United States Patent [19]

Henning et al.

[11] Patent Number: 5,341,368

[45] Date of Patent: Aug. 23, 1994

[54] DIGITAL SWITCHING SYSTEM INTERCONNECTING BUSES WITH IMCOMPATIBLE PROTOCOLS

[75] Inventors: Paul N. Henning, Madison; Kent D. Anderson, Brodhead, both of Wis.

[73] Assignee: American Tel-A-Systems, Inc., McFarland, Wis.

[21] Appl. No.: 880,161

[22] Filed: May 5, 1992

[51] Int. Cl.5 ..................... H04L 12/52; H04L 12/50
[52] U.S. Cl. ..................... 370/58.1; 370/67; 370/85.13
[58] Field of Search ............ 370/60, 60.1, 110.1, 370/94.1, 94.2, 85.13, 85.14, 85.12, 85.11, 58.1, 58.2, 58.3, 61, 67

[56] References Cited

U.S. PATENT DOCUMENTS

| | | | |
|---|---|---|---|
| 4,696,026 | 9/1987 | Plouff | 379/34 |
| 4,799,144 | 1/1989 | Parruck et al. | 364/200 |
| 4,807,282 | 2/1989 | Kazan et al. | 379/230 |
| 4,955,054 | 9/1990 | Boyd, Jr. et al. | 370/61 |
| 4,975,695 | 12/1990 | Almond et al. | 370/60.1 |
| 5,072,441 | 12/1991 | Szwarc | 370/60 |
| 5,086,461 | 2/1992 | Thorn et al. | 379/230 |

*Primary Examiner*—Wellington Chin
*Attorney, Agent, or Firm*—Antonelli, Terry, Stout & Kraus

[57] ABSTRACT

A digital switching system (10) in accordance with the invention includes a digital switching matrix (12) having an input bus and output bus; a plurality of information systems (18, 20 and 22) with each information system having an information bus for transmitting and receiving information using a protocol which is different from a protocol used by the information bus of each of the other information systems with the information buses of the information systems being electrically connected to the input and output buses of the matrix to permit information transmitted on any of the information buses to be received by any of the information buses through the input bus, the switching matrix and the output bus; a host processor (34), for controlling the information systems with commands; and a control processor (16), for generating control signals controlling switching of switches of the digital switching matrix.

52 Claims, 11 Drawing Sheets

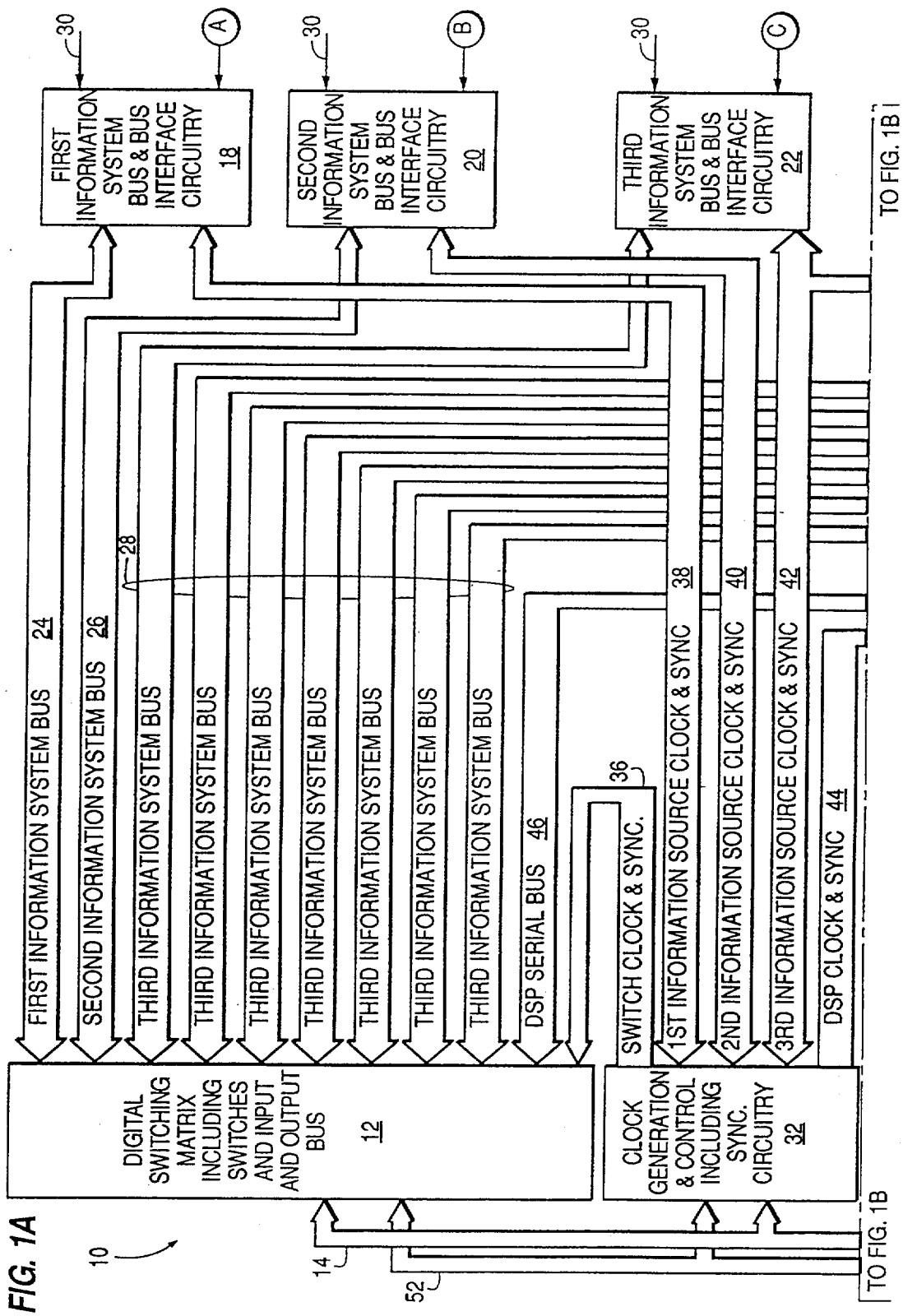

DIGITAL SWITCHING SYSTEM INTERCONNECTING BUSES WITH IMCOMPATIBLE PROTOCOLS

APPENDIX

An Appendix containing a source code listing of 240 frames of control programs which may be used for programming the control processor 16 and the digital signal processors 48 of FIG. 1 is attached hereto. The Appendix contains subject matter which is copyrighted. A limited license is granted to anyone who requires a copy of the programs disclosed therein for purposes of understanding or analyzing the present invention, but no license is granted to make a copy for any other purpose, including the loading of a processing device with code in any form or language.

CROSS-REFERENCE TO RELATED APPLICATIONS

Reference is made to Ser. No. 07/897,109, filed Jun. 11, 1992 entitled "Digital Switching System Connecting Buses With Incompatible Protocols and Telephone Answering System and Private Automatic Branch Exchange With Integrated Voice and Textual Message Recording".

TECHNICAL FIELD

The present invention relates to systems for connecting buses of information systems having incompatible protocols.

BACKGROUND ART

Digital switching systems have been developed which provide non-blocking digital switching in which pulse code modulation is used to digitize information such as voice channels to permit controllable switching of information on the inputs to the outputs of the digital switch. For example a total of 32 voice channels may be pulse code modulated and time division multiplexed so that selected channels on the inputs of the digital switch are connected to different outputs of the digital switch. The switching required to produce the time division multiplexed switching of different channels between selected inputs and outputs is produced by control switching signals applied to the digital switches of the switching matrix.

In the field of telephony numerous manufacturers make voice digitizing boards which convert individual channels (conversation) into a time division multiplexed PCM encoded format in which multiple bits encode respective samples of each channel. On a wire pair typically 24 or 32 different channels are encoded by assigning individual channels representative of a conversation to a particular time slot within a frame of the time division multiplexed PCM encoded information. Switching of the PCM information on a bus is controlled by a digital switch which permits the selective connection of individual channels through the public switched telephone network to particular telephone lines.

The voice digitizing products of manufacturers such as Dialogic Corporation, Natural Microsystems Corporation, Rhetorex and the assignee of the present invention, American Tel-A-Systems, Inc. have incompatible bus protocols which prevent direct interconnecting of buses of systems made by these manufacturers. The buses utilized by the aforementioned manufacturers and others have several possible clock rates such as 1.544 MHz, 2.048 MHz, 4.096 MHz and different 8 kHz synchronization of the frame rate as provided respectively by specifications of integrated circuits manufactured by National Semiconductor or Mitel Corporation and further synchronization signals which define superframes utilized for T1 service which are a combination of multiples of 6 basic frames at the 8 kHz frame rate. As a result of the diversity of the clock rates, synchronization and other timing signals utilized by the various manufacturers there is no compatible bus protocol for interconnecting information systems which have been made by the interconnection of boards provided by a particular manufacturer with an information system made by interconnecting boards from another manufacturer. As a result a user of a system having digitized voice to date is required to make difficult choices as to which manufacturers' products to purchase which limit the overall functional capability of a system and the ability to modify the system in the future as a consequence of the inability to interconnect subsystems formed from products manufactured by different manufacturers.

Circuit boards are marketed which may be inserted into the expansion slot of a standard PC such as a PC-AT to control different types of analog telephone ports. These boards provide analog telephone line port receptacles for connection to the public switched telephone network (PSTN). The analog ports may be for a station port which supplies battery feed capable of applying ring voltage to a line along with normal line status and control functions for the purpose of interfacing two telephones; a loop start port of the so-called "plain old telephone service" which includes all normal line status monitoring; a ground start port which provides a ground start line interface; a DID port which provides all known RS-464 and IEEE standard DID protocols including wink, immediate start as well as DTMF and pulse dialing; an E & M port which may be configured for type I or II signalling and a battery feed port which provides battery but cannot provide ring voltage. These circuit boards have programmable jumpers or switches which permit each of the ports of the circuit to be programmed to have the desired type of line characteristic. The disadvantage of this type of circuit board is that all of the circuits necessary for supporting the types of possible line interfaces which may be provided must be present on the board even though the customer may only want to use a fraction of the overall number of line type interfaces that are supported by the board. As a result, the expense of the circuit board is increased and further the number of analog lines which may be connected to the board is lessened as a consequence of the necessary electronics for supporting all of the lines taking up space which lessens the number of ports which may be on the board.

Another design of a circuit board for interfacing a PC with analog lines does not permit the programming of the characteristic of the line to which the circuit board is to be connected. Each circuit board of this type is hard-wired to support one or more types of analog line interfaces. As a result, this product is not programmable and may be only used for specific applications for specific connections to analog lines which prevents it from being reconfigured by the customers to interface with different types of analog lines.

DISCLOSURE OF THE INVENTION

The present invention is a digital switching system utilizing a digital switching matrix and further an information system having a plurality of connected information buses of different information systems which each have individual bus protocols which are incompatible and different from the protocols of the other buses of the remaining information systems that prevents communications directly between buses of the information systems. A host processor is coupled to each of the plurality of information systems for controlling the information systems with commands causing at least one of the information systems to transmit and at least one of the information systems to receive information by connecting the information bus of the transmitting and the information bus of the receiving information systems with a digital switching matrix. A control processor controls the digital switching matrix by generating control signals controlling switching of the switches of the digital switching matrix in response to commands from the host processor. The invention is particularly applicable to the interconnection of telephony systems having incompatible information buses transmitting information in the form of time division multiplexed PCM encoded digitized voice or data which are made from products of different manufacturers having different bus specifications. Individual telephone conversations, which are digitized by using time division multiplexed PCM encoding to produce multiple channels on pairs of conductors of the bus of the system, may be connected to other pairs of conductors on the bus within one of the connected information systems or to another information system through the switching matrix by suitable programming of the information systems and the control processor.

Control circuitry is provided, which is responsive to the control processor, for providing a master clock signal to the information systems which controls a rate of information transmission and reception on the buses by the information systems and further the generation of master synchronization signals for controlling framing and other master timing signals which are transmitted to the information systems to provide compatible systems clock, synchronization and control signals. The commands from the host processor control the generation of the master clock signal with the host processor commanding the information systems to control the transmission and reception on the information buses under the control of the master clock signal. The master clock signal may be synchronized a with another signal provided on one of the information buses of the information systems to the control circuitry such as, but not limited to, a timing specification provided by the PSTN such as where T1 service is provided. Additionally, the control circuitry also provides the synchronization signals to the information systems which synchronize frames of information transmitted and received on the buses by the information systems.

In a preferred application of the present invention the host processor is a PC and the control processor is commanded by the host processor to perform the necessary switching interconnections of the switching matrix in order to ensure that appropriate connections are made between the buses of the information systems which are connected to the switching matrix which result in the transmission and reception of information as commanded by the host processor to the information systems as a consequence of the commands issued from the host processor to the information systems. As a result of the commands controlling the connection of the buses from the incompatible information systems through the switching matrix and the generation of a master clock signal controlling the rate of transmission of information on the buses as well as synchronization signals, the information systems individually which have incompatible bus specifications are made compatible by the supplying of common clock and synchronization information to all systems. This ensures the compatibility of information transmission on and between the buses of the information systems and the appropriate signal paths through the switching matrix being established between the buses as a consequence of the switching of the switching matrix being under the control of the commands issued by the host processor.

The invention provides distinct advantages over the prior art which does not permit incompatible information systems to be interconnected through their buses as a consequence of incompatible bus protocols. As a result, digitized voice and other forms of digitized information, such as ISDN, may be transmitted between incompatible digital information systems by the supplying of appropriate commands from a host processor such as a PC to the control processor which controls the generation of centralized clock and synchronization information which is transmitted to the individual information systems to provide their clock and synchronization signals. As a result of using a conventional PC and a processor such as a microprocessor, which is part of a circuit board that is connected to the PC as a peripheral device which is controlled by the PC to control the digital switching matrix and the control circuitry to generate the common system timing, the overall cost of the system is reduced while permitting the interconnection of otherwise incompatible information systems in conventional usage in applications such as telephony where digitized voice products are provided by diverse manufacturers of voice digitizing circuit boards used in combination with digital switches to provide diverse telephonic services through customers connected to the PSTN.

The invention further provides a line interface between the PSTN, a personal computer and an information bus which permits the control by a personal computer of the interfacing of multiple types of analog telephone lines with the PSTN. Individual modules are inserted into slots which configure an interface with a particular type of analog telephone line. As a consequence of the module containing circuitry unique to the type(s) of analog line interface created by its insertion in the appropriate slot of the circuit board, the circuit board contains less circuitry than the prior art as a result of specialized circuits for producing the interface with a particular type of analog line being contained in the module as contrasted with the circuit board as in the prior art. Furthermore additional ports for driving additional analog lines are provided as a consequence of the circuit board containing less circuitry than the prior art as a consequence of particular circuitry for configuring a particular type of analog line interface being present within the module which is inserted into the slot of the circuit board. The line interface may be configured by the insertion of the appropriate module to provide an interface with any combination of DID, E & M, source, ground start, loop start or battery feed type analog lines. The line interface provides the low level protocols and signalling necessary for the different line types. Moreover, an interface with a bus is provided for access to other interface boards. A host processor, which may be a PC, controls the control processor of the line interface by suitable commands which are transmitted from the host processor to the control processor.

A digital switching system in accordance with the invention includes a digital switching matrix having an input bus and an output bus with information on the input bus being selectively connectable to information on the output bus in response to control signals applied to switches of the switching matrix; a plurality of information systems with each information system having an information bus for transmitting and receiving information using a protocol which is different from a protocol used by the information bus of each of the other information systems with the information buses of the information systems being electrically connected to the input and output buses of the matrix to permit information transmitted from a conductor of any of the information buses to be received by another conductor of any of the information buses through the information bus, the switching matrix and the output bus; a host processor, coupled to each of the plurality of information systems, for controlling the information systems with commands causing at least one of the information systems to transmit and at least one of the information systems to receive information using the information bus of the transmitting and the information bus of the receiving information systems, the switching matrix and the input and output buses; and a control processor, responsive to commands from the host processor, for generating the control signals controlling switching of the switches of the digital switching matrix. Information transmitted and received on the information buses may be encoded in a time division multiplexed pulse code modulated format to provide a plurality of channels of information with each channel being time division multiplexed. The channels of information may contain audio voice information or data. At least one of the systems may be connected to a public switched telephone network and the network may provide a timing reference to the switching system used to generate a master clock signal by control circuitry to control a rate of transmission and reception on the buses by the information systems. The host processor also transmits commands to a plurality of the information systems and to the control processor to cause information to be transmitted from the bus of one of the information systems through the digital switching matrix for receipt by the bus of another one of the information systems. The host processor transmits commands to one of the information systems and to the control processor to cause information to be transmitted and received by the bus of the information system receiving the commands through the switching matrix. The host processor also transmits commands to at least one of the information systems and to the control processor to cause a plurality of channels of information to be transmitted from the bus of at least of the information systems through the switching matrix to the bus of at least another one of the information systems. The host processor also transmits commands to a plurality of the information systems and to the control processor to cause the plurality of channels of information to be transmitted from the bus of at least one of the information systems through the switching matrix to the bus of at least another one of the information systems. Finally, the host processor transmits commands to the plurality of information systems and to the control processor to cause full duplex communications between buses of at least two of the information systems through the switching matrix.

The invention further includes control circuitry, responsive to the control processor, for providing a master clock signal to the information systems which controls a rate of information transmission and reception on the buses by the information systems. The commands control the generation of the master clock signal with the host processor commanding the information systems to control the transmission and reception on the information buses under the control of the master clock signal. The master clock is synchronized with a signal provided on one of the information buses of the information systems. The control circuitry also provides synchronization signals to the information systems which synchronize frames of information transmitted and received on the buses by the information systems. The commands control the generation of the synchronization signals with the host processor commanding the information systems to synchronize the transmission and reception of frames of information on the information buses under the control of the synchronization signals.

A system in accordance with the invention includes a plurality of information systems with each information system having an information bus for transmitting and receiving information using a protocol which is different from a protocol used by the information bus of each of the other information systems with conductors of the information buses of the information systems being electrically connected to permit information transmitted on a conductor of any of the information buses to be received by another conductor of any of the information buses; a host processor, coupled to each of the plurality of information systems, for controlling the information systems with commands causing at least one of the information systems to transmit and at least one of the information systems to receive information using the information bus of the transmitting and the information bus of the receiving information systems; a control processor, responsive to commands from the host processor, for generating the control signals; and control circuitry, responsive to the control processor, for providing a master clock signal to the information systems which controls a rate of information transmission and reception on the buses by the information systems. The commands control the generation of the master clock with the host processor commanding the information systems to control the transmission and reception of information on the information buses under the control of the master clock. The master clock may be synchronized to generate the clock signal with another signal provided on one of the information buses of the information systems. The control circuitry also provides synchronization signals to the information systems which synchronize frames of information transmitted and received on the buses by the information systems. The commands control the generation of the synchronization signals with the host processor commanding the information systems to synchronize the transmission and reception of frames on the information buses under the control of the synchronization signals. Information transmitted and received on the information buses may be encoded in a pulse code modulation format to provide a plurality of channels of information with each channel being time division multiplexed. The channels of information may contain audio voice information. At least one of the information systems may be connected to a public switched telephone network and the network may provide a timing reference to the system used to generate the master clock signal.

BRIEF DESCRIPTION OF THE DRAWINGS

FIGS. 1A–1C illustrates a block diagram of a system in accordance with the present invention.

BEST MODE FOR CARRYING OUT THE INVENTION

Figure 1B:
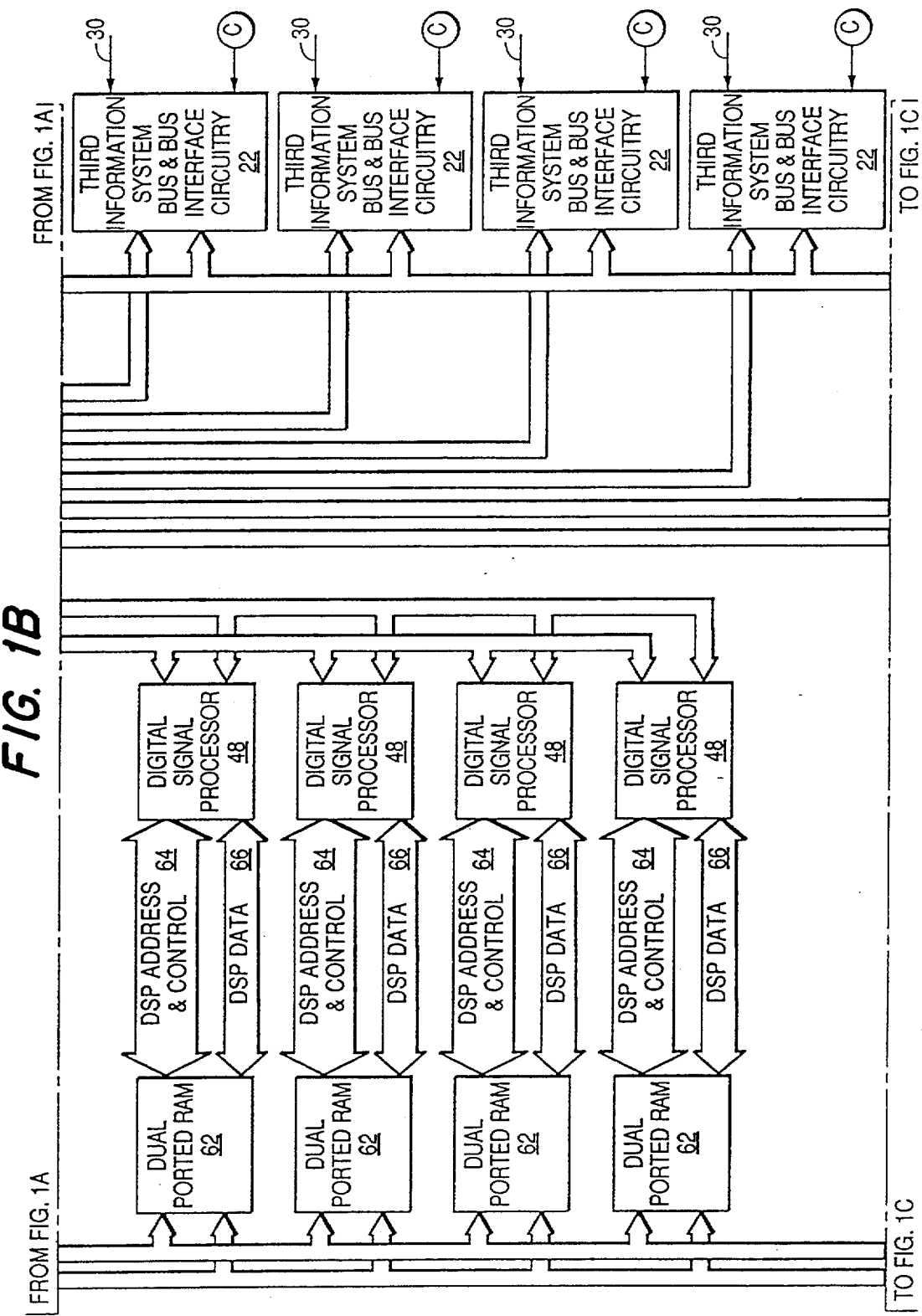
Figure 1C:
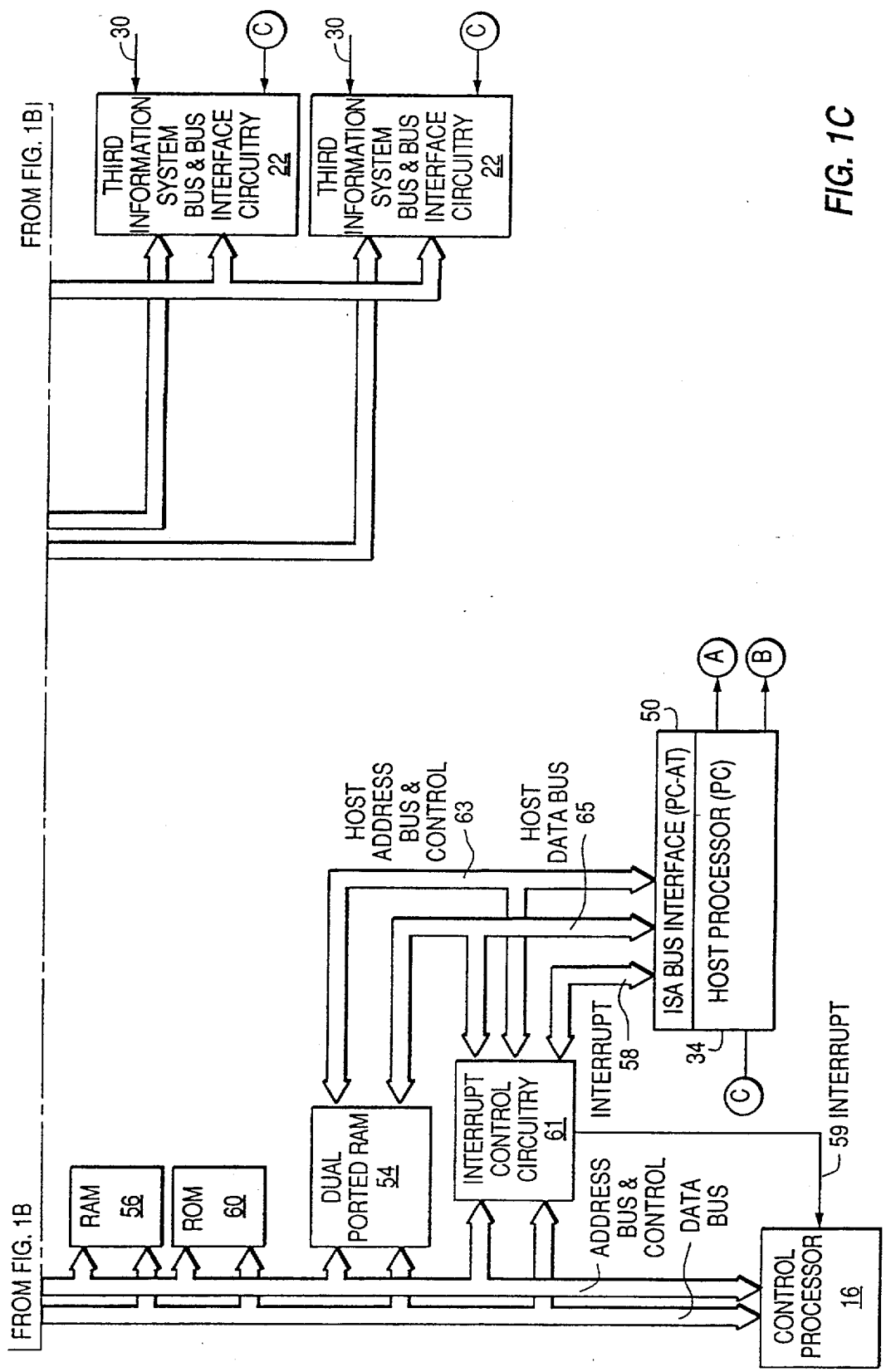

FIG. 1 illustrates a block diagram of a digital switching system 10 in accordance with the present invention. A digital switching matrix, switches and input and output buses 12 is the principal switching element of the digital switching system. The input bus and the output bus is conventional and is not separately illustrated. The digital switching matrix functions such that information on the input bus is selectively connectable to the information on the output bus in response to control signals applied to the switches of the switching matrix by control bus 14 which is connected to a control processor 16 which is described in detail below. A plurality of information systems, which are respectively identified as first, second and third information systems 18, 20 and 22, are connected to the digital switching matrix, switches and input and output buses 12 respectively by a first information system bus 24, second information system bus 26 and third information system bus 28. It should be understood that the present invention is not limited to the interconnection of any particular number of information systems and buses with the first, second and third information systems 18, 20 and 22 and first, second and third information system buses 24, 26 and 28 only being representative of possible information systems and buses which may be lesser or greater in number than the three information systems and buses as illustrated. The first information system 18 in a preferred embodiment of the invention is representative of digital voice processing circuitry manufactured by Dialogic Corporation. The second information system 20 in a preferred embodiment of the invention is representative of digital voice processing circuitry manufactured by Natural Microsystems. The third information system 22 in a preferred embodiment of the invention is representative of a group of interconnected line interface boards as described in conjunction below in FIGS. 3–8 which are manufactured by the assignee of the present invention. Inputs 30 are representative of connections between the PSTN and the configuration of circuits which form a complete information system such as a telephony system comprised of interconnected circuit boards for digital processing and switching of audio such as voice communications or data for transmission by protocols such as, but not limited to, ISDN. The digital switching matrix, switches and input and output buses 12 may be implemented by the connection of a plurality of Siemens multi-point switching and conferencing integrated circuits PEB 2245. Each integrated circuit of the digital switching matrix, switches and input and output buses 12 may switch any of 512 time and space division multiplexed input channels to any of 256 time and space division multiplexed output channels to provide PCM encoding. The inputs are connected in parallel to form a 512 channel by 512 channel switching matrix. Each integrated circuit is capable of performing multiple channel conferencing in which several input channels are cross-connected and coupled to appropriate output channels. The conferencing capability of the aforementioned integrated circuits is limited to 64 inputs combined in a maximum of 21 conferences. It should be understood that the present invention is not limited to any particular configuration or operation of the digital switching matrix, switches and input and output buses 12. The first information system bus 24, the second information system bus 26 and the third information system bus 28 each have distinct, unique, different and incompatible protocols which are incompatible with the protocols of the other buses which prevents direct connection of the buses into one system. As a result, the buses 24, 26 and 28 may not be directly connected to transfer information from one information system 18, 20 and 22 to another information system relying upon the timing including clock signals and synchronization signals generated by any one of the information systems. The digital switching matrix, switches and input and output buses 12 provide the capability of connecting conductors of each of the individual first information system bus 24, second information system bus 26 and third information system bus 28 to other conductors of that same bus or alternatively to conductors of another one of the buses and time division multiplexed information, such as voice channels, from one bus 24, 26 and 28 to another bus. The switching connections necessary to connect the input and output buses of the information on the input bus to the output bus of the digital switching matrix to provide appropriate connections between conductors of a single bus 24, 26 and 28 or between the buses is controlled by the control signals applied on the control bus 14 by the local processor 16.

The telephony industry has been characterized by diverse products each developed to provide digital voice processing utilizing time division multiplex PCM encoding. However, the manufacturers of these products have not developed a universal protocol which permits the interconnection of systems each individually configured with one manufacturer's products by bus interconnections to systems configured with another manufacturer's products. The present invention provides the capability of interconnecting information systems through buses which have incompatible protocols which have not been designed to be interconnected. The digital switching matrix, switches and input and output buses 12 provide connections between the conductors of the buses 24, 26 and 28 under the control of the control processor 16. Clock generation and control circuitry 32, which is controlled by the control processor 16, provides a master clock signal to the information systems 18, 20 and 22 which controls a clock rate of information transmission and reception of time division multiplexed PCM encoded information on the buses 24, 26 and 28 by the information systems and further controls the generation of necessary synchronization signals which synchronize the transmission and reception of frames of the time division multiplexed PCM digitally encoded information produced by the information systems on the information buses. In a preferred embodiment where the first, second and third information systems 18, 20 and 22 are respectively made from circuits supplied by Dialogic, Natural Microsystems and from the line interface circuits as described below in conjunction with FIGS. 3-8 of the assignee, a 1.544 MHz, a 2.048 MHz clock signal and a 4.096 MHz clock signal, an 8 kHz synchronization pulse marking the beginning of frames conforming to National Semiconductor timing specifications which may be used for information systems made from circuits supplied by at least the assignee, an 8 kHz synchronization pulse marking the beginning of frames conforming to Mitel timing specifications which may be used for an information system configured from Natural Microsystems circuits and synchronization signals which define a superframe used for T1 service which marks multiples of 6 basic frames. Additionally, the clock generation and control including sync circuitry 32 may be synchronized to an external timing reference from one of the information systems 18, 20 and 22 or from a source external to the information systems such as PSTN timing for T1 service used to generate the master clock signal to control the clock rate and timing of frames of information transmission and reception on the buses by the information systems. In this circumstance the master clock signal and synchronization signals may be synchronized to any external frame synchronization time reference. The external timing reference is routed to the clock generation and control including sync circuitry 32 by control of the control processor 16. Removal of the external clock reference causes the clock generation and control including sync circuitry 32 to revert to providing internally generated timing signals. Each of the information systems 18, 20 and 22 may provide the external timing reference through their connection to the PSTN which results in the timing reference being fed to the clock generation and control including sync circuitry 32 through the control processor 16 as described above. In any event, the clock generation and control including sync circuitry 32 supplies a common clock, synchronization and any other timing signals to some or all of the information systems 18, 20 and 22 either by means of signals generated as a consequence of the control of the control processor 16 as receiving commands from the host processor 34 as described below which also controls the switching connections produced by the digital switching matrix, switches and input and output buses 12 and the functioning of the first, second and third information systems 18, 20 and 22 as operating to transmit or receive information through the switching matrix and input and output buses or from an external source such as T1 timing.

The host processor 34 is coupled to each of the information systems 18, 20 and 22. The host processor 34 controls the information systems with commands causing at least one of the information systems 18, 20 and 22 to transmit and at least one of the information systems to receive information using the information system buses 24, 26 or 28, the switching matrix, switches and input and output buses 12. The different functions of the system 10 which are controlled by the host processor 34 are specified by a command set inputted from the host processor. The mnemonics of the command set are not discussed herein and may be varied. The control processor 16 is responsive to the commands issued from the host processor 34, which may be a PC and preferably may be PC-AT, for generating the control signals outputted on the bus 14 to the digital switching matrix of the digital switching matrix, switches and input and output buses 12 for controlling the switching of the switches in the switching matrix and the generation of the clock signals and synchronization signals and any other timing signals or control signals produced by the clock generation and control including sync circuitry 32. Suitable control programs for the preferred control processor 16, and digital signal processors 48 described below are respectively contained in frames 1–207 and 208–240 in the attached Appendix when the processor is the Hitachi 64180 and the digital signal processors are Analog Devices ADSP 2101. The clock generation and control including sync circuitry 32 is connected to the digital switching matrix, switches and input and output buses 12 by the switch clock and sync bus 36. Similarly the clock generation and control including sync circuitry 32 applies a common clock signal and synchronization signals respectively to at least some and in many applications all of the first, second and third information systems 18, 20 and 22 through the first information system clock and sync bus 38, the second information system clock and sync bus 40 and the third information system clock and sync bus 42. Finally, the clock generation and control including sync circuitry 32 produces clock and sync signals, which are applied through the DSP clock and sync bus 44, to a plurality of digital signal processors 48 as described below. A DSP serial bus 46 connects the digital switching matrix, switches and input and output buses 12 with the digital signal processors 48. The information transmitted on the first, second and third information system buses 24, 26 and 28 is preferably encoded in time division multiplexed pulse code modulated format to provide a plurality of channels of information which may be for example twenty-four or thirty-two in number without limitation with each channel being time division multiplexed in frames. In a preferred embodiment of the present invention, the PCM encoding of information channels by time division multiplexing is digitally encoded audio provided by the information systems 18, 20 and 22 which are made from circuits manufactured by manufacturers such as Dialogic, Natural Microsystems and the assignee of the present invention as described below. It should be understood that the invention is not limited thereto and may for example receive information in the form of data coming from the PSTN in an ISDN format. The host processor 34 controls both the local processor 16 and the first, second and third information systems 18, 20 and 22 through commands. The commands are decoded by the first, second and third information systems 18, 20 and 22 to control which of the information systems is transmitting information under control provided by the clock generation and control including sync circuitry 32 through the digital switching matrix and input and output buses 12 to the receiving information system. It should be understood that the information systems 18, 20 and 22 may be connected through the digital switching matrix, switches and input and output buses 12 under the control of the control processor 16 which in turn is controlled by the host processor 34 for controlling the digital switching matrix and input and output buses and the clock generation and control including sync circuitry 32 to cause conductors or information of one of the information system buses 24, 26 and 28 to be connected to other conductors or information in the same information system bus so that interconnects may be made in the same information system or to cause conductors or information of one of the information system buses to be connected to conductors or information of another of the information system buses. The aforementioned operation permits the interconnection between information systems to provide interconnection of buses which each have protocols which are incompatible with the protocols of the buses of the other information systems when operating within each of their respective information systems with timing supplied internally to the information system 18, 20 and 22 for controlling information transfer on its information system bus 24, 26 and 28.

To perform the diverse foregoing functions, the host processor 34 transmits commands to a plurality of the information systems 18, 20 and 22 and to the control processor 16 to cause information to be transmitted from the information system bus 24, 26 or 28 of one of the information systems 18, 20 or 22 through the digital switching matrix, switches and input and output buses 12 for receipt by the bus of another one of the information systems. Alternatively, the host processor 34 transmits commands to one of the information systems 18, 20 and 22 and to the control processor 34 to cause information to be transmitted and received by the bus of the information system(s) receiving the command through the digital switching matrix, switches and input and output buses 12. Furthermore, the host processor 34 transmits commands to at least one of the information systems 18, 20 and 22 and to the control processor 16 to cause a plurality of channels of information which are produced by the time division multiplexed PCM encoding to encode each channel in a multiple bit format such as 8 bits per channel to be transmitted from at least one information system bus 24, 26 and 28 of the information systems through the digital switching matrix, switches and input and output buses 12 to at least one bus of at least one of the information systems. Moreover, the host processor 34 transmits commands to a plurality of the information systems 18, 20 and 22 and to the control processor 16 to cause the plurality of channels of information which are encoded in the time division multiplexed PCM format to be transmitted from at least one information system bus 24, 26 and 28 of one of the information systems 18, 20 and 22 through the digital switching matrix, switches and input and output buses 12 to at least one information bus of another of the information systems. Additionally, the host processor 34 transmits commands to a plurality of information systems 18, 20 and 22 and to the control processor 16 to cause full duplex communications between information system buses 24, 26 and 28 between buses of at least two of the information systems through the switching matrix. Duplex communications are achieved by the setting of transmitting and receiving signal paths from at least a pair of information systems 18, 20 and 22 through the digital switching matrix, switches and input and output buses 12.

The clock generation and control including sync circuitry 32 is responsive to the control processor 16 to provide a master clock signal to the information systems 18, 20 and 22 which control a rate of information transmission and reception on the information system buses 24, 26 and 28 by the information systems. The commands provided by the host processor 34 control the generation of the master clock with the host processor commanding the information systems 18, 20 and 22 to control the transmission and reception of information on the information system buses 24, 26 and 28 under the control of the master clock. The master clock may be synchronized from a timing reference from one of the information systems 18, 20 and 22 or an external timing reference not under the control of the host processor 34 such as that provided by T1 service through the connection 30 to the PSTN. The clock generation and control including sync circuitry 32 also provides the synchronization signals which synchronize frames of the time division multiplexed PCM encoded information transmitted and received on the buses by the information systems 18, 20 and 22. The commands from the host processor 34 control the generation of the synchronization signals with the host processor commanding information systems 18, 20 and 22 to synchronize the transmission and reception on the information system buses 24, 26 and 28 under the control of the synchronization signals. A PC interface 50 interfaces the control processor 16 to the host processor 34. Preferably the interface 50 is an ISA bus interface which is in accordance with standards for a PC-AT. The bus interface 50 supports shared interrupts and uses both the input/output and memory address spaces on the host address bus and control 63 and the host data bus 65 of the host processor 34. The bus interface 50 provides communications between the host processor 34 and the control processor 16. Write-only input/output locations are used in controlling interrupt generation and memory base addresses. The input/output base address is switch selectable in hexadecimal respectively at input/output addresses between sequential hexadecimal addresses 0200-0370 which jump in increments of 0010 in hexadecimal address locations. Additional circuit boards within the system 10 such as the third information system 22 share interrupts mapped to the above-described input/output addresses. The base input/output address is used to reenable the interrupt control circuitry 61 that generates interrupts 58 to the host processor 34 by the host processor writing to the base input/output address after each interrupt is serviced. The base memory address for the dual ported ram 54 of the system 10 with respect to the host processor 34 is set by the host processor 34 writing to the base input/output address plus 1. Data bits D0-D7 on the host data bus 65 map to the address bits A15-A22 of the host address bus and control 61 to set aside 32K address space for the system 10. For example to map the dual ported RAM into base address location D0000 in hexadecimal of the host processor 34, data byte 1A in hexadecimal would be written to the base input/output address plus 1. There is no hardware to prevent mapping into memory below 640K. On power-up the dual ported RAM 54 cannot be accessed by the host processor 34. A jumper switch (not illustrated) may be used to control the mapping of the dual ported RAM 54 with respect to address bit A23 on the host address bus and control 63. When this jumper switch is installed, address bit A23 must be high to access the board, in which case the board is mapped into memory above 16M. The dual-ported RAM 54 may have 2K of memory with the address for the system 10 being mapped into 32K the base memory by the previously described input/output strobe. The ISA bus interface (PC-AT) 50 may contain a hex switch not illustrated to determine the 2K address space within the 32K of base memory used by a particular circuit board with the hex switch having hexadecimal settings 0–F with each hexadecimal value representing a multiple of 2K that is added to the base address of the system as determined by the previously described input/out strobe.

The shared interrupt allows the control processor 16 to generate an interrupt to the host processor 34 by writing to the dual-ported RAM address 54 of 0000 in hexadecimal. The interrupt is cleared when the host processor 34 writes to location 0000 in hexadecimal and also writes to the input/output base address. The host processor 34 can generate an interrupt to the control processor 16 by the writing of 0001 in hexadecimal into the dual-ported RAM 54. The control processor 16 clears the interrupt by writing to 0001 in hexadecimal. Interrupt requests are generated by the interrupt control circuitry 61 and are issued to the host processor 34 on the interrupt lines 58 and are issued to the control processor 16 on the interrupt line 59.

The system 10 supports the shared interrupts provided in the PC-AT Technical Manual as follows: When address 0 of the dual-ported RAM 54 is written into, an interrupt is generated (edge-triggered). If more than one circuit board such as other boards in a third information system 22 attempts to generate the interrupt, only one interrupt is actually generated. Furthermore, if one board generates an interrupt and another board tries to generate an interrupt before the first one is serviced, the second interrupt will not occur until the interrupt circuitry is rearmed. The interrupt service routine must determine which board is interrupting. After finding the appropriate board, it must perform all software tasks required in servicing the interrupt. When these tasks are completed the interrupt service routine must write to location 0 of the dual ported RAM 54 to enable the board to generate another interrupt. The last step in the process is to write into the input/output base address shared by all boards. This enables the interrupt generating circuitry on all boards. If any interrupts are pending (i.e. from a second board needing service before the first board's interrupt service routine is complete), another interrupt will be generated at this time and the normal interrupt service routine functions should be executed. This methodology allows only one board to be serviced in a given interrupt service routine. However, even if all of the boards in the system 10 request an interrupt simultaneously, a fresh interrupt is generated for each board until all have been serviced. If desired, the interrupt service routine can service all boards within one call to the interrupt service routine. If this method is chosen, the input/output strobe should not be generated until the last board is serviced. This will prevent multiple interrupts from occurring. The combination of the dual-ported RAM 54 and the interrupt control circuitry 61 provides a complete communication mechanism which allows the control processor 16 to send messages to the host processor 34 and the host processor to send messages to the control processor. These messages provide all the control functions to a particular board to interface the host processor 34 with a control processor 16.

The control processor 16 may be any suitable microprocessor but an Hitachi 64180 is utilized in conjunction with the source code in the Appendix at frames 1–207. The control processor 16 provides access to the dual-ported RAM 54, RAM 56 and ROM 60. In the aforementioned Hitachi microprocessor a total of 64K of memory is provided. All device specific functions are implemented via the input/output interface of the control processor 16. These communications include communications with the digital signal processors 48, the clock generation and control including circuitry 32, switching control of the digital switching matrix, switches and input and output buses 12 and serial input/output communications. The ROM 60 stores the application program. The RAM 56 is used for variable storage and temporary information. The dual-ported RAM 54 provides the interface to the host processor 34 as described above. The control processor 16 controls all hardware specific aspects of the system. For example, if a port in a circuit board of the third information system 22 is to be connected to a port of another board of the third information system, the control processor 16 receives a command from the host processor 34 to make this connection. The control processor 16 translates the information into the appropriate format and communicates with the digital switching matrix, switches and input and output buses 12 via the appropriate input/output port. The control processor 16 also controls the functions of the digital signal processors 48 and determines the master clock source for the system 10 such as for transmitting information on the information system buses 24, 26 and 28 in time division multiplexed PCM format.

The bus 28 of the third information system bus and bus interface circuitry 22 is designed to transfer time division multiplexed PCM encoded information to and from the boards within the hardware illustrated in FIGS. 3–8 and to other peripherals. The interface includes an appropriate master clock which may be 2.048 MHz but the invention is not limited thereto, a transmit data signal, a transmit synchronization signal, a receive data signal and a receive synchronization signal. These signals are provided on the information system bus 28 via a 10-pin ribbon header. A plurality of third information systems each of which is represented by an individual block 22 can be connected to the bus 28 to provide expansion. The clock generation and control including sync circuitry 32 must provide the master clock and synchronization signals to the third information system 22. As explained above a time reference pulse such as a synchronization signal representing the basic frame rate utilized for T1 service may be provided through the PSTN interface 30 as used for T1 service. The interface between the first information system bus 24 and bus interface circuitry 18 is intended in a preferred application to interface with Dialogic Corporation products. In this circumstance it provides a mechanism to transfer information between the digital switching matrix, switches and input and output buses 12 and products which are connected to the information system 18. It should be understood that the first information system 18 is not limited to a particular bus specification with regard to a particular manufacturer such as Dialogic Corporation. The second information system 20 and bus interface circuitry is intended in a preferred application to interface with Natural Microsystems products. It should be understood that the invention is not limited thereto. In a preferred embodiment up to 256 inputs and 256 outputs are coupled to the second information system bus 26. Clock and synchronization signals for the second information system bus 26 may be generated by the second information system bus and interface bus circuitry 20 or alternatively under the control of the clock generation and control including sync circuitry 32 when the host processor 34 is controlling the transfer of information either within the second information system 20 or between the second information system 20 and the first and third information systems 18 and 22. Finally, the clock source provided by the second information system 20 may be used to synchronize the clock generation and control including sync circuitry 32 to slave the master clock signal for at least one of the first and third information systems 18 and 22. In this case, the clock generation and control including sync circuitry 32 acts as a master for the first and third information systems 18 and 22 but is slaved to the second information system 20. Any information system may provide the clock source to the clock generation and control including sync circuitry so that the clock generation and control including sync circuitry acts as a master for the remaining information systems.

The digital signal processors 48 are used to provide tone facilities to the system 10 and to boards within the system that do not have built-in tone functions. The digital signal processors 48 may be an Analog Devices ADSP 2101. A suitable control program for a digital signal processor is contained in the above-referenced Appendix for the aforementioned Analog Devices integrated circuits at frames 208–240. The digital signal processors 48 are not required to operate the digital switching matrix, switches and input and output buses 12 and provide additional support for other functions of the overall system not involving switching. For example the digital signal processors 48 perform functions such as DTMF generation and detection, call progress generation and detection and MF generation and detection. The digital signal processors 48 are connected to dual-ported RAM 62 via a DSP address and control bus 64 and a DSP data bus 66. Furthermore the dual-ported RAM 62 is coupled to the address bus and control 14 and the data bus 52 of the control processor 16. The dual-ported RAM 62 is configured into a first-in, first-out memory which stores commands from the control processor 16 and information to be transmitted to the processor such as acknowledgement and indicating tones which have been detected.

A plurality of switches which are not illustrated may be used to program functions in the system 10. A switch may be used to provide a 2K offset in the 32K address space of the system 10. A switch sets the input/output base address. Another switch permits the programming of interrupts for determining the interrupt priority in the overall system. A switch may be used to connect an interrupt pull-up resistor with only one switch being installed on one board for a given interrupt. If more than one board shares an interrupt only one board will have this switch. Finally, a switch may be connected to address location A23 of the address bus and control 14 to permit access for memory above 16 megabytes.

Figure 2:
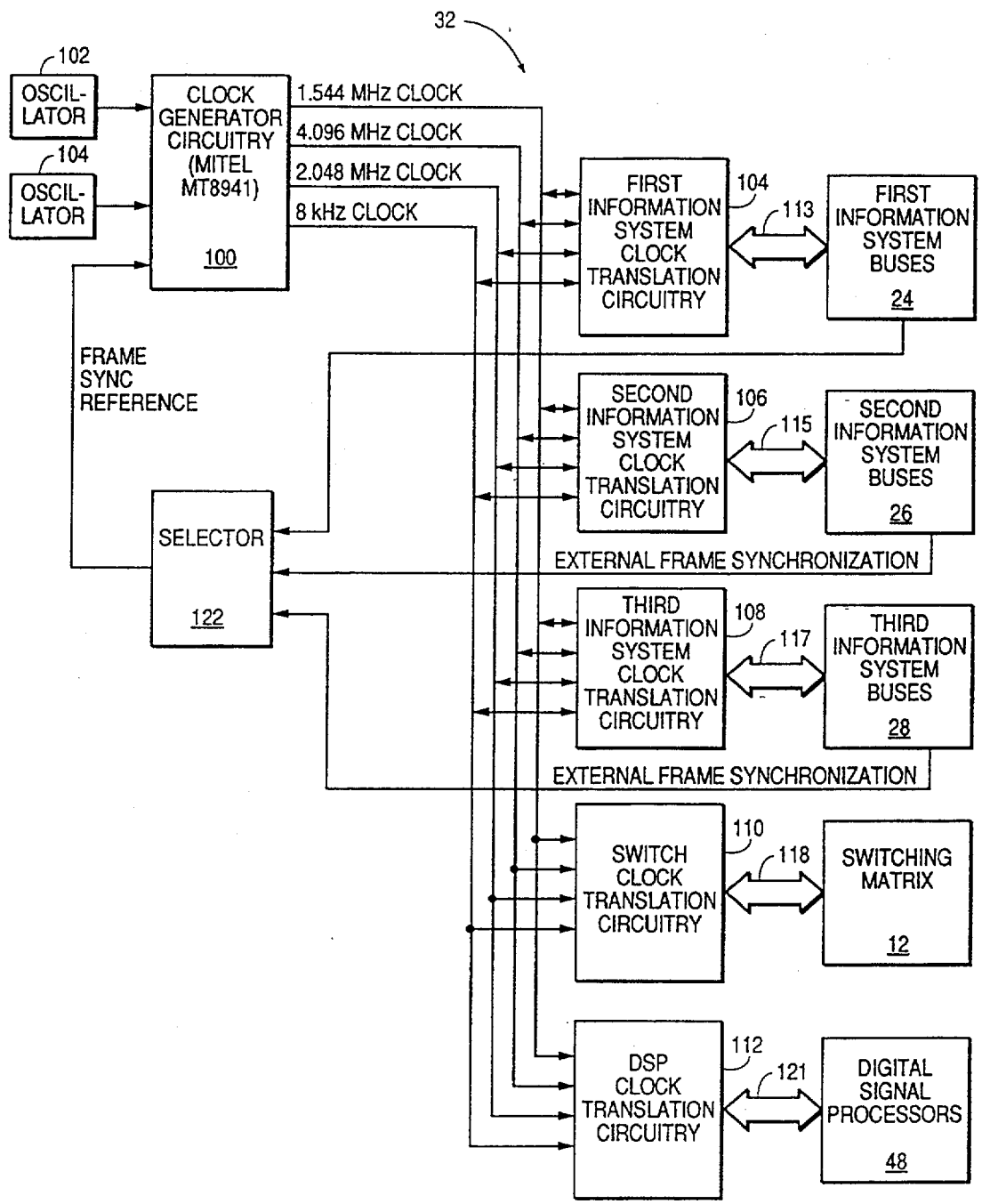
FIG. 2 illustrates a block diagram of the clock generation and control circuitry of FIG. 1.

FIG. 2 illustrates a block diagram of the clock generation and control including sync circuitry 32 of FIG. 1. Like reference numerals identify like parts in 25 FIGS. 1 and 2. Clock generation circuitry 100, which may be a Mitel integrated circuit MT8941, provides output signals comprising clock signals of 1.544 MHz, 2.048 MHz, 4.096 MHz and an 8 kHz synchronization signal in response to an input from a first oscillator 102 having a frequency of 16.384 MHz and a second oscillator 104 having a frequency of 12.352 MHz. The foregoing outputs are connected in parallel to clock translation circuitry for the first information system 104, clock translation circuitry for the second information system 106, clock translation circuitry for the third information system 108, switch clock translation circuitry 110 for the digital switching matrix, switches and input and output buses 12 and DSP clock translation circuitry 112 for the digital signal processors 48. It should be noted that the communication paths between the clock generator circuitry 110 and the first, second and third information system clock translation circuitry 104, 106 and 108 are illustrated as being bidirectional. However, in practice the design of the information systems will determine if communications are only in one direction from the clock generator circuitry 100 or in two directions between the clock generator circuitry and the information system clock translation circuitry. When communications are bidirectional, the information system is functioning as a master clock with the clock generator circuitry being slaved to the master information system and remaining information systems being slaved to the clock generator circuitry. The function of the translation circuitry 104, 106, 108, 110 and 112 is to vary pulse length and to provide time shifting and inversion of the signals generated by generator 100 to provide clock and sync signals having the particular format for driving the buses 24, 26 and 28, the switching matrix, switches and input and output bus 12 and the digital signal processors 48. The clock translation circuitry 104, 106, 108, 110 and 112 is respectively connected to the information system buses 24, 26 and 28 and the switching matrix switches and input and output buses 12 and the digital signal processor 48 with buses 113, 115, 117, 119 and 121. The clock generator circuitry 100 provides common clock and synchronization for permitting the interconnection of the information system buses 24, 26 and 28, with appropriate clock rates and frame rates as defined by sync pulses to permit the interconnection of information systems 18–22 having incompatible bus protocols with the protocols of the remaining information systems when they are operated as independent stand-alone systems as defined by their manufacturers. The external frame reference from one or more of the information systems 18, 20 and 22 is coupled from the buses 24, 26 and 28 to a selector 122 which selects a particular external frame synchronization reference from available references which may be from any information system which is connected to the clock generator circuitry 100 to permit slaving to the external source such as with T1 service resulting from a connection to the PSTN or to timing from one of the information systems. As has been stated above, the translation circuitry modifies the clock signal outputs and sync signal from the clock generator 100 to have appropriate pulse length duration and shifting and inversion to be compatible with the particular characteristics of the information system to which the information system buses 24, 26 or 28 is connected while still being overall compatible with all of the other information systems. In other words the translation performed to interface the clock signals and sync signals between the clock generator circuitry 100 and the individual information systems 18, 20 and 22 does not alter the standard timing output by the clock generator circuitry to a point where the operation of the individual buses is incompatible when they are interconnected between information systems 18, 20 and 22 by the digital switching matrix, switches and input and output bus 12.

Figure 3A:
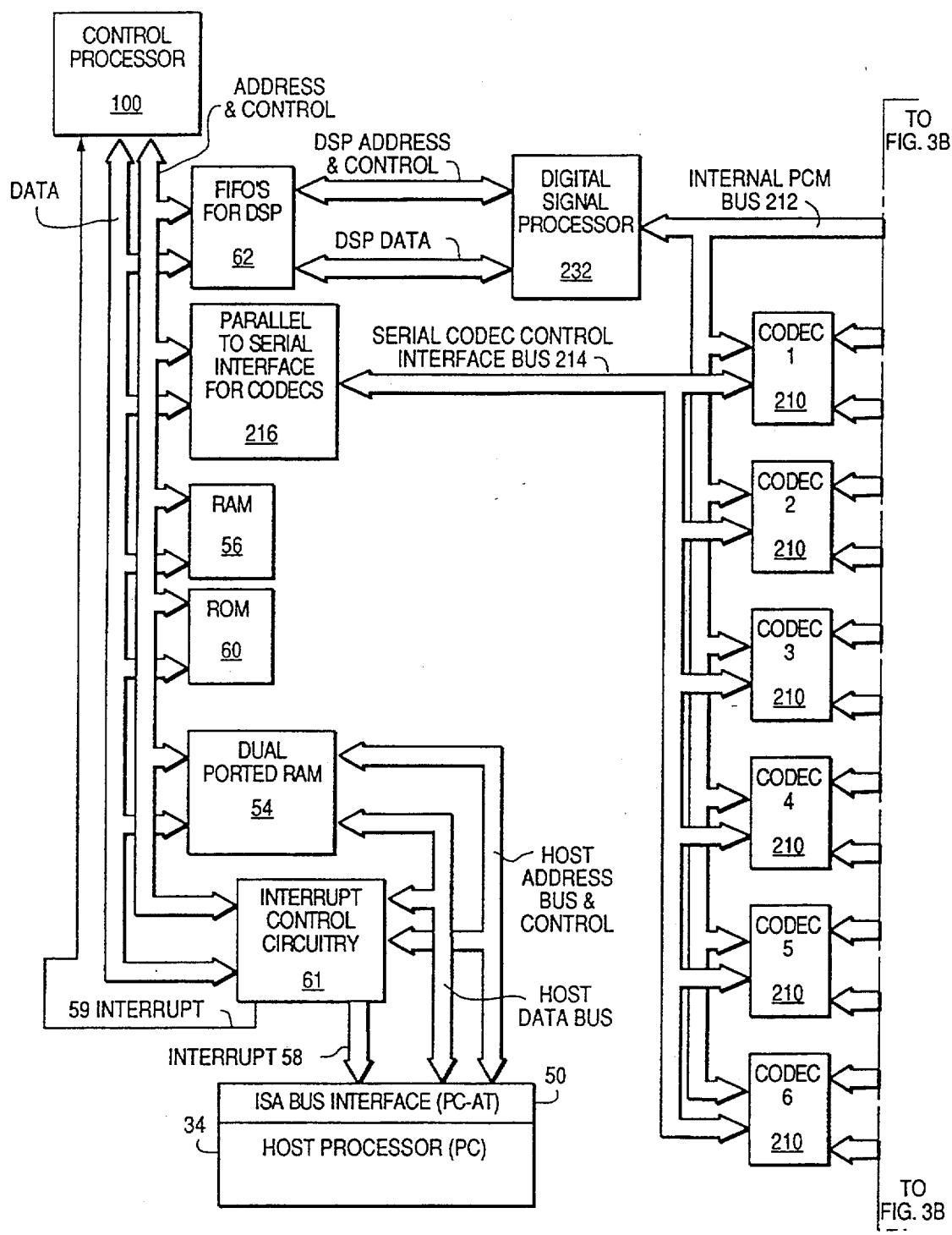
FIGS. 3A and 3B illustrate a block diagram of a line interface which may be utilized in the third information system of FIG. 1.
Figure 3B:
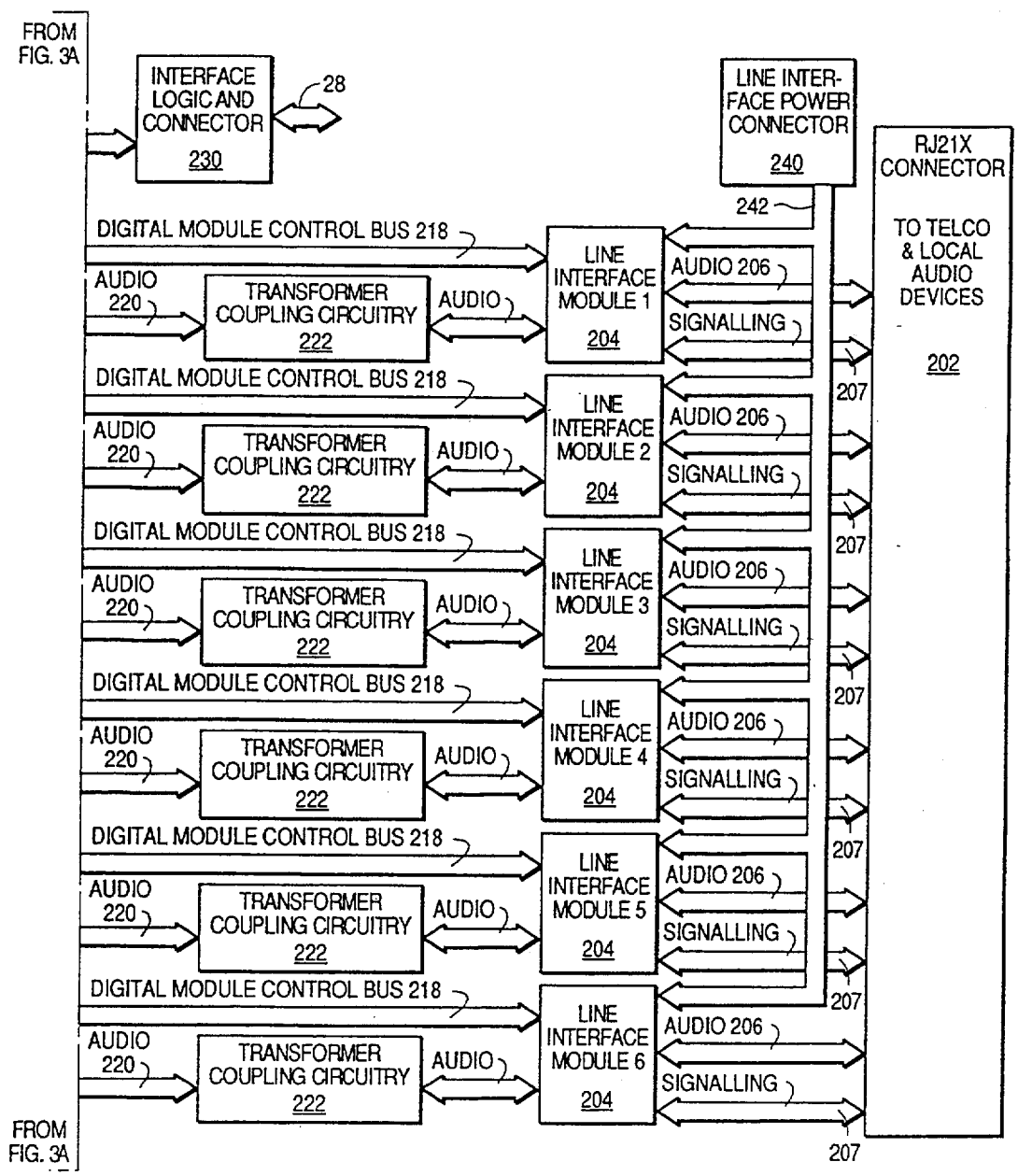

FIG. 3 illustrates a block diagram of an implementation of a third information system 22. Like reference numerals identify like parts in FIGS. 1-3. It should be understood that a preferred embodiment of the third information system 22 may be configured into seven groups of five interconnected circuit boards each having the circuitry of FIG. 3. However, the third information system 22 is not limited thereto. The individual groups of five circuit boards in accordance with FIG. 3 may be interconnected with a 10-pin ribbon cable to the individual interfaces contained within the block represented by the third information system bus and bus interface circuitry 22 of FIG. 1. As a result, the groups of five circuit boards having the circuitry of FIG. 2 may be interconnected into a complete third information system 22 which may be further interconnected with other information systems 18 and 20 as illustrated in FIG. 1 to provide multiple conferencing capabilities making the system of FIG. 1 extremely flexible for current or future voice and data applications and expansion as a result of permitting the interconnection of otherwise incompatible systems. It should be noted that many of the parts of FIGS. 1 and 3 are common and perform substantial the same function. When a part is not described in detail its function should be understood to be similar to that described above with regard to FIG. 1.

The third information system 22 functions as a general purpose line interface for up to six analog telephone lines which can be any combination of DID, E&M, Source, ground start, loop start or battery feed as described above. These connections are indicated by the RJ21X connector to telco and local audio devices 202. Individual line interface modules 204, which are discussed below in conjunction with FIGS. 4-8, are plugged into the ports in the circuit board represented by FIG. 3 to configure a particular audio line 206 as determined by the characteristic of the line interface modules 204 described below to interface with the type of analog line service provided by the line interface module.

As a consequence of splitting the circuitry between the line interface modules 204, which are removable from the ports of the third information system, the quantity and type of circuitry required to be present within the individual board implementing the third information system 22 is reduced thereby reducing the cost of the board and further providing space for additional line ports. For example, the present invention, as illustrated in FIG. 3, provides a 50% increase in the number of ports which are available over a prior art circuit as described above which had all of the circuitry for interfacing the five different types of analog line interfaces of the present invention resident on the circuit board. The address space of the control processor 34 and host processor 100 as implemented in the dual-ported RAM 54, RAM 56, ROM 60 and dual-ported RAM 62 is similar to that discussed above with regard to FIG. 1 both with regard to input, output and memory space on the PC bus. The memory space of the third information system 22 may be in common with the system of FIG. 1 in which the third information system is configured.

The control processor 100 is preferably an Hitachi 64180 microcontroller like the control processor of FIG. 1. The system provides access to 32K of ROM, 30K of RAM and 2K of dual-ported RAM as respectively implemented in ROM 60, RAM 56 and dual-ported RAM 54. The ROM 60 provides program storage for the intended application of the third information system 22. The RAM 56 is used for variable storage of temporary information. The dual-ported RAM 54 provides the interface between the control processor 100 and the host processor PC 34.

The control processor 100 controls all hardware specific aspects of the system. For example, if a port to which one of the line interface modules 204 is connected is set up as a DID port, the control processor 100 may receive a command from the host processor 34 to establish a connection in the DID port. The control processor 100 translates this information into an appropriate format and communicates with the DID port via one of the CODECs 210. Each CODEC 210 is connected to the internal PCM bus 212 and to the serial CODEC control interface bus 214. The serial CODEC control interface bus 214 is connected to a parallel to serial interface for CODECs 216 which provide communications with the control processor 100. The CODECs 210 are also connected to the line interface modules 204 through the combination of digital module control bus 218 and audio signal path 220 which includes transformer coupling circuitry 222. The transformer coupling circuitry 222 provides high voltage protection to the electronics of the third information system 22 and DC isolation.

The CODECs 210 utilize a serial communications interface through the serial CODEC control interface bus 214. The parallel to serial converter 216 permits the control processor 100 to address the CODECs. The CODECs provide numerous functions utilized in a telephony environment for establishing telephony connections. The CODECs 210 provide digital control outputs and sensor inputs. The outputs are used to control relays and other circuitry (not illustrated) necessary to seize and release telephone lines, inject ringing, etc. The inputs provide information regarding presence of loop current and presence of ring voltage, etc. The particular function of each signal is dependent upon the telephone type (DID, LOOP, START, etc.). The CODECs 210 also control the audio path 220 and perform A/D and D/A conversion of the audio signal. The analog side is transferred via transformer coupling 222 to the line interface module 204 to the telephone company or telephone instruments. The digital side through internal PCM bus 212 is transferred to interface logic and connector 230 which is connected to the third information system bus 28. The third information system bus 28 permits connection to other boards containing other third information systems 28 or to different line interface modules 204 through the internal PCM bus 212. The internal PCM bus 212 uses time division multiplex PCM encoding (either A-LAW or U-LAW). For example, the system may contain 32 devices which each transmit information on a single pair of wires. Each device communicates on one or more channels with the CODECs 210 controlling the time slots of a particular channel on which a conversation or other audio or data information may be transmitted.

The digital signal processor 232 provides tone resources required when connecting to telephone lines. These resources include DTMF generation, DTMF detection and call progress generation. Additionally, limited three-way conferencing is included in the capability of the digital signal processor 232. The call progress tones include all standard precise call progress tones required in the United States. The digital signal processor 232 sends tones directly over the internal PCM bus 212 to the CODECs 230 present in the third information system contained in FIG. 3. The digital signal processor 232 also receives tones from either the CODECs 230 or from the bus 28 through the interface logic and connector 230. Call progress tones are output continuously with no intervention from the control processor 100. Other functions are controlled by the control processor 100 via the FIFOs 62 for the digital signal processor 232 which in a preferred application are present as two 512 byte FIFOs. A standard command set is used to implement all of the functions performed by the digital signal processor 232. The digital signal processor 232 is used in some applications to provide PCM clock to the CODECs 230 present within the third information system 22 and to the bus 28. The clock source is controlled by suitable switches (not illustrated) which are within the third information system of FIG. 3. The state of one of the switches is read by the control processor 100 which then sends an appropriate command to the digital signal processor 232 to either provide the master clock, or slaved to an external clock.

The third information system bus 28 is a time division multiplexed bus which is designed to transfer PCM encoded information to and from the individual third information systems 22 as illustrated in FIG. 3 and to other third information systems and to the overall system of FIG. 1 as described above. The interface logic and connector 230 includes an appropriate master clock (usually 2.048 MHz but this is not a requirement), a transmit data signal, a transmit data synchronizing signal, a data receive signal and a receive synchronization signal. These signals are available for use by other third information systems 22 as well as the system of FIG. 1 via a 10-pin ribbon header. Expansion of the system beyond six modules 204 may be made through connections through the third information system bus 28. When a plurality of the third information systems 28 are connected together into a single system it is necessary that one of the third information systems such as that illustrated in FIG. 3 provides master clock and synchronization signals to the third information system bus 28 interconnecting the other third information systems assuming that operation independent of the system of FIG. 1 is occurring. A switch may be selected to program which of the third information systems 22 is to be the master. As a result all other third information systems 22 will be slaved to the master clock provided from the third information systems which has the program switch.

The RJ 21X connector to the telco and local audio devices 202 interfaces to telephone lines and peripherals. The connector 202 interfaces internally to the five types of line interface modules 204 as described below in conjunction with FIGS. 4–8 to provide interfaces with selectable types of audio lines as described above (DID, loop, start, etc.). The modules 204 transmit audio and signalling information to the CODECs 210.

A plurality of different types of modules are provided for different kinds of telephone lines and peripherals. The modules 204 are designed to affect the audio path as little as possible. The currently designed modules as described below are DID interface, a loop start interface, ground start interface, E & M interface, and source interface. The DID interface provides 48 volt battery to the telephone company as well as battery reversal provisions and current sensing for off hook detection. The loop start interface provides battery sink in the off hook state. Ring detection is available when on hook and current detection is available when off hook. This interface functions like a standard telephone set. The ground start interface provides all functions that the loop start interface provides with ground detection and seizure capabilities required by ground start lines. The E&M interface supports E&M types I and II. The audio path is untouched. The source interface provides battery to a standard telephone. If a ring generator is available, it can also ring the telephone to alert the user of an incoming call. Battery is applied at all times and current detection is always available.

The use of modules gives significant flexibility to the overall usage of the third information system 22. Since each module 204 supports only one or two line types, it is unnecessary to include circuitry for all types of analog line interfaces on a given module. Moreover, if special purpose functions are required, a new module can be designed to provide these functions. As a result it is not necessary that the individual third information systems 22 contain all of the circuitry necessary to support all of the analog line functions provided by the different types of line interface modules 204. Moreover, since telephone lines are occasionally exposed to hazardous voltages the use of the modules 204 makes repairs more straightforward such as if a component on a module is damaged the module can be easily replaced. Additionally, if this component were soldered into the main third information system 22 the repair would be much more difficult and time consuming. The third information system 22 includes a line interface connector 240 which permits a 48 volt power supply and ring generator to be connected to the board. The power supply and ring voltages are bussed to the line interface modules 204 by bus 242.

Multiple line interfaces are provided to the third information system 22 by the plug-in modules 204 for each of six ports. The modules 204 are attached to the main board containing the remaining circuitry of the third information system 22 of FIG. 3 with two 16-pin connectors. The signal names and pinouts for these connectors are as follows:

| | | |
|---|---|---|
| Px00: | | |
| Pin 1: | −48V. | Provides −48V to module. |
| Pin 3: | −48V. | Same as pin 1. |
| Pin 5: | −48V. | Same as pin 1. |
| Pin 7: | NC | |
| Pin 9: | NC | |
| Pin 11: | TELGND. | Provides telephone ground to module. |
| Pin 13: | TELGND. | Same as pin 11. |
| Pin 15: | TELGND. | Same as pin 11. |
| Pin 2: | TIP IN. | Tip input from Telco. |
| Pin 4: | RING IN. | Ring input from Telco. |
| Pin 6: | E. | E-lead input from Telco. |
| Pin 8: | SG. | Signal Ground input from Telco. |
| Pin 10: | M. | M-lead input from Telco. |
| Pin 12: | SB. | Signal Battery input from Telco. |
| Pin 14: | RINGBUS. | Provides Ringing Voltage to module. |
| Pin 16: | RINGBUS. | Same as pin 14. |
| Px01: | | |
| Pin 1: | TIP OUT. | Tip output to CODEC. |
| Pin 3: | RING OUT. | Ring output to CODEC. |
| Pin 5: | RELAY0. | Line Seizure Relay Drive. Active Low. |
| Pin 7: | RELAY1. | Secondary Relay Drive. Active Low. For M, Ground Start, etc. |
| Pin 9: | RELAY2. | Third Relay Drive, Active Low. For miscellaneous functions (such as ring insertion). |
| Pin 11: | SENS2. | Third sense CODEC input. Active Low. E-Lead and Ground Start. |

-continued

| Pin 13: | SENS1. | Second sense CODEC input. Active Low. Senses Ring Voltage on Sink module. Reflects current state of ring generator on source module. |
| --- | --- | --- |
| Pin 15: | SENS0. | First sense CODEC input. Active Low. Primary current sensor for all modules. |
| Pin 2: | 0V. | Ground input from main board for logic signals. |
| Pin 4: | 0V. | Same as pin 2. |
| Pin 6: | 0V. | Same as pin 2. |
| Pin 8: | +5V. | +5V input from main board for logic signals. |
| Pin 10: | +5V. | Same as pin 8. |
| Pin 12: | +5V. | Same as pin 8. |
| Pin 14: | MODRST. | Active low reset signal to modules. |
| Pin 16: | PULLUP. | Provides a 10K pullup resistor for general purpose use on module. |

Figure 4:
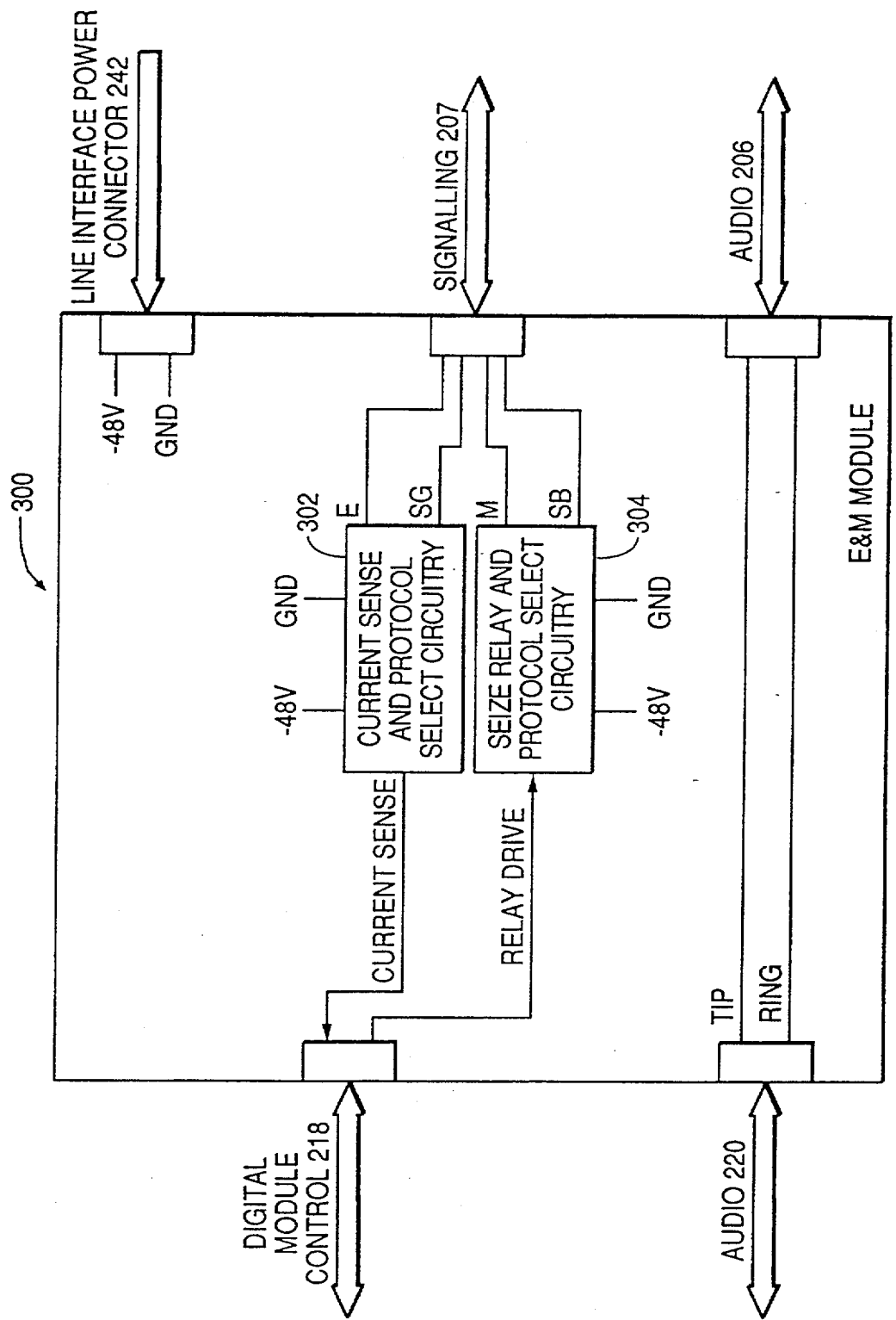
FIG. 4 illustrates a block diagram of an E & M module for use in the line interface of FIG. 3.

FIG. 4 illustrates a block diagram of a suitable E&M module 300 for use as a line interface module 204 in FIG. 3. Like reference numerals identify like parts in FIGS. 1–8. The current sense and protocol select circuitry 302 contains jumper switches that are used to partially select the desired E&M protocol such as E&M Types I and II. The current sense and protocol select circuitry 302 in conjunction with jumper switches detects the presence of current in E and SG leads. The seize relay and protocol select circuitry 304 contains jumper switches that are also used to partially select the desired E&M protocol such as E&M Types I and II. The seize relay and protocol select circuitry 302 in conjunction with the jumper switches controls the flow of current in M and SG leads.

Figure 5:
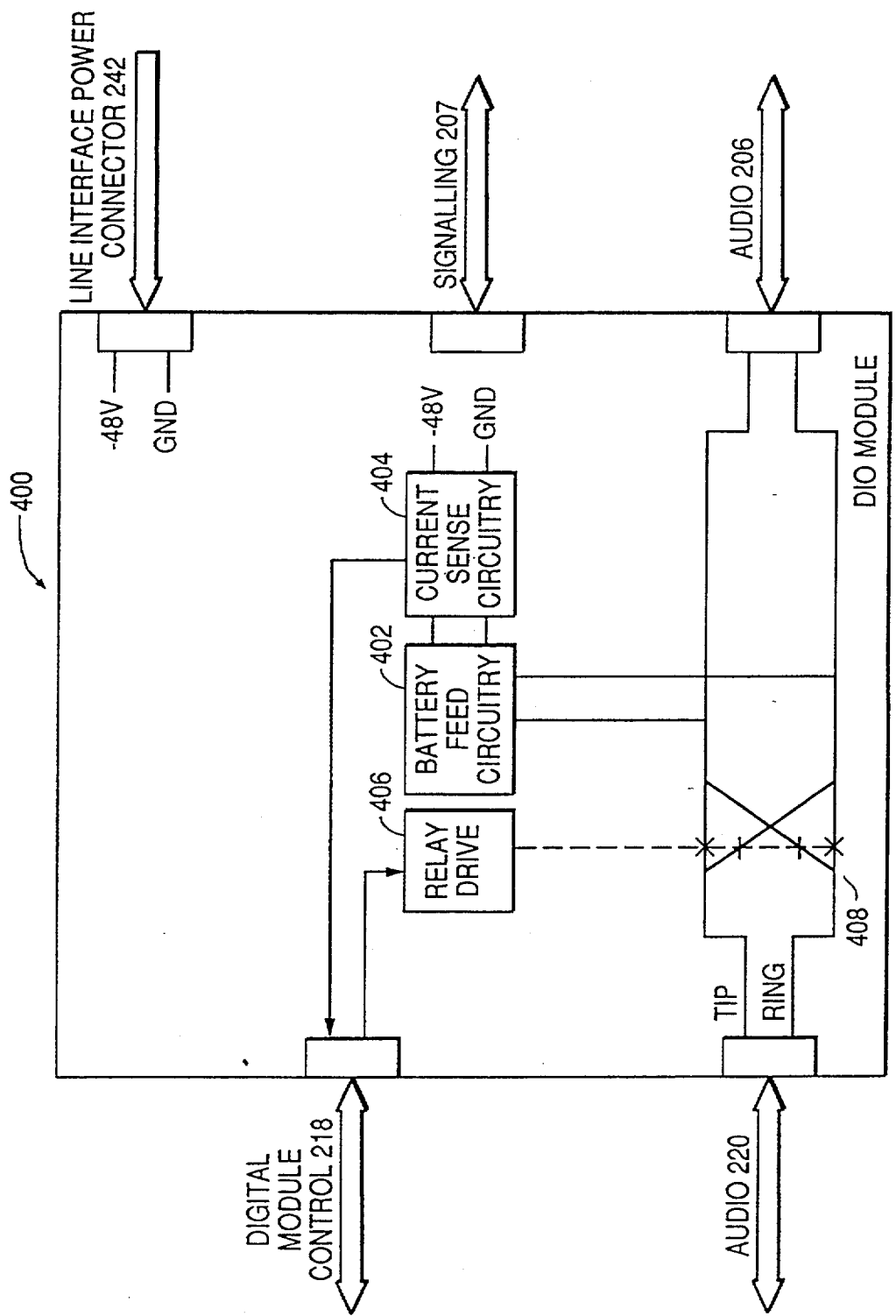
FIG. 5 illustrates a block diagram of a DID module for use in the line interface of FIG. 3.

FIG. 5 illustrates a block diagram of a suitable DID module 400 for use as a line interface module 204 in FIG. 3. The battery feed circuitry 402 provides DC current to the audio interface 220 but acts as a high impedance to AC signals that represent audio information. The current sense circuitry 404 detects the presence of current flowing from the line interface power connector 242 through the battery feed circuitry 402 and the audio interface 220 to indicate line seizure and release by external devices. The relay drive 406 is used to activate and deactivate relay 408 that controls the polarity of the voltage and current that is supplied to the audio interface 220.

Figure 6:
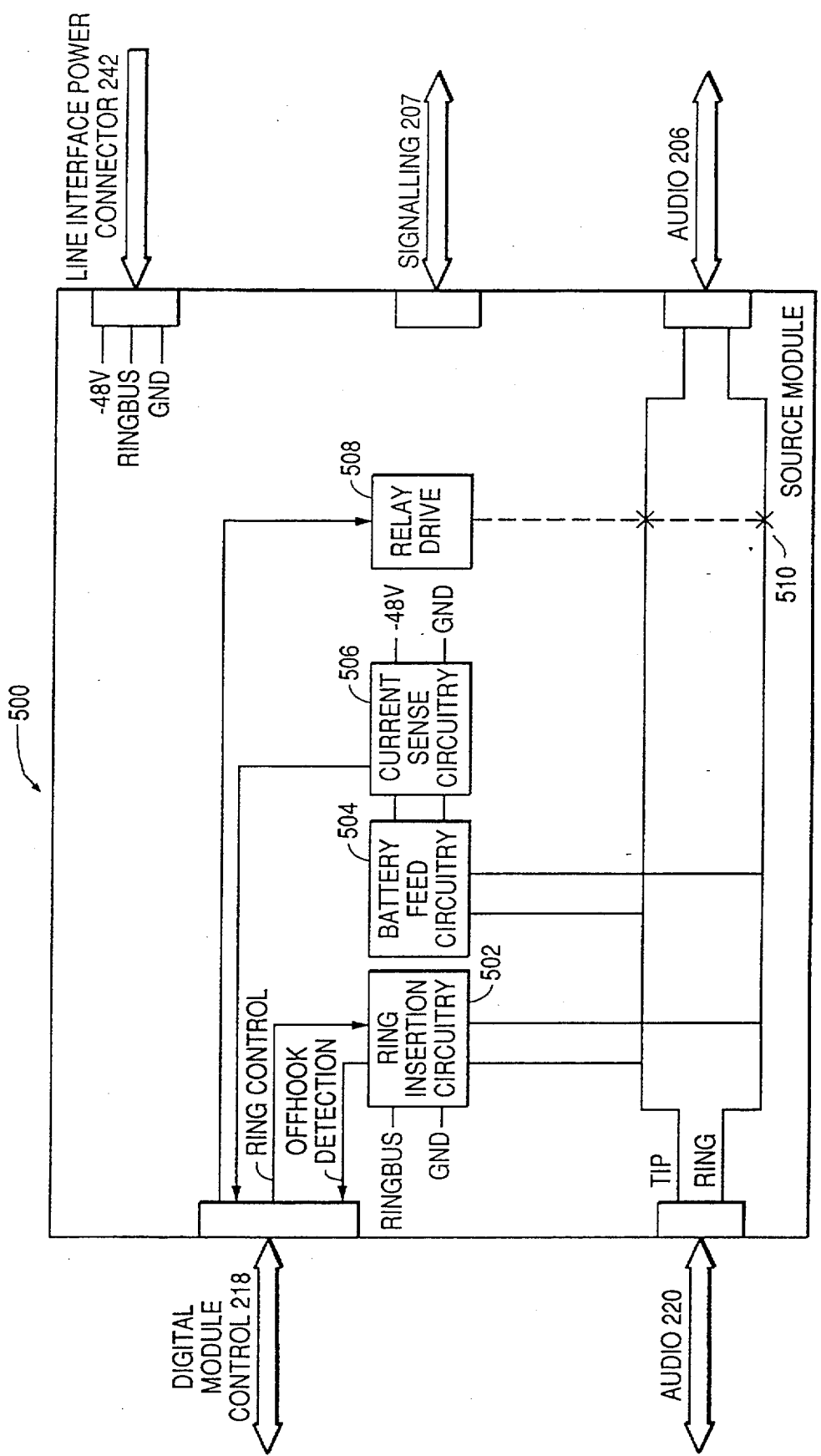
FIG. 6 illustrates a block diagram of a source module for use in the line interface of FIG. 3.

FIG. 6 illustrates a source module 500 for use as a line interface module 204 in FIG. 3. The ring insertion circuitry 502 includes relay controls that activate and deactivate the application of ring voltage to the audio interface 220. The ring insertion circuitry 502 also monitors the audio interface 220 for DC current and removes ring voltage when DC current is present. The ring insertion circuitry 502 provides an indication to the digital module control 218 of the current state of the ring insertion circuitry. The battery feed circuitry 504 and current sense circuitry 506 are similar to circuits 402 and 404 described in conjunction with FIG. 5 above. The relay drive 508 controls relay 510 to control connection of the audio 220 to the audio 206 by closing relay 206 so that audio information can be transmitted through the module 500.

Figure 7:
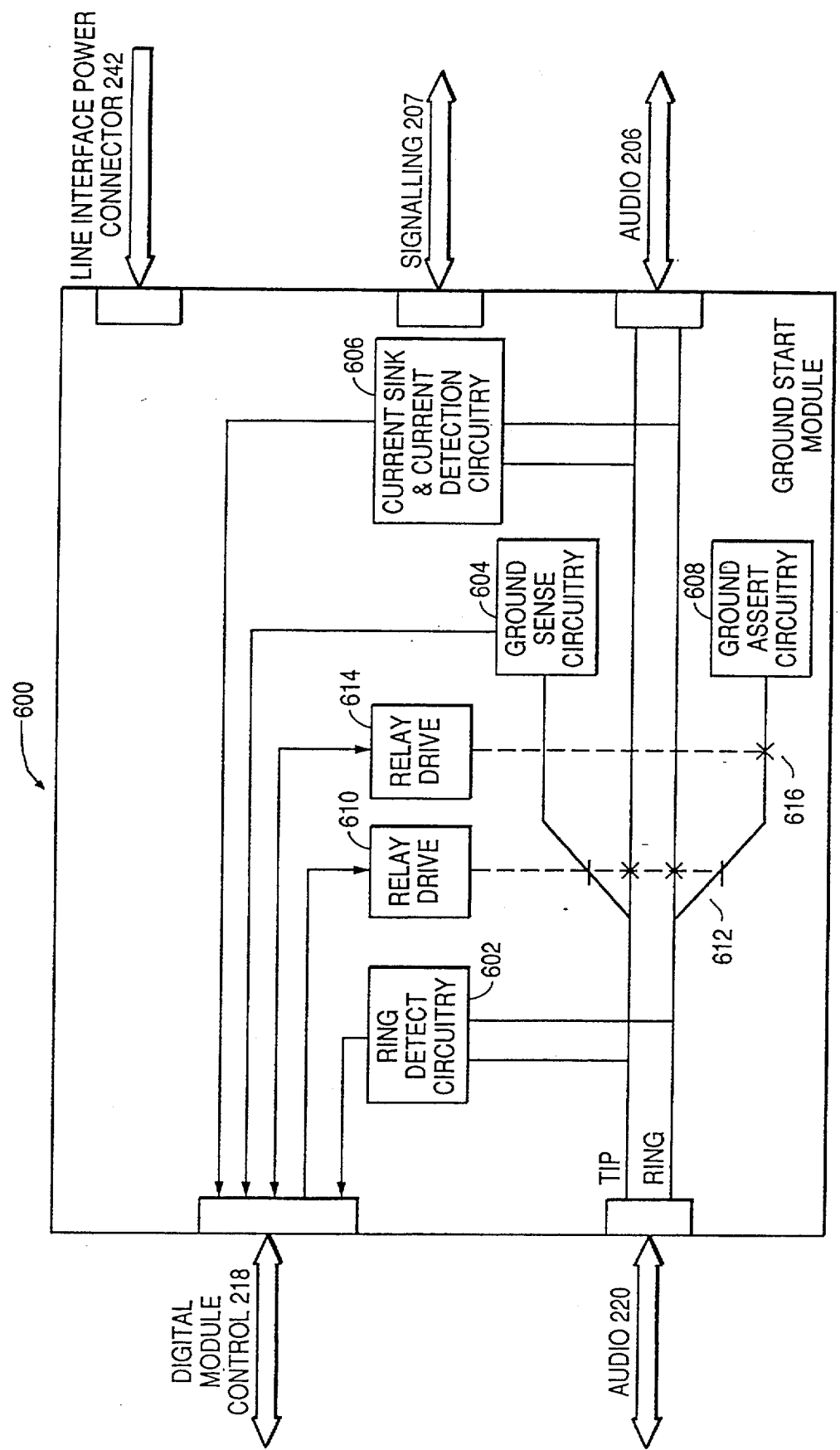
FIG. 7 illustrates a ground start module for use in the line interface of FIG. 3.

FIG. 7 illustrates a ground start module 600 for use as a line interface module 204 in FIG. 3. The ring detect circuitry 602 provides a signal to digital module control 218 that indicates the presence of ring voltage on the audio interface 220. The ground sense circuitry 604 provides a signal to digital module control 218 that indicates when the TIP lead connected to the audio interface 220 is connected to ground. The current sink and current detection circuitry 606 provides a DC current path to the audio interface 220 when a connection is established. The ground assert circuitry 608 connects the RING lead connected to the audio interface 220 to ground through a current limiting network. A signal is provided to the digital module control 218 to indicate the presence of DC current. Relay drive 610 controls relay 612 to control connection of audio 220 to audio 206 through the module 600 by closing relay 612. The ground sense circuitry 604 is normally connected to the TIP line by the relay 612 which also closes the other contact to permit connection of the ground assert circuitry 608 depending upon the state of relay 616 as described below. Relay drive 614 controls closing of relay 616 to control connection of the ground assert circuitry 608 to the RING line when relay 612 is in its normal state in which audio 220 is not connected to audio 206 through the relay 612.

Figure 8:
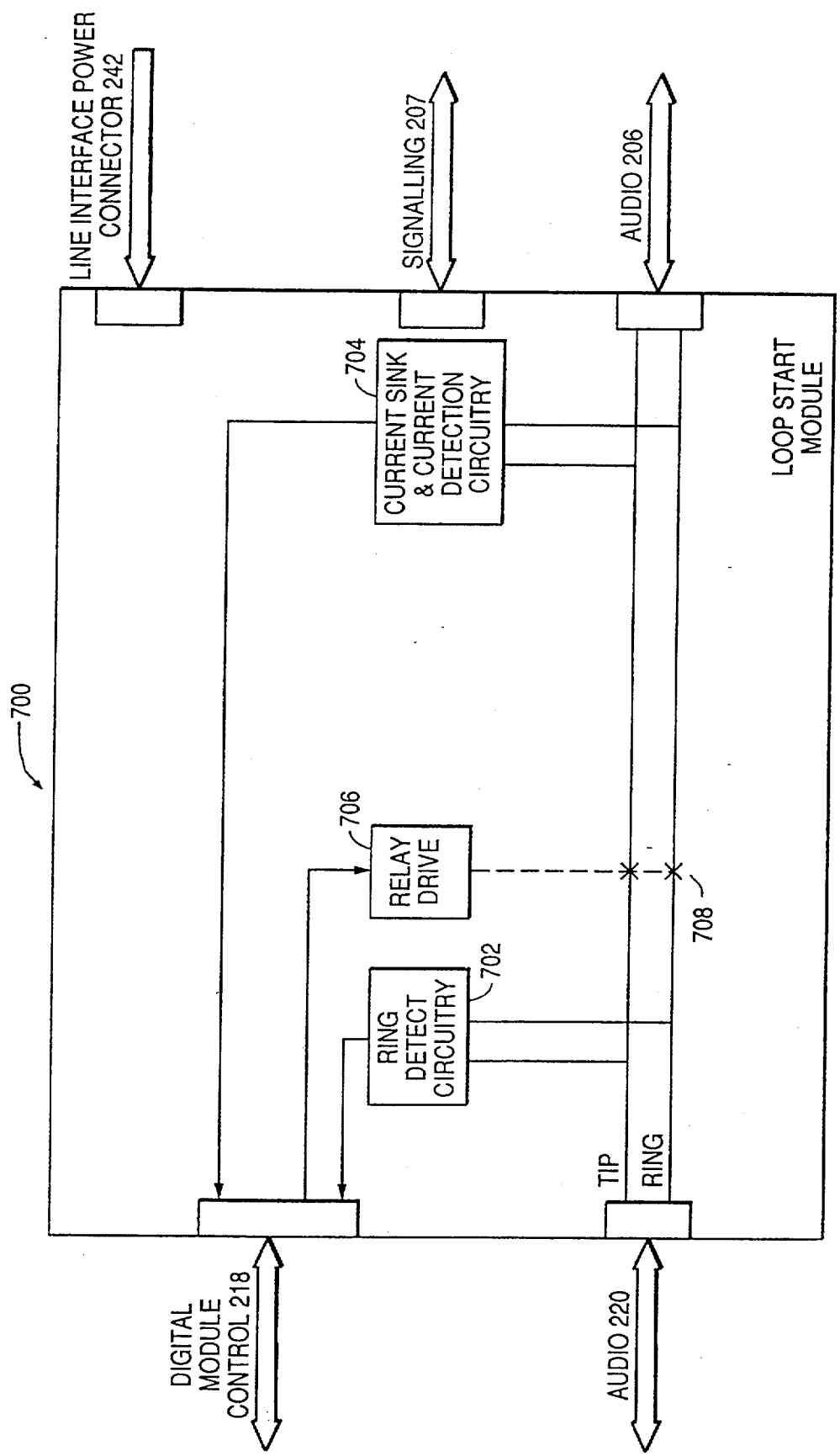
FIG. 8 illustrates a block diagram of a loop start module for use in the line interface of FIG. 3.

FIG. 8 illustrates a loop start module 700 for use as a line interface module 204 in FIG. 3. The ring detect circuitry 702 and current sink and current detection circuitry are identical to circuits 602 and 606 in FIG. 7. The relay drive 706 controls relay 708 which is normally open to connect the audio 220 to the audio 206.

While the invention has been described in terms of its preferred embodiments, it should be understood that numerous modifications may be made thereto without departing from the spirit and scope of the invention as defined in the appended claims. For example, the number of information systems each having incompatible bus protocols which may be interconnected via the digital switching matrix, switches and input and output buses 12 may be varied to connect diverse types of information system. While a preferred application of the present invention is interconnecting systems configured from circuits utilizing digitized voice, it should be understood that the present invention is not limited to information encoding voice. For example other forms of pulse code modulated data or otherwise digitally encoded data may be transmitted such as data in accordance with ISDN specifications. It is intended that all such modifications fall within the scope of the appended claims.

```
                        .ident   exam
                        .id      110984
                        .ver     1.0

.intern  exam

000F                             CR=     0DH

0000'   21 0000         exam:   LD      HL, 0
0003'   22 0000*                LD      (OFFSET), HL    ;OFFSET FOR PRIME REGISTERS
0006'   CD 0000:04              CALL    TI*             ;GET CHARACTER AFTER X
0009'   FE0D                    CP      CR              ;IF CARRIAGE RETURN, DISPLAY REGISTERS
000B'   2879                    JR      Z, ALL
000D'   FE27                    CP      ''''            ;PRIME REGISTERS?
000F'   200C                    JR      NZ, REGIST
0011'   21 FFFB                 LD      HL, -8
```

```
0014'   22 0000*                    LD      (OFFSET), HL
0017'   CD 0000:04                  CALL    TI#             ;WHICH ALTERNATE REGISTER DO WE WANT?
001A'   FE49                        CP      'H'+1           ;THERE ARE NONE GREATER THAN H!
001C'   D0                          RET     NC

001D'   CD 0000:05      REGIST:     CALL    SPACE#          ;INSERT A SPACE
0020'   FE49                        CP      'I'             ;INTERRUPT VECTOR REGISTER?
0022'   2840                        JR      Z, RI
0024'   FE41                        CP      'A'             ;ACCUMULATOR?
0026'   2841                        JR      Z, RA
0028'   21 005D'                    LD      HL, REGLST      ;LOOK THROUGH LIST OF REGISTER PAIRS
002B'   01 0007                     LD      BC, REGNUM
002E'   EDB1                        CPIR                    ;CHECK IF IT'S IN THE LIST
0030'   C0                          RET     NZ              ;IF NOT, GO AWAY

0031'   DD21 0000:06                LD      IX, REGBC#      ;BASE OF LIST
0035'   DD09                        ADD     IX, BC
0037'   DD09                        ADD     IX, BC
0039'   ED4B 0000*                  LD      BC, (OFFSET)    ;OFFSET 0=REGISTERS -8=ALTERNATES
003D'   DD09                        ADD     IX, BC
003F'   DD6E00                      LD      L, (IX+0)
0042'   DD6601                      LD      H, (IX+1)
0045'   CD 0000:07                  CALL    PUTWRD#         ;OUTPUT REGISTER PAIR CONTENTS
0048'   CD 0000:08                  CALL    STRING#
004B'   2DA0                        .ASCIS  "- "
004D'   CD 0000:04                  CALL    TI#             ;WAIT FOR INPUT TO SEE IF THEY WANT TO MODIFY
0050'   FE0D                        CP      CR
0052'   C8                          RET     Z               ;IF CR, DON'T CHANGE ANYTHING
0053'   CD 0000:09                  CALL    CHKWRD#         ;CHECK FOR NUMERIC INPUT
0056'   DD7500                      LD      (IX+0), L
0059'   DD7401                      LD      (IX+1), H       ;UPDATE CONTENTS
005C'   C9                          RET                     ;BYE

005D'   50535958484442  REGLST:     .ASCII  "PSYXHDB"
0007            REGNUM= .-REGLST

0064'   11 0000:0A      RI:         LD      DE, REGI#

0067'   1803                        JR      RIA

0069'   11 0001:0B      RA:         LD      DE, REGAF#+1

006C'   2A 0000*        RIA:        LD      HL, (OFFSET)
006F'   19                          ADD     HL, DE
0070'   EB                          EX      DE, HL          ;DE== pointer to A, A', OR I
0071'   1A                          LD      A, (DE)
0072'   CD 0000:0C                  CALL    PUTBYT#         ;OUTPUT WHAT'S THERE
0075'   CD 0000:08                  CALL    STRING#
0078'   2DA0                        .ASCIS  "- "
007A'   CD 0000:04                  CALL    TI#             ;WAIT TO SEE WHAT THEY WANT TO DO
007D'   FE0D                        CP      CR
007F'   C8                          RET     Z               ;IF CR, GO AWAY
0080'   CD 0000:09                  CALL    CHKWRD#
0083'   EB                          EX      DE, HL
0084'   73                          LD      (HL), E         ;SAVE NEW INPUT
0085'   C9                          RET 0086'   CD 0000:0D      ALL:        CALL    CRLF#           ;DISPLAY THE FLAGS
0089'   3A 0000:0B                  LD      A, (REGAF#)
008C'   CD 0146'                    CALL    FLAGS 008F'   CD 0000:08                  CALL    STRING#
0092'   20412D0D                    .ASCIS  " A ="
0096'   3A 0001:0B                  LD      A, (REGAF#+1)
0099'   CD 0000:0C                  CALL    PUTBYT          ;DISPLAY A 009C'   CD 0000:08                  CALL    STRING#
009F'   20424320D                   .ASCIS  " BC ="
00A4'   2A 0000:06                  LD      HL, (REGBC#)
00A7'   CD 0000:07                  CALL    PUTWRD#         ;DISPLAY BC 00AA'   CD 0000:08                  CALL    STRING#
00AD'   204452089                   .ASCIS  " DE ="
00B2'   2A 0000:0E                  LD      HL, (REGDE#)
00B5'   CD 0000:07                  CALL    PUTWRD#         ;DISPLAY DE 00B8'   CD 0000:08                  CALL    STRING#
00BB'   204B4C20BD                  .ASCIS  " HL ="
00C0'   2A 0000:0F                  LD      HL, (REGHL#)
00C3'   CD 0000:07                  CALL    PUTWRD#         ;DISPLAY HL 00C6'   CD 0000:08                  CALL    STRING#
00C9'   204958BD                    .ASCIS  " IX="
00CD'   2A 0000:10                  LD      HL, (REGIX#)
00D0'   CD 0000:07                  CALL    PUTWRD#         ;DISPLAY IX 00D3'   CD 0000:08                  CALL    STRING#
00D6'   204959BD                    .ASCIS  " IY="
00DA'   2A 0000:11                  LD      HL, (REGIY#)
00DB'   CD 0000:07                  CALL    PUTWRD#         ;DISPLAY IY 00E0'   CD 0000:08                  CALL    STRING#
00E3'   205350BD                    .ASCIS  " SP="
00E7'   2A 0000:12                  LD      HL, (USRSP#)
00EA'   CD 0000:07                  CALL    PUTWRD#         ;DISPLAY SP
```

```
00ED'   CD 0000:08              CALL    STRING#
00F0'   205043BD                .ASCIS  " PC="
00F4'   2A 0000:13              LD      HL,(USRPC#)
00F7'   CD 0000:07              CALL    PUTWRD#         ;DISPLAY PC

00FA'   CD 0000:08              CALL    STRING#
00FD'   20493D                  .ASCIS  " I="
0100'   3A 0000:0A              LD      A,(REGI#)
0103'   CD 0000:0C              CALL    PUTBYT#         ;DISPLAY INT VECTOR

0106'   CD 0000:0B              CALL    CRLF#           ;ON SECOND LINE, DO ALTERNATES...
0109'   3A 0000:14              LD      A,(REGAF1#)
010C'   CD 0146'                CALL    FLAGS           ;ALTERNATE FLAGS

010F'   CD 0000:08              CALL    STRING#
0112'   204127BD                .ASCIS  " A'="
0116'   3A 0001:14              LD      A,(REGAF1#+1)
0119'   CD 0000:0C              CALL    PUTBYT#         ;DISPLAY A'

011C'   CD 0000:08              CALL    STRING#
011F'   20424327BD              .ASCIS  " BC'="
0124'   2A 0000:15              LD      HL,(REGBC1#)
0127'   CD 0000:07              CALL    PUTWRD#         ;DISPLAY BC'

012A'   CD 0000:08              CALL    STRING#
012D'   20444527BD              .ASCIS  " DE'="
0132'   2A 0000:16              LD      HL,(REGDE1#)
0135'   CD 0000:07              CALL    PUTWRD#         ;DISPLAY DE'

0138'   CD 0000:08              CALL    STRING#
013B'   20484C27BD              .ASCIS  " HL'="
0140'   2A 0000:17              LD      HL,(REGHL1#)
0143'   C3 0000:07              JP      PUTWRD#         ;DISPLAY HL'  *LAST ONE*

0146'   21 015C'        FLAGS:  LD      HL, FLAG$       ;FLAG LIST
0149'   0608                    LD      B, 8            ;EIGHT OF EM
014B'   87              ..FLG:  ADD     A, A            ;SHIFT FLAG BYTE
014C'   F5                      PUSH    AF
014D'   3E2D                    LD      A, '-'          ;DISPLAY '-' IF FLAG NOT SET
014F'   3001                    JR      NC, ..1
0151'   7E                      LD      A, (HL)         ;ELSE DISPLAY FLAG SYMBOL
0152'   CD 0000:1B      ..1:    CALL    CO#
0155'   F1                      POP     AF              ;RESTORE DATA
0156'   23                      INC     HL              ;NEXT SYMBOL
0157'   10F2                    DJNZ    ..FLG
0159'   C3 0000:05              JP      SPACE#

015C'   535A2D482D504E  FLAG$:  .ASCII  "SZ-H-PNC"      ;SIGN,ZERO,HALF CARRY,PARITY,ADD/SUBTRACT,CARRY

0000*                           .LOC    .DATA.
0000*                           OFFSET::.BLKW   1

.END

..ident pcmio
                                .id     120391
                                .ver    1/0

.intern imid,omid,tone,mite
                                .extern setops,space,putbyt,binasc
                                .extern error,crlf,csts,putasc
                                .extern oper1,oper2,oper3

00EE                    dspdat  =       0EEh
00EF                    dspst   =       0EFh 00F0                    msmb    =       0F0h            ;micro wire second byte
00F1                    mfmb    =       0F1h            ;microwire first byte
00FA                    mcs     =       0FAh            ;chip select output register
00FB                    mskr    =       0FBh            ;clock polarity control byte
00FC                    mwm     =       0FCh            ;mode register
00FD                    mskr    =       0FDh            ;clock rate register
00FE                    mst     =       0FEh            ;status register
00FF                    mpd     =       0FFh            ;pin definition register 0000'   CD 0000:04      imid:   call    setops
0003'   FE02                    cp      2
0005'   C0                      ret     nz              ;must be 2 arguments
0006'   CD 0000:05              call    space
0009'   3A 0000:0C              ld      A,(oper1)       ;port #
000C'   D3FA                    out     (mcs),A         ;chip select
000E'   3E00                    ld      A,0
0010'   D3F0                    out     (msmb),A        ;dummy byte
0012'   3A 0000:0D              ld      A,(oper2)       ;data in A
0015'   D3F1                    out     (mfmb),A        ;output to microwire
0017'   DBFE            ..1:    in      A,(mst)         ;see if busy
0019'   A7                      and     A
001A'   28FB                    jr      z,..1
001C'   DBF0                    in      A,(msmb)        ;get data from MID
001E'   F5                      push    AF
001F'   3E0F                    ld      A,0Fh
0021'   D3FA                    out     (mcs),A         ;turn off chip select
0023'   F1                      pop     AF
0024'   CD 0000:06              call    putbyt          ;output data
0027'   C3 0000:07              jp      binasc
```

```
002A'   CD 0000:04   omid:   call    setors
002D'   FE03                 cp      3                       ;3 arguments
002F'   C2 0000:08           jp      nz,error
0032'   3A 0000:0C           ld      A,(operi)               ;opr1 0
0035'   D3FA                 out     (mcs),A                 ;chip select
0037'   3A 0000:0E           ld      A,(oper3)
003A'   D3F0                 out     (msmb),A                ;2nd byte
003C'   3A 0000:0D           ld      A,(oper2)
003F'   D3F1                 out     (mfmb),A                ;1st byte
0041'   DBFE         ..1:    in      A,(mst)                 ;wait till done
0043'   A7                   and     A
0044'   28FB                 jr      z,..1
0046'   3E00                 ld      A,0                     ;dummy byte
0048'   D3F0                 out     (msmb),A
004A'   3A 0000:0D           ld      A,(oper2)
004D'   F604                 or      4                       ;set to read result
004F'   D3F1                 out     (mfmb),A
0051'   DBFE         ..2:    in      A,(mst)
0053'   A7                   and     A
0054'   28FB                 jr      z,..2
0056'   DBF0                 in      A,(msmb)                ;get data from MID
0058'   F5                   push    AF
0059'   3E0F                 ld      A,0Fh
005B'   D3FA                 out     (mcs),A                 ;turn off chip select
005D'   CD 0000:05           call    space
0060'   CD 0000:05           call    space
0063'   F1                   pop     AF
0064'   CD 0000:06           call    putbyt
0067'   C3 0000:07           jp      binasc 006A'   CD 0000:09   tone:   call    crlf
006D'   CD 0000:0A   ..1:    call    csts                    ;check for character
0070'   A7                   or      A
0071'   C0                   ret     nz
0072'   DBEA         ..2:    in      A,(0EAh)
0074'   E601                 and     1
0076'   28F5                 jr      z,..1
0078'   DBEB                 in      A,(0EBh)
007A'   CD 0000:0B           call    putasc
007D'   C3 006A'             jp      tone ;initialize DSP & CODEC's 0080'   DBEF         mite:   in      A,(dspst)               ;see if slave
0082'   E610                 and     10h
0084'   2803                 jr      z,fout                  ;if slave
0086'   3E01                 ld      A,1                     ;no
0088'   D3EE         fout:   out     (dspdat),A
008A'   DBEF         ..d:    in      A,(dspst)               ;see if DSP got it
008C'   E680                 and     80h
008E'   28FA                 jr      z,..d
0090'   DBEE                 in      A,(dspdat)

;initialize the MID

0092'   3EF0                 ld      A,0F0h                  ;set MID direction, bits 0-3 output
0094'   D3FF                 out     (mpd),A
0096'   3E0F                 ld      A,0Fh                   ;write 1's to data bits no chip select
0098'   D3FA                 out     (mcs),A
009A'   3EFF                 ld      A,0FFh
009C'   D3FB                 out     (mskp),A                ;set clock polarity to rising edge
009E'   D3FC                 out     (mwm),A                 ;select 16 bit mode all ports
00A0'   3E00                 ld      A,0
00A2'   D3FD                 out     (mskr),A                ;disable interrupts, master, divide by 1 clock 00A4'   21 00C5'             ld      HL,midtbl               ;initialization table
00A7'   7E           ..mlp:  ld      A,(HL)
00A8'   FEFF                 cp      0FFh
00AA'   C8                   ret     z
00AB'   CD 00B0'             call    midio
00AE'   18F7                 jr      ..mlp 00B0'   0EFA         midio:  ld      C,mcs                   ;chip select
00B2'   EDA3                 outi
00B4'   0EF0                 ld      C,msmb                  ;2nd byte
00B6'   EDA3                 outi
00B8'   0C                   inc     C                       ;1st byte
00B9'   EDA3                 outi
00BA'   DBFE         ..lp:   in      A,(mst)                 ;wait till done
00BD'   A7                   and     A
00BE'   28FB                 jr      z,..lp
00C0'   3E0F                 ld      A,0Fh
00C2'   D3FA                 out     (mcs),A                 ;turn off chip selects
00C4'   C9                   ret 00C5'   00B1B2       midtbl: .byte   00h,B1h,B2h
00C8'   0040D2               .byte   00h,40h,0D2h
00CB'   0040CA               .byte   00h,40h,0CAh
00CE'   0080D2               .byte   00h,80h,0D2h
00D1'   00B1CA               .byte   00h,B1h,0CAh
00D4'   00BFAA               .byte   00h,0BFh,0AAh
00D7'   00BFA2               .byte   00h,0BFh,0A2h
```

```
00DA'   00B102              .byte   00h,081h,02h
00DD'   018182              .byte   01h,081h,082h
00E0'   0140D2              .byte   01h,040h,0D2h
00E3'   0140CA              .byte   01h,040h,0CAh
00E6'   0181D2              .byte   01h,081h,0D2h
00E9'   0180CA              .byte   01h,080h,0CAh
00EC'   01BFAA              .byte   01h,0BFh,0AAh
00EF'   01BFA2              .byte   01h,0BFh,0A2h
00F2'   018102              .byte   01h,081h,02h
00F5'   FF                  .byte   0FFh
                            .end
```

Segments and Symbols:

```
.GLOB.:   Address = 0000, Size = FFFF

.FREE.    0100

.INIT :   Address = 2000, Size = 01A9

START     2000    SCHED     215E

QUEUES:   Address = 21A9, Size = 008A

PUSHPG    21A9    PULLPG    21C1    PUSH32    21D7    PULL32    21EF
  PUSH16    2205    PULL16    221D

CLOCK :   Address = 2233, Size = 0067

CLOCK     2233

COMMNT:   Address = 229A, Size = 0070

PCMSG     229A    CONRCV    22DE

MONITO:   Address = 230A, Size = 0477

MONITR    230A    PARS      2607    CONOUT    262D    ASCHEX    2687

MSGPRC:   Address = 2781, Size = 02E9

MSGPRC    2781    GXBLK     2A3B

MUSAC :   Address = 2A6A, Size = 0252

CNCTIT    2A6A    DISCTO    2AEB    DISCIT    2B06    CONFIT    2B5B
  LISTEN    2BCF    DECONF    2C0A    CHKCNF    2C6B

'CLOCK:   Address = D800, Size = 0004

TENTHS    D800    TICKS     D801    SCNT      D802    IFLAG     D803

'MONITO:  Address = D804, Size = 006F

SHWFLG    D804    RCVBUF    D833    XNTBUF    D853

'MSGPRC:  Address = D873, Size = 0034

RBLKMP    D875    XBLKMP    D876
```

Modules:

```
Name     ID#      Version   Revision   Source File

INIT     040192      1         1       MTSTART .ZSM
QUEUES   071983      2         0       QUEUES  .ZSM
CLOCK    031692      1         0       MCLOCK  .ZSM
COMMNT   022092      1         0       COMMINT .ZSM
MONITO   040192      1         1       MONITORM.ZSM
MSGPRC   041092      1         1       MESSAGEN.ZSM
MUSAC    040192      1         1       MUSAC   .ZSM
```

```
                    .ident  init
                    .id     040192
                    .ver    1/1              ;MUSAC 1, sets up MVIP (may need to eliminate)

;PROM version

.intern sched,start

.extern clock
                    .extern conrcv,pcmss
                    .extern monitr,msgprc
                    .extern ticks,tenths 0009                rstrt  =   0009h
0003                auack  =   0003h 001B                esc    =   1Bh
```

```
0000              ram      =    0D000h          ;start of scratch RAM
DC00              rrtp     =    0DC00h
DC02              rrt      =    0DC02h
DC7E              pstack   =    0DC7Eh
0002              taskno   =    2
0040              stksiz   =    64

.insert matrixio.dfn
                  ;Matrix board I/O definitions 3/16/92

00EF              dsp0     =    0EFh            ;DSP FIFO 0
00EE              dsp1     =    0EEh            ;DSP FIFO 1
00ED              dsp2     =    0EDh            ;DSP FIFO 2
00EC              dsp3     =    0ECh            ;DSP FIFO 3

00F3              fifost   =    0F3h            ;FIFO status
00F4              MVIP47   =    0F4h            ;MVIP enables hwys 4-7
00F5              MVIP03   =    0F5h            ;MVIP enables hwys 0-3
00F6              MVIPCS   =    0F6h            ;MVIP clock select/PEB enables
00F7              clksel   =    0F7h            ;clock select 00F8              mode1    =    0F8h            ;MUSAC 1 mode register
00F9              stat1    =    0F9h            ;MUSAC 1 status
00FA              cmr1     =    0FAh            ;MUSAC 1 Conference Mask Register
00FB              miap1    =    0FBh            ;MUSAC 1 Indirect Access Port 00FC              mode0    =    0FCh            ;MUSAC 0 mode register
00FD              stat0    =    0FDh            ;MUSAC 0 status
00FE              cmr0     =    0FEh            ;MUSAC 0 Conference Mask Register
00FF              miap0    =    0FFh            ;MUSAC 0 Indirect Access Port ;64180 I/O Registers 0000              CA0      =    0               ;serial channel 0 control registers
0002              CB0      =    2
0004              ST0      =    4               ;serial channel 0 status register
0006              TDR0     =    6               ;console transmit data
0008              RDR0     =    8               ;console receive data 0001              CA1      =    1               ;serial channel 1 control registers
0003              CB1      =    3
0005              ST1      =    5               ;status register
0007              TDR1     =    7               ;transmit data
0009              RDR1     =    9               ;receive data 000C              TMDRL0   =    0Ch             ;timer register
000E              RLDR0L   =    0Eh             ;timer 0 load registers
000F              RLDR0H   =    0Fh
0010              TCR      =    10h             ;timer control register 0032              DCNTL    =    32h             ;wait state control
0033              IL       =    33h             ;interupt vector
0034              ITC      =    34h             ;interupt control register
0036              RCR      =    36h             ;refresh register .insert matrxmem.dfn
                  ;Matrix Memory definition 4-01-92

C000              consq    =    0C000h          ;console queue
C020              rcvq     =    0C020h          ;receive message queue
C030              xmtq     =    0C030h          ;xmit message queue
C100              rcvbfs   =    0C100h          ;receive buffers
C200              xmtbfs   =    0C200h          ;transmit buffers C300              muscbf   =    0C300h          ;Musac I/O buffer CE00              ccmap    =    0CE00h          ;Conference Control Address Map
D000              sltmap   =    0D000h          ;time slot map for MUSAC 0
D200              sltmp1   =    0D200h          ;time slot map for MUSAC 1

FB00              xmtflg   =    0FB00h          ;transmit flag
FB01              rcvflg   =    0FB01h          ;receive flag
FB02              rcvbox   =    0FB02h          ;receive box
F840              xmtbox   =    0F840h          ;transmit mailbox
FB80              xstate   =    0FB80h          ;auxiliary state table 0000'                      .loc  .prog.

0000'   F3        start:   di                    ;disable interupts
0001'   3E00               ld    A,0
0003'   ED3936             out0  (RCR),A         ;disable the refresh
0006'   31 DC7E            ld    SP,pstack       ;set stack pointer
0009'   3E3F               ld    A,3Fh
000B'   ED47               ld    I,A             ;set interupt vector
000D'   ED5E               im    2               ;set interupt mode ;initialize RAM and tables 000F'   21 C000            ld    HL,0C000h       ;set RAM to 0
0012'   11 C001            ld    DE,0C001h
0015'   01 37FF            ld    BC,37FFh
0018'   3600               ld    (HL),0
001A'   ED80               ldir
```

```
001C'  21 F801              ld      HL,rcvfls           ;initialize shared RAM except 1st byte
001F'  11 FB02              ld      DE,rcvbox
0022'  01 07FE              ld      BC,7FEh
0025'  3600                 ld      (HL),0
0027'  EDB0                 ldir
```

;initialize the MUSAC utilization maps

```
0029'  21 B000              ld      HL,sitmap
002D'  11 B001              ld      DE,sitmap + 1
002F'  36FF                 ld      (HL),0FFh
0031'  01 03FF              ld      BC,3FFh
0034'  EDB0                 ldir
0036'  21 CE01              ld      HL,ccamap + 1
0039'  11 0004              ld      DE,4                ;space allocated for each access channel
003D'  3E00                 ld      A,0                 ;address #
003F'  0640                 ld      B,64                ;# of channels
0040'  77          ..clr:   ld      (HL),A
0041'  3C                   inc     A
0042'  19                   add     HL,DE
0043'  10FB                 djnz    ..clr
```

;initialize interrupt vector

```
0045'  3EE0                 ld      A,0E0h
0047'  ED3933               out0    (IL),A              ;interrupt vector base =E0h
004A'  3E02                 ld      A,2
004C'  ED3934               out0    (ITC),A             ;disable external interrupts except INT1
```

;initialize the console and communications ports

```
004F'  3E74                 ld      A,74h               ;8 data bits, no parity, RTS = 1
0051'  ED3900               out0    (CA0),A
0054'  ED3901               out0    (CA1),A
0057'  3E02                 ld      A,2
0059'  ED3902               out0    (CB0),A             ;9600 baud
005C'  ED3903               out0    (CB1),A
005F'  3E00                 ld      A,0
0061'  ED3905               out0    (ST1),A             ;no interrupt on channel 1 DCD = 0
0064'  3E08                 ld      A,8                 ;rcv. interrupt, CTS disabled
0066'  ED3904               out0    (ST0),A             ;console port
```

;initialize timer 0

```
0069'  3E00        ..tim:   ld      A,00h               ;set counter to 3072 for 100 hz interrupt
006B'  ED390E               out0    (RLDR0L),A
006E'  3E0C                 ld      A,0Ch
0070'  ED390F               out0    (RLDR0H),A
0073'  3E11                 ld      A,11h               ;enable timer 0, interrupt
0075'  ED3910               out0    (TCR),A
```

;select the clock

```
0078'  3E5B                 ld      A,5Bh               ;2.048 & 4.096 clocks
007A'  D3F7                 out     (clksel),A
007C'  0604                 ld      B,4
007E'  DDE3        ..wlp:   ex      (SP),IX             ;wait for 4 sync pulses (500 microsec)
0080'  DDE3                 ex      (SP),IX
0082'  10FA                 djnz    ..wlp
```

;disable MVIP hishways

```
0084'  3E55                 ld      A,055h
0086'  D3F5                 out     (mvip03),A          ;disable MVIP hishways 0-3
0088'  D3F4                 out     (mvip47),A          ;disable MVIP hishways 4-7
008A'  3E80                 ld      A,80h
008C'  D3F6                 out     (mvipcs),A          ;disable PCM sync, MVIP clock,LED on
```

;initialize MUSAC 0 & 1

```
008E'  3EDE                 ld      A,0DEh
0090'  D3FC                 out     (mode0),A
0092'  D3FD                 out     (mode1),A
0094'  3EE0                 ld      A,0E0h
0096'  D3FF                 out     (miap0),A
0098'  D3FB                 out     (miap1),A
009A'  3E06                 ld      A,6                 ;u-law, no bit inversion, 4.096 clock
009C'  D3FF                 out     (miap0),A
009E'  D3FB                 out     (miap1),A
00A0'  3EFE                 ld      A,0FEh
00A2'  D3FF                 out     (miap0),A
00A4'  D3FB                 out     (miap1),A
00A6'  DBFA        ..mlp1:  in      A,(stat0)           ;wait for 2 bit to clear
00A8'  CB77                 bit     6,A
00AA'  20FA                 jr      nz,..mlp1
00AC'  DBF9        ..mlp2:  in      A,(stat1)           ;same on MUSAC 1
00AE'  CB77                 bit     6,A
00B0'  20FA                 jr      nz,..mlp2
```

;reset indirect access, connection memory, disable standby, set to 2.048

```
00B2'  3E00                 ld      A,0
00B4'  D3FC                 out     (mode0),A           ;reset
```

```
00B6'  D3F8              out    (model),A
00B8'  DBFD     ..mlp2:  in     A,(stat0)          ;wait for busy bit to clear
00BA'  CB7F              bit    7,A
00BC'  20FA              jr     nz,..mlp2
00BE'  DBFE              in     A,(cmp0)           ;read the CHR to clear this request bit
00C0'  DBF9     ..mlpb:  in     A,(stat1)          ;wait for MUSAC 1
00C2'  CB7F              bit    7,A
00C4'  20FA              jr     nz,..mlpb
00C6'  DBFA              in     A,(cmp1)
```

;clear the conference memory

```
00C8'  0640              ld     B,64
00CA'  0EFF              ld     C,mlapu
00CC'  1600              ld     D,0
00CE'  3E67     ..cflp:  ld     A,67h              ;conference control address
00D0'  ED79              out    (C),A
00D2'  3EFF              ld     A,0FFh
00D4'  ED79              out    (C),A
00D6'  ED51              out    (C),D
00D8'  3EA7              ld     A,0A7h
00DA'  ED79              out    (C),A
00DC'  3EFF              ld     A,0FFh
00DE'  ED79              out    (C),A
00E0'  ED51              out    (C),D
00E2'  0C                inc    C                  ;do MUSAC 1
00E3'  3E67              ld     A,67h
00E5'  ED79              out    (C),A
00E7'  3EFF              ld     A,0FFh
00E9'  ED79              out    (C),A
00EB'  ED51              out    (C),D
00ED'  3EA7              ld     A,0A7h
00EF'  ED79              out    (C),A
00F1'  3EFF              ld     A,0FFh
00F3'  ED79              out    (C),A
00F5'  ED79              out    (C),A
00F7'  0D                dec    C                  ;back to MUSAC 0
00F8'  14                inc    D
00F9'  10D3              djnz   ..cflp
```

;set the clock counter

```
00FB'  01 0064  ..toc:   ld     BC,0064h
00FE'  ED43 0000/09      ld     (ticks),BC
0102'  3E0A              ld     A,10
0104'  32 0000/0A        ld     (tenths),A
```

;initialize the queue pointers

```
0107'  01 0202           ld     BC,0202h
010A'  ED43 C000         ld     (consq),BC          ;console queue
010E'  ED43 C020         ld     (rcvq),BC           ;receive message queue
0112'  ED43 C030         ld     (xmtq),BC           ;transmit message queue
0116'  C3 0119'          jp     psched              ;set up user stacks
```

```
3FE0                     .loc   3FE0h
```

;real time clock vectors

```
3FE0   0000/06  clkvec:  .word  pcmss
3FE2   0003              .word  quack
3FE4   0000/04           .word  clock
3FE6   0003              .word  quack
```

```
3FEE                     .loc   3FEEh
```

```
3FEE   0000/05  convec:  .word  .conrcv
3FF0   0003              .word  quack
3FF2   0003              .word  quack
3FF4   0003              .word  quack
3FF6   0000              .word  0
3FF8   0000              .word  0
3FFA   0000              .word  0
3FFC   0000              .word  0
```

```
0119'                    .loc   .pros.
```

;sched places tasks on the round robin table and points to their stacks

```
0119'  21 015A' psched:  ld     HL,tasks           ;list of tasks
011C'  0602              ld     B,tasknp
011E'  DD21 DC7E         ld     IX,rstack          ;top of stack area for 1st task
0122'  11 0040           ld     DE,stksiz          ;stack size
0125'  7E       stklp:   ld     A,(HL)             ;1st task return address
0126'  DD7700            ld     (IX),A
0129'  23                inc    HL
012A'  7E                ld     A,(HL)             ;high order address
012B'  DD7701            ld     (IX + 1),A
012E'  23                inc    HL
012F'  DD19              add    IX,DE              ;point at next task stack
0131'  10F2              djnz   stklp
```

```
0133'   0602             ld      B,taskno
0135'   DD21 BC02        ld      IX,rrt          ;round robin table
0139'   21 BC72          ld      HL,stack - 12   ;set stack pointer at top address + registers
013C'   11 0040          ld      DE,stksiz
013F'   DD360001  rrtlp: ld      (IX),1          ;set status to ready
0143'   DD7501           ld      (IX + 1),L      ;stack pointer address
0146'   DD7402           ld      (IX + 2),H
0149'   19               add     HL,DE
014A'   DD23             inc     IX
014C'   DD23             inc     IX
014E'   DD23             inc     IX              ;next RRT entry
0150'   10ED             djnz    rrtlp           ;loop for all tasks
0152'   DD3600FF         ld      (IX),0FFh       ;end of stack flag
0156'   FB               ei                      ;enable the interrupts
0157'   C3 018D'         jp      wrap ;list of tasks 015A'   0000107   tasks: .word   monitr          ;monitor task
015C'   0000108          .word   msgprc          ;mailbox message processor
                 .remark "
                 The last 14 bytes of the stack for each task will include the IY register
                 the IX register
                 the HL register
                 the DE register
                 the BC register
                 the AF register
                 the return address The round robin table contains a three byte entry for each task.
                 The first byte contains the status (0=NOT READY, 1=READY). The
                 next two bytes contain the stack pointer for the task.

015E'   F5        sched: push    AF              ;save AF on task's stack
015F'   3E01             ld      A,1             ;task status READY, task will run next time 0161'   C5       pushes: push    BC              ;save all registers on task's stack
0162'   D5               push    DE
0163'   E5               push    HL
0164'   DDE5             push    IX
0166'   FDE5             push    IY
0168'   21 0000          ld      HL,0            ;put the task stack pointer in HL
016B'   39               add     HL,SP
016C'   DD2A BC00        ld      IX,(rrtp)       ;round robin table pointer
0170'   11 0003          ld      DE,3            ;round robin table entry size
0173'   DD7700           ld      (IX),A          ;save task status
0176'   DD7501           ld      (IX + 1),L      ;save stackpointer address
0179'   DD7402           ld      (IX + 2),H
017C'   DD19     next:   add     IX,DE           ;point at next task in RRT
017F'   DD22 DC00 updat: ld      (rrtp),IX       ;update RRT pointer
0182'   DD7E00           ld      A,(IX)          ;get status byte
0185'   B7               or      A
0186'   CA 017C'         jp      z,next          ;if 0, task not ready to run
0189'   3C               inc     A               ;check for FF, end of table
018A'   C2 0193'         jp      nz,sotask       ;if ready to run, do it
018D'   DD21 BC02 wrap:  ld      IX,rrt          ;if at end of table, try task at start of table
0191'   18EB             jr      updat           ;wrap around ;load registers for next task 0193'   DD6E01  sotask: ld      L,(IX + 1)      ;stack pointer for new task
0196'   DD6602           ld      H,(IX + 2)
0199'   F9               ld      SP,HL
019A'   FDE1             pop     IY              ;restore registers for new task
019C'   DDE1             pop     IX
019E'   E1               pop     HL
019F'   D1               pop     DE
01A0'   C1               pop     BC
01A1'   F1               pop     AF              ;all registers restored
01A2'   C9               ret                     ;return to task 01A3'   F5       dsched: push    AF              ;save flags on the task's stack
01A4'   3E00             ld      A,0             ;set task's status to NOT READY
01A6'   C3 0161'         jp      pushes 0000'                    .end    start .ident  queues
                 .id     071983
                 .ver    2.0

.intern pushes
                 .intern pulles
                 .intern push32
                 .intern pull32
                 .intern push16
                 .intern pull16

;push onto 254 byte queue, enter HL point at queue, character in A
                 ;return with carry if full, destroys contents of E
```

```
0000'   37              pushes:  scf                     ;set the carry flag
0001'   F5                       push    AF              ;save the value to push
0002'   7E                       ld      A,(HL)          ;head of queue
0003'   23                       inc     HL              ;tail of queue
0004'   3C                       inc     A               ;point at next byte in queue
0005'   C2 0008'                 jp      nz,..1          ;check if end of queue buffer
0008'   3E02                     ld      A,2             ;if end, point at beginning
000A'   BE              ..1:     cp      (HL)            ;compare new head to tail
000B'   CA 0016'                 jp      z,full          ;if the same, queue is full
000E'   2B                       dec     HL              ;point at head again
000F'   77                       ld      (HL),A          ;save the new head
0010'   85                       add     A,L
0011'   6F                       ld      L,A
0012'   F1                       pop     AF              ;point at head byte
0013'   77                       ld      (HL),A          ;restore value
0014'   3F                       ccf                     ;put data onto queue
0015'   C9                       ret                     ;clear the carry flag 0016'   F1              full:    pop     AF              ;restore value
0017'   C9                       ret ;pull from 254 byte queue, HL = start of queue area, return with data in A
                                ;if empty return with carry set 0018'   7E              pulles:  ld      A,(HL)          ;head
0019'   23                       inc     HL              ;point at tail
001A'   BE                       cp      (HL)            ;compare head and tail
001B'   CA 002C'                 jp      z,empty         ;if head = tail, queue empty
001E'   7E                       ld      A,(HL)          ;tail address
001F'   3C                       inc     A               ;point at tail byte
0020'   C2 0025'                 jp      nz,..1          ;check for end of queue
0023'   3E02                     ld      A,2             ;start of queue
0025'   77              ..1:     ld      (HL),A          ;save new tail
0026'   2B                       dec     L
0027'   85                       add     A,L             ;add tail to start of queue
0028'   6F                       ld      L,A             ;point at tail byte
0029'   7E                       ld      A,(HL)          ;get data from queue
002A'   A7                       and     A               ;clear carry flag
002B'   C9                       ret 002C'   37              empty:   scf                     ;set carry flag if empty
002D'   C9                       ret ;push onto 30 byte queue, enter HL point at queue, character in A 002E'   37              push32:  scf                     ;set the carry flag
002F'   F5                       push    AF              ;save the value to push
0030'   7E                       ld      A,(HL)          ;head of queue
0031'   23                       inc     HL              ;tail of queue
0032'   3C                       inc     A               ;point at next byte in queue
0033'   FE20                     cp      32              ;check if end of queue
0035'   C2 003A'                 jp      nz,..1          ;if end, point at destination
0038'   3E02                     ld      A,2
003A'   BE              ..1:     cp      (HL)            ;compare new head to tail
003B'   CA 0016'                 jp      z,full          ;if the same, queue is full
003E'   2B                       dec     HL              ;point at head again
003F'   77                       ld      (HL),A          ;save the new head
0040'   85                       add     A,L
0041'   6F                       ld      L,A             ;point at head byte
0042'   F1                       pop     AF              ;restore value
0043'   77                       ld      (HL),A          ;put data onto queue
0044'   3F                       ccf                     ;clear the carry flag
0045'   C9                       ret ;pull from 30 byte queue, HL = start of queue area, return with data in A
                                ;if empty return with carry set 0046'   7E              pull32:  ld      A,(HL)          ;head
0047'   23                       inc     HL              ;point at tail
0048'   BE                       cp      (HL)            ;compare head and tail
0049'   CA 0030'                 jp      z,empty         ;if head = tail, queue empty
004C'   7E                       ld      A,(HL)          ;tail address
004D'   3C                       inc     A               ;point at tail byte
004E'   FE20                     cp      32              ;check for end of queue
0050'   C2 0055'                 jp      nz,..1
0053'   3E03                     ld      A,2             ;start of queue
0055'   77              ..1:     ld      (HL),A          ;save new tail
0056'   2B                       dec     L
0057'   85                       add     A,L             ;add tail to start of queue
0058'   6F                       ld      L,A             ;point at tail byte
0059'   7E                       ld      A,(HL)          ;get data from queue
005A'   A7                       and     A               ;clear carry flag
005B'   C9                       ret ;pull from 14 byte queue, HL points at queue, A is value to push
                                ;returns with carry if full, value in A 005C'   37              push16:  scf                     ;set the carry flag
005D'   F5                       push    AF              ;save value to push
005E'   7E                       ld      A,(HL)          ;head of queue
005F'   23                       inc     HL              ;tail of queue
0060'   3C                       inc     A               ;point at next byte in queue
0061'   FE10                     cp      16              ;end of queue?
```

```
0063'    C2 0068'           JP      nz,..1
0066'    3E02               ld      A,2         ;wrap around to beginning if end
0068'    BE         ..1:    cp      (HL)        ;compare head to tail
0069'    CA 0016'           jp      z,full      ;if the same, queue is full
006C'    2B                 dec     HL
006D'    77                 ld      (HL),A      ;save the new head
006E'    85                 add     A,L
006F'    6F                 ld      L,A         ;point at the head address
0070'    F1                 pop     AF
0071'    77                 ld      (HL),A
0072'    3F                 ccf                 ;clear the carry flag
0073'    C9                 ret
```

;pull from 14 byte queue, HL = address of queue, return with data in A
;if empty, return with carry set

```
0074'    7E         pull16: ld      A,(HL)      ;head of queue
0075'    23                 inc     HL          ;tail of queue
0076'    BE                 cp      (HL)        ;compare head and tail
0077'    CA 002C'           jp      z,empty     ;if head = tail, queue empty
007A'    7E                 ld      A,(HL)      ;tail address
007B'    3C                 inc     A           ;point at tail byte
007C'    FE10               cp      16          ;check for end of queue
007E'    C2 0083'           jp      nz,..1
0081'    3E02               ld      A,2         ;wrap around if at end
0083'    77         ..1:    ld      (HL),A      ;save the new tail address
0084'    2B                 dec     L
0085'    85                 add     A,L         ;point at tail address
0086'    6F                 ld      L,A
0087'    7E                 ld      A,(HL)      ;get data from queue
0088'    B7                 or      A           ;clear the carry flag
0089'    C9                 ret
```

```
                    .end
            .ident  clock
            .id     031692
            .ver    1,0

.intern clock
            .extern push16,pull16

.intern ticks,scnt,tenths,iflag
            .extern xblkmm,xmtbuf

.insert matrixio.dfn
            ;Matrix board I/O definitions 3/16/92

00EF        dsp0        =   0EFh        ;DSP FIFO 0
00EE        dsp1        =   0EEh        ;DSP FIFO 1
00ED        dsp2        =   0EDh        ;DSP FIFO 2
00EC        dsp3        =   0ECh        ;DSP FIFO 3

00F3        fifost      =   0F3h        ;FIFO status
00F4        MVIP47      =   0F4h        ;MVIP enables hwys 4-7
00F5        MVIP03      =   0F5h        ;MVIP enables hwys 0-3
00F6        MVIPCS      =   0F6h        ;MVIP clock select/PEB sync/LED
00F7        clksel      =   0F7h        ;clock select 00F8        mode1       =   0F8h        ;MUSAC 1 mode register
00F9        stat1       =   0F9h        ;MUSAC 1 status
00FA        cmr1        =   0FAh        ;MUSAC 1 Conference Mask Register
00FB        miap1       =   0FBh        ;MUSAC 1 Indirect Access Port 00FC        mode0       =   0FCh        ;MUSAC 0 mode register
00FD        stat0       =   0FDh        ;MUSAC 0 status
00FE        cmr0        =   0FEh        ;MUSAC 0 Conference Mask Register
00FF        miap0       =   0FFh        ;MUSAC 0 Indirect Access Port ;64180 I/O Registers 0000        CA0         =   0           ;serial channel 0 control registers
0002        CB0         =   2
0004        ST0         =   4           ;serial channel 0 status register
0006        TDR0        =   6           ;console transmit data
0008        RDR0        =   8           ;console receive data 0001        CA1         =   1           ;serial channel 1 control registers
0003        CB1         =   3
0005        ST1         =   5           ;status register
0007        TDR1        =   7           ;transmit data
0009        RDR1        =   9           ;receive data 000C        TMDRL0      =   0Ch         ;timer register
000E        RLDR0L      =   0Eh         ;timer 0 load registers
000F        RLDR0H      =   0Fh
0010        TCR         =   10h         ;timer control register
0032        DCNTL       =   32h         ;wait state control
0033        IL          =   33h         ;interrupt vector
0034        ITC         =   34h         ;interrupt control register
0036        RCR         =   36h         ;refresh register .insert matrxmem.dfn
            ;Matrix Memory definition 4-01-92
```

```
C000                    consls   =    0C000h        ;console queue
C020                    rcvq     =    0C020h        ;receive message queue
C030                    xmtq     =    0C030h        ;xmit message queue
C100                    rcvbfs   =    0C100h        ;receive buffers
C200                    xmtbfs   =    0C200h        ;transmit buffers C300                    muscbf   =    0C300h        ;MUSAC I/O buffer CE00                    ccamap   =    0CE00h        ;Conference Control address map
D000                    sltmap   =    0D000h        ;time slot map for MUSAC 0
D200                    sltmp1   =    0D200h        ;time slot map for MUSAC 1

F800                    xmtfls   =    0F800h        ;transmit flag
F801                    rcvfls   =    0F801h        ;receive flag
F802                    rcvbox   =    0F802h        ;receive box
F840                    xmtbox   =    0F840h        ;transmit mailbox
F880                    xstate   =    0F880h        ;auxillary state table 0000'  F3               clock:   di
0001'  08                        ex    AF,AF'
0002'  D9                        exx                ;exchange registers
0003'  DDE5                      push  IX
0005'  ED3810                    in0   A,(TCR)      ;read timer control register to reset interrupt
0038'  ED380C                    in0   A,(TMDRL0)   ;read timer also ;check for outgoing messages 000B'  3A F800                   ld    A,(xmtfls)
000E'  A7                        and   A
000F'  2030                      jr    nz,time      ;if flag set, skip
0011'  21 C030                   ld    HL,xmtq
0014'  CD 0000:05                call  pull16
0017'  D8 004E'                  jr    c,time       ;if queue empty, skip
001A'  47                        ld    B,A          ;save block #
001B'  3A 0003*                  ld    A,(iflag)
001E'  A7                        and   A
001F'  2822                      jr    z,..fre      ;if flag is 0, kill messages
0021'  78                        ld    A,B          ;restore block #
0022'  6F                        ld    L,A
0023'  CB0D                      rrc   L
0025'  CB0D                      rrc   L
0027'  CB0D                      rrc   L
0029'  26C2                      ld    H,xmtbfs/256 ;point at transmit buffer
002B'  E5                        push  HL
002C'  11 F840                   ld    DE,xmtbox
002F'  01 0020                   ld    BC,32
0032'  EDB0                      ldir
0034'  E1                        pop   HL
0035'  11 0000:07                ld    DE,xmtbuf    ;monitor buffer
0038'  01 0020                   ld    BC,32
003B'  EDB0                      ldir
003D'  47                        ld    B,A
003E'  3E01                      ld    A,1
0040'  32 F800                   ld    (xmtfls),A   ;set the transmit flag
0043'  04               ..fre:   inc   B
0044'  3E7F                      ld    A,7Fh
0046'  07               ..lp:    rlca
0047'  10FB                      djnz  ..lp
0049'  21 0000:06                ld    HL,xblkmp
004C'  A6                        and   (HL)         ;block map
004D'  77                        ld    (HL),A       ;free the block ;take care of clocks and timed functions 004E'  ED4B 0001*       time:    ld    BC,(ticks)   ;counter
0052'  0B                        dec   C
0053'  ED43 0001*                ld    (ticks),BC
0057'  2007                      jr    nz,..nsec    ;a second yet?
0059'  04                        inc   B            ;bump the seconds counter
005A'  0E64                      ld    C,100        ;reset interupt down counter
005C'  ED43 0001*                ld    (ticks),BC 0060'                  ..nsec:
0060'  DDE1            bye:      pop   IX
0062'  08                        ex    AF,AF'
0063'  D9                        exx                ;restore registers
0064'  FB                        ei
0065'  ED4D                      reti 0000*                            .loc  .data.

0000*                   tenths:  .blkb 1            ;tenth of a second timer
0001*                   ticks:   .blkb 1            ;downcounter
0002*                   scnt:    .blkb 1            ;seconds
0003*                   iflag:   .blkb 1            ;interrupt flag
                                 .end .ident   commnt
                        .id      022092
                        .ver     1,0

.intern  conrcv,rcmss
```

```
        .extern push32,push16
        .extern rblkmp

.insert pcmiteio.dfn
        ;PC Mite I/O definitions 02-20-92
```

| | | | | |
|---|---|---|---|---|
| 0000 | CA0   | = | 0    | ;serial channel 0 control register |
| 0002 | CB0   | = | 2    | |
| 0004 | ST0   | = | 4    | ;serial channel 0 status register |
| 0006 | TDR0  | = | 6    | ;console transmit data |
| 0008 | RDR0  | = | 8    | ;console receive data |
| 0001 | CA1   | = | 1    | ;serial channel 1 control registers |
| 0003 | CB1   | = | 3    | |
| 0005 | ST1   | = | 5    | ;status register |
| 0007 | TDR1  | = | 7    | ;transmit data |
| 0009 | RDR1  | = | 9    | ;receive data |
| 000C | TMDRL0 | = | 0Ch | ;timer register |
| 000E | RLDROL | = | 0Eh | ;timer 0 load registers |
| 000F | RLDROH | = | 0Fh | |
| 0010 | TCR   | = | 10h  | ;timer control register |
| 0032 | DCNTL | = | 32h  | ;wait state control |
| 0033 | IL    | = | 33h  | ;interrupt vector |
| 0034 | ITC   | = | 34h  | ;interrupt control register |
| 0036 | RCR   | = | 36h  | ;refresh register |
| 00EE | dspdat | = | 0EEh | ;DSP data port |
| 00EF | dspst  | = | 0EFh | ;DSP status port (bits 4-7) |
| 00EF | rotsw  | = | 0EFh | ;card select rotary switch (bits 0-3) |
| 00F0 | msnb  | = | 0F0h | ;microwire 2nd byte |
| 00F1 | mfmb  | = | 0F1h | ;microwire 1st byte |
| 00FA | mcs   | = | 0FAh | ;chip select output register |
| 00FB | mskp  | = | 0FBh | ;clock polarity control byte |
| 00FC | mwm   | = | 0FCh | ;mode register |
| 00FD | mskr  | = | 0FDh | ;clock rate register |
| 00FE | mst   | = | 0FEh | ;status register |
| 00FF | mpd   | = | 0FFh | ;pin definition register |

```
        .insert pcmitmem.dfn
        ;PC Mite Memory definition 4-07-92
```

| | | | | |
|---|---|---|---|---|
| C000 | conslq | = | 0C000h | ;console queue |
| C020 | rcvq   | = | 0C020h | ;receive message queue |
| C030 | xmtq   | = | 0C030h | ;xmit message queue |
| C100 | rcvbfs | = | 0C100h | ;receive buffers |
| C200 | xmtbfs | = | 0C200h | ;transmit buffers |
| C700 | ttgen1 | = | 0C700h | ;DTMF generator 1 flag |
| C701 | ttgen2 | = | 0C701h | ;DTMF generator 2 flag |
| C702 | ttdet1 | = | 0C702h | ;DTMF detector 1 flag |
| C703 | ttdet2 | = | 0C703h | ;DTMF detector 2 flag |
| C704 | ttdet3 | = | 0C704h | ;DTMF detector 3 flag |
| C708 | cnf1   | = | 0C708h | ;conference port 1 |
| C709 | cnf2   | = | 0C709h | ;conference port 2 |
| C70A | cnf3   | = | 0C70Ah | ;conference port 3 |
| C710 | flshtm | = | 0C710h | ;flash-hook generator timers |
| C720 | ttdbf1 | = | 0C720h | ;DTMF detector buffer 1 |
| C740 | ttdbf2 | = | 0C740h | ;DTMF detector buffer 2 |
| C760 | ttdbf3 | = | 0C760h | ;DTMF detector buffer 3 |
| C7C0 | ttsbf1 | = | 0C7C0h | ;DTMF generator buffer 1 |
| C7E0 | ttsbf2 | = | 0C7E0h | ;DTMF generator buffer 2 |
| C800 | snstbl | = | 0C800h | ;port status table |
| C808 | beltmr | = | 0C808h | ;phone bell timer |
| C810 | tyrtbl | = | 0C810h | ;port type table |
| C818 | protbl | = | 0C818h | ;protocol table |
| C820 | statbl | = | 0C820h | ;state table |
| C828 | onhkf  | = | 0C828h | ;on-hook flag |
| C829 | isens0 | = | 0C829h | ;current isense table |
| C82A | isens1 | = | 0C82Ah | ;100 msec current table |
| C82B | isens2 | = | 0C82Bh | ;200 msec current table |
| C82C | ofhkf  | = | 0C82Ch | ;off-hook flag |
| C830 | rins0  | = | 0C830h | ;ring0 sample |
| C831 | rins1  | = | 0C831h | ;ring 100 msec sample |
| C832 | rins2  | = | 0C832h | ;ring 200 msec sample |
| C833 | rins1s | = | 0C833h | ;ring 1 sec. sample |
| C834 | rins2s | = | 0C834h | ;ring 2 sec. sample |
| C835 | rnsflg | = | 0C835h | ;ring detect flag |
| C838 | rnstmr | = | 0C838h | ;ring clear timers |
| C840 | grvflg | = | 0C840h | ;ground removed flag |
| C841 | snd0   | = | 0C841h | ;ground 0 msec. |
| C842 | snd1   | = | 0C842h | ;ground 100 msec. |
| C843 | snd2   | = | 0C843h | ;ground 200 msec. |
| C844 | gasflg | = | 0C844h | ;ground asserted flag |
| C848 | rnst0  | = | 0C848h | ;ring trip 0 msec. |
| C849 | rnst1  | = | 0C849h | ;ring trip 100 msec. |
| C84A | rnst2  | = | 0C84Ah | ;ring trip 200 msec |
| C84B | rnstf  | = | 0C84Bh | ;ring trip flag |
| C84C | rmask  | = | 0C84Ch | ;ring mask |
| C850 | plsbf0 | = | 0C850h | ;DID pulse buffer 0 msec. |
| C851 | plsbf1 | = | 0C851h | ;DID pulse buffer 10 msec. |
| C852 | plsbf2 | = | 0C852h | ;DID pulse buffer 20 msec. |

```
C853            plsfls   =   0C853h       ;pulse flag
C855            dmask    =   0C855h       ;DID mask
C858            plscnt   =   0C858h       ;DID pulse count
C860            didst    =   0C860h       ;DID state
C868            didtmr   =   0C868h       ;DID timers
C870            didnum   =   0C870h       ;DID number
C878            didcnt   =   0C878h       ;DID number counter
C880            didbfs   =   0C880h       ;DID number buffers
C8E0            flshbf   =   0C8E0h       ;flash-hook detection buffers
C8E6            flshfs   =   0C8E6h       ;flash-hook flag
C8E7            onhkf2   =   0C8E7h       ;on-hook flag for phones & C&M
C8E8            lnflss   =   0C8E8h       ;line flags
C8F0            codecb   =   0C8F0h       ;codec buffer F800            xmtfls   =   0F800h       ;transmit flag
F801            rcvfls   =   0F801h       ;receive flag
F802            rcvbox   =   0F802h       ;receive box
F840            xmtbox   =   0F840h       ;transmit mailbox
F880            xstate   =   0F880h       ;auxillary state table 0003            quack    =   0003h ;receive message from the PC, takes 112 usec. to service interrupt 0000'  F3       pcmss:   di
0001'  08                ex     AF,AF'
0002'  D9                exx
0003'  3A 0000:06        ld     A,(rblkmp)    ;receive block map
0006'  0608              ld     B,8
0008'  07       ..fndb:  rlca
0009'  D2 0011'          jp     nc,..fnd
000C'  10FA              djnz   ..fndb
000E'  C3 003A'          jp     norm          ;if no free blocks, dump message
0011'  58       ..fnd:   ld     E,B
0012'  0F                rrca
0013'  F680              or     80h
0015'  07                rlca
0016'  10FD     ..flp:   rlca
0018'  32 0000:06        djnz   ..flp
001B'  1D                ld     (rblkmp),A    ;save the new map
001C'  4B                dec    E
001D'  CB0B              ld     C,E
001F'  CB0B              rrc    E
0021'  CB0B              rrc    E
0023'  1601              rrc    E
0025'  21 F802           ld     D,rcvbfs/256  ;receive buffers
0028'  0620              ld     HL,rcvbox     ;ec message buffer
002A'  7E                ld     B,32          ;max size
002B'  12       ..le:    ld     A,(HL)
002C'  A7                ld     (DE),A        ;transfer a byte
002D'  2804              and    A
002F'  1C                jr     z,..et        ;check for end of message
0030'  2C                inc    E
0031'  10F7              inc    L
0033'  79                djnz   ..le
0034'  21 C020  ..et:    ld     A,C
0037'  CD 0000:05        ld     HL,rcvq       ;receive message queue
003A'  3E00     norm:    call   push16        ;push block k onto queue
003C'  32 F801           ld     A,0
003F'  D9                ld     (rcvflg),A    ;clear the interupt
0040'  08                exx
0041'  FB                ex     AF,AF'
0042'  ED4D              ei
                         reti ;console receive interupt 0044'  F3       conrcv:  di
0045'  08                ex     AF,AF'
0046'  D9                exx
0047'  ED3804            in0    A,(STO)       ;check the status
004A'  E670              and    70h
004C'  2015              jr     nz,error      ;if error bits not 0, error
004E'  ED3808            in0    A,(RDR0)      ;get character
0051'  E67F              and    7Fh           ;elliminate parity
0053'  FE03              cp     03h           ;cntrl-C?
0055'  CA 0003           jp     z,quack
0058'  21 C000           ld     HL,consiq     ;console input queue
005B'  CD 0000:04        call   push32
005E'  08                ex     AF,AF'
005F'  D9                exx
0060'  FB                ei
0061'  ED4D              reti 0063'  3E74     error:   ld     A,74h
0065'  ED3900            out0   (CA0),A       ;clear the error bits
0068'  ED3808            in0    A,(RDR0)      ;eat the character
006B'  08                ex     AF,AF'
006C'  D9                exx
006D'  FB                ei
006E'  ED4D              reti .end
                .ident   monitor
                .id      040192
                .ver     1,1           ;MUSAC 1 support
```

```
             .intern monitr
             .intern phrs,conout,aschex

.extern sched
             .extern push32,push16
             .extern sxblk
             .extern cnctit,discit
             .extern confit,deconf .intern rcvbuf,xmtbuf,shwfls .insert matrixio.dfn
             ;Matrix board I/O definitions 3/16/92
00EF         dsp0        =       0EFh        ;DSP FIFO 0
00EE         dsp1        =       0EEh        ;DSP FIFO 1
00ED         dsp2        =       0EDh        ;DSP FIFO 2
00EC         dsp3        =       0ECh        ;DSP FIFO 3

00F3         fifost      =       0F3h        ;FIFO status
00F4         MVIP47      =       0F4h        ;MVIP enables bus 4-7
00F5         MVIP03      =       0F5h        ;MVIP enables bus 0-3
00F6         MVIPCS      =       0F6h        ;MVIP clock select/PEB sync/CLK
00F7         clksel      =       0F7h        ;clock select 00F8         mode1       =       0F8h        ;MUSAC 1 mode register
00F9         stat1       =       0F9h        ;MUSAC 1 status
00FA         cmr1        =       0FAh        ;MUSAC 1 Conference Mask Register
00FB         miap1       =       0FBh        ;MUSAC 1 Indirect Access Port 00FC         mode0       =       0FCh        ;MUSAC 0 mode register
00FD         stat0       =       0FDh        ;MUSAC 0 status
00FE         cmr0        =       0FEh        ;MUSAC 0 Conference Mask Register
00FF         miap0       =       0FFh        ;MUSAC 0 Indirect Access Port ;64180 I/O Registers 0000         CA0         =       0           ;serial channel 0 control registers
0002         CB0         =       2
0004         ST0         =       4           ;serial channel 0 status register
0006         TDR0        =       6           ;console transmit data
0008         RDR0        =       8           ;console receive data 0001         CA1         =       1           ;serial channel 1 control registers
0003         CB1         =       3
0005         ST1         =       5           ;status register
0007         TDR1        =       7           ;transmit data
0009         RDR1        =       9           ;receive data
000C         TMDRL0      =       0Ch         ;timer register
000E         RLDRL0      =       0Eh         ;timer 0 load register
000F         RLDR0H      =       0Fh
0010         TCR         =       10h         ;timer control register 0032         DCNTL       =       32h         ;wait state control
0033         IL          =       33h         ;interupt vector
0034         ITC         =       34h         ;interupt control register
0036         RCR         =       36h         ;refresh register .insert matrxmem.dfn
             ;Matrix Memory definition 4-01-92

C000         consq       =       0C000h      ;console queue
C020         rcvq        =       0C020h      ;receive message queue
C030         xmtq        =       0C030h      ;xmit message queue
C100         rcvbfs      =       0C100h      ;receive buffers
C200         xmtbfs      =       0C200h      ;transmit buffers C300         miscbf      =       0C300h      ;Musac I/O buffer CE00         ccamap      =       0CE00h      ;Conference Control Address Map
D000         sitmap      =       0D000h      ;time slot map for MUSAC 0
D200         sitmap1     =       0D200h      ;time slot map for MUSAC 1

F800         xmtfls      =       0F800h      ;transmit flag
F801         rcvflg      =       0F801h      ;receive flag
F802         rcvbox      =       0F802h      ;receive box
F840         xmtbox      =       0F840h      ;transmit mailbox
F880         xstate      =       0F880h      ;auxiliary state table 000A         lf          =       0Ah
000C         era         =       0Ch         ;0Ch for ADDS, 1Ah for televideo
000D         cr          =       0Dh
0013         esc         =       13h
0059         crschr      =       "Y"         ;"(" for ADDS, "=" for televideo 0000  3E0C       monitr: ld      A,era
0002  CD 0323'           call    conout
0005  21 03C4'           ld      HL,headns       ;"Matrix Monitor"
0008  11 0101            ld      DE,0101h
000B  CD 02FD'           call    phrs
000E  21 03D3'           ld      HL,dpmsg        ;"DON'T PANIC!"
0011  11 0140            ld      DE,0140h
0014  CD 02FD'           call    phrs
0017  21 0380'           ld      HL,msshd        ;mailbox headings
```

```
001A'   11 0301              ld      DE,0301h
001B'   CD 02FD'             call    phrs
0020'   21 03F6'             ld      HL,cmndnd
0023'   11 0501              ld      DE,0501h
0026'   CD 02FD'             call    phrs
0029'   21 0406'             ld      HL,hushd
002C'   11 0701              ld      DE,0701h
002F'   CD 02FD'             call    phrs
0032'   0E30                 ld      C,"0"
0034'   0610                 ld      B,16
0036'   11 0803       ..p1p: ld      DE,0803h
0039'   CD 030A'             call    curs
003C'   79                   ld      A,C
003D'   CD 0323'             call    conout
0040'   14                   inc     D
0041'   0C                   inc     C
0042'   FE39                 cp      "9"
0044'   2002                 jr      nz,..9
0046'   0E41                 ld      C,"A"
0048'   10EF          ..9:   djnz    ..p1p
004A'   CD 02B4'             call    slotso 004D'   11 0510       loop:  ld      DE,0510h
0050'   21 0452'             ld      HL,spaces
0053'   CD 02FD'             call    phrs
0056'   CD 0000:04    ..lp:  call    sched        ;loop through the scheduler
0059'   CD 011F'             call    show
005C'   3A 002F*             ld      A,(rcvbuf)
005F'   A7                   and     A
0060'   205A                 jr      nz,rmss      ;if not zero, a message has been received
0062'   3A 004F*             ld      A,(xmtbuf)
0065'   A7                   and     A
0066'   206E                 jr      nz,xmss      ;if not zero, a message has been transmitted
0068'   21 C000              ld      HL,consla
006B'   CD 0000:05           call    cul132       ;check if a console input
006E'   38E6                 jr      c,..lp 0070'   CD 00A2'             call    ocmnd        ;output the command letter
0073'   FE52                 cp      "R"
0075'   CA 0000'             jp      z,monitr     ;redraw the screen
0078'   FE43                 cp      "C"
007A'   CA 012D'             jp      z,cnct       ;connect two time slots
007D'   FE44                 cp      "D"
007F'   CA 014F'             jp      z,dscnct     ;disconnect at timeslot
0082'   FE4B                 cp      "K"
0084'   CA 017C'             jp      z,conf       ;set up a conference
0087'   FE4C                 cp      "L"
0089'   CA 0160'             jp      z,listen
008C'   FE4D                 cp      "M"
008E'   CA 0218'             jp      z,dspmss     ;DSP message
0091'   FE50                 cp      "P"
0093'   CA 00F0'             jp      z,pcmss
0096'   FE55                 cp      "U"
0098'   CA 01D0'             jp      z,unconf     ;send a message to the PC
009B'   FE58                 cp      "X"
009D'   CA 00AE'             jp      z,xcnns      ;clear a conference
00A0'   18AB                 jr      loop         ;exchange MUSAC output display 00A2'   F5            ocmnd: push    AF
00A3'   11 0510              ld      DE,0510h
00A6'   CD 030A'             call    curs
00A9'   F1                   pop     AF
00AA'   CD 0323'             call    conout
00AD'   C9                   ret 00AE'   3A 0001*      xcnns: ld      A,(musacn)   ;swap MUSAC to display
00B1'   EE01                 xor     1
00B3'   32 0001*             ld      (musacn),A
00B6'   CD 02B4'             call    slotso
00B9'   C3 004D'             jp      loop 00BC'   21 0452'      rmss:  ld      HL,spaces    ;erase the last message
00BF'   11 030B              ld      DE,030Bh
00C2'   CD 02FD'             call    phrs
00C5'   21 002F*             ld      HL,rcvbuf
00C8'   11 030B              ld      DE,030Bh
00CB'   CD 02FD'             call    phrs         ;display the message
00CE'   21 002F*             ld      HL,rcvbuf
00D1'   3600                 ld      (HL),0       ;clear the buffer
00D3'   C3 004D'             jp      loop 00D6'   21 0452'      xmss:  ld      HL,spaces    ;erase the last message
00D9'   11 040B              ld      DE,040Bh
00DC'   CD 02FD'             call    phrs
00DF'   21 004F*             ld      HL,xmtbuf
00E2'   11 040B              ld      DE,040Bh
00E5'   CD 02FD'             call    phrs         ;display the message
00E8'   21 004F*             ld      HL,xmtbuf
00EB'   3600                 ld      (HL),0       ;clear the buffer
00ED'   C3 004D'             jp      loop 00F0'   11 000F*      pcmss: ld      DE,dspbuf
00F3'   061E                 ld      B,30         ;max length
00F5'   CD 0355'      ..lp:  call    char         ;get characters
00F8'   FE1B                 cp      esc          ;exit on an escapex
```

```
00FA'   CA 004D'            jp      z,loop
00FD'   FE0D                cp      cr
00FF'   2807                jr      z,..end         ;return ends it
0101'   CD 0323'            call    conout          ;display the character
0104'   12                  ld      (DE),A
0105'   13                  inc     DE
0106'   10EB                djnz    ..lp
0108'   3E00        ..end:  ld      A,0             ;terminator
010A'   12                  ld      (DE),A          ;save Arnold
010B'   CD 0000:07          call    sxblk
010E'   21 000F#            ld      HL,dspbut
0111'   01 0020             ld      BC,32
0114'   EDB0                ldir
0116'   21 0030             ld      HL,xmtq
0119'   CD 0000:06          call    push16
011C'   C3 004D'            jp      loop ;show changes if any
011F'   3A 0000#    show:   ld      A,(shwfls)      ;check the flag
0122'   A7                  and     A
0123'   C8                  ret     z
0124'   3E00                ld      A,0
0126'   32 0000#            ld      (shwfls),A
0129'   CD 02B4'            call    slotso          ;display the time slot table
012C'   C9                  ret 012D'   CD 0359'    cnct:   call    setnum          ;set a three digit #
0130'   DA 004D'            jp      c,loop
0133'   50                  ld      D,B
0134'   59                  ld      E,C
0135'   3E20                ld      A,' '
0137'   CD 0323'            call    conout
013A'   CD 0359'            call    setnum
013D'   DA 004D'            jp      c,loop
0140'   60                  ld      H,B
0141'   69                  ld      L,C
0142'   CD 0000:08          call    cnctit
0145'   EB                  ex      DE,HL
0146'   CD 0000:08          call    cnctit
0149'   CD 02B4'            call    slotso
014C'   C3 004D'            jp      loop 014F'   CD 0359'    dscnct: call    setnum
0152'   DA 004D'            jp      c,loop
0155'   59                  ld      E,C
0156'   50                  ld      D,B
0157'   CD 0000:09          call    dscit
015A'   CD 02B4'            call    slotso
015D'   C3 004D'            jp      loop 0160'   CD 0359'    listen: call    setnum          ;set a three digit #
0163'   DA 004D'            jp      c,loop
0166'   50                  ld      D,B             ;output timeslot
0167'   59                  ld      E,C
0168'   3E20                ld      A,' '
016A'   CD 0323'            call    conout
016D'   CD 0359'            call    setnum          ;set another number
0170'   DA 004D'            jp      c,loop
0173'   60                  ld      H,B             ;input time slot
0174'   69                  ld      L,C
0175'   CD 0000:08          call    cnctit          ;set up the listen
0178'   CD 02B4'            call    slotso
017B'   C3 004D'            jp      loop 017E'   CD 0388'    conf:   call    setds2          ;set the handle number
0181'   DA 004D'            jp      c,loop
0184'   FE16                cp      22              ;handle must be 1-21
0186'   D2 004D'            jp      nc,loop
0189'   FE00                cp      0
018B'   CA 004D'            jp      z,loop
018E'   32 0002#            ld      (handle),A      ;save it
0191'   CD 01E9'            call    clrcnf
0194'   3E20        ..cle:  ld      A,' '
0196'   CD 0323'            call    conout
0199'   CD 0359'            call    setnum          ;set the time slot
019C'   380E                jr      c,..exit
019E'   50                  ld      D,B             ;hishway
019F'   59                  ld      E,C             ;timeslot
01A0'   CD 01B2'            call    fndcnf          ;find a free conference input
01A3'   3807                jr      c,..exit
01A5'   3E60                ld      A,60h           ;command, no invert bit
01A7'   CD 0000:0A          call    confit
01AA'   18E8                jr      ..cle
01AC'   CD 02B4'    ..exit: call    slotso          ;display it
01AF'   C3 004D'            jp      loop 01B2'   21 CE00     fndcnf: ld      HL,ccamap       ;Conference Control address Map
01B5'   ED4B 0002#          ld      BC,(handle)     ;set the handle #
01B9'   0640                ld      B,64
01BB'   7E          ..lp:   ld      A,(HL)          ;look for a free CCA
01BC'   FE00                cp      0
01BE'   2808                jr      z,..fnd
01C0'   3E04                ld      A,4             ;next one
01C2'   85                  add     A,L
01C3'   6F                  ld      L,A
```

```
01C4'  10F5              djnz   ..lp              ;set carry flag if none free
01C6'  37                scf
01C7'  C9                ret 01C8'  71        ..fnd:  ld     (HL),C            ;reserve input for handle
01C9'  2C                inc    L
01CA'  46                ld     B,(HL)            ;input #
01CB'  2C                inc    L
01CC'  73                ld     (HL),E            ;save the timeslot
01CD'  2C                inc    L
01CE'  72                ld     (HL),D            ;save the hishway
01CF'  C9                ret 01D0'  CD 0388'  unconf: call   setdg2            ;get a 2 digit number
01D3'  DA 004D'          jp     c,loop            ;handle must be 1-2)
01D6'  FE16              cp     22
01D8'  D2 004D'          jp     nc,loop
01DB'  FE00              cp     0
01DD'  CA 004D'          jp     z,loop
01E0'  CD 01E9'          call   clrcnf            ;clear an old conference of same handle
01E3'  CD 02B4'          call   slotsh            ;display changes to time slots
01E6'  C3 004D'          jp     loop 01E9'  4F        clrcnf: ld     C,A               ;conference handle number
01EA'  FD21 CE00         ld     IY,ccamap         ;Conference Control Address map
01EE'  0640              ld     B,64              ;conference control address handle
01F0'  FD7E00    ..lp:   ld     A,(IY)
01F3'  B9                cp     C
01F4'  201A              jr     nz,..nm           ;if no match, skip
01F6'  FD5E02            ld     E,(IY + 2)        ;get the time slot
01F9'  FD5603            ld     D,(IY + 3)        ;and hishway
01FC'  FD3600 00         ld     (IY),0            ;clear the handle
0200'  FD3602FF          ld     (IY + 2),0FFh
0204'  FD3603FF          ld     (IY + 3),0FFh
0208'  C5                push   BC
0209'  FD4601            ld     B,(IY + 1)
020C'  CD 0000:0B        call   deconf            ;release the conference input
020F'  C1                pop    BC
0210'  11 0004   ..nm:   ld     DE,4
0213'  FD19              add    IY,DE
0215'  10D9              djnz   ..lp
0217'  C9                ret 0218'  11 000F*  dspmss: ld     DE,dspbuf
021B'  061E              ld     B,30
021D'  CD 0335'          call   char              ;legal commands in range 1-9
0220'  FE31              cp     "1"
0222'  DA 004D'          jp     c,loop
0225'  FE3A              cp     "9" + 1
0227'  D2 004D'          jp     nc,loop
022A'  CD 0323'          call   conout
022D'  E60F              and    0FFh
022F'  12                ld     (DE),A
0230'  13                inc    DE
0231'  CD 025D'  ..lp:   call   stdtmf            ;set the port and digit string
0234'  FE19              cp     esc
0236'  CA 004D'          jp     z,loop            ;check for end of string
0239'  FE00              cp     0th
023B'  2804              jr     z,..end
023D'  12                ld     (DE),A
023E'  13                inc    DE
023F'  10F0              djnz   ..lp
0241'  EB        ..end:  ex     DE,HL             ;EOT character
0242'  36FF              ld     (HL),0FFh
0244'  3A 000F*          ld     A,(dspbuf)        ;DTMF generator messages?
0247'  FE04              cp     4
0249'  2804              jr     z,..dial
024B'  FE05              cp     5
024D'  2005              jr     nz,..ndl
024F'  36FF      ..dial: ld     (HL),0FFh         ;if so, put in string terminator
0251'  23                inc    HL
0252'  36FF              ld     (HL),0FFh
0254'  21 000F*  ..ndl:  ld     HL,dspbuf
0257'  CD 02A4'          call   dspout
025A'  C3 004D'          jp     loop 025D'  CD 0335'  stdtmf: call   char              ;get a character
0260'  21 028D'          ld     HL,tonval - 1     ;# of legal characters
0263'  01 0017           ld     BC,23
0266'  EDB9              cpdr
0268'  2073              jr     nz,stdtmf
026A'  FE1B              cp     esc
026C'  C8                ret    z
026D'  CD 0323'          call   conout
0270'  21 028D'          ld     HL,tonval
0273'  09                add    HL,BC             ;get the correct code
0274'  7E                ld     A,(HL)
0275'  C9                ret 0276'  30313233343536    tonchr: .ascii  "0123456789ABCD*#LUXPN"[cr][esc]
028D'  30313233343536    tonval: .ascii  "0123456789:;<=>?@ABCN"[cr][esc]

02A4'  7E        dspout: ld     A,(HL)
02A5'  FEFF              cp     0FFh
02A7'  C8                ret    z
```

```
02A8'   DB73                    ..1P:   in      A,(fifost)      ;DSP status
02AA'   CB67                            bit     4,A             ;check for full FIFO
02AC'   28FA                            jr      z,..1P
02AE'   7E                              ld      A,(HL)
02AF'   D3E7                            out     (dsP0),A
02B1'   23                              inc     HL
02B2'   18F0                            jr      dsPout 02B4'   3A 0001K        slotso: ld      A,(musacn)      ;check which MUSAC outputs to drive
02B7'   21 D000                         ld      HL,sltmap
02BA'   A7                              and     A
02BB'   2803                            jr      z,..mo
02BD'   21 D200                         ld      HL,sltmP1       ;else, MUSAC 1
02C0'   11 0807         ..mo:   ld      DE,0807h
02C3'   0A08                            ld      B,8
02C5'   C5              ..1P:   push    BC
02C6'   0610                            ld      B,10
02C8'   CD 02E6'        ..1P1:  call    sloto
02CB'   14                              inc     D
02CC'   10FA                            djnz    ..1P1
02CE'   1608                            ld      D,8
02D0'   7B                              ld      A,E
02D1'   C604                            add     A,4
02D3'   5F                              ld      E,A
02D4'   0610                            ld      B,10
02D6'   CD 02E6'        ..1P2:  call    sloto
02D9'   14                              inc     D
02DA'   10FA                            djnz    ..1P2
02DC'   1608                            ld      D,8
02DE'   7B                              ld      A,E
02DF'   C605                            add     A,5
02E1'   5F                              ld      E,A
02E2'   C1                              pop     BC
02E3'   10DD                            djnz    ..1P
02E5'   C9                              ret 02E6'   CD 030A'        sloto:  call    curs
02E9'   4E                              ld      C,(HL)
02EA'   23                              inc     HL
02EB'   7E                              ld      A,(HL)
02EC'   CD 0349'                        call    hexo
02EF'   79                              ld      A,C
02F0'   07                              rlca
02F1'   07                              rlca
02F2'   07                              rlca
02F3'   07                              rlca
02F4'   CD 0349'                        call    hexo
02F7'   79                              ld      A,C
02F8'   CD 0349'                        call    hexo
02FB'   23                              inc     HL
02FC'   C9                              ret MONITO - Matrix Console Monitor task
Send message to the DSP 02FD'   CD 030A'        Phrs:   call    curs
0300'   7E              ..1P:   ld      A,(HL)          ;get the character
0301'   FE00                    cP      0
0303'   C8                      ret     z               ;if 0, end of Phrase
0304'   CD 0323'                call    conout          ;output character
0307'   23                      inc     HL
0308'   18F6                    jr      ..1P 030A'   F5              curs:   push    AF
030B'   3E1B                    ld      A,esc
030D'   CD 0323'                call    conout
0310'   3E59                    ld      A,crschr        ;= for Televideo, Y for ADDS
0312'   CD 0323'                call    conout
0315'   7A                      ld      A,D
0316'   C620                    add     A,20h
0318'   CD 0323'                call    conout
031B'   7B                      ld      A,E
031C'   C620                    add     A,20h
031E'   CD 0323'                call    conout
0321'   F1                      pop     AF
0322'   C9                      ret 0323'   F5              conout: push    AF
0324'   ED5B04          ..1:    in0     A,(ST0)
0327'   E602                    and     2
0329'   2005                    jr      nz,..2
032B'   CD 0000:04              call    sched
032E'   18F4                    jr      ..1
0330'   F1              ..2:    pop     AF
0331'   ED3906                  out0    (TDR0),A
0334'   C9                      ret 0335'   CD 0000:04      char:   call    sched
0338'   21 0000                 ld      HL,consls       ;console input queue
033B'   CD 0000:05              call    Pul132
033E'   38F5                    jr      c,char          ;if carry, no character
0340'   FE61                    cP      "a"
0342'   D8                      ret     c
0343'   FE7B                    cP      "z"+1
```

```
0345'   B0                              ret     nc
0346'   E65F                            and     5Fh             ;make upper case
0348'   C9                              ret ;output a four bit value as a hex digit 0349'   F5              hexo:   push    AF
034A'   E60F                    and     0Fh
034C'   C630                    add     A,"0"
034E'   FE3A                    cp      "9" + 1
0350'   3802                    jr      c,..9
0352'   C607                    add     A,7
0354'   CD 0323'        ..9:    call    conout
0357'   F1                      pop     AF
0358'   C9                      ret ;get a three digit hex #, return it in BC 0359'   CD 039C'        setnum: call    setdis          ;get the 1st digit
035C'   D8                      ret     c
035D'   CD 0323'                call    conout
0360'   CD 03BC'                call    hex
0363'   47                      ld      B,A
0364'   CD 039C'                call    setdis          ;get the 2nd digit
0367'   D8                      ret     c
0368'   CD 0323'                call    conout
036B'   CD 03BC'                call    hex
036E'   FE02                    cp      2
0370'   3F                      ccf
0371'   D8                      ret     c               ;2nd digit < 2
0372'   4F                      ld      C,A
0373'   CD 039C'                call    setdis
0376'   D8                      ret     c
0377'   CD 0323'                call    conout
037A'   CD 03BC'                call    hex
037D'   CB21                    sla     C
037F'   CB21                    sla     C
0381'   CB21                    sla     C
0383'   CB21                    sla     C
0385'   B1                      or      C
0386'   4F                      ld      C,A
0387'   C9                      ret ;set a 2 digit hex number 0388'   CD 039C'        setds2: call    setdis          ;set the 1st digit
038B'   D8                      ret     c
038C'   CD 0323'                call    conout
038F'   47                      ld      B,A
0390'   CD 039C'                call    setdis
0393'   D8                      ret     c
0394'   CD 0323'                call    conout
0397'   4F                      ld      C,A
0398'   CD 03AD'                call    aschex
039B'   C9                      ret 039C'   CD 0335'        setdis: call    char            ;get a character from the console
039F'   FE30                    cp      "0"
03A1'   D8                      ret     c
03A2'   FE3A                    cp      "9" + 1
03A4'   3805                    jr      c,..ccf
03A6'   FE41                    cp      "A"
03A8'   D8                      ret     c
03A9'   FE47                    cp      "G"
03AB'   3F              ..ccf:  ccf
03AC'   C9                      ret
03AD'   78              aschex: ld      A,B
03AE'   CD 03BC'                call    hex
03B1'   07                      rlca
03B2'   07                      rlca
03B3'   07                      rlca
03B4'   07                      rlca
03B5'   47                      ld      B,A
03B6'   79                      ld      A,C
03B7'   CD 03BC'                call    hex
03BA'   B0                      or      B
03BB'   C9                      ret 03BC'   D630            hex:    sub     "0"
03BE'   FE0A                    cp      10
03C0'   D8                      ret     c
03C1'   D607                    sub     7
03C3'   C9                      ret 03C4'   4D6174726978 20     headms: .asciz  "Matrix Monitor"
03D3'   446F6E27742050      dpmss:  .asciz  "Don't Panic!"
03E0'   7263762E206D73      msshd:  .ascii  "rcv. mss."
03E9'   0D0A20786D742E              .asciz  [crJClfJ" xmt. mss."
03F6'   456E74657220 43     cmndhd: .asciz  "Enter Command: "
0406'   736C6F74202068      hwyhd:  .ascii  "slot  hwy 0  hwy 1  hwy 2  hwy 3"
0420'   202020687779 20             .asciz  "  hwy 4  hwy 5  hwy 6  hwy 7"
0452'   202020202020 20     spaces: .asciz  "                                "  ;36 spaces
```

```
                              .loc    .data.
        0000*       shufls:   .blkb   1
        0000*       musacn:   .blkb   1
        0001*       handle:   .blkb   1
        0002*       statbf:   .blkb   12
        0003*       dsrbuf:   .blkb   32
        000F*       rcvbuf:   .blkb   32
        002F*       xmtbuf:   .blkb   32
        004F*                 .end
                    .ident    msgprc
                    .io       041092
                    .ver      1,1             ;valid argument checks .intern   msgprc
                    .intern   sxblk .extern   sched,pull16,push16
                    .extern   cnctit,discit,discto
                    .extern   confit,deconf,listen,chkcnf
                    .extern   aschex .intern   rblkmp,xblkmp .extern   iflag
                    .extern   rcvbuf,shufls .insert   matrxmem.dfn
                    ;Matrix Memory definition 4-01-92

C000                consq    =    0C000h              ;console queue
C020                rcvq     =    0C020h              ;receive message queue
C030                xmtq     =    0C030h              ;xmit message queue
C100                rcvbfs   =    0C100h              ;receive buffers
C200                xmtbfs   =    0C200h              ;transmit buffers C300                muscof   =    0C300h              ;MUSAC i/o buffer CE00                ccamap   =    0CE00h              ;Conference Control Address Map
D000                sitmap   =    0D000h              ;time slot map for MUSAC 0
D200                sitmp1   =    0D200h              ;time slot map for MUSAC 1

F800                xmtflg   =    0F800h              ;transmit flag
F801                rcvflg   =    0F801h              ;receive flag
F802                rcvbox   =    0F802h              ;receive box
F840                xmtbox   =    0F840h              ;transmit mailbox
F880                xstate   =    0F880h              ;auxillary state table 00EF                rotsw    =    0EFh 0000'   21 02E1'    msgprc:  ld    HL,rstmss          ;the restart message
0003'   11 F840              ld    DE,xmtbox
0006'   01 000B              ld    BC,B
0009'   EDB0                 ldir 000B'   CD 0000:04  msglp:   call  sched              ;loop through sched
000E'   21 C020              ld    HL,rcvq
0011'   CD 0000:05           call  pull16             ;anything on the receive queue
0014'   38F5                 jr    c,msglp            ;if not, loop through sched
0016'   21 C100              ld    HL,rcvbfs          ;point at the message
0019'   6F                   ld    L,A
001A'   CB0D                 rrc   L
001C'   CB0D                 rrc   L
001E'   CB0D                 rrc   L
0020'   E5                   push  HL                 ;message
0021'   11 0004*             ld    DE,buffer
0024'   01 0020              ld    BC,32
0027'   EDB0                 ldir                     ;save in the buffer
0029'   E1                   pop   HL
002A'   11 0000:10           ld    DE,rcvbuf          ;monitor buffer
002D'   01 0020              ld    BC,32
0030'   EDB0                 ldir                     ;save in monitor buffer for display
0032'   3C                   inc   A                  ;free the block
0033'   47                   ld    B,A
0034'   3E7F                 ld    A,7Fh
0036'   07          ..lp:    rlca                     ;rotate mask
0037'   10FD                 djnz  ..lp
0039'   21 002B*             ld    HL,rblkmp
003C'   A6                   and   (HL)               ;clear the bit
003D'   77                   ld    (HL),A             ;save the new map
003E'   DD21 0004*           ld    IX,buffer
0042'   DD7E00               ld    A,(IX)             ;get first character of message
0045'   FE43                 cp    "C"                ;port command?
0047'   CA 0080'             jp    z,cmnd
004A'   FE49                 cp    "I"                ;interrupt control message?
004C'   2802                 jr    z,imss
004E'   18BB                 jr    msglp 0050'   DD7E01      imss:    ld    A,(IX + 1)
0053'   FE4E                 cp    "N"                ;enable interrupts to host
0055'   2806                 jr    z,..on
0057'   FE46                 cp    "F"                ;disable interrupts to host
0059'   C2 000B'             jp    nz,msglp
005C'   3E00                 ld    A,0                ;clear the interrupt enable flag
005E'   32 0000:0F           ld    (iflag),A
0061'   C3 000B'             jp    msglp
```

```
0064'  3E01            ..on:    ld      A,1                    ;set the interrupt enable flag
0066'  32 0000:0F              ld      (iflag),A
0069'  CD 023A'                call    sxblk
006C'  21 007D'                ld      HL,intack              ;interrupt enable acknowledge
006F'  01 0003                 ld      BC,3
0072'  EDB0                    ldir
0074'  21 0030                 ld      HL,xmtq                ;push onto transmit queue
0077'  CD 0000:06              call    pushlo
007A'  C3 000B'                jp      msslp 007D'  494100          intack: .asciz  "IA"
0080'  DD7E01          cmnd:   ld      A,(IX + 1)             ;command
0083'  FE43                    cp      "C"
0085'  281A                    jr      z,cnct                 ;connect
0087'  FE44                    cp      "D"
0089'  2B32                    jr      z,dscnt                ;disconnect
008B'  FE4C                    cp      "L"
008D'  2B46                    jr      z,listen               ;listen
008F'  FE4B                    cp      "K"
0091'  CA 00E7'                jp      z,conf                 ;conference
0094'  FE4D                    cp      "M"
0096'  CA 015E'                jp      z,confm                ;monitor a conference
0099'  FE55                    cp      "U"
009B'  CA 013B'                jp      z,unconf               ;unconference
009E'  C3 000B'                jp      msslp ;create a two way audio path 00A1'  CD 026D'        cnct:   call    arg2                   ;set the 2nd argument (highway & timeslot)
00A4'  DA 0214'                jp      c,argerr2
00A7'  EB                      ex      DE,HL
00A8'  CD 0247'                call    arg1                   ;set the 1st argument (highway & timeslot)
00AB'  DA 021A'                jp      c,argerr
00AE'  CD 0000:07              call    cnctit                 ;audio path to 1st argument
00B1'  EB                      ex      DE,HL                  ;flip arguments
00B2'  CD 0000:07              call    cnctit                 ;audio path to 2nd argument
00B5'  3E01            shwlp:  ld      A,1                    ;show the change
00B7'  32 0000:11              ld      (shufls),A
00BA'  C3 000B'                jp      msslp ;clear one or more audio paths 00BD'  DD7E02          dscnt:  ld      A,(IX + 2)             ;check for end of message
00C0'  FE00                    cp      0
00C2'  2BF1                    jr      z,shwlp
00C4'  CD 0247'                call    arg1                   ;set the time slot
00C7'  DA 021A'                jp      c,argerr
00CA'  CD 0000:08              call    discit                 ;disconnect it
00CD'  DD23                    inc     IX
00CF'  DD23                    inc     IX
00D1'  DD23                    inc     IX
00D3'  18E8                    jr      dscnt                  ;point at next argument and loop ;create a one-way audio path 00D5'  CD 026D'        listen: call    arg2                   ;2nd argument (highway & timeslot)
00D8'  DA 0214'                jp      c,argerr2
00DB'  EB                      ex      DE,HL
00DC'  CD 0247'                call    arg1                   ;1st argument (highway & timeslot)
00DF'  DA 021A'                jp      c,argerr
00E2'  CD 0000:07              call    cnctit                 ;make audio path from 2nd arg to 1st
00E5'  18CE                    jr      shwlp
```

AMTEL Z80 ASSEMBLER V4.14
MSGPRC - Matrix board Message Processing Routine
Port Commands
    ;create a conference with 1 to 8 inputs

```
00E7'  DD4602          conf:   ld      B,(IX + 2)
00EA'  DD4E03                  ld      C,(IX + 3)
00ED'  CD 0000:0E              call    aschex
00F0'  32 0001#                ld      (handle),A             ;conference handle
00F3'  FE16                    cp      22                     ;check for a legal handle number
00F5'  303C                    jr      nc,..err1
00F7'  FE00                    cp      0
00F9'  283B                    jr      z,..err1
00FB'  4F                      ld      C,A                    ;handle number
00FC'  CD 0182'                call    clrcnf                 ;clear any old conference of same handle
00FF'  3E60                    ld      A,60h
0101'  32 0000#                ld      (invert),A             ;inversion sense
0104'  DD23                    inc     IX                     ;align the index for arg1
0106'  DD23                    inc     IX
0108'  DD7E02          ..cflp: ld      A,(IX + 2)             ;check for null, end of command
010B'  A7                      and     A
010C'  281E                    jr      z,..end
010E'  CD 0247'                call    arg1                   ;set the argument
0111'  DA 021A'                jp      c,argerr
0114'  CD 0000:0D              call    chkcnf                 ;see if in another conference
0117'  CD 0190'                call    fndcnf                 ;find a free CCA
011A'  3813                    jr      c,..err2               ;if carry, no more conference inputs
011C'  3A 0000#                ld      A,(invert)             ;set command with invert bit
011F'  CD 0000:0A              call    confit                 ;set up conference
0122'  32 0000#                ld      (invert),A             ;save command with invert bit
```

```
0125'  11 0003              ld     DE,3
0128'  DD19                 add    IX,DE                  ;point at the next argument
012A'  18DC                 jr     ..cflp
012C'  C3 00B5'     ..end:  jp     shwlp                  ;display changes
012F'  3E02         ..err2: ld     A,2                    ;ran out of inputs
0131'  1802                 jr     ..err
0133'  3E01         ..err1: ld     A,1                    ;illegal handle
0135'  CD 01E1'     ..err:  call   cnferr
0138'  C3 000B'             jp     msslp ;break down a conference 013B'  DD4602       unconf: ld     B,(IX + 2)
013E'  DD4E03               ld     C,(IX + 3)
0141'  CD 0000:0E           call   aschex
0144'  4F                   ld     C,A                    ;conference handle
0145'  FE00                 cp     0
0147'  280A                 jr     z,..err
0149'  FE16                 cp     22
014B'  3006                 jr     nc,..err
014D'  CD 01B2'             call   clrcnf                 ;clear the conference
0150'  C3 00B5'             jp     shwlp
0153'  32 0001*     ..err:  ld     (handle),A
0156'  3E01                 ld     A,1
0158'  CD 01E1'             call   cnferr
015B'  C3 000B'             jp     msslp ;monitor a conference 015E'  DD4602       confm:  ld     B,(IX + 2)
0161'  DD4E03               ld     C,(IX + 3)
0164'  CD 0000:0E           call   aschex
0167'  32 0001*             ld     (handle),A             ;conference handle
016A'  DD23                 inc    IX
016C'  DD23                 inc    IX
016E'  CD 0247'             call   arg1                   ;timeslot and hishway of output
0171'  DA 021A'             jp     c,arserr
0174'  3A 0001*             ld     A,(handle)
0177'  0640                 ld     B,64                   ;# of inputs in table
0179'  21 CE00              ld     HL,ccamap              ;conference control address map
017C'  BE           ..lp:   cp     (HL)                   ;see if a match to the handle
017D'  2809                 jr     z,..fnd
017F'  7D                   ld     A,L
0180'  C604                 add    A,4
0182'  6F                   ld     L,A
0183'  10F7                 djnz   ..lp
0185'  C3 000B'             jp     msslp                  ;if can't match handle, ignore
0188'  23           ..fnd:  inc    HL
0189'  46                   ld     B,(HL)                 ;conference input number
018A'  CD 0000:0C           call   listen                 ;listen to the conference
018D'  C3 00B5'             jp     shwlp ;find a free input in the Conference Control Address Map 0190'  21 CE00      fndcnf: ld     HL,ccamap              ;Conference Control Address Map
0193'  ED4B 0001*           ld     BC,(handle)
0197'  0640                 ld     B,64
0199'  7E           ..lp:   ld     A,(HL)                 ;check if free
019A'  FE00                 cp     0
019C'  2808                 jr     z,..fnd                ;if free, found, else try the next one
019E'  3E04                 ld     A,4                    ;next address
01A0'  85                   add    A,L
01A1'  6F                   ld     L,A
01A2'  10F5                 djnz   ..lp
01A4'  37                   scf                           ;set carry flag if no address available
01A5'  C9                   ret
01A6'  71           ..fnd:  ld     (HL),C                 ;save the handle
01A7'  2C                   inc    L
01A8'  2C                   inc    L
01A9'  73                   ld     (HL),E                 ;save the timeslot
01AA'  2C                   inc    L
01AB'  72                   ld     (HL),D                 ;save the hishway
01AC'  3E40                 ld     A,64
01AE'  90                   sub    B
01AF'  47                   ld     B,A                    ;return with control address in B; handle in C
01B0'  A7                   and    A                      ;clear the carry flag
01B1'  C9                   ret ;clear all conference inputs whose handle = C 01B2'  FD21 CE00    clrcnf: ld     IY,ccamap              ;Conference Control Address Map
01B6'  0640                 ld     B,64
01B8'  FD7E00       ..lp:   ld     A,(IY)                 ;conference control address handle
01BB'  B9                   cp     C                      ;match the conference against the handle
01BC'  201B                 jr     nz,..nm
01BE'  FD5E02               ld     E,(IY + 2)             ;set the time slot
01C1'  FD5603               ld     D,(IY + 3)             ;and hishway
01C4'  FD360000             ld     (IY),0
01C8'  FD3602FF             ld     (IY + 2),0FFh          ;clear the time slot from table
01CC'  FD3603FF             ld     (IY + 3),0FFh
01D0'  C5                   push   BC                     ;Conference Control address
01D1'  3E40                 ld     A,64
01D3'  90                   sub    B
01D4'  47                   ld     B,A
01D5'  CD 0000:0B           call   deconf                 ;release the conference input
```

```
01D8'   C1                          pop     BC
01D9'   11 0004         ..nm:       ld      DE,4
01DC'   FD19                        add     IY,DE
01DE'   10D8                        djnz    ..lp
01E0'   C9                          ret ;send a conference error message 01E1'   21 020D'        cnferr:     ld      HL,cfemss
01E4'   11 0024*                    ld      DE,xbuf
01E7'   01 0007                     ld      BC,7
01EA'   EDB0                        ldir
01EC'   F630                        or      "0"
01EE'   32 0029*                    ld      (xbuf + 5),A    ;error type
01F1'   3A 0001#                    ld      A,(handle)
01F4'   CD 02A1'                    call    nexasc          ;convert nex to ascii
01F7'   ED43 0026#                  ld      (xbuf + 2),BC
01FB'   CD 02BA'        error:      call    gxblk           ;get a block for the message
01FE'   21 0024#                    ld      HL,xbuf
0201'   01 0007                     ld      BC,7
0204'   EDB0                        ldir                    ;put message in the block
0206'   21 C030                     ld      HL,xmtq
0209'   CD 0000:06                  call    push16          ;push the block onto the queue
020C'   C9                          ret 020D'   454B2020303000  cfemss:     .asciz  "EK  00"

;Illegal argument Error

0214'   DD23            arser2:     inc     IX              ;line up IX for error message
0216'   DD23                        inc     IX
0218'   DD23                        inc     IX
021A'   21 0241'        arserr:     ld      HL,argmss
021D'   11 0024*                    ld      DE,xbuf
0220'   01 0006                     ld      BC,6
MSGPRC - Matrix board Message Processing Routine
Conference Routines 0223'   EDB0                        ldir
0225'   FD21 0024#                  ld      IY,xbuf
0229'   DD7E02                      ld      A,(IX + 2)
022C'   FD7702                      ld      (IY + 2),A
022F'   DD7E03                      ld      A,(IX + 3)
0232'   FD7703                      ld      (IY + 3),A
0235'   DD7E04                      ld      A,(IX + 4)
0238'   FD7704                      ld      (IY + 4),A
023B'   CD 01FB'                    call    error
023E'   C3 000B'                    jp      msglp 0241'   454178787800    argmss:     .asciz  "EAxxx"
                        ;get argument 1, put in DE 0247'   DD7E02          arg1:       ld      A,(IX + 2)      ;hishway
024A'   CD 0293'                    call    legal           ;check for hex number
024D'   D8                          ret     c
024E'   4F                          ld      C,A
024F'   0630                        ld      B,"0"
0251'   CD 0000:0E                  call    aschex
0254'   57                          ld      D,A
0255'   DD7E03                      ld      A,(IX + 3)      ;time slot
0258'   CD 0293'                    call    legal
025B'   D8                          ret     c
025C'   47                          ld      B,A
025D'   DD7E04                      ld      A,(IX + 4)
0260'   CD 0293'                    call    legal
0263'   D8                          ret     c
0264'   4F                          ld      C,A
0265'   CD 0000:0E                  call    aschex
0268'   FE20                        cp      32              ;check for range of 0-31
026A'   3F                          ccf
026B'   5F                          ld      E,A
026C'   C9                          ret ;get argument 2, put in DE 026D'   DD7E05          arg2:       ld      A,(IX + 5)
0270'   CD 0293'                    call    legal
0273'   D8                          ret     c
0274'   4F                          ld      C,A
0275'   0630                        ld      B,"0"
0277'   CD 0000:0E                  call    aschex
027A'   57                          ld      D,A
027B'   DD7E06                      ld      A,(IX + 6)
027E'   CD 0293'                    call    legal
0281'   D8                          ret     c
0282'   47                          ld      B,A
0283'   DD7E07                      ld      A,(IX + 7)
0286'   CD 0293'                    call    legal
0289'   D8                          ret     c
028A'   4F                          ld      C,A
028B'   CD 0000:0E                  call    aschex
028E'   FE20                        cp      32              ;check for timeslot range 0-31
0290'   3F                          ccf
0291'   5F                          ld      E,A
0292'   C9                          ret
```

```
                                ;check for a legal hex digit

02937   FE30            legal:  cp      "0"             ;< 0
0295'   D8                      ret     c
0296'   FE3A                    cp      "9" + 1         ;9 or less ok
0298'   3F                      ccf
0299'   D0                      ret     nc
029A'   FE41                    cp      "A"             ;< A
029C'   D8                      ret     c
029D'   FE47                    cp      "G"             ;F or less ok
029F'   3F                      ccf
02A0'   C9                      ret ;convert a hex # to ascii 02A1'   4F              hexasc: ld      C,A
02A2'   CD 02B0'                call    hex
02A5'   47                      ld      B,A
02A6'   79                      ld      A,C
02A7'   0F                      rrca
02A8'   0F                      rrca
02A9'   0F                      rrca
02AA'   0F                      rrca
02AB'   CD 02B0'                call    hex
02AE'   4F                      ld      C,A
02AF'   C9                      ret
02B0'   E60F            hex:    and     0Fh
02B2'   C630                    add     A,"0"
02B4'   FE3A                    cp      "9" + 1
02B6'   D8                      ret     c
02B7'   C607                    add     A,7
02B9'   C9                      ret ;find a transmit buffer return buffer # in A, address in dC 02BA'   F3              sxblk:  di
02BB'   3A 0003*                ld      A,(xblkmp)      ;block map
02BE'   0608                    ld      B,8
02C0'   07              ..lp:   rlca                    ;look for a 0
02C1'   3006                    jr      nc,..fnd
02C3'   10FB                    djnz    ..lp
02C5'   FB                      ei
02C6'   CD 0000*04              call    sched           ;no 0's, wait
02C9'   18EF                    jr      sxblk
02CB'   58              ..fnd:  ld      E,B             ;block # + 1
02CC'   0F                      rrca
02CD'   F680                    or      80h             ;set bit in map
02CF'   07              ..flp:  rlca
02D0'   10FD                    djnz    ..flp
02D2'   32 0003*                ld      (xblkmp),A      ;save new map
02D5'   FB                      ei
02D6'   1D                      dec     E
02D7'   7B                      ld      A,E             ;block #
02D8'   CB0B                    rrc     E
02DA'   CB0B                    rrc     E
02DC'   CB0B                    rrc     E
02DE'   1602                    ld      D,xmtbfs/256    ;point at the block
02E0'   C9                      ret
02E1'   52657374617274  rstmss: .asciz  "Restart"

0000*                           .loc    .data.

0000*                   invert: .blkb   1
0001*                   handle: .blkb   1
0002*                   rblkmp: .blkb   1
0003*                   xblkmp: .blkb   1
0004*                   buffer: .blkb   32
0024*                   xbuf:   .blkb   16
                                .end
                        .ident  musac
                        .id     040192
                        .ver    1,1             ;add MUSAC 1

.intern cnctit,discit,discto
                        .intern confit,deconf,listen,chkcnf .insert matrxmem.dfn
                        ;Matrix Memory definition 4-01-92
C000                    conslq  =       0C000h          ;console queue
C020                    rcvq    =       0C020h          ;receive message queue
C030                    xmtq    =       0C030h          ;xmit message queue
C100                    rcvbfs  =       0C100h          ;receive buffers
C200                    xmtbfs  =       0C200h          ;transmit buffers C300                    muscbf  =       0C300h          ;Musac i/o buffer CE00                    ccamap  =       0CE00h          ;Conference Control Address Map
D000                    sltmap  =       0D000h          ;time slot map for MUSAC 0
D200                    sltmp1  =       0D200h          ;time slot map for MUSAC 1

F800                    xmtflg  =       0F800h          ;transmit flag
F801                    rcvflg  =       0F801h          ;receive flag
```

```
FB02                rcvbox    =    0FB02h           ;receive box
FB40                xmtbox    =    0FB40h           ;transmit mailbox
FB80                xstate    =    0FB80h           ;auxillary state table
                    .insert matrixio.dfn
                    ;Matrix board I/O definitions 3/16/92

00EF                dsp0      =    0EFh             ;DSP FIFO 0
00EE                dsp1      =    0EEh             ;DSP FIFO 1
00ED                dsp2      =    0EDh             ;DSP FIFO 2
00EC                dsp3      =    0ECh             ;DSP FIFO 3

00F3                fifost    =    0F3h             ;FIFO status
00F4                MVIP47    =    0F4h             ;MVIP enables hwys 4-7
00F5                MVIP03    =    0F5h             ;MVIP enables hwys 0-3
00F6                MVIPCS    =    0F6h             ;MVIP clock select/PEB sync LED
00F7                clksel    =    0F7h             ;clock select 00F8                mode1     =    0F8h             ;MUSAC 1 mode register
00F9                stat1     =    0F9h             ;MUSAC 1 status
00FA                cmr1      =    0FAh             ;MUSAC 1 Conference Mask Register
00FB                miap1     =    0FBh             ;MUSAC 1 Indirect Access Port 00FC                mode0     =    0FCh             ;MUSAC 0 mode register
00FD                stat0     =    0FDh             ;MUSAC 0 status
00FE                cmr0      =    0FEh             ;MUSAC 0 Conference Mask Register
00FF                miap0     =    0FFh             ;MUSAC 0 Indirect Access Port ;64180 I/O Registers 0000                CA0       =    0                ;serial channel 0 control register
0002                CB0       =    2
0004                ST0       =    4                ;serial channel 0 status register
0006                TDR0      =    6                ;console transmit data
0008                RDR0      =    8                ;console receive data 0001                CA1       =    1                ;serial channel 1 control register
0003                CB1       =    3
0005                ST1       =    5                ;status register
0007                TDR1      =    7                ;transmit data
0009                RDR1      =    9                ;receive data 000C                TMDRL0    =    0Ch              ;timer register
000E                RLDR0L    =    0Eh              ;timer 0 load registers
000F                RLDR0H    =    0Fh
0010                TCR       =    10h              ;timer control register 0032                DCNTL     =    32h              ;wait state control
0033                IL        =    33h              ;interupt vector
0034                ITC       =    34h              ;interupt control register
0036                RCR       =    36h              ;refresh register ;set up an audio path from HL to DE timeslots and hishways 0000'  E5           cnctit:   push   HL
0001'  D5                     push   DE
0002'  CB5A                   bit    3,D              ;check if output hishway > 7
0004'  3030                   jr     nz,..m1          ;if so, use MUSAC 1
0006'  FD21 D000              ld     IY,sltmap        ;point at the time slot map
000A'  CD 0236'               call   devrt
000D'  FD19                   add    IY,DE
000F'  FD19                   add    IY,DE
0011'  FD7500                 ld     (IY),L           ;save the incoming timeslot
0014'  FD7401                 ld     (IY + 1),H
0017'  FD21 C300              ld     IY,muscbf        ;musac command buffer
001B'  0610                   ld     B,10h            ;command bit
001D'  CB05                   rlc    L                ;convert incoming timeslot
001F'  CB25                   sla    L
0021'  CB25                   sla    L
0023'  CB25                   sla    L
0025'  CB10                   rl     B                ;rotate bit 4 of timeslot into command
0027'  7C                     ld     A,H              ;incoming hishway
0028'  E607                   and    0Fh
002A'  B5                     or     L
002B'  FD7000                 ld     (IY),B           ;command
002E'  FD7701                 ld     (IY + 1),A       ;incoming timeslot and hishway
0031'  CB03                   rlc    E
0033'  CB03                   rlc    E
0035'  CB03                   rlc    E
0037'  FD7302                 ld     (IY + 2),E       ;outgoing timeslot and hishway
003A'  0603                   ld     B,3
003C'  CD 0242'               call   omusac
003F'  D1                     pop    DE
0040'  E1                     pop    HL
0041'  C9                     ret ;write to the 2nd MUSAC 0042'  FD21 D200    ..m1:     ld     IY,sltmp1        ;point at the time slot map
0046'  CD 0236'               call   devrt
0049'  FD19                   add    IY,DE
004B'  FD19                   add    IY,DE
004D'  FD7500                 ld     (IY),L           ;save the incoming timeslot
```

```
0059'  FD7401                ld      (IY + 1),H     ;musac command buffer
0053'  FD21 C300             ld      IY,muscbf      ;command bit
0057'  0610                  ld      B,10h          ;convert incoming timeslot
0059'  CB25                  sla     L
005B'  CB25                  sla     L
005D'  CB25                  sla     L
005F'  CB25                  sla     L
0061'  CB10                  rl      B              ;rotate bit 4 of timeslot into command
0063'  7C                    ld      A,H            ;incoming highway
0064'  E60F                  and     0Fh
0066'  B5                    or      L
0067'  FD7000                ld      (IY),B         ;command
006A'  FD7701                ld      (IY + 1),A     ;incoming timeslot and highway
006D'  CB03                  rlc     E
006F'  CB03                  rlc     E
0071'  CB03                  rlc     E
0073'  FD7302                ld      (IY + 2),E     ;outgoing timeslot and highway
0076'  0603                  ld      B,3
0078'  CD 0244'              call    omusc1         ;write command to MUSAC1
007B'  D1                    pop     DE
007C'  E1                    pop     HL
007D'  C9                    ret ;clear the audio paths to DE and the input timeslot to it 007E'  E5       discto:      push    HL
007F'  D5                    push    DE
0080'  21 D000               ld      HL,sltmap
0083'  CB5A                  bit     3,B
0085'  2803                  jr      z,..d
0087'  21 D200               ld      HL,sltmp1
008A'  CD 0236' ..d:         call    devrt
008D'  19                    add     HL,DE
008E'  19                    add     HL,DE
008F'  5E                    ld      E,(HL)         ;set the time slot connected to
0090'  23                    inc     HL
0091'  56                    ld      D,(HL)
0092'  7B                    ld      A,E
0093'  FEFF                  cp      0FFh           ;if the timeslot is DE, nothing connected to it
0095'  2803                  jr      z,..nd
0097'  CD 009C'              call    discit         ;disconnect it
009A'  D1       ..nd:        pop     DE
009B'  E1                    pop     HL ;clear the audio path to timeslot and highway DE 009C'  E5       discit:      push    HL
009D'  D5                    push    DE
009E'  CB5A                  bit     3,B            ;check for MUSAC 1
00A0'  2028                  jr      nz,..nd
00A2'  21 D000               ld      HL,sltmap      ;the time slot map table
00A5'  CD 0236'              call    devrt
00A8'  19                    add     HL,DE
00A9'  19                    add     HL,DE
00AA'  3EFF                  ld      A,0FFh         ;see if already cleared
00AC'  BE                    cp      (HL)
00AD'  2818                  jr      z,..nd
00AF'  77                    ld      (HL),A         ;clear the slot table
00B0'  23                    inc     HL
00B1'  77                    ld      (HL),A
00B2'  21 C300               ld      HL,muscbf
00B5'  3622                  ld      (HL),22h       ;clear command
00B7'  23                    inc     HL
00B8'  3600                  ld      (HL),0         ;0
00BA'  23                    inc     HL
00BB'  CB03                  rlc     E
00BD'  CB03                  rlc     E
00BF'  CB03                  rlc     E
00C1'  73                    ld      (HL),E         ;timeslot and highway
00C2'  0603                  ld      B,3
00C4'  CD 0242' ..nd:        call    omusac
00C7'  D1                    pop     DE
00C8'  E1                    pop     HL
00C9'  C9                    ret 00CA'  21 D200  ..m1:        ld      HL,sltmp1      ;the time slot map table
00CD'  CD 0236'              call    devrt
00D0'  19                    add     HL,DE
00D1'  19                    add     HL,DE
00D2'  3EFF                  ld      A,0FFh         ;see if already cleared
00D4'  BE                    cp      (HL)
00D5'  28F6                  jr      z,..nd
00D7'  77                    ld      (HL),A         ;clear the slot table
00D8'  23                    inc     HL
00D9'  77                    ld      (HL),A
00DA'  21 C300               ld      HL,muscbf
00DD'  3622                  ld      (HL),22h       ;clear command
00DF'  23                    inc     HL
00E0'  3600                  ld      (HL),0         ;0
00E2'  23                    inc     HL
00E3'  CB03                  rlc     E
00E5'  CB03                  rlc     E
00E7'  CB03                  rlc     E
00E9'  73                    ld      (HL),E         ;timeslot and highway
```

```
00EA'   0603                    ld      B,3
00EC'   CD 024A'                call    omusc1
00EF'   18B6                    jr      ..nd ;set up a conference input, DE = timeslot, C = handle, B = CCA 00F1'   F5              confit: push    AF              ;save the command byte
00F2'   21 C300                 ld      HL,muscbf
00F5'   CB63                    bit     4,E
00F7'   2802                    jr      z,..n4
00F9'   F601                    or      1               ;bit 4 of timeslot is bit 0 of command
00FB'   77              ..n4:   ld      (HL),A
00FC'   23                      inc     HL
00FD'   7B                      ld      A,E
00FE'   CB27                    sla     A
0100'   CB27                    sla     A
0102'   CB27                    sla     A
0104'   CB27                    sla     A
0106'   B2                      or      D
0107'   77                      ld      (HL),A          ;input time slot
0108'   23                      inc     HL
0109'   70                      ld      (HL),B          ;conference control address
010A'   23                      inc     HL
010B'   36A0                    ld      (HL),0A0h
010D'   23                      inc     HL
010E'   71                      ld      (HL),C          ;conference number (handle)
010F'   35                      dec     (HL)            ;handle = conf # + 1
0110'   23                      inc     HL
0111'   70                      ld      (HL),B          ;CCA
0112'   C5                      push    BC
0113'   0606                    ld      B,6
0115'   CD 0242'                call    omusac          ;set up inputs to MUSAC 0
0118'   0606                    ld      B,0
011A'   CD 024A'                call    omusc1          ;set up inputs to MUSAC 1
011D'   C1                      pop     BC
011E'   21 C300                 ld      HL,muscbf
0121'   3624                    ld      (HL),24h
0123'   23                      inc     HL
0124'   70                      ld      (HL),B          ;CCA
0125'   23                      inc     HL
0126'   7B                      ld      A,E
0127'   CB27                    sla     A
0129'   CB27                    sla     A
012B'   CB27                    sla     A
012D'   CB5A                    bit     3,D
012F'   2019                    jr      nz,..n1
0131'   B2                      or      D
0132'   77                      ld      (HL),A          ;connection memory output timeslot
0133'   CD 0236'                call    devrt
0136'   21 B000                 ld      HL,sltmap       ;put in the slot map table
0139'   19                      add     HL,DE
013A'   19                      add     HL,DE
013B'   70                      ld      (HL),B          ;conference control address
013C'   CBFE                    set     7,(HL)          ;set bit 7 to show conference
013E'   23                      inc     HL
013F'   3600                    ld      (HL),0
0141'   0603                    ld      B,3
0143'   CD 0242'                call    omusac          ;output to MUSAC 0 chip
0146'   F1                      pop     AF
0147'   EE02                    xor     2               ;change invert bit
0149'   C9                      ret 014A'   CB9A            ..n1:   res     3,D             ;clear the hishway 0 bit
014C'   B2                      or      D
014D'   77                      ld      (HL),A          ;connection memory output timeslot
014E'   CD 0236'                call    devrt
0151'   21 B200                 ld      HL,sltmp1       ;put in the slot map table
0154'   19                      add     HL,DE
0155'   19                      add     HL,DE
0156'   70                      ld      (HL),B          ;conference control address
0157'   CBFE                    set     7,(HL)          ;set bit 7 to show conference
0159'   23                      inc     HL
015A'   3600                    ld      (HL),0
015C'   0603                    ld      B,3
015E'   CD 024A'                call    omusc1          ;output to MUSAC 1 chip
0161'   F1                      pop     AF
0162'   EE02                    xor     2               ;change invert bit
0164'   C9                      ret ;listen to a conference, B = CCA, DE = timeslot 0165'   21 C300         listen: ld      HL,muscbf
0168'   3624                    ld      (HL),24h
016A'   23                      inc     HL
016B'   70                      ld      (HL),B          ;Conference control address
016C'   23                      inc     HL
016D'   7B                      ld      A,E             ;hishway and time slot
016E'   CB27                    sla     A
0170'   CB27                    sla     A
0172'   CB27                    sla     A
0174'   CB5A                    bit     3,D
0176'   2013                    jr      nz,..o1         ;check for MUSAC 1 output
0178'   B2                      or      D
```

```
0179'   77                          ld      (HL),A
017A'   CD 0236'            call    devrt           ;put in slotmap table
017D'   21 D000             ld      HL,sltmap
0180'   19                          add     HL,DE
0181'   19                          add     HL,DE
0182'   70                          ld      (HL),B          ;Conference Control Address
0183'   CBFE                set     7,(HL)          ;set bit 7 to show conference
0185'   0603                        ld      B,3
0187'   CD 0242'            call    omusac          ;output to MUSAC chip
018A'   C9                          ret
018B'   CB9A        ..m1:   res     3,B             ;clear highway 8 bit
018D'   B2                          or      D
018E'   77                          ld      (HL),A
018F'   CD 0236'            call    devrt           ;put in slotmap table
0192'   21 D200             ld      HL,sltmp1
0195'   19                          add     HL,DE
0196'   19                          add     HL,DE
0197'   70                          ld      (HL),B          ;Conference Control Address
0198'   CBFE                set     7,(HL)          ;set bit 7 to show conference
019A'   0603                        ld      B,3
019C'   CD 024A'            call    omusc1          ;output to MUSAC 1 chip
019F'   C9                          ret ;clear a conference, B = CCA, DE = timeslot 01A0'   21 C300     deconf: ld      HL,muscbf
01A3'   3667                        ld      (HL),67h
01A5'   23                          inc     HL
01A6'   36FF                        ld      (HL),0FFh
01A8'   23                          inc     HL
01A9'   70                          ld      (HL),B          ;Conference Control Address
01AA'   23                          inc     HL
01AB'   36A7                        ld      (HL),0A7h
01AD'   23                          inc     HL
01AE'   36FF                        ld      (HL),0FFh
01B0'   23                          inc     HL
01B1'   70                          ld      (HL),B
01B2'   C5                          push    BC
01B3'   0606                        ld      B,6
01B5'   CD 0242'            call    omusac          ;clear conference input on MUSAC 0
01B8'   0606                        ld      B,6
01BA'   CD 024A'            call    omusc1          ;clear conference input on MUSAC 1
01BD'   C1                          pop     BC
01BE'   21 C300             ld      HL,muscbf
01C1'   3627                        ld      (HL),27h
01C3'   23                          inc     HL
01C4'   36FF                        ld      (HL),0FFh
01C6'   23                          inc     HL
01C7'   7B                          ld      A,E
01C8'   CB27                        sla     A
01CA'   CB27                        sla     A
01CC'   CB27                        sla     A
01CE'   CB5A                        bit     3,D             ;check for MUSAC 1 output
01D0'   2015                        jr      nz,..m1
01D2'   B2                          or      D
01D3'   77                          ld      (HL),A          ;time slot & highway
01D4'   CD 0236'            call    devrt
01D7'   21 D000             ld      HL,sltmap       ;clear the slot map table
01DA'   19                          add     HL,DE
01DB'   19                          add     HL,DE
01DC'   36FF                        ld      (HL),0FFh
01DE'   23                          inc     HL
01DF'   36FF                        ld      (HL),0FFh
01E1'   0609                        ld      B,9
01E3'   CD 0242'            call    omusac
01E6'   C9                          ret
01E7'   CB9A        ..m1:   res     3,B             ;clear the highway 8 bit
01E9'   B2                          or      D
01EA'   77                          ld      (HL),A          ;time slot & highway
01EB'   CD 0236'            call    devrt
01EE'   21 D200             ld      HL,sltmp1       ;clear the slot map table
01F1'   19                          add     HL,DE
01F2'   19                          add     HL,DE
01F3'   36FF                        ld      (HL),0FFh
01F5'   23                          inc     HL
01F6'   36FF                        ld      (HL),0FFh
01F8'   0603                        ld      B,3
01FA'   CD 024A'            call    omusc1          ;clear MUSAC 1 output
01FD'   C9                          ret ;check to see if in another conference 01FE'   F5          chkcnf: push    AF
01FF'   C5                          push    BC
0200'   0640                        ld      B,64
0201'   FD21 CE00           ld      IY,ccamap       ;Conference Control Address map
0205'   FD7E02      ..lp:   ld      A,(IY + 2)      ;check for match of timeslot
0208'   BB                          cp      E
0209'   2006                        jr      nz,..nxt
020B'   FD7E03              ld      A,(IY + 3)      ;and highway
020E'   BA                          cp      D
020F'   2800                        jr      z,..fnd
0211'   FD23        ..nxt:  inc     IY              ;if no match, check next CCA
0213'   FD23                        inc     IY
```

```
0216'  FD23                inc     IY
0218'  FD23                inc     IY
021A'  10E8                djnz    ..lp
021C'  C1                  pop     BC
021D'  F1                  pop     AF
021E'  C9                  ret
021F'  FD4601     ..fnd:   ld      B,(IY + 1)      ;Conference Control address
0222'  FD360900            ld      (IY),0          ;free CCA
0226'  FD3602FF            ld      (IY + 2),0FFh   ;clear timeslot & highway
022A'  FD3603FF            ld      (IY + 3),0FFh
022E'  D5                  push    DE
022F'  CD 01A0'            call    decont
0232'  D1                  pop     DE
0233'  C1                  pop     BC
0234'  F1                  pop     AF
0235'  C9                  ret ;convert highway in D and time slot in E to an offset into timeslot use table 0236'  7A         devrt:   ld      A,D
0237'  E607                and     07h
0239'  0F                  rrca
023A'  0F                  rrca
023B'  0F                  rrca
023C'  57                  ld      D,A
023D'  B3                  or      E
023E'  5F                  ld      E,A
023F'  1600                ld      D,0
0241'  C9                  ret ;output B bytes starting at muscbf to the MUSAC chip 0242'  21 C300    omusac:  ld      HL,muscbf       ;output buffer
0245'  0EFF                ld      C,miap0         ;MUSAC indirect port
0247'  EDB3                otir
0249'  C9                  ret 024A'  21 C300    omusc1:  ld      HL,muscbf       ;output buffer
024D'  0EFD                ld      C,miap1         ;MUSAC 1 indirect port
024F'  EDB3                otir
0251'  C9                  ret
                           .end
```

.GLOB.:   Address = 0000, Size = FFFF

.FREE.    010C      VER      3730      TOPRAM    EFFF

ZERO  :   Address = 0070, Size = 0000

INIT    0070

INIT  :   Address = 0070, Size = 002D

LIMIX :   Address = 009D, Size = 00E3

START   009D      QUACK    0118      ERROR     0142

CONSOL:   Address = 0180, Size = 005F

CSTS    0180      CCHK     0189      CI        018D      TI        01A4
  CO      0189      CRLF     01C6      SPACE     01CC      STRING    01D3

NUMBER:   Address = 01DF, Size = 00E0

PUTWRD  01DF      PUTBYT   01E4      PUTBIN    01FE      PUTASC    0212
  PUTDEC  0229      CHKWRD   0251      GETWRD    0256      GETOPS    0292

DISPLY:   Address = 02BF, Size = 0086

DISPLY  02BF

FILL  :   Address = 0345, Size = 002B

FILL    0345

GO    :   Address = 036D, Size = 008C

GO      036D      RESTRT   03B9

HEX   :   Address = 03F9, Size = 0037

HEX     03F9      BINASC   0427

IOOUT :   Address = 0430, Size = 0026

IPORT   0430      OPORT    0444

BGBNLD:   Address = 0456, Size = 0123

BGBNLD  0456

DSPLOD:   Address = 0579, Size = 0130

DSPLOD  0579

```
MOVE   :    Address = 06A9, Size = 0035

MOVE     06A9

SUBS   :    Address = 06DE, Size = 0049

SUBS     06DE

TEST   :    Address = 0727, Size = 0003

TEST     0727

EXAM   :    Address = 072A, Size = 0164

EXAM     072A

PCMIO  :    Address = 095E, Size = 00F6

INIT     095E    OMID    0988    TONE    09C8    MITE    09DE

NUMBER :    Address = EF00, Size = 0008

OPER1    EF00    OPER2   EF02    OPER3   EF04    OPER4   EF06

DISPLY :    Address = EF08, Size = 0002

GO     :    Address = EF0A, Size = 001F

REGAF1   EF0A    REGBC1  EF0C    REGDE1  EF0E    REGHL1  EF10
   REGAF    EF12    REGBC   EF14    REGDE   EF16    REGHL   EF18
   REGIX    EF1A    REGIY   EF1C    USRSP   EF1E    USRPC   EF20
   REGI     EF22

CONSLD :    Address = EF29, Size = 0004

DSPLOD :    Address = EF2D, Size = 0004

EXAM   :    Address = EF31, Size = 0002

OFFSET   EF31

Modules:

Name      ID#       Version    Revision    Source File

ZERO      081987       2          1        ZERO    .ZSM
     INIT      120391       1          8        PCINIT  .ZSM
     CMNTR     122091       1          2        PCMSTART.ZSM
     CONSOL    110889       1          0        COMBOCON.ZSM
     NUMBER    110984       1          0        NUMBER  .ZSM
     DISPLY    110984       1          0        DISPLY  .ZSM
     FILL      110984       1          0        FILL    .ZSM
     GO        091685       1          0        GO      .ZSM
     HEX       110984       1          0        HEX     .ZSM
     INOUT     110984       1          0        INOUT   .ZSM
     CONSLD    110889       1          3        CONBODLD.ZSM
     DSPLOD    122091       1          0        DSPLOAD .ZSM
     MOVE      110984       1          0        MOVE    .ZSM
     SUBS      110984       1          0        SUBS    .ZSM
     TEST      110984       1          0        TEST    .ZSM
     EXAM      110984       1          0        EXAM    .ZSM
     PCMIO     120391       1          0        PCMITEIO.ZSM

.ident   zero
                        .id      081987
                        .ver     2,1

.extern  init,start,quack
                        .extern  ci,co,csts,strins
                        .extern  restrt 2000                    tnpint   =       2000n 0000                             .loc    0

0000   C3 2000          zero:    JP      tnpint          ;Jump to tone plant program
0003   C3 0000:06                JP      QUACK           ;RESTART ZAPPLE WITHOUT INITIALIZATION
0006   C3 0000:07                JP      CI              ;CONSOLE INPUT (RETURNS CHR IN A)
0009   C3 0000:08                JP      CO              ;CONSOLE OUTPUT (PRINTS CHR IN A)
000C   C3 0000:09                JP      CSTS            ;CONSOLE STAT (0=NOT READY FF=CHARACTER READY)
000F   C3 0000:0A                JP      strins 0030                             .loc    30n

0030   C3 0000:06                JP      QUACK

0038                             .loc    38h

0038   C3 0000:0B                JP      RESTRT          ;BREAKPOINT ENTRY
```

```
0038    436F7079726967         .ascii  "Copyright AMTEL Communications 1987"

0066                            .loc    66h 0066    37              nmi:    scf
0067    ED45                    retn                    ;NMI sets the carry flag and returns .end
                        .ident  init
                        .id     120391
                        .ver    1/8

.intern init
                        .extern start

.insert 64180io.dfn
                        ;"Hitachi 64180 I/O definitions, 2-17-88

0000                    CA0     =       0       ;Serial control register A, channel 0
0001                    CA1     =       1       ;Serial control register A, channel 1
0002                    CB0     =       2       ;Serial control register B, channel 0
0003                    CB1     =       3       ;Serial control register B, channel 1
0004                    ST0     =       4       ;Channel 0 status register
0005                    ST1     =       5       ;Channel 1 status register
0006                    TD0     =       6       ;Channel 0 transmit data
0007                    TD1     =       7       ;Channel 1 transmit data
0008                    RD0     =       8       ;Channel 0 receive data
0009                    RD1     =       9       ;Channel 1 receive data
000A                    CSIOC   =       0Ah     ;CSI/O control register
000B                    CSIOD   =       0Bh     ;CSI/O data register 0032                    DCNTL   =       32h     ;DMA/Wait control register
0036                    RCR     =       36h     ;Refresh control register
0038                    CBR     =       38h     ;Common base register
0039                    BBR     =       39h     ;Bank base register
003A                    CBAR    =       3Ah     ;Common/bank MMU register
003F                    ICR     =       3Fh     ;I/O control register
00ED                    msel    =       0EDh            ;Mitel Clock Port 00FA                    mcs     =       0FAh            ;chip select output register
00FB                    mskp    =       0FBh            ;clock polarity control port
00FC                    mwm     =       0FCh            ;mode register
00FD                    mskr    =       0FDh            ;clock rate register
00FF                    mpd     =       0FFh            ;pin definition register 0000'   F3              init:   di
0001'   3E74                    ld      A,74h           ;RTS = 1, TEND0, & pins as port
0003'   ED3900                  out0    (CA0),A         ;initialize serial channels
0006'   ED3901                  out0    (CA1),A
0009'   3E02                    ld      A,02h           ;9600 baud, prescale 0
000B'   ED3902                  out0    (CB0),A
000E'   ED3903                  out0    (CB1),A
0011'   3E00                    ld      A,00h
0013'   ED3904                  out0    (ST0),A         ;no interrupts, DCD = 0
0016'   3E00                    ld      A,00h
0018'   ED3905                  out0    (ST1),A         ;no interrupts, CTS disabled 001B'   3E07                    ld      A,7             ;beep for kicks
001D'   ED3907                  out0    (TD1),A
0020'   3E41                    ld      A,"A"
0022'   ED3906                  out0    (TD0),A ;set up memory map static ram starting at 8000h, movable area above F000

0025'   3E00                    ld      A,00h
0027'   ED3936                  out0    (RCR),A         ;no refresh
                        ;       out0    (DCNTL),A       ;turn off wait states 002A'   C3 0000:04              jp      start .end
                        .ident  cmntr
                        .id     122091
                        .ver    1/2

.intern start,quack,error

.extern display,fill,so,hex
                        .extern iport,downld,move,oport,subs,test,exam
                        .extern imid,omid,tone,mite,dsplod
                        .extern string,co,ti
                        .extern topram,usrsp,ver

000D                    CR=     0DH
000A                    LF=     0AH

0000'   31 0001:17      start:  LD      SP, TOPRAM+1            ;SET UP ZAP'S STACK
0003'   21 0000:17              LD      HL, TOPRAM
0006'   11 FFFF:17              LD      DE, TOPRAM-1
0009'   01 00FF                 LD      BC, 255
000C'   3600                    LD      (HL), 0
000E'   EDB8                    LDDR                            ;CLEAR TOP PAGE OF RAM 0010'   21 FF01:17              LD      HL,TOPRAM+1-100H
0013'   22 0000:18              LD      (USRSP), HL             ;SET UP USER STACK BELOW TOP PG
```

```
0016'   CD 0000:14              call    strins
0019'   0D0A0A416D7465          .ASCIS  [CR][LF][LF] "Amtel Intelligent Switch Card Monitor v"
0043'   21 0000:19              LD      HL, VER
0046'   7C                      LD      A, H
0047'   CD 0000:15              CALL    CO
004A'   3E2E                    LD      A, '.'
004C'   CD 0000:15              CALL    CO
004F'   7D                      LD      A, L
0050'   CD 0000:15              CALL    CO              ;TYPE VERSION NUMBER ON SCREEN
0053'   CD 0000:14              call    strins
0056'   0D0A436F707972          .ascis  [cr][lf]"Copyright Amtel Communications 1987"

007B'   31 0001:17      QUACK:  LD      SP, TOPRAM+1
007E'   CD 0000:14              CALL    STRING
0081'   0D0AA3                  .ASCIS  [CR][LF] "#"
0084'   CD 0000:16              CALL    T1                      ;GET CHARACTER
0087'   21 00C0'                LD      HL, CMDTBL-1
008A'   01 0011                 LD      BC, CMDTBL-CMDCHR
008D'   EDB9                    CPDR                            ;IS COMMAND IN TABLE?
008F'   20EA                    JR      NZ, QUACK               ;IF NOT, IGNORE
0091'   DD21 00C1'              LD      IX, CMDTBL
0095'   DD09                    ADD     IX,BC
0097'   DD09                    ADD     IX,BC                   ;IX>> ADDRESS OF COMMAND
0099'   DD6601                  LD      H, (IX+1)
009C'   DD6E00                  LD      L, (IX+0)               ;HL== ADDRESS OF COMMAND
009F'   CD 00A4'                CALL    ..1
00A2'   18B7                    JR      QUACK
00A4'   E9              ..1:    JP      (HL)

00A5'   CD 0000:14      ERROR:: CALL    STRING
00A8'   205768617D              .ASCIS  " What?"
00AE'   18CB                    JR      QUACK 00B0'   41424344464748  CMDCHR: .ASCII  "ABCDFGHILMOSTXYZ" [0Ch]
00C1'   0000:0F 0000:10 CMDTBL: .WORD   imid,omid,mite,displ,FILL,GO,HEX
00CF'   0000:08 0000:09         .WORD   IPORT,downld,MOVE,OPORT,SUBS,TEST,EXAM,dsplod,tone,CG 0000'                           .END    START
                        .ident  console
                        .id     110889
                        .ver    1/0

.intern ci,co,ti,csts,cchk,strins
                        .intern crlf,space
                        .extern quack .insert 64180io.dfn
                        ;"Hitachi 64180 I/O definitions, 2-17-88

0000                            CA0     =       0       ;Serial control register A, channel 0
0001                            CA1     =       1       ;Serial control register A, channel 1
0002                            CB0     =       2       ;Serial control register B, channel 0
0003                            CB1     =       3       ;Serial control register B, channel 1
0004                            ST0     =       4       ;Channel 0 status register
0005                            ST1     =       5       ;Channel 1 status register
0006                            TD0     =       6       ;Channel 0 transmit data
0007                            TD1     =       7       ;Channel 1 transmit data
0008                            RD0     =       8       ;Channel 0 receive data
0009                            RD1     =       9       ;Channel 1 receive data
000A                            CSIOC   =       0Ah     ;CSI/O control register
000B                            CSIOD   =       0Bh     ;CSI/O data register 0032                            DCNTL   =       32h     ;DMA/Wait control register
0036                            RCR     =       36h     ;Refresh control register
0038                            CBR     =       38h     ;Common base register
0039                            BBR     =       39h     ;Bank base register
003A                            CBAR    =       3Ah     ;Common/bank MMU register
003F                            ICR     =       3Fh     ;I/O control register
000D                            cr      =       0Dh     ;carriage return
000A                            lf      =       0Ah     ;line feed 0000'   ED3804          csts:   in0     A,(ST0)         ;console status port
0003'   E680                    and     80h
0005'   C8                      ret     z
0006'   3EFF                    ld      A, 0FFh
0008'   C9                      ret 0009'   CD 0000'        cchk:   call    csts            ;check for a character could be ctrl-c
000C'   C8                      ret     z 000D'   CD 0000'        ci:     call    csts
0010'   28FB                    jr      z, ci           ;loop til ready
0012'   ED3808                  in0     A,(RD0)         ;input character after polling port
0015'   E67F                    and     7Fh             ;no parity
0017'   28F4                    jr      z, ci           ;eat nulls
0019'   FE03                    cp      3               ;control c?
001B'   C0                      ret     nz
001C'   CD 0053'                call    strins
001F'   5EC3                    .ascis  "^C"
```

```
0021'   C3 0000:04              jp      quack           ;if control c, go to command line 0024'   CD 000B'        ti:     call    ci              ;get character
0027'   FE20                    cp      20h             ;echo if printable
0029'   D8                      ret     c
002A'   C5                      push    bc
002B'   4F                      ld      c, a
002C'   CD 0039'                call    co
002F'   C1                      pop     bc
0030'   FE61                    cp      "a"             ;lower case?
0032'   D8                      ret     c
0033'   FE7B                    cp      "z" + 1
0035'   D0                      ret     nc
0036'   E6DF                    and     0DFh            ;convert lower to upper case
0038'   C9                      ret 0039'   F5              co:     push    af              ;enter with chr in a
003A'   ED3804          ..1:    in0     A,(STO)         ;console status port
003D'   E602                    and     2               ;txbuf empty
003F'   28F9                    jr      z, ..1
0041'   F1                      pop     af
0042'   ED3906                  out0    (TDO),A         ;output the character
0045'   C9                      ret 0046'   CD 0053'        crlf:   call    strings
0049'   0D8A                    .ascis  [cr][lf]
004B'   C9                      ret 004C'   F5              space:  push    af
004D'   CD 0053'                call    strings
0050'   A0                      .ascis  " "
0051'   F1                      pop     af
0052'   C9                      ret 0053'   E3              strings: ex     (sp), hl
0054'   7E              ..1:    ld      a, (hl)         ;get character
0055'   CD 0039'                call    co
0058'   CB7E                    bit     7, (hl)         ;test for stop bit
005A'   23                      inc     hl
005B'   28F7                    jr      z, ..1          ;loop til done
005D'   E3                      ex      (sp), hl
005E'   C9                      ret .end

; - Z80 MONITOR -- NUMBER INPUT/OUTPUT

.ident  number
                        .id     110984
                        .ver    1,0

.intern puturd,putbyt,putbin,putasc,putdec
                        .intern setops,setwrd,chkwrd

0X0D                    CR=     0DH
0X0A                    LF=     0AH

;OUTPUT HL IN HEX

0000'   7C              puturd: LD      A,H
0001'   CD 0005'                CALL    PUTBYT
0004'   7D                      LD      A,L

;OUTPUT A IN HEX

0005'   F5              putbyt: PUSH    AF              ;SAVE NUMBER ON STACK
0006'   CD 000B'                CALL    ..1
0009'   F1                      POP     AF
000A'   C9                      RET
000B'   F5              ..1:    PUSH    AF
000C'   0F                      RRCA
000D'   0F                      RRCA
000E'   0F                      RRCA
000F'   0F                      RRCA                    ;GET HIGH NIBBLE FIRST
0010'   CD 0014'                CALL    ..2             ;OUTPUT NIBBLE
0013'   F1                      POP     AF
0014'   E60F            ..2:    AND     0FH             ;ISOLATE 4 BITS
0016'   C690                    ADD     A, 90H
0018'   27                      DAA
0019'   CE40                    ADC     A, 40H
001B'   27                      DAA
001C'   C3 0000:04              JP      CO#             ;CLEVER CONVERSION OF NIBBLE

;OUTPUT 'A' IN BINARY

001F'   F5              putbin: PUSH    AF
0020'   C5                      PUSH    BC
0021'   0608                    LD      B, 8
0023'   87              ..SHF:  ADD     A, A            ;SHIFT BITS OUT OF HIGH END
0024'   F5                      PUSH    AF
0025'   3E30                    LD      A, '0'
0027'   3001                    JR      NC, ..1         ;IF NO CARRY, ZERO
0029'   3C                      INC     A               ;ELSE ONE
002A'   CD 0000:04      ..1:    CALL    CO#             ;OUTPUT BIT
002D'   F1                      POP     AF
002E'   10F3                    DJNZ    ..SHF
```

;DISPLAY ASCII IF VALID ASCII CHARACTER

```
0033'   E67F         putasc: AND     7FH              ;GIVE ASCII EQUIV IGNORE PARITY
0035'   FE20                 CP      20H
0037'   D8                   RET     C
0038'   FE7F                 CP      7FH
003A'   D0                   RET     NC
003B'   F5                   PUSH    AF               ;SAVE IT
003C'   CD 0000:05           CALL    STRING#
003F'   2742                 .ASCIS  " ' "            ;OUTPUT BETWEEN SINGLE QUOTES
0041'   F1                   POP     AF
0042'   CD 0000:04           CALL    CO#
0045'   CD 0000:05           CALL    STRING#
0048'   A7                   .ASCIS  " ' "
0049'   C9                   RET
```

;DISPLAY WORD IN HL IN DECIMAL

```
004A'   E5           putdec: PUSH    HL
004B'   F5                   PUSH    AF
004C'   CD 0057'             CALL    DWRD
004F'   3E2E                 LD      A, '.'
0051'   CD 0000:04           CALL    CO#
0054'   F1                   POP     AF
0055'   E1                   POP     HL
0056'   C9                   RET
0057'   11 FFFF      DWRD:   LD      DE, -1           ;ACCUMULATE DIVIDEND IN DE
005A'   01 000A              LD      BC, 10           ;DIVISOR
005D'   BF                   CP      A
005E'   13           ..1:    INC     DE               ;DO SUCCESSIVE SUBTRACTIONS OF 10
005F'   ED42                 SBC     HL, BC
0061'   30FB                 JR      NC, ..1
0063'   09                   ADD     HL, BC
0064'   7A                   LD      A, D             ;ANYTHING THERE?
0065'   B3                   OR      E
0066'   7D                   LD      A, L
0067'   EB                   EX      DE, HL
0068'   F5                   PUSH    AF
0069'   C4 0057'             CALL    NZ, DWRD         ;RECURSIVELY DIVIDE TILL HIGHEST DIGIT
006C'   F1                   POP     AF
006D'   F630                 OR      '0'              ;PRINT LAST DIGIT
006F'   C3 0000:04           JP      CO#

0072'   21 0000      chkwrd: LD      HL,0             ;ENTER HERE WITH CHARACTER IN A THAT COULD BE
                                                      ;START OF HEX DIGIT STRING
0075'   1809                 JR      WRD              ;WILL BUILD FULL WORD 0077'   21 0000      setwrd: LD      HL, 0            ;INPUT HEX WORD, RETURN IN HL
007A'   CD 0000:06           CALL    TI#
007D'   FE0D                 CP      CR               ;CARRIAGE RETURN VALID TERMINATOR
007F'   C8                   RET     Z
0080'   CD 00A4'     WRD:    CALL    CHKHEX           ;CONVERT CHARACTERS
0083'   1804                 JR      ..2
0085'   CD 0095'     ..1:    CALL    GETHEX           ;GET HEX DIGIT
0088'   D8                   RET     C
0089'   C5           ..2:    PUSH    BC
008A'   0600                 LD      B, 0
008C'   4F                   LD      C, A
008D'   29                   ADD     HL, HL
008E'   29                   ADD     HL, HL
008F'   29                   ADD     HL, HL
0090'   29                   ADD     HL, HL
0091'   09                   ADD     HL, BC
0092'   C1                   POP     BC
0093'   18F0                 JR      ..1

0095'   CD 0000:06   GETHEX: CALL    TI#
0098'   FE0D                 CP      CR
009A'   37                   SCF
009B'   C8                   RET     Z                ;CR IS VALID TERMINATOR
009C'   FE20                 CP      ' '
009E'   37                   SCF
009F'   C8                   RET     Z                ;SPACE OK
00A0'   FE2C                 CP      ','
00A2'   37                   SCF
00A3'   C8                   RET     Z                ;COMMA OK TOO
00A4'   FE30         CHKHEX: CP      '0'              ;CHECK IF A GOOD HEX DIGIT
00A6'   DA 0000:07           JP      C, ERROR#
00A9'   FE3A                 CP      '9'+1
00AB'   380C                 JR      C, ..1
00AD'   FE41                 CP      'A'
00AF'   DA 0000:07           JP      C, ERROR#
00B2'   FE47                 CP      'F'+1
00B4'   D2 0000:07           JP      NC, ERROR#
00B7'   D607                 SUB     'A'-('0'+10)     ;OFFSET LETTER INTO DIGIT
00B9'   E60F         ..1:    AND     0FH              ;ISOLATE DIGIT
00BB'   C9                   RET                      ;RETURN NO CARRY INDICATING VALID DIG
```

;GET A STRING OF NUMERIC OPERANDS

```
00BC'   DD21 0000#   setops: LD     IX, OPER1
00C0'   0604                 LD     B, 4              ;MAXIMUM OF 4 OPERANDS
00C2'   CD 0077'     ..1:    CALL   GETHRD            ;GET A HEX WORD
00C5'   3013                 JR     NC, ..2           ;NO WORD
00C7'   DD7500               LD     (IX+0), L         ;L.S.B.
00CA'   DD7401               LD     (IX+1), H         ;M.S.B.
00CD'   DD23                 INC    IX
00CF'   DD23                 INC    IX
00D1'   FE0D                 CP     CR                ;IF CARRIAGE RETURN, GO AWAY
00D3'   2806                 JR     Z, ..3
00D5'   10EB                 DJNZ   ..1

00D7'   C3 0000:07           JP     ERROR#            ;TOO MANY INPUT
00DA'   04           ..2:    INC    B                 ;ONE LESS OPERAND THAN WE THOUGHT
00DB'   3E05         ..3:    LD     A, 5
00DD'   90                   SUB    B                 ;RETURN W/ A,B = # OF ARGUMENTS ENTERED
00DE'   47                   LD     B, A
00DF'   C9                   RET

0000#                        .LOC   .DATA.

0000#                OPER1:: .BLKW  1
0002#                OPER2:: .BLKW  1
0004#                OPER3:: .BLKW  1
0006#                OPER4:: .BLKW  1
0020'                        .RELOC

.END
                             .ident  dsply
                             .id     110994
                             .ver    1,0

.intern dsply
                             .extern setops,putwrd,putbyt
                             .extern strins,crlf,space,cchk
                             .extern oper1,oper2

0000'   CD 0000:04   dsply:  CALL   GETOPS
0003'   B7                   OR     A
0004'   2873                 JR     Z, MORE           ;IF NO OPERANDS, GIVE US ANOTHER PAGE OF DATA
0006'   FE01                 CP     1                 ;IF ONLY ONE OPERAND, DISPLAY THAT PAGE
0008'   2874                 JR     Z, CHUNK
000A'   FE02                 CP     2                 ;ELSE MUST BE EXACTLY 2 OPERANDS
000C'   C0                   RET    NZ
000D'   2A 0000:0C           LD     HL, (OPER2)
0010'   ED5B 0000:0B         LD     DE, (OPER1)
0014'   BF                   CP     A
0015'   ED52                 SBC    HL, DE
0017'   D8                   RET    C                 ;FORGET IF START IS AFTER END
0018'   23                   INC    HL
0019'   EB                   EX     DE, HL            ;DE=COUNTER HL=ADDRESS 001A'   CD 0000:08   ADDRES: CALL   CRLF
001D'   CD 0000:05           CALL   PUTWRD
0020'   CD 0000:07           CALL   STRING            ;DISPLAY THE ADDRESS
0023'   3A2040               .ASCIS ": "
0026'   0610                 LD     B, 16             ;16 BYTES PER LINE
0028'   E5                   PUSH   HL                ;SAVE ADDRESS
0029'   CD 0000:0A   DATA:   CALL   CCHK              ;CHECK FOR ABORT
002C'   78                   LD     A, B
002D'   FE08                 CP     8
002F'   2003                 JR     NZ, ..1
0031'   CD 0000:09           CALL   SPACE             ;INSERT EXTRA SPACE
0034'   7E           ..1:    LD     A, (HL)           ;DATA
0035'   CD 0000:06           CALL   PUTBYT            ;DISPLAY
0038'   CD 0000:09           CALL   SPACE             ;SPACE
003B'   23                   INC    HL                ;BUMP PTR
003C'   22 0000#             LD     (DISPAD), HL      ;MAINTAIN DISPLAY ADDRESS
003F'   1B                   DEC    DE                ;COUNT DOWN
0040'   7A                   LD     A, D
0041'   B3                   OR     E
0042'   2804                 JR     Z, TEXT1          ;DONE?
0044'   10E3                 DJNZ   DATA              ;IF NOT, KEEP ON
0046'   1804                 JR     TEXT2

0048'   05           TEXT1:  DEC    B                 ;ALLOW FOR EXTRA DISPLAYED
0049'   CD 0000:07   TEXT2:  CALL   STRING
004C'   202020A0             .ASCIS "   "             ;SPACE OUT
0050'   E1                   POP    HL
0051'   3E10                 LD     A, 16
0053'   90                   SUB    B                 ;NUMBER ON THIS LINE
0054'   47                   LD     B, A              ;COUNTER
0055'   CD 0000:0A   TXTLP:  CALL   CCHK
0058'   78                   LD     A, B
0059'   FE08                 CP     8                 ;TIME TO SPLIT LINE?
005B'   2003                 JR     NZ, ..1
005D'   CD 0000:09           CALL   SPACE
0060'   7E           ..1:    LD     A, (HL)           ;BYTE TO OUTPUT
0061'   23                   INC    HL
0062'   E67F                 AND    7FH
0064'   FE20                 CP     20H               ;PRINTABLE?
0066'   3804                 JR     C, ..DOT          ;IF NOT, MAKE INTO DOT
```

```
0068'   FE7F                    CP      7FH
006A'   3802                    JR      C, ..CHR
006C'   3E2E            ..DOT:  LD      A, '.'
006E'   4F              ..CHR:  LD      C, A
006F'   CD 0000:0B              CALL    CO#                     ;ECHO EITHER ASCII OR DOT
0072'   10E1                    DJNZ    TXTLP
0074'   7A                      LD      A, D
0075'   B3                      OR      E
0076'   C8                      RET     Z
0077'   18A1                    JR      ADDRES                  ;TIME FOR NEXT LINE

0079'   2A 0000#        MORE:   LD      HL, (DISPAD)
007C'   1803                    JR      PAGE
007E'   2A 0000:0B      CHUNK:  LD      HL, (OPER1)
0081'   11 0100         PAGE:   LD      DE, 256                 ;WHOLE PAGE
0084'   1894                    JR      ADDRES                  ;GO TO IT

0000#                           .LOC    .DATA.

0000#                   DISPAD: .BLKB   1                       ;REMEMBER LAST BYTE DISPLAYED

.ident  .end
                        .id     110984
                        .ver    1,0

.intern fill

0000'   CD 0000:04      fill:   CALL    GETOPS#
0003'   FE03                    CP      3
0005'   C2 0000:05              JP      NZ, ERROR#              ;MUST INPUT EXACTLY 3 OPERANDS
0008'   2A 0000:06              LD      HL, (OPER2#)            ;"END" ADDRESS
000B'   ED5B 0000:07            LD      DE, (OPER1#)            ;"START" ADDRESS
000F'   BF                      CP      A
0010'   ED52                    SBC     HL, DE                  ;IS END BEFORE START?
0012'   280C                    JR      Z, SAME                 ;IF SAME ADDRESS, JUST DO ONE BYTE
0014'   DA 0000:05              JP      C, ERROR#
0017'   44                      LD      B, H
0018'   4D                      LD      C, L                    ;BYTE COUNT
0019'   CD 0020'                CALL    SAME                    ;FILL START ADDRESS WITH DATA
001C'   13                      INC     DE
001D'   EDB0                    LDIR                            ;MOVE DATA
001F'   C9                      RET 0020'   2A 0000:07      SAME:   LD      HL, (OPER1#)
0023'   3A 0000:0B              LD      A, (OPER3#)
0026'   77                      LD      (HL), A                 ;STUFF DATA AT START ADDRESS
0027'   C9                      RET .END
                        .ident  so
                        .id     091685
                        .ver    1,0

.intern so,restrt
                        .intern resaf1,resbc1,resde1,reshl1
                        .intern resaf,resbc,resde,reshl
                        .intern resix,resiy,usrsp,usrpc,resi .extern getops,error,nuturd
                        .extern quack,crlf,strins
                        .extern topram,oper1,oper2

0001                    CR=     0DH
000A                    LF=     0AH

0000'   CD 0000:04      so:     CALL    GETOPS
0003'   B7                      OR      A
0004'   2819                    JR      Z, GOLAST               ;NO OPERANDS, GO TO LAST BREAK POINT
0006'   3D                      DEC     A
0007'   3810                    JR      Z, GOTO                 ;ONE OPERAND, GOTO ADDRESS
0009'   3D                      DEC     A
000A'   C2 0000:05              JP      NZ, ERROR               ;MUST BE 2 OPERANDS

000D'   2A 0000:0C              LD      HL, (OPER2)             ;BREAKPOINT ADDRESS
0010'   22 001C#                LD      (BRKADD), HL            ;SAVE IT
0013'   7E                      LD      A, (HL)                 ;GET WHATEVER'S THERE
0014'   32 001E#                LD      (BRKDAT), A             ;SAVE IT
0017'   36FF                    LD      (HL), 0FFH              ;"RST 38H" OPCODE FOR BREAKPOINT

0019'   2A 0000:0B      GOTO:   LD      HL, (OPER1)
001C'   22 0016#                LD      (USRPC), HL             ;INITIALIZE USER P.C.

001F'   CD 0000:08      GOLAST: CALL    CRLF
0022'   3EC3                    LD      A, JP                   ;SET UP JUMP VECTOR
0024'   32 0019#                LD      (JPVEC), A
0027'   2A 0016#                LD      HL, (USRPC)
002A'   22 001A#                LD      (JPVEC+1), HL

002D'   31 0000#                LD      SP, REGAF1              ;LOAD USER VALUES INTO REGISTERS
0030'   3A 0018#                LD      A, (REGI)
0033'   ED47                    LD      I, A
0035'   08                      EX      AF, AF'                 ;LOAD ALTERNATE REGS FIRST
0036'   F1                      POP     AF
0037'   08                      EX      AF, AF'
0038'   D9                      EXX
```

```
0039'   C1                          POP     BC
003A'   D1                          POP     DE
003B'   E1                          POP     HL
003C'   D9                          EXX                     ;NOW DO OTHER REGS
003D'   F1                          POP     AF
003E'   C1                          POP     BC
003F'   D1                          POP     DE
0040'   E1                          POP     HL
0041'   DDE1                        POP     IX
0043'   FDE1                        POP     IY
0045'   ED7B 0014*                  LD      SP, (USRSP)
0049'   C3 0019*            JP              JPVEC           ;GOTO IT

;GET HERE FROM RST 38H TRAP

004C'   E5                  restrt: EX      (SP), HL        ;SAVE HL, GET ADDRESS AFTER BKPT
004D'   2B                          DEC     HL              ;ADDRESS OF BKPT
004E'   22 0016*                    LD      (USRPC), HL     ;SAVE IT
0051'   E1                          POP     HL              ;FORMER HL CONTENTS
0052'   ED73 0014*                  LD      (USRSP), SP     ;SAVE THEIR STACK PTR
0056'   31 001A*                    LD      SP, REGIY+2     ;PLACE TO SAVE EVERYTHING
005A'   FDE5                        PUSH    IY
005B'   DDE5                        PUSH    IX
005D'   E5                          PUSH    HL
005E'   D5                          PUSH    DE
005F'   C5                          PUSH    BC
0060'   F5                          PUSH    AF
0061'   D9                          EXX
0062'   E5                          PUSH    HL
0063'   D5                          PUSH    DE
0064'   C5                          PUSH    BC
0065'   D9                          EXX
0066'   08                          EX      AF, AF'
0067'   F5                          PUSH    AF
0068'   08                          EX      AF, AF'
0069'   2A 001C*                    LD      HL, (BRKADD)
006C'   7C                          LD      A, H
006D'   B5                          OR      L               ;WAS A BREAKPOINT SPECIFIED?
006E'   280A                        JR      Z, BRKPNT
0070'   3A 001E*                    LD      A, (BRKDAT)
0073'   77                          LD      (HL), A
0074'   21 0000                     LD      HL, 0
0077'   22 001C*                    LD      (BRKADD), HL    ;RESET BREAKPOINT ADDRESS TO ZERO
007A'   31 0001:0A          BRKPNT: LD      SP, TOPRAM+1
007D'   CD 0000:09                  CALL    STRING
0080'   0D0AAA                      .ASCIS  [CR][LF] "*"
0083'   2A 0016*                    LD      HL, (USRPC)
0086'   CD 0000:06                  CALL    PUTWRD
0089'   C3 0000:07                  JP      QUACK           ;BACK TO START 0000*                               .loc    .data.

0000*                       REGAF1: .BLKB   2
0002*                       REGBC1: .BLKB   2
0004*                       REGDE1: .BLKB   2
0006*                       REGHL1: .BLKB   2
0008*                       REGAF:  .BLKB   2
000A*                       REGBC:  .BLKB   2
000C*                       REGDE:  .BLKB   2
000E*                       REGHL:  .BLKB   2
0010*                       REGIX:  .BLKB   2
0012*                       REGIY:  .BLKB   2
0014*                       USRSP:  .BLKB   2
0016*                       USRPC:  .BLKB   2
0018*                       REGI:   .BLKB   1
0019*                       JPVEC:  .BLKB   3
001C*                       BRKADD: .BLKW   1
001E*                       BRKDAT: .BLKB   1

.end
                            .ident  hex
                            .id     110984
                            .ver    1/0

.intern hex,binasc

;INPUT ONE OR TWO NUMBERS
                            ;TWO NUMBERS, GIVE HEX SUM AND DIFF
                            ;ONE NUMBER, GIVE BINARY, DECIMAL

0000'   CD 0000:04          hex:    CALL    GETOPS#
0003'   3D                          DEC     A               ;ONE?
0004'   2818                        JR      Z, ONE
0006'   3D                          DEC     A               ;TWO?
0007'   C0                          RET     NZ              ;IF NOT,IGNORE 0008'   CD 0000:05                  CALL    CRLF#
000B'   2A 0000:06                  LD      HL, (OPER1#)
000E'   ED5B 0000:07                LD      DE, (OPER2#)
0012'   E5                          PUSH    HL
0013'   19                          ADD     HL, DE
0014'   CD 0000:08                  CALL    PUTWRD#         ;SUM
0017'   CD 0000:09                  CALL    SPACE#
001A'   E1                          POP     HL
```

```
0018'   BF                          CP      A
001C'   ED52                        SBC     HL, DE
001E'   C3 0000:03                  JP      PUTWRD#         ;DIFFERENCE

0021'   CD 0000:09      ONE:  CALL  SPACE#
0024'   2A 0000:06            LD    HL, (OPER1#)
0027'   CD 0000:0A            CALL  PUTDEC#         ;OUTPUT DECIMAL
002A'   7C                    LD    A, H
002B'   B7                    OR    A
002C'   C0                    RET   NZ              ;IF 16-BIT, RETURN
002D'   7D                    LD    A, L

002E'   CD 0000:09      binasc: CALL SPACE#
0031'   CD 0000:0B              CALL PUTBIN#
0034'   C3 0000:0C              JP   PUTASC#

.end
                        .ident  input
                        .id     110984
                        .ver    1,0

.intern iport,oport

0000'   CD 0000:04      iport: CALL  GETOPS#
0003'   3D                     DEC   A                ;ONE OPERAND?
0004'   C0                     RET   NZ               ;IF NOT, IGNORE COMMAND
0005'   CD 0000:05             CALL  SPACE#           ;INSERT A SPACE
0008'   ED4B 0000:06           LD    BC, (OPER1#)     ;GET PORT#
000C'   ED78                   IN    A, (C)
000E'   CD 0000:07             CALL  PUTBYT#          ;OUTPUT IN HEX
0011'   C3 0000:08             JP    BINASC#          ;COMPLETE LIKE HEX DISPLAY 0014'   CD 0000:04      oport: CALL  GETOPS#
0017'   FE02                   CP    2
0019'   C2 0000:09             JP    NZ, ERROR#       ;MUST BE 2
001C'   ED4B 0000:06           LD    BC, (OPER1#)
0020'   3A 0000:0A             LD    A, (OPER2#)
0023'   ED79                   OUT   (C), A           ;OUTPUT DATA
0025'   C9                     RET .end
                        .ident  dowald
                        .id     110889
                        .ver    1,3

;for the Combo card

.intern dowld

.extern strins
                        .extern co,ci,csts
                        .extern quack ; V1.1 Print dots on the console while downloading.
                        ; V1.2 Allow user to abort download by hitting any key.

; This routine will peel off the Intel hex extras and then load the data at
                        ; the proper address.  Checksums will be checked.

0005                                    ST1     = 05h            ; status for download port
0009                                    RD1     = 09h            ; data for download port 0000'   CD 0000:04      dowld:  call    strins
0003'   6F6164696E6720          .ascis  "oading in progress..."
0018'   3E00                    ld      A, 00
001A'   32 0000#                ld      (address),A
001D'   32 0001#                ld      (address+1),A
0020'   32 0002#                ld      (numbyt),A
0023'   32 0003#                ld      (cksum),A
0026'   CD 00CA'        init:   call    rdchar           ; open the hex file.
0029'   FE3A                    cp      ':'              ; see if char = ':'
002B'   2079                    jr      nz, init         ; normal characters, convert to binary.
002D'   3E2E                    ld      A,'.'            ; print a dot on the console for
002F'   CD 0000:05              call    co               ; every line of the input file.
0032'   CD 00DC'                call    setbyt           ; set the no of bytes in the line
0035'   386F                    jr      c, msend
0037'   CD 00E8'                call    setadd           ; set the address of where to store it.
003A'   CD 010B'                call    sethex           ; trash the next 2 chars.
003D'   3A 0002#        quack:  ld      A, (numbyt)
0040'   47                      ld      B,A
0041'   CD 010B'        stoch:  call    sethex           ;store the binary char at the given address.
0044'   2A 0000#                ld      HL, (address)
0047'   77                      ld      (HL),A
0048'   23                      inc     HL               ; no, so keep on loading
0049'   22 0000#                ld      (address),HL
004C'   10F3                    djnz    stoch            ; read all the char in a record.

; check checksum

004E'   CD 010B'                call    sethex
0051'   3A 0003#                ld      A, (cksum)
0054'   FE00                    cp      00h
0056'   2002                    jr      nz, error
0058'   18CC                    jr      init
```

```
005A'   CD 0000:04          error:  call    strins
005D'   070D0A43686563              .ascis  [07h][0Dh][0Ah]"Checksum error, load aborted."[0Dh][0Ah]
                                    ld      A,7Fh                           ;send a delete back back
0076'   1848                        out     (data),A
0081'   CD 0000:04          abort:  call    strins
0084'   0D0A4C6F616420              .ascis  [0Dh][0Ah]"Load aborted by user."[0Dh][0Ah]
                                    call    ci                              ; eat the character the user typed
0090'   CD 0000:06                  call    ci
                                    jp      quack
00A3'   C3 00C9'                    jp      end 00A6'   CD 0000:04          msgend: call    strins
00A9'   0D0A4C6F616420              .ascis  [0Dh][0Ah]"Load completed successfully."[0Dh][0Ah]
00C9'   C9                  end:    ret 00CA'   CD 0000:07          rdchar: call    csts
00CD'   20B2                        jr      nz,abort
00CF'   ED3805                      in0     A,(ST1)                         ;is there a character?
00D2'   E680                        and     80h
00D4'   28F4                        jr      z,rdchar
00D6'   ED3809                      in0     A,(RD1)                         ;read it
00D9'   E67F                        and     7Fh
00DB'   C9                          ret 00DC'   CD 010B'            setbyt: call    sethex
00DF'   FE00                        cp      00h
00E1'   283E                        jr      z, endsis
00E3'   A7                          and     A
00E4'   32 0002*                    ld      (numbyt),A                      ; store the # in numbyt
00E7'   C9                          ret 00E8'   CD 010B'            setadd: call    sethex
00EB'   67                          ld      H,A
00EC'   CD 010B'                    call    sethex
00EF'   6F                          ld      L,A
00F0'   22 0000*                    ld      (address),HL
00F3'   C9                          ret ; converts 2 notes into 1 hex digit.
00F4'   CD 0102'            hexit:  call    hex
00F7'   4F                          ld      C,A
00F8'   78                          ld      A,B
00F9'   CD 0102'                    call    hex
00FC'   07                          rlca
00FD'   07                          rlca
00FE'   07                          rlca
00FF'   07                          rlca
0100'   B1                          or      C
0101'   C9                          ret ; see if char is letter or digit
0102'   FE40                hex:    cp      40h
0104'   3802                        jr      c, ..1
0106'   D607                        sub     07h
010B'   E60F                ..1:    and     0Fh
010A'   C9                          ret                                     ; a contains actual character.

010B'   CD 00CA'            sethex: call    rdchar
010E'   C5                          push    BC
010F'   47                          ld      B,A
0110'   CD 00CA'            next:   call    rdchar
0113'   CD 00F4'                    call    hexit
0116'   47                          ld      B,A
0117'   3A 0003*                    ld      A, (cksum)
011A'   80                          add     A,B
011B'   32 0003*                    ld      (cksum),A
011E'   78                          ld      A,B
011F'   C1                          pop     BC
0120'   C9                          ret 0121'   37                  endsis: scf
0122'   C9                          ret 0000#                               .loc    .data.

0000#                       addres: .blkw   1                               ; remember the address we're stuffing into
0002#                       numbyt: .blkb   1
0003*                       cksum:  .blkb   1                               ; remember the running checksum .end
                            .ident  dsrlod
                            .id     122091
                            .ver    1,0

;for the PC-MITE card

.intern dsrlod

.extern strins
                            .extern co,ci,csts
                            .extern quack ; This routine will stuff the Intel hex file into the USP FIFO
```

```
0005                        ST1     = 05h           ; status for download port
0009                        RD1     = 09h           ; data for download port
00EE                        dspdat  = 0EEh          ;DSP data
00EF                        dspst   = 0EFh          ;DSP status 0000'   CD 0000:04  dsplod: call    strins
0003'   6F616469E6720       .ascis  "oading in progress..."
001B'   3E00                ld      A, 00
001D'   32 0000*            ld      (address),A
001D'   32 0001*            ld      (address+1),A
0020'   32 0002*            ld      (numbyt),A
0023'   32 0003*            ld      (cksum),A
0026'   CD 00C9'    init:   call    rdchar          ; open the hex file.
0029'   FE3A                cp      ':'             ; see if char = ':'
002B'   20F9                jr      nz, init        ; normal character, convert to binary.
002D'   3E2E                ld      A,'.'           ; print a dot on the console for
002F'   CD 0000:05          call    co              ; every line of the input file.
0032'   CD 00DE'            call    setbyt          ; set the no of bytes in the line
0035'   3802                jr      c, mssend
0037'   CD 00EA'            call    setadd          ; set the address of where to store it.
003A'   CD 010D'            call    gethex          ; trash the next 2 chars.
003D'   3A 0002*    numch:  ld      A, (numbyt)
0040'   47                  ld      B,A
0041'   CD 010D'    stoch:  call    gethex          ;store the binary char at the stored address.
0044'   2A 0000*            ld      HL, (address)
;                           ld      (HL),A          ;don't actually save it
0047'   23                  inc     HL              ; no, so keep on loading
0048'   22 0000*            ld      (address),HL
004B'   10F4                djnz    stoch           ; read all the char in a record.

; check checksum

004D'   CD 010D'            call    gethex
0050'   3A 0003*            ld      A, (cksum)
0053'   FE00                cp      00h
0055'   2002                jr      nz, error
0057'   18CD                jr      init
0059'   CD 0000:04  error:  call    strins
005C'   07D0A43686563       .ascis  [07h][0Dh][0Ah]"Checksum error, load aborted."[0Dh][0Ah]
                            ld      A,7Fh           ;send a delete back host
                            out     (data),A
007E'   1848                jr      end
0080'   CD 0000:04  abort:  call    strins
0083'   0D0A4C6F616420      .ascis  [0Dh][0Ah]"Load aborted by user."[0Dh][0Ah]
009C'   CD 0000:06          call    ci              ; eat the character the user typed
009F'   C3 0000:08          jp      quack
00A2'   C3 00C8'            jp      end 00A5'   CD 0000:04  mssend: call    strins
00A8'   0D0A4C6F616420      .ascis  [0Dh][0Ah]"Load completed successfully."[0Dh][0Ah]
00C8'   C9          end:    ret 00C9'   CD 0000:07  rdchar: call    csts
00CC'   20B2                jr      nz,abort
00CE'   ED3805              in0     A,(ST1)         ;is there a character?
00D1'   E680                and     80h
00D3'   28F4                jr      z,rdchar
00D5'   ED3809              in0     A,(RD1)         ;read it
00D8'   E67F                and     7Fh
00DA'   CD 0125'            call    dspout          ;echo it to DSP FIFO
00DD'   C9                  ret 00DE'   CD 010D'    setbyt: call    gethex
00E1'   FE00                cp      00h
00E3'   283E                jr      z,endsis
00E5'   A7                  and     A
00E6'   32 0002*            ld      (numbyt),A      ; store the # in numbyt
00E9'   C9                  ret 00EA'   CD 010D'    setadd: call    gethex
00ED'   67                  ld      H,A
00EE'   CD 010D'            call    gethex
00F1'   6F                  ld      L,A
00F2'   22 0000*            ld      (address),HL
00F5'   C9                  ret 00F6'   CD 0104'    hexit:  call    hex             ; converts 2 bytes into 1 hex digit.
00F9'   4F                  ld      C,A
00FA'   78                  ld      A,B
00FB'   CD 0104'            call    hex
00FE'   07                  rlca
00FF'   07                  rlca
0100'   07                  rlca
0101'   07                  rlca
0102'   B1                  or      C
0103'   C9                  ret 0104'   FE40        hex:    cp      40h             ; see if char is letter or digit.
0106'   3802                jr      c, ..1
```

```
0102'  D607            sub     07h
0104'  E60F     ..1:   and     0Fh
010C'  C9              ret                              ; a contains actual character.

010D'  CD 00C9' sethex: call   rdchar
0110'  C5              push    BC
0111'  47              ld      B,A
0112'  CD 00C9' next:  call    rdchar
0115'  CD 00F6'        call    hexit
0118'  47              ld      B,A
0119'  3A 0003#        ld      A, (cksum)
011C'  80              add     A,B
011D'  32 0003#        ld      (cksum),A
0120'  78              ld      A,B
0121'  C1              pop     BC
0122'  C9              ret 0123'  37       endsis: scf
0124'  C9              ret 0125'  F5       dspout: push   AF
0126'  DBEF     ..lp:  in      A,(dspst)      ;wait till DSP not full
0128'  CB77            bit     6,A
012A'  28FA            jr      z,..lp
012C'  F1              pop     AF
012D'  D3EE            out     (dspdat),A     ;output to DSP
012F'  C9              ret 0000#                   .loc    .data.

0000#            address: .blkb 1              ; remember the address we're stuffing into
0002#            numbyt: .blkb 1
0003#            cksum:  .blkb 1              ; remember the running checksum .ident  end
                         move
                 .id     110984
                 .ver    1,0

.intern move

0000'  CD 0000:04  move:  CALL  GETOPS#
0003'  FE03             CP     3
0005'  C2 0000:05       JP     NZ, ERROR#     ;MUST BE 3
0008'  2A 0000:06       LD     HL, (OPER2#)   ;END ADDRESS
000B'  ED5B 0000:07     LD     DE, (OPER1#)
000F'  ED52             SBC    HL, DE
0011'  DA 0000:05       JP     C, ERROR#
0014'  44               LD     B, H
0015'  4D               LD     C, L           ;BYTE COUNT - 1

0016'  2A 0000:08       LD     HL, (OPER3#)   ;DESTINATION
0019'  B7               OR     A
001A'  ED52             SBC    HL, DE         ;DEST-SRC
001C'  380C             JR     C, DOWN        ;IF DEST IS BELOW SRC, MOVE DOWN

001E'  2A 0000:08  UP:  LD     HL, (OPER3#)
0021'  09               ADD    HL, BC         ;DEST+LENGTH
0022'  EB               EX     DE,HL
0023'  2A 0000:06       LD     HL, (OPER2#)
0026'  03               INC    BC
0027'  EDB8             LDDR
0029'  C9               RET

002A'  2A 0000:07  DOWN: LD    HL, (OPER1#)   ;SOURCE
002D'  ED5B 0000:08     LD     DE, (OPER3#)   ;DEST
0031'  03               INC    BC
0032'  EDB0             LDIR
0034'  C9               RET

.ident  end
                         subs
                 .id     110984
                 .ver    1,0

.intern subs

000D             CR=     0DH

;S<ADDR><CR>

0000'  CD 0000:04  subs:  CALL  GETNRD#
0003'  D0               RET    NC             ;RETURN IF NO ADDRESS 0004'  CD 0000:05  LOOP:  CALL  CRLF#         ;ADVANCE TO NEXT LINE
0007'  CD 0000:06       CALL   PUTWRD#        ;DISPLAY THE ADDRESS
000A'  CD 0000:07       CALL   STRING#
000D'  3A20A0           .ASCIS ": "
0010'  7E               LD     A, (HL)        ;GET BYTE FROM MEMORY
0011'  CD 0000:08       CALL   PUTBYT#        ;DISPLAY IT
0014'  CD 0000:09       CALL   SPACE#         ;LEAVE A SPACE 0017'  CD 0000:0A       CALL   TI#            ;GET KEYBOARD INPUT
001A'  FE0D             CP     CR
```

```
0010'   2812                        JR      Z, NEXT         ;IF CARRIAGE RETURN, GO TO NEXT ADDRESS
0012'   FE2D                        CP      '-'
0020'   2811                        JR      Z, LAST         ;IF '-' GOTO LAST ADDRESS
0022'   FE2E                        CP      '.'
0024'   C8                          RET     Z               ;IF '.' RETURN TO COMMAND LINE
0025'   FE22                        CP      '"'
0027'   280D                        JR      Z, QUOTE        ;IF QUOTE, INPUT ASCII TEXT
0029'   E5                          PUSH    HL
002A'   CD 0000:0H                  CALL    CHKWRD#         ;CHECK FOR HEX NUMBER
002D'   7D                          LD      A, L            ;GET BYTE FROM INPUT
002E'   E1                          POP     HL              ;RESTORE ADDRESS
002F'   77                          LD      (HL), A         ;PUT IT THERE

0030'   23              NEXT:       INC     HL
0031'   18D1                        JR      LOOP

0033'   2B              LAST:       DEC     HL
0034'   18CE                        JR      LOOP

0036'   CD 0000:0A      QUOTE:      CALL    TI#             ;GET CHARACTER
0039'   FE0D                        CP      CR              ;IF CR, END OF ASCII TEXT
003B'   28C7                        JR      Z, LOOP
003D'   FE20                        CP      20H
003F'   38F5                        JR      C, QUOTE        ;IGNORE CONTROL CHARACTER
0041'   FE7F                        CP      7FH
0043'   30F1                        JR      NC, QUOTE
0045'   77                          LD      (HL), A         ;CHARACTER IS OK, SAVE IT
0046'   23                          INC     HL
0047'   18ED                        JR      QUOTE

.SBS    - Z80 MONITOR -- SUBSTITUTE COMMAND

.END
                            .ident  test
                            .id     110984
                            .ver    1/0

.intern test

.RADIX  16

000D                        CR=     0DH
000A                        LF=     0AH

0000'   CD 0000:04      test:       CALL    GETOPS#
0003'   FE02                        CP      2               ;NEED 2 OPERANDS (START & STOP)
0005'   C2 0000:05                  JP      NZ, ERROR#
0008'   ED5B 0000:06                LD      BC, (OPER1#)    ;OPER1# HAS STARTING ADDRESS
000D'   ED5B 0000:07                LD      DE, (OPER2#)
0010'   13                          INC     DE
0011'   ED53 0000:07                LD      (OPER2#), DE    ;OPER2# HAS ENDING ADDRESS+1

0015'   D9                          EXX
0016'   11 0000                     LD      DE, 0           ;INIT ERROR COUNTER
0019'   21 0000                     LD      HL, 0           ;INIT PASS COUNTER
001C'   D9                          EXX

001D'   CD 0000:0B                  CALL    CRLF#           ;START THE TEST

;           SETUP OF THE BIT PATTERN

0020'   2A 0000:06      LOOP:       LD      HL, (OPER1#)    ;GET STARTING ADDRESS
0023'   11 0000                     LD      DE, 00          ;REGISTER D = PASS NO, E = BLOCK NO
0026'   1832                        JR      TESTB           ;FIRST TIME THROUGH

0028'   CD 0000:09      TESTR:      CALL    CSTS#
002B'   B7                          OR      A
002C'   2827                        JR      Z, ..OK         ;NO KEYBOARD ENTRY, CONTINUE TEST
002E'   CD 0000:0A                  CALL    STRING#
0031'   0D0A5041535345              .ASCIS  [CR][LF]'PASSES: '
0039'   D9                          EXX
003C'   D5                          PUSH    DE              ;SAVE ERROR COUNT
003D'   CD 0000:0B                  CALL    PUTDEC#
0040'   CD 0000:0A                  CALL    STRING#
0043'   20202020455252              .ASCIS  '   ERRORS: '
004F'   E1                          POP     HL              ;RESTORE ERROR COUNT
0050'   CD 0000:0B                  CALL    PUTDEC#
0053'   D9                          EXX
0054'   C9                          RET

0055'   7A              ..OK:       LD      A, D            ;PASS 256 COMPLETED?
0056'   A7                          AND     A
0057'   CA 0027'                    JP      Z, MFINI        ;YES PASS COMPLETED

005A'   43              TESTB:      LD      B, E            ;GET THE BIT PATTERN
005B'   70              ..LAP:      LD      (HL), B
005C'   23                          INC     HL
005D'   04                          INC     B
005E'   CD 008D'                    CALL    COMPC
0061'   2808                        JR      Z, CKBLK
0063'   7B                          LD      A, E            ;GET THE BLOCK
```

```
0064'   B8                      CP      B
0065'   20F4                    JR      NZ,..LAP
0067'   1C                      INC     E
0068'   43                      LD      B,E
0069'   18F0                    JR      ..LAP

;
        ;       CHECK THE BLOCK FOR THE CORRECT DATA
        ;

006B'   5A              CKBLK:  LD      E,D             ;GET THE PASS NUMBER
006C'   43                      LD      B,E             ;GET THE BIT PATTERN
006D'   2A 0000:06              LD      HL,(OPER1#)     ;GET THE STARTING ADDRESS

0070'   7E              ..LAP:  LD      A,(HL)          ;GET THE DATA
0071'   B8                      CP      B               ;COMPARE IT WITH THE BIT PATTERN
0072'   C4 00A2'                CALL    NZ,MERR         ;NON EQUAL MEMORY ERROR
0075'   23                      INC     HL              ;GET THE NEXT ADDRESS
0076'   04                      INC     B               ;INCREMENT THE BIT PATTERN
0077'   CD 008D'                CALL    COMPC           ;CHECK FOR END OF COMPARISON
007A'   CA 0085'                JP      Z,..RST         ;DONE, DO A RESTART
007D'   7B                      LD      A,E             ;GET THE BLOCK NUMBER
007E'   B8                      CP      B               ;TIME FOR NEW BLOCK?
007F'   20EF                    JR      NZ,..LAP
0081'   1C                      INC     E
0082'   43                      LD      B,E             ;NEW BIT PATTERN
0083'   18EB                    JR      ..LAP

;       CYCLE THROUGH AGAIN

0085'   14              ..RST:  INC     D               ;INCREMENT THE PASS NUMBER
0086'   5A                      LD      E,D             ;LOAD THE BLOCK NUMBER
0087'   2A 0000:06              LD      HL,(OPER1#)     ;RESTORE STARTING ADDR
008A'   C3 0028'                JP      TESTR

;       CHECK FOR END OF MEMORY FILL/CHECK
        ;                       RETURN Z SET IF DONE

008D'   3A 0001:07      COMPC:  LD      A,(OPER2#+1)    ;END ADDRESS (HI BYTE)
0090'   BC                      CP      H
0091'   C0                      RET     NZ
0092'   3A 0000:07              LD      A,(OPER2#)      ;END ADDRESS (LO BYTE)
0095'   BD                      CP      L
0096'   C9                      RET

0097'   3E3D            MFINI:  LD      A,'='
0099'   CD 0000:0C              CALL    CO#
009C'   D9                      EXX
009D'   23                      INC     HL              ;BUMP PASS COUNTER
009E'   D9                      EXX
009F'   C3 0020'                JP      LOOP

;       MEMORY ERROR ROUTINE

00A2'   D9              MERR:   EXX
00A3'   13                      INC     DE              ;BUMP ERROR COUNTER
00A4'   D9                      EXX
00A5'   E5                      PUSH    HL
00A6'   C5                      PUSH    BC              ;SAVE GOOD DATA (B)
00A7'   F5                      PUSH    AF              ;BAD RAM DATA
00A8'   E5                      PUSH    HL
00A9'   CD 0000:0A              CALL    STRING#
00AC'   0D0A4552524F52          .ASCIS  [CR][LF]'ERROR '
00B5'   E1                      POP     HL
00B6'   CD 0000:0D              CALL    PUTWRD#
00B9'   CD 0000:0A              CALL    STRING#
00BC'   2020422A0               .ASCIS  '   B '
00C1'   F1                      POP     AF              ;GET THE BAD DATA BACK
00C2'   CD 0000:0E              CALL    PUTBIN#         ;PRINT BAD DATA IN A
00C5'   CD 0000:0A              CALL    STRING#
00C8'   2020472A0               .ASCIS  '   G '
00CD'   F1                      POP     AF              ;GET THE GOOD BINARY PATTERN IN A
00CE'   CD 0000:0E              CALL    PUTBIN#
00D1'   E1                      POP     HL
00D2'   C9                      RET

.END
                        .ident  dsprrc
                        .id     040792
                        .ver    1,4             ;flashhooks in strins
                        ;ver    1,3             ;3/5/92 DSP firmware
                        ;ver    1,2             ;multiple cards
                        ;ver    1,1             ;new DSP firmware .intern dsprrc,dspand
                        .intern confem,clrttd .extern sched,state
                        .extern sxbfk,rush16
                        .extern fishit .intern dspflg
                        .extern dtmfmn
```

```
.insert pcmitmem.dfn
;PC Nite Memory definition 4-07-92

C000            conslq  =       0C000h          ;console queue
C020            rcvq    =       0C020h          ;receive message queue
C030            xmtq    =       0C030h          ;xmit message queue
C100            rcvbfs  =       0C100h          ;receive buffers
C200            xmtbfs  =       0C200h          ;transmit buffers C700            ttgen1  =       0C700h          ;DTMF generator 1 flag
C701            ttgen2  =       0C701h          ;DTMF generator 2 flag
C702            ttdet1  =       0C702h          ;DTMF detector 1 flag
C703            ttdet2  =       0C703h          ;DTMF detector 2 flag
C704            ttdet3  =       0C704h          ;DTMF detector 3 flag
C708            cnf1    =       0C708h          ;conference port 1
C709            cnf2    =       0C709h          ;conference port 2
C70A            cnf3    =       0C70Ah          ;conference port 3
C710            flshtm  =       0C710h          ;flash-hook generator timers
C720            ttdbf1  =       0C720h          ;DTMF detector buffer 1
C740            ttdbf2  =       0C740h          ;DTMF detector buffer 2
C760            ttdbf3  =       0C760h          ;DTMF detector buffer 3
C7C0            ttsbf1  =       0C7C0h          ;DTMF generator buffer 1
C7E0            ttsbf2  =       0C7E0h          ;DTMF generator buffer 2
C800            snstbl  =       0C800h          ;port status table
C808            beltmr  =       0C808h          ;phone bell timer
C810            turtbl  =       0C810h          ;port type table
C818            protbl  =       0C818h          ;protocol table
C820            statbl  =       0C820h          ;state table
C828            onhkf   =       0C828h          ;on-hook flag
C829            isens0  =       0C829h          ;current isense table
C82A            isens1  =       0C82Ah          ;100 msec current table
C82B            isens2  =       0C82Bh          ;200 msec current table
C82C            ofhkf   =       0C82Ch          ;off-hook flag
C830            rins0   =       0C830h          ;rins0 sample
C831            rins1   =       0C831h          ;rins 100 msec sample
C832            rins2   =       0C832h          ;rins 200 msec sample
C833            rins1s  =       0C833h          ;ring 1 sec. sample
C834            rins2s  =       0C834h          ;ring 2 sec. sample
C835            rngfls  =       0C835h          ;ring detect flag
C838            rnstmr  =       0C838h          ;ring clear timers
C840            grvfls  =       0C840h          ;ground removed flag
C841            snd0    =       0C841h          ;ground 0 msec.
C842            snd1    =       0C842h          ;ground 100 msec.
C843            snd2    =       0C843h          ;ground 200 msec.
C844            gasfls  =       0C844h          ;ground asserted flag
C848            rnst0   =       0C848h          ;ring trip 0 msec.
C849            rnst1   =       0C849h          ;ring trip 100 msec.
C84A            rnst2   =       0C84Ah          ;ring trip 200 msec
C84B            rnstf   =       0C84Bh          ;ring trip flag
C84C            rmask   =       0C84Ch          ;ring mask
C850            plsbf0  =       0C850h          ;DID pulse buffer 0 msec.
C851            plsbf1  =       0C851h          ;DID pulse buffer 10 msec.
C852            plsbf2  =       0C852h          ;DID pulse buffer 20 msec.
C853            plsfls  =       0C853h          ;pulse flag
C855            dmask   =       0C855h          ;DID mask
C858            plscnt  =       0C858h          ;DID pulse count
C860            didst   =       0C860h          ;DID state
C868            didtmr  =       0C868h          ;DID timers
C870            didnum  =       0C870h          ;DID number
C878            didcnt  =       0C878h          ;DID number counter
C880            didbfs  =       0C880h          ;DID number buffers
C8E0            flshbf  =       0C8E0h          ;flash-hook detection buffers
C8E6            flshfs  =       0C8E6h          ;flash-hook flag
C8E7            onhkf2  =       0C8E7h          ;on-hook flag for phones & E&M
C8E8            lnflss  =       0C8E8h          ;line flags
C8F0            codecb  =       0C8F0h          ;codec buffer F800            xmtfls  =       0F800h          ;transmit flag
F801            rcvfls  =       0F801h          ;receive flag
F802            rcvbox  =       0F802h          ;receive box
F840            xmtbox  =       0F840h          ;transmit mailbox
F880            xstate  =       0F880h          ;auxiliary state table 00EE            dspdat  =       0EEh
00EF            dspst   =       0EFh
00EF            rotsw   =       0EFh 0000'   3EFF            dsppc:  ld      A,0FFh          ;initialize 3rd detector
0002'   32 C704                 ld      (ttdet3),A 0005'   CD 0000104      dsplp:  call    sched
0008'   DBEF                    in      A,(dspst)       ;check the DSP status
000A'   07                      rlca                    ;a byte in the FIFO
000B'   30FB                    jr      nc,dsplp
000D'   DBEE                    in      A,(dspdat)      ;get the byte
000F'   FE03                    cp      3
0011'   2815                    jr      z,gen1          ;DTMF generator 1 done
0013'   FE04                    cp      4
0015'   281F                    jr      z,gen2          ;DTMF generator 2 done
0017'   FE05                    cp      5
0019'   CA 00A8'                jp      z,det1          ;DTMF detector 1
001C'   FE06                    cp      6
001E'   CA 00A8'                jp      z,det2          ;DTMF detector 2
0021'   FE07                    cp      7
0023'   CA 00A8'                jp      z,det3          ;DTMF detector 3
0026'   18DD                    jr      dsplp
```

```
00287  FD21 C700   sen1:   ld      IY,ttsen1
0028A  21 C700             ld      HL,ttsbf1
002BE  7E                  ld      A,(HL)          ;any additional tones in buffer
0030'  FE00                cp      0
0032'  2021                jr      nz,more1
0034'  1830                jr      sen
0036'  FD21 C701   sen2:   ld      IY,ttsen2
003A'  21 C720             ld      HL,ttsbf2
003D'  7E                  ld      A,(HL)          ;any additional tones in buffer
003E'  FE00                cp      0
0040'  2019                jr      nz,more2
0042'  FD7E00      sen:    ld      A,(IY)          ;set the generator firm
0045'  FD36007F            ld      (IY),0FFh
0049'  FEFF                cp      0FFh
004B'  2808                jr      z,dsolr
004D'  4F                  ld      C,A
004E'  3E01                ld      A,1             ;digits done stimuli
0050'  CD 0000:05          call    state
0053'  18B0                jr      dsolr 0055'  3600        more1:  ld      (HL),0          ;clear the repeater
0057'  0E04                ld      C,4
0059'  1804                jr      more
005B'  3600        more2:  ld      (HL),0          ;clear the repeater
005D'  0E05                ld      C,5
005F'  3E43        more:   ld      A,"C"           ;a pause
0061'  ED43 0002*          ld      (dspbuf),BC     ;put channel and pause in USP messages
0065'  11 0004*            ld      DE,dspbuf + 2
0068'  23                  inc     HL
0069'  0620                ld      B,32
006B'  7E          ..lp:   ld      A,(HL)
006C'  FE00                cp      0
006E'  2816                jr      z,..end
0070'  E5                  push    HL
0071'  C5                  push    BC
0072'  21 0100'            ld      HL,tontbl - 1
0075'  01 0015             ld      BC,21
0078'  EDB9                cpdr
007A'  3E42                ld      A,"B"           ;a short pause
007C'  2005                jr      nz,..nm         ;if no match
007E'  21 0101'            ld      HL,tontbl
0081'  09                  add     HL,BC
0082'  7E                  ld      A,(HL)
0083'  C1          ..nm:   pop     BC
0084'  E1                  pop     HL
0085'  12                  ld      (DE),A
0086'  13                  inc     DE
0087'  23                  inc     HL
0088'  10E1                djnz    ..lp
008A'  EB          ..end:  ex      DE,HL
008B'  364F                ld      (HL),4Fh
008D'  23                  inc     HL
008E'  36FF                ld      (HL),0FFh
0090'  FD4E00              ld      C,(IY)
0093'  21 C710             ld      HL,flshtm
0096'  0600                ld      B,0
0098'  09                  add     HL,BC
0099'  3607                ld      (HL),7
009B'  79                  ld      A,C
009C'  CD 0000:0B          call    flsht           ;flash it
009F'  21 0003*            ld      HL,dspbuf
00A2'  CD 023B'            call    dspsnd
00A5'  C3 0005'            jp      dsolr 00A8'  FD21 C702   dat1:   ld      IY,ttdet1
00AC'  21 C720             ld      HL,ttdbf1
00AF'  1810                jr      det
00B1'  FD21 C703   dat2:   ld      IY,ttdet2
00B5'  21 C740             ld      HL,ttdbf2
00B8'  1807                jr      det
00BA'  FD21 C704   det3:   ld      IY,ttdet3
00BE'  21 C760             ld      HL,ttdbf3
00C1'  CD 0000:04  det:    call    sched           ;wait for another byte from USP
00C4'  DBEF                in      A,(dspst)
00C6'  07                  rlca
00C7'  30F8                jr      nc,det
00C9'  DBEE                in      A,(dspdat)      ;read in the byte
00CB'  CD 0197'            call    dtmfdg          ;translate it into a digit
00CE'  4F                  ld      C,A             ;save the digit
00CF'  060F                ld      B,15
00D1'  7E          ..lp:   ld      A,(HL)
00D2'  FE00                cp      0
00D4'  2803                jr      z,..x
00D6'  23                  inc     HL
00D7'  10F8                djnz    ..lp
00D9'  71          ..x:    ld      (HL),C          ;save the digit
00DA'  31 0000:09          ld      HL,dtmfan
00DD'  3601                ld      (HL),1
00DF'  060F                ld      B,15
00E1'  23          ..lp1:  inc     HL
00E2'  7E                  ld      A,(HL)
00E3'  FE00                cp      0
00E5'  2809                jr      z,..f
```

```
0087'  10FB              djnz  ..lp1
0089'  0606        ..lp2: ld   B,14
00EB'  3600              ld    (HL),0
00ED'  2B                dec   HL
00EE'  10FB              djnz  ..lp2
00F0'  71          ..l3:  ld    (HL),C
00F1'  FD7E00            ld    A,(IY)
00F4'  FEFF              cp    0FFh
00F6'  CA 0005'          jp    z,dsplp        ;if not assigned, ignore
00F9'  C5                push  BC
00FA'  E60F              and   0Fh
00FC'  4F                ld    C,A
00FD'  1E00              ld    E,00h          ;disable the receive time slot
00FF'  3E06              ld    A,6            ;listen stimuli
0101'  CD 0000:05        call  state
0104'  C1                pop   BC
0105'  FDCB007E          bit   7,(IY)         ;check the DS? flag
0109'  C2 0134'          jp    nz,did 010C'  CD 0000:06        call  sxblk
010F'  F5                push  AF
0110'  EB                ex    DE,HL
0111'  3653              ld    (HL),"S"
0113'  23                inc   HL
0114'  3654              ld    (HL),"T"
0116'  23                inc   HL
0117'  DBEF              in    A,(rotsw)      ;read in the card select switch
0119'  E60F              and   0Fh
011B'  F630              or    "0"
011D'  77                ld    (HL),A
011E'  23                inc   HL
011F'  FD7E00            ld    A,(IY)         ;the port
0122'  C630              add   A,"0"
0124'  77                ld    (HL),A
0125'  23                inc   HL
0126'  71                ld    (HL),C         ;the digit
0127'  23                inc   HL
0128'  3600              ld    (HL),0
012A'  F1                pop   AF
012B'  21 C036           ld    HL,xmtq
012E'  CD 0000:07        call  pushlb
0131'  C3 0005'          jp    dsplp 0134'  FD7E00      did:  ld    A,(IY)
0137'  E607              and   07h            ;port #
0139'  5F                ld    E,A
013A'  1600              ld    D,0
013C'  21 CB78           ld    HL,didcnt
013F'  19                add   HL,DE
0140'  46                ld    B,(HL)
0141'  34                inc   (HL)           ;bump the counter
0142'  D5                push  DE
0143'  CB23              sla   E
0145'  CB23              sla   E
0147'  CB23              sla   E
0149'  CB23              sla   E
014B'  21 CB80           ld    HL,didbfs
014E'  19                add   HL,DE
014F'  E5                push  HL
0150'  78                ld    A,B
0151'  85                add   A,L
0152'  6F                ld    L,A
0153'  71                ld    (HL),C
0154'  E1                pop   HL
0155'  D1                pop   DE
0156'  0021 CB1C         ld    I,(protbl)     ;the protocol
015A'  DD19              add   IX,DE
015C'  DD7E00            ld    A,(IX)
015F'  E60F              and   0Fh            ;# of digits
0161'  04                inc   B
0162'  B8                cp    B
0163'  C2 0057'          jp    nz,dsplp       ;if not # to # of digits yet done
0166'  FD7E00            ld    A,(IY)         ;port #
0169'  E60F              and   0Fh
016B'  4F                ld    C,A
016C'  3E0B              ld    A,11           ;digits done
016E'  CD 0000:05        call  state
0171'  FD3600FF          ld    (IY),0FFh      ;clear the DS? flag
0175'  CD 0000:06        call  sxblk
0178'  F5                push  AF
0179'  EB                ex    DE,HL
017A'  3653              ld    (HL),"S"
017C'  23                inc   HL
017D'  3644              ld    (HL),"D"
017F'  23                inc   HL
0180'  DBEF              in    A,(rotsw)      ;read in the card select switch
0182'  E60F              and   0Fh
0184'  F630              or    "0"
0186'  77                ld    (HL),A
0187'  23                inc   HL
0188'  79                ld    A,C
0189'  C630              add   A,"0"
018B'  77                ld    (HL),A
018C'  23                inc   HL
018D'  1A          ..dl: ld    A,(DE)
```

```
0185'   77              ld      (HL),A
0186'   13              inc     DE
0187'   23              inc     HL
0191'   FE00            cp      0
0193'   20F8            jr      nz,..dlp
0195'   F1              pop     AF
0196'   21 0050         ld      HL,<mta
0199'   CD 000010       call    pushl6
019C'   C3 0005'        jp      dsplp
```

;translate the DSP code into a digit

```
019F'   E5      dtmfds: push    HL              ;save HL
01A0'   E60F            and     0Fh             ;mask off offset
01A2'   4F              ld      C,A
01A3'   0600            ld      B,0
01A5'   21 01A0'        ld      HL,tonchr + 1   ;translation table for 1 down tones
01A8'   09              add     HL,BC           ;point at it
01A9'   7E              ld      A,(HL)          ;get the character
01AA'   E1              pop     HL              ;restore HL
01AB'   C9              ret 01AC'   20303132333435  tonchr: .ascii  " 0123456789ABCD*#LUXP"  ;if no match returns space char
01C1'   40303132333435  toatbl: .ascii  "@0123456789:;<=>?@ABC"
```

;clear the touch tone detectors if in use

```
01D5'   21 0702         clrttd: ld      HL,ttdet1
01D8'   0E02            ld      C,6
01DA'   BE              cp      (HL)
01DB'   2818            jr      z,..clr
01DD'   CBFF            set     7,A             ;also check with DID bit set
01DF'   BE              cp      (HL)
01E0'   2813            jr      z,..clr
01E2'   0C              inc     C               ;check next detector
01E3'   23              inc     HL
01E4'   BE              cp      (HL)
01E5'   280E            jr      z,..clr
01E7'   CBBF            res     7,A             ;with DID bit cleared
01E9'   BE              cp      (HL)
01EA'   2809            jr      z,..clr
01EC'   0C              inc     C               ;check 3rd detector
01ED'   23              inc     HL
01EE'   BE              cp      (HL)
01EF'   2804            jr      z,..clr
01F1'   CBFF            set     7,A             ;with DID bit set
01F3'   BE              cp      (HL)
01F4'   C9              ret     nz
01F5'   36FF    ..clr:  ld      (HL),0FFh       ;clear the flag
01F7'   CBBF            res     7,A             ;clear the DID bit
01F9'   F5              push    AF
01FA'   21 0002#        ld      HL,dspbuf
01FD'   71              ld      (HL),C
01FE'   23              inc     HL
01FF'   364E            ld      (HL),4Eh        ;disable the detector
0201'   23              inc     HL
0202'   36FF            ld      (HL),0FFh
0204'   21 0002#        ld      HL,dspbuf
0207'   CD 023B'        call    dspsnd
020A'   F1              pop     AF
020B'   C9              ret
```

;send a conference message to the DSP

```
020C'   E5      confem: push    HL
020D'   D5              push    DE
020E'   C5              push    BC
020F'   11 0708         ld      DE,cnf1
0212'   21 0002#        ld      HL,dspbuf
0215'   3609            ld      (HL),9          ;conference message
0217'   23              inc     HL
0218'   CD 022E'        call    ..cts
021B'   CD 022E'        call    ..cts
021E'   CD 022E'        call    ..cts
0221'   36FF            ld      (HL),0FFh
0223'   21 0002#        ld      HL,dspbuf
0226'   CD 023B'        call    dspsnd          ;send the message to the DSP
0229'   C1              pop     BC
022A'   D1              pop     DE
022B'   E1              pop     HL
022C'   C9              ret 022D'   1A      ..cts:  ld      A,(DE)          ;get the port
022E'   FEFF            cp      0FFh            ;if 0FFh, silent
0230'   2002            jr      nz,..x
0232'   3E1E            ld      A,1Eh           ;null value time slot
0234'   C630    ..x:    add     A,"0"
0236'   77              ld      (HL),A          ;save in the message
0237'   13              inc     DE
0238'   23              inc     HL
0239'   C9              ret
```

;send a message at HL to the DSP

```
023D*    7E              dspsnd: ld      A,(HL)
023E*    FEFF                    cp      0FFh
0240*    280C                    jr      z,..end
0242*    DBEF            ..lp:   in      A,(dspst)
0244*    CB77                    bit     6,A
0246*    28FA                    jr      z,..lp
0248*    7E                      ld      A,(HL)
0249*    D3EE                    out     (dspdat),A    ;output it
024B*    23                      inc     HL
024C*    18EF                    jr      dspsnd
024E*    DBEF            ..end:  in      A,(dspst)
0250*    CB77                    bit     6,A
0252*    28FA                    jr      z,..end
0254*    C9                      ret 0000*                            .loc    .data.

0000*                    dspfls: .blkb   2
0002*                    dspbuf: .blkb   16

.end
                         .ident  did
                         .id     041792
                         .ver    1,3           ;check for pulses of tone (error condition)
                         .ver    1,2           ;multiple cards
                         .ver    1,1           ;change DID message .intern did .extern sched,state
                         .extern push16,sxbrk .insert pcmitmem.dfn
                         ;PC Mite Memory definition 4-07-92

C000                     consfq  =       0C000h          ;console queue
C020                     rcvq    =       0C020h          ;receive message queue
C030                     xmtq    =       0C030h          ;xmit message queue
C100                     rcvbfs  =       0C100h          ;receive buffers
C200                     xmtbfs  =       0C200h          ;transmit buffers C700                     ttsen1  =       0C700h          ;DTMF generator 1 flag
C701                     ttsen2  =       0C701h          ;DTMF generator 2 flag
C702                     ttdet1  =       0C702h          ;DTMF detector 1 flag
C703                     ttdet2  =       0C703h          ;DTMF detector 2 flag
C704                     ttdet3  =       0C704h          ;DTMF detector 3 flag
C708                     cnf1    =       0C708h          ;conference port 1
C709                     cnf2    =       0C709h          ;conference port 2
C70A                     cnf3    =       0C70Ah          ;conference port 3
C710                     flshtm  =       0C710h          ;flash-hook generator timers
C720                     ttdbf1  =       0C720h          ;DTMF detector buffer 1
C740                     ttdbf2  =       0C740h          ;DTMF detector buffer 2
C760                     ttdbf3  =       0C760h          ;DTMF detector buffer 3
C7C0                     ttsbf1  =       0C7C0h          ;DTMF generator buffer 1
C7E0                     ttsbf2  =       0C7E0h          ;DTMF generator buffer 2
C800                     snsttl  =       0C800h          ;port status table
C808                     beltmr  =       0C808h          ;phone bell timer
C810                     typtbl  =       0C810h          ;port type table
C818                     prottbl =       0C818h          ;protocol table
C820                     stattbl =       0C820h          ;State table
C828                     onhkf   =       0C828h          ;on-hook flag
C829                     isens0  =       0C829h          ;current isense table
C82A                     isens1  =       0C82Ah          ;100 msec current table
C82B                     isens2  =       0C82Bh          ;200 msec current table
C82C                     ofhkf   =       0C82Ch          ;off-hook flag
C830                     ring0   =       0C830h          ;ring0 sample
C831                     ring1   =       0C831h          ;ring 10 msec sample
C832                     ring2   =       0C832h          ;ring 200 msec sample
C833                     ring1s  =       0C833h          ;ring 1 sec. sample
C834                     ring2s  =       0C834h          ;ring 2 sec. sample
C835                     rnsfls  =       0C835h          ;ring detect flag
C838                     rnstmr  =       0C838h          ;ring clear timers
C840                     srvfls  =       0C840h          ;sround removed flag
C841                     snd0    =       0C841h          ;sround 0 msec.
C842                     snd1    =       0C842h          ;sround 100 msec.
C843                     snd2    =       0C843h          ;sround 200 msec.
C844                     sasfls  =       0C844h          ;sround asserted flag
C848                     rnst0   =       0C848h          ;rins trip 0 msec.
C849                     rnst1   =       0C849h          ;rins trip 100 msec.
C84A                     rnst2   =       0C84Ah          ;rins trip 200 msec
C84B                     rnstf   =       0C84Bh          ;rins trip flag
C84C                     rmask   =       0C84Ch          ;ring mask
C850                     plsbf0  =       0C850h          ;DID pulse buffer 0 msec.
C851                     plsbf1  =       0C851h          ;DID pulse buffer 10 msec.
C852                     plsbf2  =       0C852h          ;DID pulse buffer 20 msec.
C853                     plsfls  =       0C853h          ;pulse flag
C855                     dmask   =       0C855h          ;DID mask
C858                     plscnt  =       0C858h          ;DID pulse count
C860                     didst   =       0C860h          ;DID state
C868                     didtmr  =       0C868h          ;DID timers
C870                     didnum  =       0C870h          ;DID number
C878                     didcnt  =       0C878h          ;DID number counter
C880                     didbfs  =       0C880h          ;DID number buffers
C8E0                     flshbf  =       0C8E0h          ;flash-hook detection buffers
```

```
CBE6              flshfs   =    0CBE6h          ;flash-hook flag
CBE7              onhkf2   =    0CBE7h          ;on-hook flag for phones & E&M
CBE8              laflss   =    0CBE8h          ;line flags
CBF0              codecb   =    0CBF0h          ;codec buffer FB00              xmtfls   =    0FB00h          ;transmit flag
FB01              rcvfls   =    0FB01h          ;receive flag
FB02              rcvbox   =    0FB02h          ;receive box
FB40              xmtbox   =    0FB40h          ;transmit mailbox
FB80              xstate   =    0FB80h          ;auxiliary state table 00EF              rotsw    =    0EFh            ;card select rotary switch 0000'   21 CB70   did:     ld   HL,didtab
0003'   11 CB80            ld   DE,didbfs
0006'   DD21 CB78          ld   IX,didcnt
000A'   FD21 CB18          ld   IY,protol
000E'   0606              ld   B,6
0010'   F3        ..lp:    di
0011'   7E                 ld   A,(HL)          ;check the buffer for a digit
0012'   3600               ld   (HL),0          ;clear it
0014'   FB                 ei
0015'   A7                 and  A               ;see if a new digit
0016'   2819               jr   z,..nxt
0018'   EB                 ex   DE,HL
0019'   E5                 push HL
001A'   4F                 ld   C,A
001B'   DD7E00             ld   A,(IX)          ;the digit count
001E'   85                 add  A,L
001F'   6F                 ld   L,A
0020'   71                 ld   (HL),C          ;save the digit
0021'   E1                 pop  HL
0022'   DD3400             inc  (IX)            ;bump the digit count
0025'   FD7E00             ld   A,(IY)          ;get the protocol
0028'   E60F               and  0Fh             ;mask off upper four bits
002A'   DDBE00             cp   (IX)
002D'   CC 0042'           call z,didone        ;if all the digits, then complete number
0030'   EB                 ex   DE,HL
0031'   2C        ..nxt:   inc  L
0032'   DD23               inc  IX
0034'   FD23               inc  IY
0036'   7B                 ld   A,E
0037'   C610               add  A,16
0039'   5F                 ld   E,A
003A'   10D4               djnz ..lp
003C'   CD 0000:04         call scned
003F'   C3 0000'           jp   did 0042'   C5        didone:  push BC
0043'   D5                 push DE
0044'   E5                 push HL
0045'   EB                 ex   DE,HL
0046'   21 CB60            ld   HL,didst       ;DID state table
0049'   3E06               ld   A,6
004B'   90                 sub  B
004C'   4F                 ld   C,A
004D'   0600               ld   B,0
004F'   09                 add  HL,BC
0050'   3600               ld   (HL),0         ;set state to 0
0052'   21 CB68            ld   HL,didtmr
0055'   09                 add  HL,BC
0056'   3600               ld   (HL),0
0058'   FDCB0076           bit  6,(IY)         ;check if protocol set to tone
005C'   2041               jr   nz,..err
005E'   21 CB20            ld   HL,state1
0061'   09                 add  HL,BC
0062'   3607               ld   (HL),7         ;set state to off-hook waiting
0064'   EB                 ex   DE,HL
0065'   CD 0000:07         call sxblk          ;get a message block
0068'   F5                 push AF
0069'   3E53               ld   A,"S"          ;build a DID message
006B'   12                 ld   (DE),A
006C'   13                 inc  DE
006D'   3E44               ld   A,"D"
006F'   12                 ld   (DE),A
0070'   13                 inc  DE
0071'   DBEF               in   A,(rotsw)      ;read the card select switch
0073'   E60F               and  0Fh
0075'   F630               or   "0"
0077'   12                 ld   (DE),A
0078'   13                 inc  DE
0079'   79                 ld   A,C            ;port #
007A'   C630               add  A,"0"
007C'   12                 ld   (DE),A
007D'   0610               ld   B,16
007F'   13        ..dlp:   inc  DE             ;transfer the number
0080'   7E                 ld   A,(HL)
0081'   FE00               cp   0              ;check for the end of the string
0083'   280E               jr   z,..dn
0085'   C630               add  A,"0"          ;make into ASCII
0087'   FE3A               cp   "9"+1          ;0 is 10 pulses
0089'   2002               jr   nz,..nz
008B'   3E30               ld   A,"0"
008D'   12        ..nz:    ld   (DE),A
008E'   3600               ld   (HL),0         ;clear the buffer
```

```
0090'   23                       inc    HL
0091'   10EC                     djnz   ..dlp
0093'   12              ..dn:    ld     (DE),A      ;terminator
0094'   F1                       pop    AF
0095'   21 C030                  ld     HL,xmtq
0098'   CD 0000'06               call   push16
0098'   DD360000                 ld     (IX),0      ;clear the digits counter
009F'   E1              ..err:   pop    HL
00A0'   D1                       pop    DE
00A1'   C1                       pop    BC
00A2'   C9                       ret .end
                        .ident  stimul
                        .id     041792
                        .ver    1,3         ;3 DTMF detectors
                        ;ver    1,2         ;flash-hook detection
                        ;ver    1,1         ;DTMF DID .intern stimul .extern sched,state
                        .extern sxblk,push16
                        .extern rinsit,unrins,stmsg
                        .extern dsrsnd .extern scnt .insert pcmitmem.dfn
                        ;PC Mite Memory definition 4-02-92
```

| Addr | Name | | Value | Comment |
|---|---|---|---|---|
| C000 | consq | = | 0C000h | ;console queue |
| C020 | rcvq | = | 0C020h | ;receive message queue |
| C030 | xmtq | = | 0C030h | ;xmit message queue |
| C100 | rcvbfs | = | 0C100h | ;receive buffers |
| C200 | xmtbfs | = | 0C200h | ;transmit buffers |
| C700 | ttgen1 | = | 0C700h | ;DTMF generator 1 flag |
| C701 | ttgen2 | = | 0C701h | ;DTMF generator 2 flag |
| C702 | ttdet1 | = | 0C702h | ;DTMF detector 1 flag |
| C703 | ttdet2 | = | 0C703h | ;DTMF detector 2 flag |
| C704 | ttdet3 | = | 0C704h | ;DTMF detector 3 flag |
| C708 | cnf1 | = | 0C708h | ;conference port 1 |
| C709 | cnf2 | = | 0C709h | ;conference port 2 |
| C70A | cnf3 | = | 0C70Ah | ;conference port 3 |
| C710 | fishtm | = | 0C710h | ;flash-hook generator timers |
| C720 | ttdbf1 | = | 0C720h | ;DTMF detector buffer 1 |
| C740 | ttdbf2 | = | 0C740h | ;DTMF detector buffer 2 |
| C760 | ttdbf3 | = | 0C760h | ;DTMF detector buffer 3 |
| C7C0 | ttsbf1 | = | 0C7C0h | ;DTMF generator buffer 1 |
| C7E0 | ttsbf2 | = | 0C7E0h | ;DTMF generator buffer 2 |
| C800 | snstbl | = | 0C800h | ;port status table |
| C808 | beltmr | = | 0C808h | ;phone bell timer |
| C810 | tyrtbl | = | 0C810h | ;port type table |
| C818 | protbl | = | 0C818h | ;protocol table |
| C820 | statbl | = | 0C820h | ;State table |
| C828 | onhkf | = | 0C828h | ;on-hook flag |
| C829 | isens0 | = | 0C829h | ;current isense table |
| C82A | isens1 | = | 0C82Ah | ;100 msec current table |
| C82B | isens2 | = | 0C82Bh | ;200 msec current table |
| C82C | ofhkf | = | 0C82Ch | ;off-hook flag |
| C830 | rins0 | = | 0C830h | ;rins0 sample |
| C831 | rins1 | = | 0C831h | ;rins 100 msec sample |
| C832 | rins2 | = | 0C832h | ;rins 200 msec sample |
| C833 | rins1s | = | 0C833h | ;rins 1 sec. sample |
| C834 | rins2s | = | 0C834h | ;rins 2 sec. sample |
| C835 | rnsflg | = | 0C835h | ;rins detect flag |
| C838 | rnstmr | = | 0C838h | ;rins clear timers |
| C840 | grvflg | = | 0C840h | ;ground removed flag |
| C841 | gnd0 | = | 0C841h | ;ground 0 msec. |
| C842 | gnd1 | = | 0C842h | ;ground 100 msec. |
| C843 | gnd2 | = | 0C843h | ;ground 200 msec. |
| C844 | gasflg | = | 0C844h | ;ground asserted flag |
| C848 | rnst0 | = | 0C848h | ;ring trip 0 msec. |
| C849 | rnst1 | = | 0C849h | ;ring trip 100 msec. |
| C84A | rnst2 | = | 0C84Ah | ;ring trip 200 msec |
| C84B | rnstf | = | 0C84Bh | ;ring trip flag |
| C84C | rmask | = | 0C84Ch | ;rins mask |
| C850 | plsbf0 | = | 0C850h | ;DID pulse buffer 0 msec. |
| C851 | plsbf1 | = | 0C851h | ;DID pulse buffer 10 msec. |
| C852 | plsbf2 | = | 0C852h | ;DID pulse buffer 20 msec. |
| C853 | plsflg | = | 0C853h | ;pulse flag |
| C855 | dmask | = | 0C855h | ;DID mask |
| C858 | plscnt | = | 0C858h | ;DID pulse count |
| C860 | didst | = | 0C860h | ;DID state |
| C868 | didtmr | = | 0C868h | ;DID timers |
| C870 | didnum | = | 0C870h | ;DID number |
| C878 | didcnt | = | 0C878h | ;DID number counter |
| C880 | didbfs | = | 0C880h | ;DID number buffers |
| C8E0 | flshbf | = | 0C8E0h | ;flash-hook detection buffers |
| C8E6 | flshfg | = | 0C8E6h | ;flash-hook flag |
| C8E7 | onhkf2 | = | 0C8E7h | ;on-hook flag for phones & C&N |
| C8E8 | lnflgs | = | 0C8E8h | ;line flags |
| C8F0 | codecb | = | 0C8F0h | ;codec buffer |

```
F800                    xmtfls  =       0F800h          ;transmit flag
F801                    rcvfls  =       0F801h          ;receive flag
F802                    rcvbox  =       0F802h          ;receive box
F840                    xmtbox  =       0F840h          ;transmit mailbox
F880                    xstate  =       0F880h          ;auxiliary state table
00EF                    rotsw   =       0EFh            ;card select rotary switch 0000'   CD 0000:04      stimul: call    sched 0003'   3A CB55         ofhk:   ld      A,(dmask)       ;DID ports
0006'   EEFF                    xor     0FFh
0008'   4F                      ld      C,A
0009'   3A CB2C                 ld      A,(ofhkf)       ;check the off hook flags
000C'   A1                      and     C               ;ignore DID ports
000D'   CA 002A'                jp      z,dofhk         ;check to see if any new off hooks
0010'   0607                    ld      B,7
0012'   0E00                    ld      C,0
0014'   0F              ..lp:   rrca
0015'   3806                    jr      c,..fnd         ;if a carry, found it
0017'   0C                      inc     C
0018'   10FA                    djnz    ..lp
001A'   C3 002A'                jp      dofhk
001D'   CBBF            ..fnd:  res     7,A             ;clear the flag
001F'   0F              ..2lp:  rrca
0020'   10FD                    djnz    ..2lp
0022'   32 CB2C                 ld      (ofhkf),A
0025'   3E07                    ld      A,7             ;off hook stimuli
0027'   CD 0000:05              call    state 002A'   3A CB55         dofhk:  ld      A,(dmask)       ;DID ports
002D'   4F                      ld      C,A
002E'   3A CB2C                 ld      A,(ofhkf)       ;check the off-hook flags
0031'   A1                      and     C               ;DID ports only
0032'   CA 00DC'                jp      z,rnstrp        ;check to see if any new off hooks
0035'   0607                    ld      B,7
0037'   0E00                    ld      C,0
0039'   0F              ..lp:   rrca
003A'   3806                    jr      c,..fnd         ;if a carry, found it
003C'   0C                      inc     C
003D'   10FA                    djnz    ..lp
003F'   C3 00DC'                jp      rnstrp
0042'   CBBF            ..fnd:  res     7,A             ;clear the flag
0044'   0F              ..2lp:  rrca
0045'   10FD                    djnz    ..2lp
0047'   32 CB2C                 ld      (ofhkf),A
004A'   21 CB18                 ld      HL,protbl       ;check the protocol
004D'   09                      add     HL,BC
004E'   CB76                    bit     6,(HL)          ;DTMF DID
0050'   201C                    jr      nz,..dtmf
0052'   7E                      ld      A,(HL)
0053'   E60F                    and     0Fh             ;check # of digits
0055'   280F                    jr      z,..ofhk        ;if no digits, off hook
0057'   21 CB20                 ld      HL,statbl
005A'   09                      add     HL,BC
005B'   7E                      ld      A,(HL)          ;state of DID port
005C'   FE00                    cp      0               ;is it idle
005E'   CA 00DC'                jp      z,rnstrp
0061'   FE0A                    cp      10
0063'   CA 00DC'                jp      z,rnstrp
0066'   3E07            ..ofhk: ld      A,7             ;off hook stimuli
0068'   CD 0000:05              call    state
006B'   C3 00DC'                jp      rnstrp

;DTMF DID

006E'   21 CB20         ..dtmf: ld      HL,statbl
0071'   09                      add     HL,BC
0072'   7E                      ld      A,(HL)
0073'   FE0A                    cp      10              ;waiting acknowledge
0075'   3804                    jr      z,..wak
0077'   FE00                    cp      0               ;is it idle
0079'   202B                    jr      nz,..ofhk       ;if not idle, not DID, off-hook
007B'   3607            ..wak:  ld      (HL),7          ;put in the waiting state
007D'   21 C702                 ld      HL,ttdetl       ;1st detector flag
0080'   0606                    ld      B,6
0082'   7E                      ld      A,(HL)
0083'   FEFF                    cp      0FFh            ;is it free
0085'   280C                    jr      z,..dl          ;if not free, try second detector
0087'   23                      inc     HL
0088'   04                      inc     B
0089'   7E                      ld      A,(HL)
008A'   FEFF                    cp      0FFh
008C'   2820                    jr      z,..der         ;3rd detector
008E'   23                      inc     HL
008F'   04                      inc     B
0090'   7E                      ld      A,(HL)
0091'   FEFF                    cp      0FFh
0093'   71              ..dl:   ld      (HL),C          ;save port #
0094'   CBFE                    set     7,(HL)          ;set the DID flag
0096'   51                      ld      D,C
0097'   CBFA                    set     7,D
0099'   1EC2                    ld      E,0C2h          ;dial tone
009B'   3E04                    ld      A,4             ;transmit stimuli
009D'   CD 0000:05              call    state
```

```
00A0'   FD21 0001*           ld      IY,xbuf
00A4'   FB7200               ld      (IY),B
00A7'   7A                   ld      A,D           ;time slot
00A8'   E61F                 and     1Fh
00AA'   C630                 add     A,30h
00AC'   FD7701               ld      (IY + 1),A
00AF'   FD3602FF             ld      (IY + 2),0FFh
00B3'   21 0001*             ld      HL,xbuf
00B6'   CD 0000:0B           call    dspsnd
00B9'   1B21                 jr      rnstrp 00BB'   CD 0000:06   ..der:  call    sxblk
00BE'   F5                   push    AF
00BF'   EB                   ex      DE,HL
00C0'   3645                 ld      (HL),"E"
00C2'   23                   inc     HL
00C3'   3644                 ld      (HL),"D"
00C5'   23                   inc     HL
00C6'   DBCF                 in      A,(rptsw)
00C8'   E60F                 and     0Fh
00CA'   C630                 add     A,"0"
00CC'   77                   ld      (HL),A
00CD'   23                   inc     HL
00CE'   79                   ld      A,C
00CF'   F630                 or      "0"
00D1'   77                   ld      (HL),A
00D2'   23                   inc     HL
00D3'   3600                 ld      (HL),0
00D5'   F1                   pop     AF
00D6'   21 C030              ld      HL,xmtq
00D9'   CD 0000:07           call    push16

00DC'   3A C84B      rnstrp: ld      A,(rnstf)    ;check the ring trip flag
00DF'   A7                   and     A
00E0'   CA 00FD'             jp      z,onhk       ;check to see if any new on hooks
00E3'   0607                 ld      B,7
00E5'   0E00                 ld      C,0
00E7'   0F           ..lp:   rrca
00E8'   3806                 jr      c,..fnd      ;if a carry, found it
00EA'   0C                   inc     C
00EB'   10FA                 djnz    ..lp
00ED'   C3 00FD'             jp      onhk
00F0'   CBBF         ..fnd:  res     7,A          ;clear the flag
00F2'   0F           ..2lp:  rrca
00F3'   10FD                 djnz    ..2lp
00F5'   32 C84B              ld      (rnstf),A
00F8'   3E07                 ld      A,7          ;off hook stimuli
00FA'   CD 0000:05           call    state ;on-hook detection 00FD'   3A C828      onhk:   ld      A,(onhkf)    ;check the on hook flag
0100'   A7                   and     A
0101'   2822                 jr      z,onhk2      ;check to see if any new on hooks
0103'   0607                 ld      B,7
0105'   0E00                 ld      C,0
0107'   0F           ..lp:   rrca
0108'   3805                 jr      c,..fnd      ;if a carry, found it
010A'   0C                   inc     C
010B'   10FA                 djnz    ..lp
010D'   1816                 jr      onhk2
010F'   CBBF         ..fnd:  res     7,A          ;clear the flag
0111'   0F           ..2lp:  rrca
0112'   10FD                 djnz    ..2lp
0114'   32 C828              ld      (onhkf),A    ;save the new flag byte
0117'   21 C810              ld      HL,typtbl
011A'   09                   add     HL,BC
011B'   7E                   ld      A,(HL)
011C'   FE05                 cp      5            ;E&M or office phone
011E'   3005                 jr      nc,onhk2     ;use onhook flag 2 because of flashhooks
0120'   3E05                 ld      A,5          ;on hook stimuli
0122'   CD 0000:05           call    state ;on-hook detection with flash-hook detection 0125'   3A C8E7      onhk2:  ld      A,(onhkf2)   ;check the on hook flag
0128'   A7                   and     A
0129'   2822                 jr      z,flash      ;check to see if any new on hooks
012B'   0607                 ld      B,7
012D'   0E00                 ld      C,0
012F'   0F           ..lp:   rrca
0130'   3805                 jr      c,..fnd      ;if a carry, found it
0132'   0C                   inc     C
0133'   10FA                 djnz    ..lp
0135'   1816                 jr      flash
0137'   CBBF         ..fnd:  res     7,A          ;clear the flag
0139'   0F           ..2lp:  rrca
013A'   10FD                 djnz    ..2lp
013C'   32 C8E7              ld      (onhkf2),A   ;save the new flag byte
013F'   21 C810              ld      HL,typtbl
0142'   09                   add     HL,BC
0143'   7E                   ld      A,(HL)
0144'   FE05                 cp      5            ;E&M or office phone
0146'   3805                 jr      c,flash      ;ignore if not E&M or phone
```

```
0140'  3E05            ld     A,5              ;on hook stimuli
0142'  CD 0000:05      call   state ;flashhook detection 014D'  3A CBE6    flash: ld    A,(flshfg)       ;check the flash flags
0150'  A7              and    A
0151'  3823            jr     z,rins           ;check to see if any new flash hooks
0153'  0607            ld     B,7
0155'  0E00            ld     C,0
0157'  0F         ..lp: rrca
0158'  3805            jr     c,..fnd          ;if a carry, found it
015A'  0C              inc    C
015B'  10FA            djnz   ..lp
015D'  1817            jr     rins
015F'  CBBF       ..fnd: res  7,A              ;clear the flag
0161'  0F         ..2lp: rrca
0162'  10FD            djnz   ..2lp
0164'  32 CBE6         ld     (flshfg),A       ;save the new flag byte
0167'  21 CB10         ld     HL,turntbl
016A'  09              add    HL,BC
016B'  7E              ld     A,(HL)
016C'  FE05            cp     5                ;E&M or office phone
016E'  3806            jr     c,rins           ;only E&M & phones have flashhooks
0170'  79              ld     A,C
0171'  0E51            ld     C,"Q"
0173'  CD 0000:0A      call   stmsg ;rins detection 0176'  3A CB35    rins: ld    A,(rngflg)       ;check the rins detect flag
0179'  A7              and    A
017A'  2819            jr     z,snddet         ;check to see if any new rings
017C'  0607            ld     B,7
017E'  0E00            ld     C,0
0180'  0F         ..lp: rrca
0181'  3805            jr     c,..fnd          ;if a carry, found it
0183'  0C              inc    C
0184'  10FA            djnz   ..lp
0186'  180D            jr     snddet
0188'  CBBF       ..fnd: res  7,A              ;clear the flag
018A'  0F         ..2lp: rrca
018B'  10FD            djnz   ..2lp
018D'  32 CB35         ld     (rngflg),A       ;save the new flag byte
0190'  3E03            ld     A,3              ;rins detect stimuli
0192'  CD 0000:05      call   state ;sround detection 0195'  3A CB44    snddet: ld  A,(sasflg)       ;check the sround asserted flag
0198'  A7              and    A
0199'  2819            jr     z,sndrmv         ;check to see if any new srounds
019B'  0607            ld     B,7
019D'  0E00            ld     C,0
019F'  0F         ..lp: rrca
01A0'  3805            jr     c,..fnd          ;if a carry, found it
01A2'  0C              inc    C
01A3'  10FA            djnz   ..lp
01A5'  180D            jr     sndrmv
01A7'  CBBF       ..fnd: res  7,A              ;clear the flag
01A9'  0F         ..2lp: rrca
01AA'  10FD            djnz   ..2lp
01AC'  32 CB44         ld     (sasflg),A       ;save the new flag byte
01AF'  3E0A            ld     A,10             ;sround assertion stimuli
01B1'  CD 0000:05      call   state ;sround removal 01B4'  3A CB40    sndrmv: ld  A,(srvflg)       ;check the sround removed flag
01B7'  A7              and    A
01B8'  2819            jr     z,timer          ;check to see if any new removed srounds
01BA'  0607            ld     B,7
01BC'  0E00            ld     C,0
01BE'  0F         ..lp: rrca
01BF'  3805            jr     c,..fnd          ;if a carry, found it
01C1'  0C              inc    C
01C2'  10FA            djnz   ..lp
01C4'  180D            jr     timer
01C6'  CBBF       ..fnd: res  7,A              ;clear the flag
01C8'  0F         ..2lp: rrca
01C9'  10FD            djnz   ..2lp
01CB'  32 CB40         ld     (srvflg),A       ;save the new flag byte
01CE'  3E09            ld     A,9              ;rins clear stimuli
01D0'  CD 0000:05      call   state ;check the timer 01D3'  21 0000#   timer: ld   HL,secs          ;stimuli second
01D6'  3A 0000:0C      ld     A,(scnt)         ;clock second
01D9'  BE              cp     (HL)
01DA'  CA 0000'        jp     z,stimuli        ;if the same skip
01DD'  77              ld     (HL),A           ;save new second 01DE'  21 CB38         ld     HL,rnstmr        ;rins clear timer table
01E1'  0606            ld     B,6
01E3'  0E00            ld     C,0
01E5'  7E         ..tlp: ld   A,(HL)
```

```
01E6'  FE00                   cp      0
01E8'  2808                   jr      z,..nxt        ;if timer is 0, ignore
01EA'  35                     dec     (HL)           ;else decrement it
01EB'  2005                   jr      nz,..nxt       ;if not 0, ignore
01ED'  3E09                   ld      A,9            ;ring clear stimuli
01EF'  CD 0000:05             call    state
01F2'  0C             ..nxt:  inc     C
01F3'  2C                     inc     L
01F4'  10EF                   djnz    ..tlp 01F6'  11 C820                ld      DE,sastbl
01F9'  21 C808                ld      HL,beltmr
01FC'  0606                   ld      B,6
01FE'  0E00                   ld      C,0
0200'  1A             beloop: ld      A,(DE)
0201'  FE05                   cp      5              ;bell state
0203'  2019                   jr      nz,..nxt
0205'  7E                     ld      A,(HL)
0206'  3D                     dec     A
0207'  77                     ld      (HL),A
0208'  280C                   jr      z,..rng
020A'  FE04                   cp      4              ;2 on, four off
020C'  2010                   jr      nz,..nxt
020E'  E5                     push    HL
020F'  C5                     push    BC
0210'  79                     ld      A,C
0211'  CD 0000:09             call    unring         ;stop bell from ringing
0214'  1806                   jr      ..nxt2
0216'  E5             ..rng:  push    HL
0217'  C5                     push    BC
0218'  79                     ld      A,C
0219'  CD 0000:0B             call    ringit         ;ring the bell
021C'  C1             ..nxt2: pop     BC
021D'  E1                     pop     HL
021E'  2C             ..nxt:  inc     L
021F'  1C                     inc     E
0220'  0C                     inc     C
0221'  10DD                   djnz    beloop
0223'  C3 0000'               jp      stimul 0000#                         .loc    .data.

0000#                 secs:   .blkb   1
0001#                 xbuf:   .blkb   4
                              .end
                      .ident  msgprc
                      .id     041092
                      .ver    1,5            ;check for illegal arguments
                      ;ver    1,4            ;flashhook generation
                                             ;multiple highways, card numbers to 16
                      ;ver    1,3            ;3/5/92 DSP firmware
                      ;ver    1,2            ;multiple cards
                                             ;interrupt flag messages
                      ;ver    1,1            ;new DSP software .intern msgprc
                      .intern sxblk .extern sched,pull16,push16
                      .extern state,stuss
                      .extern dspsnd,confen
                      .extern mtdio,aschex,hysain,flshit .intern rblkmp,xblkmp
                      .extern iflag
                      .extern rcvbuf,dspfls,shwfls .insert pcmitmem.dfn
                      ;PC Mite Memory definition 4-07-92

C000                  consq    =      0C000h         ;console queue
C020                  rcvq     =      0C020h         ;receive message queue
C030                  xmtq     =      0C030h         ;xmit message queue
C100                  rcvbfs   =      0C100h         ;receive buffers
C200                  xmtbfs   =      0C200h         ;transmit buffers C700                  ttgen1   =      0C700h         ;DTMF generator 1 flag
C701                  ttgen2   =      0C701h         ;DTMF generator 2 flag
C702                  ttdet1   =      0C702h         ;DTMF detector 1 flag
C703                  ttdet2   =      0C703h         ;DTMF detector 2 flag
C704                  ttdet3   =      0C704h         ;DTMF detector 3 flag
C708                  cnf1     =      0C708h         ;conference port 1
C709                  cnf2     =      0C709h         ;conference port 2
C70A                  cnf3     =      0C70Ah         ;conference port 3
C710                  flshtm   =      0C710h         ;flash-hook generator timers
C720                  ttdbf1   =      0C720h         ;DTMF detector buffer 1
C740                  ttdbf2   =      0C740h         ;DTMF detector buffer 2
C760                  ttdbf3   =      0C760h         ;DTMF detector buffer 3
C7C0                  ttsbf1   =      0C7C0h         ;DTMF generator buffer 1
C7E0                  ttsbf2   =      0C7E0h         ;DTMF generator buffer 2
C800                  sastbl   =      0C800h         ;port status table
C808                  beltmr   =      0C808h         ;phone bell timer
C810                  typtbl   =      0C810h         ;port type table
C818                  protbl   =      0C818h         ;protocol table
```

```
C820          statbl   =   0C820h     ;State table
C828          onhkf    =   0C828h     ;on-hook flag
C829          isens0   =   0C829h     ;current isense table
C82A          isens1   =   0C82Ah     ;100 msec current table
C82B          isens2   =   0C82Bh     ;200 msec current table
C82C          ofhkf    =   0C82Ch     ;off-hook flag
C830          rins0    =   0C830h     ;rins0 sample
C831          rins1    =   0C831h     ;rins 100 msec sample
C832          rins2    =   0C832h     ;rins 200 msec sample
C833          rins1s   =   0C833h     ;rins 1 sec. sample
C834          rins2s   =   0C834h     ;rins 2 sec. sample
C835          rnsfls   =   0C835h     ;rins detect flag
C838          rnstmr   =   0C838h     ;rins clear timers
C840          grvfls   =   0C840h     ;ground removed flag
C841          gnd0     =   0C841h     ;ground 0 msec.
C842          gnd1     =   0C842h     ;ground 100 msec.
C843          gnd2     =   0C843h     ;ground 200 msec.
C844          gasfls   =   0C844h     ;ground asserted flag
C848          rnst0    =   0C848h     ;rins trip 0 msec.
C849          rnst1    =   0C849h     ;rins trip 100 msec.
C84A          rnst2    =   0C84Ah     ;rins trip 200 msec
C84B          rnstf    =   0C84Bh     ;rins trip flag
C84C          rmask    =   0C84Ch     ;rins mask
C850          plsbf0   =   0C850h     ;DID pulse buffer 0 msec.
C851          plsbf1   =   0C851h     ;DID pulse buffer 10 msec.
C852          plsbf2   =   0C852h     ;DID pulse buffer 20 msec.
C853          plsfls   =   0C853h     ;pulse flag
C855          dmask    =   0C855h     ;DID mask
C858          plscnt   =   0C858h     ;DID pulse count
C860          didst    =   0C860h     ;DID state
C868          didtmr   =   0C868h     ;DID timers
C870          didnum   =   0C870h     ;DID number
C878          didcnt   =   0C878h     ;DID number counter
C880          didbfs   =   0C880h     ;DID number buffers
C8E0          fishbf   =   0C8E0h     ;flash-hook detection buffers
C8E6          flshfs   =   0C8E6h     ;flash-hook flag
C8E7          onhkf2   =   0C8E7h     ;on-hook flag for phones & etc.
C8E8          lnflgs   =   0C8E8h     ;line flags
C8F0          codecb   =   0C8F0h     ;codec buffer F800          xmtflg   =   0F800h     ;transmit flag
F801          rcvfls   =   0F801h     ;receive flag
F802          rcvbox   =   0F802h     ;receive box
F840          xmtbox   =   0F840h     ;transmit mailbox
F880          xstate   =   0F880h     ;auxiliary state table 00EF          rotsw    =   0EFh 0000'  21 0517'    msgprc: ld    HL,rstmsg    ;the restart message
0003'  11 F840             ld    DE,xmtbox
0006'  01 0008             ld    BC,8
0009'  EDB0               ldir 000B'  CD 0000:04  msgle:  call  sched
000E'  21 C020             ld    HL,rcvq
0011'  CD 0000:05          call  pull16
0014'  38F5                jr    c,msgle
0016'  21 C100             ld    HL,rcvbfs
0019'  6F                  ld    L,A
001A'  CB0D                rrc   L
001C'  CB0D                rrc   L
001E'  CB0D                rrc   L
0020'  E5                  push  HL           ;message
0021'  11 0003*            ld    DE,buffer
0024'  01 0020             ld    BC,32
0027'  EDB0               ldir                 ;save in the buffer
0029'  E1                  pop   HL
002A'  11 0000:10          ld    DE,rcvbuf    ;monitor buffer
002D'  01 0020             ld    BC,32
0030'  EDB0               ldir                 ;save in monitor buffer for display
0032'  3C                  inc   A            ;free the block
0033'  47                  ld    B,A
0034'  3E7F                ld    A,7Fh
0036'  07         ..le:    rlca               ;rotate mask
0037'  10FD                djnz  ..le
0039'  21 0000*            ld    HL,rblkmp
003C'  A6                  and   (HL)         ;clear the bit
003D'  77                  ld    (HL),A       ;save the new map
003E'  DD21 0002*          ld    IX,buffer
0042'  DD7E00              ld    A,(IX)       ;set first character of message
0045'  FE53                cp    "S"          ;set?
0047'  CA 0321'            jp    z,set
004A'  FE43                cp    "C"          ;port command?
004C'  CA 008B'            jp    z,cmnd
004F'  FE49                cp    "I"          ;interrupt control message?
0051'  2802                jr    z,imss
0053'  18B6                jr    msgle 0055'  DD7E01      imss:   ld    A,(IX + 1)
0058'  FE4E                cp    "N"
005A'  2804                jr    z,..on
005C'  FE46                cp    "F"
005E'  C2 000B'            jp    nz,msgle
0061'  3E00                ld    A,0
0063'  32 0000:07          ld    (iflgs),A
```

```
0066'  C3 0009'              jp    msslp
0069'  3E01          ..on:   ld    A,1
006B'  32 0000:0F            ld    (iflas),A
006E'  CD 04FB'              call  sxblk
0071'  21 0082'              ld    HL,intack      ;interrupt acknowledge
0074'  01 0003               ld    BC,3
0077'  EDB0                  ldir
0079'  21 C030               ld    IX,xmtq        ;push onto transmit queue
007C'  CD 0000:06            call  push16
007F'  C3 0009'              jp    msslp 0082'  494100        intack: .asciz "IA"
0085'  DD7E02        cmnd:   ld    A,(IX + 2)     ;card #
0088'  CD 04EB'              call  hex
008B'  DA 0009'              jp    c,msslp
008E'  47                    ld    B,A
008F'  DBEF                  in    A,(rotsw)      ;read in rotary switch
0091'  E60F                  and   0Fh            ;card # selected on switch
0093'  B8                    cp    B
0094'  280B                  jr    z,..ok         ;if same, process the message
0096'  DD7E01                ld    A,(IX + 1)     ;if not the same, see if conference
0099'  FE4B                  cp    "K"
009B'  CA 01A6'              jp    z,cnfrnc       ;if a conference, process anyway
009E'  C3 0009'              jp    msslp          ;if not conference ignore the message
00A1'  DD7E03        ..ok:   ld    A,(IX + 3)     ;port on card?
00A4'  FE30                  cp    "0"
00A6'  DA 0009'              jp    c,msslp        ;must be 0-5
00A9'  FE36                  cp    "6"
00AB'  D2 0009'              jp    nc,msslp
00AE'  DD7E01                ld    A,(IX + 1)     ;command
00B1'  FE41                  cp    "A"            ;audit command
00B3'  2836                  jr    z,audit
00B5'  FE43                  cp    "C"            ;connect
00B7'  CA 0141'              jp    z,cnct
00BA'  FE42                  cp    "B"            ;busy hold
00BC'  2862                  jr    z,busy
00BE'  FE44                  cp    "D"            ;disconnect
00C0'  2850                  jr    z,dscnt
00C2'  FE48                  cp    "H"            ;hold
00C4'  2869                  jr    z,hold
00C6'  FE46                  cp    "F"            ;generate a flashhook
00C8'  CA 017C'              jp    z,flash
00CB'  FE4B                  cp    "K"            ;conference
00CD'  CA 01A6'              jp    z,cnfrnc
00D0'  FE4C                  cp    "L"            ;listen for DTMF
00D2'  CA 0202'              jp    z,ldtmf
00D5'  FE4E                  cp    "N"            ;on-hook acknowledge
00D7'  2825                  jr    z,onhkak
00D9'  FE54                  cp    "T"            ;tone command?
00DB'  CA 0269'              jp    z,tone
00DE'  FE50                  cp    "P"            ;call progress tone
00E0'  CA 0166'              jp    z,calprs
00E3'  FE58                  cp    "X"            ;create one way audio
00E5'  CA 0157'              jp    z,xmit
00E8'  C3 0009'              jp    msslp ;audit a time slot 00EB'  CD 04BB'      audit:  call  args2          ;get the transmit time slot of port to audit
00EE'  DA 0009'              jp    c,msslp
00F1'  5F                    ld    E,A
00F2'  DD7E03                ld    A,(IX + 3)     ;port number
00F5'  E607                  and   07h
00F7'  4F                    ld    C,A
00F8'  3E06                  ld    A,6            ;listen stimuli
00FA'  CD 0000:07            call  state
00FD'  C3 0009'              jp    msslp ;on hook acknowledge (currently not in use)

0100'  DD7E03        onhkak: ld    A,(IX + 3)     ;port #
0103'  E607                  and   07h
0105'  4F                    ld    C,A
0106'  0600                  ld    B,0
0108'  21 C820               ld    HL,statbl
010B'  09                    add   HL,BC
010C'  7E                    ld    A,(HL)         ;get the state
010D'  FE0A                  cp    10             ;off hook waiting acknowledge state
010F'  DA 0009'              jp    c,msslp ;disconnect a port 0112'  DD7E03        dscnt:  ld    A,(IX + 3)     ;port #
0115'  E607                  and   07h
0117'  4F                    ld    C,A            ;port #
0118'  3E00                  ld    A,0            ;disconnect stimuli
011A'  CD 0000:07            call  state
011D'  C3 0009'              jp    msslp ;check if a port is busy, if not reserve by putting it on hold 0120'  DD7E03        busy:   ld    A,(IX + 3)     ;port #
0123'  E607                  and   7
0125'  21 C820               ld    HL,statbl
0128'  47                    ld    B,A
```

```
0129'  85              add    A,L
012A'  6F              ld     L,A
012B'  7E              ld     A,(HL)          ;get the state of the port
012C'  FE00            cp     0
012E'  2803            jr     z,hold          ;if idle, put on hold
                       ld     C,"B"
                       ld     A,B
                       call   stasg           ;send a state message
0130'  C3 0008'        jp     msglp ;put a port on hold 0133'  DD7E03  hold:   ld     A,(IX + 3)      ;port to connect to
0136'  E607            and    07h
0138'  4F              ld     C,A             ;port #
0139'  3E02            ld     A,2             ;hold stimuli
013B'  CD 0000:07      call   state
013E'  C3 0008'        jp     msglp ;connect a port (one half of a connection)

0141'  CD 04B8'  cnct: call   args2           ;the other port for time slot
0144'  DA 0008'        jp     c,msglp
0147'  5F              ld     E,A
0148'  CD 04AF'        call   args1           ;the port acting upon
014B'  DA 0008'        jp     c,msglp
014E'  57              ld     D,A             ;transmit time slot
014F'  3E01            ld     A,1             ;connect stimuli
0151'  CD 0000:07      call   state
0154'  C3 0008'        jp     msglp ;set up a one way audio (port transmitting)

0157'  CD 04AF'  xmit: call   args1           ;set the port to transmit
015A'  DA 0008'        jp     c,msglp
015D'  57              ld     D,A
015E'  3E04            ld     A,4             ;transmit stimuli
0160'  CD 0000:07      call   state
0163'  C3 0008'        jp     msglp ;issue a call progress tone 0166'  DD7E03  cplprs: ld     A,(IX + 3)      ;port #
0169'  E607            and    07h
016B'  4F              ld     C,A
016C'  DD7E04          ld     A,(IX + 4)      ;the tone #
016F'  E603            and    03h
0171'  C6C2            add    A,0C2h
0173'  5F              ld     E,A             ;time slot of tone
0174'  3E06            ld     A,6             ;listen stimuli
0176'  CD 0000:07      call   state
0179'  C3 0008'        jp     msglp ;generate a flashhook 017C'  DD7E03  flash:  ld     A,(IX + 3)      ;port #
017F'  E607            and    07h
0181'  4F              ld     C,A
0182'  0600            ld     B,0
0184'  21 CB20         ld     HL,statbl       ;make sure it's in a legal state
0187'  09              add    HL,BC
0188'  7E              ld     A,(HL)          ;get the state
0189'  A7              and    A
018A'  2817            jr     z,..nf          ;if idle, no flash
018C'  FE01            cp     1
018E'  2804            jr     z,..f           ;if connect, flash okay
0190'  CB47            bit    0,A
0192'  200F            jr     nz,..nf         ;if rings, bell, or off-hook waiting no flash
0194'  21 C710  ..f:   ld     HL,flshtm
0197'  09              add    HL,BC
0198'  DD7E04          ld     A,(IX + 4)      ;time of flash in tenths of second
019B'  CD 04EB'        call   hex
019E'  77              ld     (HL),A          ;set the timer
019F'  79              ld     A,C
01A0'  CD 0000:0E      call   flshit          ;open the relay
01A3'  C3 0008'  ..nf: jp     msglp ;conference command 01A6'  DBEF    cnfrnc: in     A,(rotsw)
01A8'  E60F            and    0Fh             ;convert card slot to ascii
01AA'  C630            add    A,"0"
01AC'  FE3A            cp     "9" + 1
01AE'  3802            jr     c,..9
01B0'  C607            add    A,7
01B2'  4F       ..9:   ld     C,A
01B3'  1EC7            ld     E,0C7h          ;1st receive timeslot
01B5'  CD 04AF'        call   args1
01B8'  DA 0008'        jp     c,msglp
01BB'  57              ld     D,A             ;transmit timeslot
01BC'  E67F            and    7Fh
01BE'  32 C70B         ld     (cnf1),A
01C1'  DD7E02          ld     A,(IX + 2)
01C4'  B9              cp     C
01C5'  2005            jr     nz,..c2
```

```
01C7'   3E08                    ld      A,8             ;conference
01C9'   CD 0000:07              call    state
01CC'   CD 04B8'        ..c2:   call    ars2
01CF'   DA 0008'                jp      c,msslp
01D2'   57                      ld      D,A             ;transmit timeslot
01D3'   1C                      inc     E               ;receive timeslot
01D4'   E67F                    and     7Fh
01D6'   32 C709                 ld      (cnf2),A
01D9'   DD7E04                  ld      A,(IX + 4)
01DC'   BD                      cp      L
01DD'   2005                    jr      nz,..c3
01DF'   3E08                    ld      A,8
01E1'   CD 0000:07              call    state
01E4'   CD 04C1'        ..c3:   call    ars3
01E7'   DA 0009'                jp      c,msslp
01EA'   57                      ld      D,A             ;transmit timeslot
01EB'   1C                      inc     E               ;receive timeslot
01EC'   E67F                    and     7Fh
01EE'   32 C72A                 ld      (cnf3),A
01F1'   DD7E06                  ld      A,(IX + 6)
01F4'   BD                      cp      L
01F5'   2005                    jr      nz,..c
01F7'   3E08                    ld      A,8
01F9'   CD 0000:07              call    state
01FC'   CD 0000:0A      ..c:    call    confem
01FF'   C3 0008'                jp      msslp ;listen for DTMF 0202'   21 0702         ldtmf:  ld      HL,ttdetl       ;1st detector flag
0205'   0606                    ld      B,6
0207'   7E                      ld      A,(HL)
0208'   FEFF                    cp      0FFh            ;is it free?
020A'   2806                    jr      z,..d1
020C'   23                      inc     HL              ;if not free, try the second detector
020D'   04                      inc     B
020E'   7E                      ld      A,(HL)
020F'   FEFF                    cp      0FFh
0211'   2807                    jr      z,..d1
0213'   23                      inc     HL              ;try 3rd detector
0214'   04                      inc     B
0215'   7E                      ld      A,(HL)
0216'   FEFF                    cp      0FFh
0218'   202B                    jr      nz,..der        ;if third not free, error
021A'   DD7E03          ..d1:   ld      A,(IX + 3)      ;port #
021D'   E607                    and     07h
021F'   77                      ld      (HL),A          ;set the detector flag
0220'   4F                      ld      C,A
0221'   F680                    or      80h
0223'   57                      ld      D,A
0224'   1EC2                    ld      E,0C2h          ;dial tone
0226'   3E04                    ld      A,4             ;listen stimuli
0228'   CD 0000:07              call    state
022B'   FD21 0224'              ld      IY,xbuf
022F'   FD7000                  ld      (IY),B          ;detector #
0232'   7A                      ld      A,D             ;time slot
0233'   E61F                    and     1Fh
0235'   C630                    add     A,30h
0237'   FD7701                  ld      (IY + 1),A      ;detector timeslot
023A'   FD3602FF                ld      (IY + 2),0FFh   ;terminator
023E'   21 0224'                ld      HL,xbuf
0241'   CD 0000:09              call    dspsnd          ;send a message to the DSP
0244'   C3 0008'                jp      msslp
0247'   0E44            ..der:  ld      C,"D"
0249'   CD 04FB'        error:  call    sxblk           ;if an error, send error message
024C'   F5                      push    AF
024D'   EB                      ex      DE,HL
024E'   3645                    ld      (HL),"E"
0250'   23                      inc     HL
0251'   71                      ld      (HL),C          ;error type
0252'   23                      inc     HL
0253'   DD7E02                  ld      A,(IX + 2)      ;the port number
0256'   77                      ld      (HL),A
0257'   23                      inc     HL
0258'   DD7E03                  ld      A,(IX + 3)
025B'   77                      ld      (HL),A
025C'   23                      inc     HL
025D'   3600                    ld      (HL),0
025F'   F1                      pop     AF
0260'   21 C030                 ld      HL,xatq
0263'   CD 0000:06              call    push16
0266'   C3 0008'                jp      msslp ;send a tone string 0269'   21 0700         tone:   ld      HL,ttsenl       ;1st generator flag
026C'   1EC0                    ld      E,0C0h          ;time slot
026E'   7E                      ld      A,(HL)
026F'   FEFF                    cp      0FFh            ;is it free?
0271'   2807                    jr      z,..s1
0273'   23                      inc     HL              ;if not free, try the second generator
0274'   1C                      inc     E
0275'   7E                      ld      A,(HL)
0276'   FEFF                    cp      0FFh
0278'   305F                    jr      nc,..ser        ;if second not free, error
```

```
027A'  DD7E03           ..s1:   ld      A,(IX + 3)          ;port #
027D'  E607                     and     07h
027F'  77                       ld      (HL),A              ;set the generator flag
0280'  4F                       ld      C,A
0281'  0600                     ld      B,0
0283'  21 0820                  ld      HL,stator
0286'  09                       add     HL,BC
0287'  7E                       ld      A,(HL)
0288'  FE04                     cp      4                   ;transmit state (determine digits?)
028A'  2005                     jr      nz,..nx
028C'  3E0B                     ld      A,11                ;if so, digit done stimuli to free up
028E'  CD 0000:07               call    state
0291'  3E06             ..nx:   ld      A,6                 ;listen stimuli
0293'  CD 0000:07               call    state
0296'  7B                       ld      A,E
0297'  E601                     and     1                   ;DTMF generator #
0299'  F604                     or      4                   ;make it a command
029B'  4F                       ld      C,A
029C'  2642                     ld      H,42h               ;a short pause
029E'  22 0022#                 ld      (xbuf),HL
02A1'  FD21 0006#               ld      IY,buffer + 4
02A5'  11 0024#                 ld      DE,xbuf + 2
02A8'  061E                     ld      B,30
02AA'  FD7E00           ..le:   ld      A,(IY)
02AD'  FE00                     cp      0
02AF'  2819                     jr      z,..end
02B1'  FE46                     cp      "F"
02B3'  2829                     jr      z,..flsh            ;if so, send only 1st part of string to DSP
02B5'  C5                       push    BC
02B6'  21 0305'                 ld      HL,tontbl - 1       ;translate into DSP tones
02B9'  01 0015                  ld      BC,21
02BC'  EDB9                     cpdr
02BE'  21 030C'                 ld      HL,tontbl
02C1'  09                       add     HL,BC
02C2'  C1                       pop     BC
02C3'  7E                       ld      A,(HL)
02C4'  12                       ld      (DE),A
02C5'  FD23                     inc     IY
02C7'  13                       inc     DE
02C8'  10E0                     djnz    ..le
02CA'  EB               ..end:  ex      DE,HL               ;DSP message terminator
02CB'  364F                     ld      (HL),4Fh
02CD'  23                       inc     HL
02CE'  36FF                     ld      (HL),0FFh           ;sending terminator
02D0'  21 0022#                 ld      HL,xbuf
02D3'  CD 0000:09               call    dspsnd              ;send a message to the DS
02D6'  C3 000b'                 jp      nssle
02D9'  0E47             ..ser:  ld      C,"G"
02DB'  C3 0249'                 jp      error ;if a flashhook, put rest of string into a buffer 02DE'  D5               ..flsh: push    DE
02DF'  FDE5                     push    IY
02E1'  E1                       pop     HL
02E2'  11 C7C0                  ld      DE,ttsbf1
02E5'  3A 0022#                 ld      A,(xbuf)            ;DSP channel
02E8'  FE04                     cp      4
02EA'  2803                     jr      z,..4
02EC'  11 C7E0                  ld      DE,ttsbf2           ;if not channel 1, channel 2
02EF'  01 0020          ..4:    ld      BC,32
02F2'  EDB0                     ldir
02F4'  D1                       pop     DE
02F5'  18D3                     jr      ..end 02F7'  20303132333435   tonchr: .ascii  " 0123456789ABCD*#&LUXP"
030C'  42303132333435   tontbl: .ascii  "B0123456789:;<=>?@ABC"
0321'  DD7E01           set:    ld      A,(IX + 1)          ;parameters to be set
0324'  FE47                     cp      "G"                 ;set gains
0326'  CA 0401'                 jp      z,setgan
0329'  FE48                     cp      "H"                 ;set hybrid filter coefficients
032B'  CA 0451'                 jp      z,sethyb
032E'  FE50                     cp      "P"                 ;set the protocols
0331'  CA 0377'                 jp      z,setprn
0334'  FE54                     cp      "T"                 ;set type
0336'  C2 000b'                 jp      nz,nssle
0338'  DD21 0004#               ld      IX,buffer + 2
033C'  11 CB10                  ld      DE,typtbl
033F'  FD21 CB18                ld      IY,prtbtl
0343'  0606                     ld      B,6                 ;# of ports
0345'  C5               ..lp:   push    HL
0346'  C5                       push    BC
0347'  DD7E00                   ld      A,(IX)              ;port type
034A'  21 0379'                 ld      HL,typtlet + 0
034D'  01 0007                  ld      BC,7
0350'  EDB9                     cpdr
0352'  79                       ld      A,C                 ;type number table
0353'  12                       ld      (DE),A
0354'  7B                       ld      A,E
0355'  E607                     and     7
0357'  CD 0000:0B               call    hygain              ;set gains and hybrid values for each
035A'  79                       ld      A,C
035B'  FE03                     cp      3
035D'  3808                     jr      c,..den             ;ADI?
035F'  FE05                     cp      5
```

```
03c1'   2804            jr      z,..dem         ;C&M?
0363'   ED560000        ld      (IY),0          ;if neither, clear the protocols
0367'   D1      ..dem:  pop     DE
0368'   E1              pop     HL
0369'   DC03            inc     IX              ;bump pointers
036C'   13              inc     DE
036D'   FD23            inc     IY
036F'   10B5            djnz    ..lp
0371'   3E01            ld      A,1
0373'   32 0000:12      ld      (showfls),A
0376'   C3 000B'        jp      mssip 0379'   4E4C4644474550  tsplet: .ascii  "NLFDGEP"

037F'   DD7E02  setpro: ld      A,(IX + 3)
0382'   CD 04EB'        call    hex
0385'   DA 000B'        jp      c,mssip
0388'   47              ld      B,A
0389'   DBEF            in      A,(rotsw)
038B'   E60F            and     0Fh
038D'   B8              cp      B
038E'   C2 000B'        jp      nz,mssip
0391'   DD7E03          ld      A,(IX + 3)      ;port #
0394'   CD 04EB'        call    hex
0397'   DA 000B'        jp      c,mssip
039A'   FE06            cp      6
039C'   D2 000B'        jp      nc,mssip
039F'   5F              ld      E,A
03A0'   1600            ld      D,0
03A2'   0E00            ld      C,0
03A4'   21 CB1B         ld      HL,protbl       ;protocol table
03A7'   19              add     HL,DE
03A8'   DD7E04          ld      A,(IX + 4)      ;wink or immediate
03AB'   FE49            cp      "I"
03AD'   2807            jr      z,..im          ;if "I" immediate
03AF'   FE57            cp      "W"
03B1'   C2 000B'        jp      nz,mssip        ;if neither, ignore message
03B4'   CBF9            set     7,C             ;if wink set it
03B6'   DD7E05  ..im:   ld      A,(IX + 5)
03B9'   FE50            cp      "P"
03BB'   2807            jr      z,..pls         ;P for pulse
03BD'   FE54            cp      "T"
03BF'   C2 000B'        jp      nz,mssip        ;if neither, ignore message
03C2'   CBF1            set     6,C
03C4'   DD7E06  ..pls:  ld      A,(IX + 6)      ;# of digits
03C7'   D630            sub     "0"
03C9'   DA 000B'        jp      c,mssip         ;look for digits between 1 and 5
03CC'   FE0A            cp      10
03CE'   D2 000B'        jp      nc,mssip
03D1'   B1              or      C
03D2'   77              ld      (HL),A          ;set new one
03D3'   A7              and     A
03D4'   2819            jr      z,..cdm         ;if protocol is 0, clear mask
03D6'   DD7E03          ld      A,(IX + 3)      ;port #
03D9'   E607            and     07h
03DB'   3C              inc     A
03DC'   47              ld      B,A
03DD'   3E80            ld      A,80h           ;mask
03DF'   07      ..dlp:  rlca
03E0'   10FD            djnz    ..dlp
03E2'   21 CB55         ld      HL,dmask
03E5'   B6              or      (HL)            ;set bit in dil mask
03E6'   77      ..xit:  ld      (HL),A          ;save new dil mask
03E7'   3E01            ld      A,1
03E9'   32 0000:12      ld      (showfls),A     ;set show flag for the monitor
03EC'   C3 000B'        jp      mssip
03EF'   DD7E03  ..cdm:  ld      A,(IX + 3)      ;port #
03F2'   E607            and     07h
03F4'   3C              inc     A
03F5'   47              ld      B,A
03F6'   3E7F            ld      A,7Fh           ;mask
03F8'   07      ..clp:  rlca
03F9'   10FD            djnz    ..clp
03FB'   21 CB55         ld      HL,dmask
03FE'   A6              and     (HL)            ;clear bit in dil mask and set
03FF'   18E5            jr      ..xit
                        ;set the gains for a port
0401'   DD7E02  setgan: ld      A,(IX + 2)
0404'   CD 04EB'        call    hex
0407'   DA 000B'        jp      c,mssip
040A'   47              ld      B,A
040B'   DBEF            in      A,(rotsw)
040D'   E60F            and     0Fh
040F'   B8              cp      B
0410'   C2 000B'        jp      nz,mssip
0413'   DD7E03          ld      A,(IX + 3)      ;port #
0416'   CD 04EB'        call    hex
0419'   DA 000B'        jp      c,mssip
041C'   FE06            cp      6
041E'   D2 000B'        jp      nc,mssip
0421'   F5              push    AF
0422'   21 0440'        ld      HL,gains
0425'   11 CBF0         ld      DE,codecb
0428'   01 0005         ld      BC,5
042B'   EDB0            ldir
```

```
0420'   DD4604              ld      B,(IX + 4)       ;transmit sain msb
0430'   DD4605              ld      C,(IX + 5)       ;transmit sain lsb
0433'   CD 0000:0C          call    aschex
0436'   32 CBF0             ld      (codecb),A       ;set transmit sain in table
0439'   DD4606              ld      B,(IX + 6)
043C'   DD4607              ld      C,(IX + 7)
043F'   CD 0000:0C          call    aschex
0442'   32 CBF2             ld      (codecb + 2),A
0445'   F1                  pop     AF               ;port #
0446'   CD 0000:0B          call    midio            ;output to CODEC
0449'   C3 000B'            jp      mssip 044C'   BFAA        sains:  .byte   0BFh,0AAh        ;transmit sain
044E'   BFA2                .byte   0BFh,0A2h        ;receive sain
0450'   FF                  .byte   0FFh ;set hybrid filter coefficients 0451'   DD7E02      sethyb: ld      A,(IX + 2)
0454'   CD 04EB'            call    hex
0457'   DA 000B'            jp      c,mssip
045A'   47                  ld      B,A
045B'   DBEF                in      A,(rotsw)
045D'   E60F                and     0Fh
045F'   B8                  cp      B
0460'   C2 000B'            jp      nz,mssip
0463'   DD7E03              ld      A,(IX + 3)       ;port #
0466'   CD 04EB'            call    hex
0469'   DA 000B'            jp      c,mssip
046C'   FE06                cp      6
046E'   D2 000B'            jp      nc,mssip
0471'   F5                  push    AF
0472'   21 04AB'            ld      HL,hybrid
0475'   11 CBF0             ld      DE,codecb
0478'   01 0007             ld      BC,7
047B'   EDB0                ldir
047D'   DD4604              ld      B,(IX + 4)
0480'   DD4605              ld      C,(IX + 5)
0483'   CD 0000:0C          call    aschex
0486'   32 CBF0             ld      (codecb),A       ;resister1
0489'   DD4606              ld      B,(IX + 6)
048C'   DD4607              ld      C,(IX + 7)
048F'   CD 0000:0C          call    aschex
0492'   32 CBF2             ld      (codecb + 2),A   ;resister 2
0495'   DD4608              ld      B,(IX + 8)
0498'   DD4609              ld      C,(IX + 9)
049B'   CD 0000:0C          call    aschex
049E'   32 CBF4             ld      (codecb + 4),A   ;resister3
04A1'   F1                  pop     AF               ;port #
04A2'   CD 0000:0B          call    midio            ;output values to CODEC
04A5'   C3 000B'            jp      mssip 04A8'   00B2        hybrid: .byte   00,0B2h          ;write resister 1
04AA'   00BA                .byte   00,0BAh          ;write resister 2
04AC'   00C2                .byte   00,0C2h          ;write resister 3
04AE'   FF                  .byte   0FFh ;set the port # of the first argument 04AF'   DD4602      arg1:   ld      B,(IX + 2)       ;card #
04B2'   DD4603              ld      C,(IX + 3)
04B5'   C3 04CA'            jp      setslt           ;calculate the time slot ;set the port # of the second argument 04B8'   DD4604      arg2:   ld      B,(IX + 4)       ;card # 2nd port
04BB'   DD4605              ld      C,(IX + 5)       ;port #2
04BE'   C3 04CA'            jp      setslt ;set the port # of the third argument 04C1'   DD4606      arg3:   ld      B,(IX + 6)
04C4'   DD4607              ld      C,(IX + 7)
04C7'   C3 04CA'            jp      setslt ;calculate the time slot from the card and port #

04CA'   79          setslt: ld      A,C
04CB'   CD 04EB'            call    hex              ;port #
04CE'   D8                  ret     c                ;return if not a legal hex #
04CF'   FE06                cp      6                ;check if between 0-5
04D1'   3F                  ccf
04D2'   D8                  ret     c
04D3'   4F                  ld      C,A
04D4'   78                  ld      A,B              ;card #
04D5'   CD 04EB'            call    hex
04D8'   D8                  ret     c                ;return with carry if not a legal #
04D9'   FE05        ..5:    cp      5                ;set remainder after divide by 5
04DB'   3804                jr      c,..6
04DD'   D605                sub     5
04DF'   18F8                jr      ..5
04E1'   CB27        ..6:    sla     A                ;six times card #
04E3'   47                  ld      B,A
04E4'   CB27                sla     A
04E6'   80                  add     A,B
```

```
04E7'  81                           add     A,C             ;plus port on card
04E8'  F680                         or      80h             ;hishway enable
04EA'  C9                           ret ;convert ascii to hex 04EB'  D630              hex:       sub     "0"
04ED'  D8                           ret     c
04EE'  FE0A                         cp      10
04F0'  3F                           ccf
04F1'  C9                           ret
04F2'  D607                         sub     7
04F4'  FE10                         cp      16
04F6'  3F                           ccf
04F7'  C9                           ret ;find a transmit buffer return buffer # in a, address in de 04F8'  F3                sxblk:     di
04F9'  3A 0001*                     ld      A,(xblkmp)      ;block map
04FC'  0608                         ld      B,8
04FE'  07                ..lp:      rlca                    ;look for a 0
04FF'  3036                         jr      nc,..fnd
0501'  10FB                         djnz    ..lp
0503'  FB                           ei
0504'  CD 0000*0A                   call    sched           ;no 0's, wait
0507'  18EF                         jr      sxblk
0509'  58                ..fnd:     ld      C,B             ;block # + 1
050A'  0F                           rrca
050B'  F680                         or      80h             ;set bit in map
050D'  07                ..flp:     rlca
050E'  10FD                         djnz    ..flp
0510'  32 0001*                     ld      (xblkmp),A      ;save new map
0513'  FB                           ei
0514'  1D                           dec     E
0515'  79                           ld      A,C             ;block #
0516'  CB08                         rrc     B
0518'  CB08                         rrc     B
051A'  CB08                         rrc     B
051C'  16C2                         ld      D,xmtbfs/256    ;point at the block
051E'  C9                           ret 051F'  52o5274o1274       rstmss:   .asciz  "Restart"
0000*                               .loc    .data.

0000*              rblkmp:  .blkb   1
0001*              xblkmp:  .blkb   1
0002*              buffer:  .blkb   32
0022*              xbuf:    .blkb   16
                            .end
                   .ident  monitor
                   .id     040692
                   .ver    1,3           ;flashhook generation
                   ;ver    1,2           13/5/92 DSP firmware
                   ;ver    1,1           ;new DSP software .intern monitr
                   .intern phrs,conout,aschex .extern sched
                   .extern state
                   .extern pull32,push16
                   .extern sxblk
                   .extern midio,confem,hysain,flshit .intern rcvbuf,xmtbuf,shwflg
                   .intern dtmfem .insert pcniteio.dfn
                   ;PC Nite I/O definitions 02-26-92

0000              CA0     =     0               ;serial channel 0 control resisters
0002              CB0     =     2
0004              ST0     =     4               ;serial channel 0 status resister
0006              TDR0    =     6               ;console transmit data
0008              RDR0    =     8               ;console receive data 0001              CA1     =     1               ;serial channel 1 control resisters
0003              CB1     =     3
0005              ST1     =     5               ;status resister
0007              TDR1    =     7               ;transmit data
0009              RDR1    =     9               ;receive data 000C              TMDRL0  =     0Ch             ;timer resister
000E              RLDR0L  =     0Eh             ;timer 0 load resisters
000F              RLDR0H  =     0Fh
0010              TCR     =     10h             ;timer control resister 0032              DCNTL   =     32h             ;wait state control
0033              IL      =     33h             ;interupt vector
0034              ITC     =     34h             ;interupt control resister
0036              RCR     =     36h             ;refresh resister 00EE              dspdat  =     0EEh            ;DSP data port
```

```
00EF            dspst   =       0EFh            ;DSP status port (bits 4-7)
00EF            rotsw   =       0EFh            ;card select rotary switch (bits 0-3)

00F0            msmb    =       0F0h            ;microwire 2nd byte
00F1            mfmb    =       0F1h            ;microwire 1st byte
00FA            mcs     =       0FAh            ;chip select output register
00FB            mskp    =       0FBh            ;clock polarity control bit
00FC            mwm     =       0FCh            ;mode register
00FD            mskr    =       0FDh            ;clock rate register
00FE            mst     =       0FEh            ;status register
00FF            mpd     =       0FFh            ;pin definition register
                .insert pcmitmem.dfn
                ;PC Mite Memory definition 4-07-92

C000            consq   =       0C000h          ;console queue
C020            rcvq    =       0C020h          ;receive message queue
C030            xmtq    =       0C030h          ;xmit message queue
C100            rcvbfs  =       0C100h          ;receive buffers
C200            xmtbfs  =       0C200h          ;transmit buffers C700            ttgen1  =       0C700h          ;DTMF generator 1 flag
C701            ttgen2  =       0C701h          ;DTMF generator 2 flag
C702            ttdet1  =       0C702h          ;DTMF detector 1 flag
C703            ttdet2  =       0C703h          ;DTMF detector 2 flag
C704            ttdet3  =       0C704h          ;DTMF detector 3 flag
C708            cnf1    =       0C708h          ;conference port 1
C709            cnf2    =       0C709h          ;conference port 2
C70A            cnf3    =       0C70Ah          ;conference port 3
C710            flshtm  =       0C710h          ;flash-hook generator timers
C720            ttdbf1  =       0C720h          ;DTMF detector buffer 1
C740            ttdbf2  =       0C740h          ;DTMF detector buffer 2
C760            ttdbf3  =       0C760h          ;DTMF detector buffer 3
C7C0            ttsbf1  =       0C7C0h          ;DTMF generator buffer 1
C7E0            ttsbf2  =       0C7E0h          ;DTMF generator buffer 2
C800            snstbl  =       0C800h          ;port status table
C808            beltmr  =       0C808h          ;phone bell timer
C810            typtbl  =       0C810h          ;port type table
C818            protbl  =       0C818h          ;protocol table
C820            statbl  =       0C820h          ;state table
C828            onhkf   =       0C828h          ;on-hook flag
C829            isens0  =       0C829h          ;current isense table
C82A            isens1  =       0C82Ah          ;100 msec current table
C82B            isens2  =       0C82Bh          ;200 msec current table
C82C            ofhkf   =       0C82Ch          ;off-hook flag
C830            ring0   =       0C830h          ;ring0 sample
C831            ring1   =       0C831h          ;ring 100 msec sample
C832            ring2   =       0C832h          ;ring 200 msec sample
C833            ring1s  =       0C833h          ;ring 1 sec. sample
C834            ring2s  =       0C834h          ;ring 2 sec. sample
C835            rngfls  =       0C835h          ;ring detect flag
C836            rngtmr  =       0C836h          ;ring clear timers
C840            grvfls  =       0C840h          ;ground removed flag
C841            gnd0    =       0C841h          ;ground 0 msec.
C842            gnd1    =       0C842h          ;ground 100 msec.
C843            gnd2    =       0C843h          ;ground 200 msec.
C844            gasfls  =       0C844h          ;ground asserted flag
C848            rngt0   =       0C848h          ;ring trip 0 msec.
C849            rngt1   =       0C849h          ;ring trip 100 msec.
C84A            rngt2   =       0C84Ah          ;ring trip 200 msec.
C84B            rngtf   =       0C84Bh          ;ring trip flag
C84C            rmask   =       0C84Ch          ;ring mask
C850            plsbf0  =       0C850h          ;DID pulse buffer 0 msec.
C851            plsbf1  =       0C851h          ;DID pulse buffer 10 msec.
C852            plsbf2  =       0C852h          ;DID pulse buffer 20 msec.
C853            plsfls  =       0C853h          ;pulse flag
C855            dmask   =       0C855h          ;DID mask
C858            plscnt  =       0C858h          ;DID pulse count
C860            didst   =       0C860h          ;DID state
C868            didtmr  =       0C868h          ;DID timers
C870            didnum  =       0C870h          ;DID number
C878            didcnt  =       0C878h          ;DID number counter
C880            didbfs  =       0C880h          ;DID number buffers
C8E0            flshbf  =       0C8E0h          ;flash-hook detection buffers
C8E6            flshfs  =       0C8E6h          ;flash-hook flag
C8E7            onhkr2  =       0C8E7h          ;on-hook flag for phones 2 120
C8E8            lnflgs  =       0C8E8h          ;line flags
C8F0            codecb  =       0C8F0h          ;codec buffer F800            xmtfls  =       0F800h          ;transmit flag
F801            rcvfls  =       0F801h          ;receive flag
F802            rcvbox  =       0F802h          ;receive box
F840            xmtbox  =       0F840h          ;transmit mailbox
F880            xstate  =       0F880h          ;auxiliary state table 000A            lf      =       0Ah
000C            era     =       0Ch             ;0Ch for ABDS, 1Ah for televideo
000D            cr      =       0Dh
001B            esc     =       1Bh
0059            crschr  =       "Y"             ;"Y" for ABDS, "=" for televideo 0000' 3E0C      monitr: ld      A,era
0002' CD 0571'          call    conout
0005' 21 0551'          ld      HL,headmg       ;"PC Mite Monitor"
0008' 11 0101           ld      DE,0101h
```

```
000D'  CD 054B'              call    phrs
0010'  21 0601'              ld      HL,drmss        ;"DON'T PANIC!"
0013'  11 0140               ld      DE,0140h
0016'  CD 054B'              call    phrs
0019'  21 060E'              ld      HL,msshd        ;mailbox headings
001C'  11 0301               ld      DE,0301h
001F'  CD 054B'              call    phrs
0022'  21 0624'              ld      HL,cmndhd
0025'  11 0501               ld      DE,0501h
0028'  CD 054B'              call    phrs
002B'  21 0654'              ld      HL,eprthd
002E'  11 0701               ld      DE,0701h
0031'  CD 054B'              call    phrs
0034'  21 0658'              ld      HL,dtmfhd
0037'  11 0F01               ld      DE,0F01h
003A'  CD 054B'              call    phrs
003D'  0E31                  ld      C,"1"
003F'  0606                  ld      B,6
0041'  11 0803               ld      DE,0803h
0044'  CD 0558'      ..plp:  call    curs
0047'  79                    ld      A,C
0048'  CD 0571'              call    conout
004B'  14                    inc     D
004C'  0C                    inc     C
004D'  10F5                  djnz    ..plp
004F'  CD 04B2'              call    typeo           ;display the port types 0052'  11 0510       loop:   ld      DE,0510h
0055'  21 0663'              ld      HL,spaces
0058'  CD 054B'              call    phrs
005B'  CD 0000:04    ..lp:   call    sched           ;loop through the scheduler
005E'  CD 01B0'              call    dtmf            ;check for DTMF
0061'  CD 0136'              call    show
0064'  CD 0144'              call    statck          ;check status for change
0067'  C2 0166'              jp      nz,status
006A'  3A 002B*              ld      A,(rcvbuf)
006D'  A7                    and     A
006E'  2065                  jr      nz,rmss         ;if not zero, a message has been received
0070'  3A 004B*              ld      A,(xmtbuf)
0073'  A7                    and     A
0074'  2079                  jr      nz,xmss         ;if not zero, a message has been transmitted
0076'  21 0000               ld      HL,consta       ;check if a console input
0079'  CD 0000:06            call    pull32
007C'  3EDD                  jr      c,..lp 007E'  CD 00C7'              call    ocmnd           ;output the command letter
0081'  FE47                  cp      "G"
0083'  CA 036B'              jp      z,sain          ;set CODEC gain
0086'  FE46                  cp      "F"
0088'  CA 0214'              jp      z,flash         ;generate a flashhook
008B'  FE42                  cp      "B"
008D'  CA 03B6'              jp      z,balanc        ;set CODEC balance
0090'  FE54                  cp      "T"
0092'  CA 0414'              jp      z,type          ;set type command
0095'  FE53                  cp      "S"
0097'  CA 0166'              jp      z,status        ;display status
009A'  FE52                  cp      "R"
009C'  CA 0000'              jp      z,monitr        ;redraw the screen
009F'  FE43                  cp      "C"
00A1'  CA 01CA'              jp      z,cnct          ;connect command
00A4'  FE44                  cp      "D"
00A6'  CA 01F6'              jp      z,dscnt         ;disconnect command
00A9'  FE48                  cp      "H"
00AB'  CA 0205'              jp      z,hold          ;hold command
00AE'  FE4B                  cp      "K"
00B0'  CA 0237'              jp      z,knfrnc        ;conference command
00B3'  FE4C                  cp      "L"
00B5'  CA 0287'              jp      z,listen        ;timeslot listen command
00B8'  FE58                  cp      "X"
00BA'  CA 02A6'              jp      z,xmit          ;timeslot transmit command
00BD'  FE4D                  cp      "M"
00BF'  CA 0205'              jp      z,dspmss        ;DSP message
00C2'  FE50                  cp      "P"
00C4'  CA 0107'              jp      z,pcmss         ;send a message to the PC
00C7'  18B9                  jr      loop 00C9'  F5            ocmnd:  push    AF
00CA'  11 0510               ld      DE,0510h
00CD'  CD 0558'              call    curs
00D0'  F1                    pop     AF
00D1'  CD 0571'              call    conout
00D4'  C9                    ret 00D5'  21 0663'      rmss:   ld      HL,spaces       ;erase the last message
00D8'  11 0308               ld      DE,0308h
00DB'  CD 054B'              call    phrs
00DE'  21 002B*              ld      HL,rcvbuf       ;display the message
00E1'  11 0308               ld      DE,0308h
00E4'  CD 054B'              call    phrs
00E7'  21 002B*              ld      HL,rcvbuf
00EA'  3600                  ld      (HL),0          ;clear the buffer
00EC'  C3 0050'              jp      loop
```

```
0058'  21 0003'     xmss:   ld      HL,spaces       ;erase the last message
00F0'  11 040B              ld      DE,040Bh
00F3'  CD 054B'             call    phrs
00F6'  21 004B'             ld      HL,xmtbuf       ;display the message
00F9'  11 040B              ld      DE,040Bh
00FC'  CD 054B'             call    phrs
00FF'  21 004B'             ld      HL,xmtbuf
0102'  3600                 ld      (HL),0          ;clear the buffer
0104'  C3 0050'             jp      loop 0107'  11 0003h     pcmss:  ld      DE,dspbuf
010A'  061E                 ld      B,30            ;max length
010C'  CD 0583'     ..lp:   call    char            ;set characters
010F'  FE1B                 cp      esc             ;exit on an escape
0111'  CA 0050'             jp      z,loop
0114'  FE0D                 cp      cr              ;return ends it
0116'  2807                 jr      z,..end
0118'  CD 0571'             call    conout          ;display the character
011B'  12                   ld      (DE),A
011C'  13                   inc     DE
011D'  10EB                 djnz    ..lp
011F'  3E00         ..end:  ld      A,0             ;terminator
0121'  12                   ld      (DE),A          ;save Arnold
0122'  CD 0000:08           call    sxblk
0125'  21 0001h             ld      HL,dspbuf
0128'  01 0020              ld      BC,32
012B'  EDB0                 ldir
012D'  21 C030              ld      HL,xmts
0130'  CD 0000:07           call    push16
0133'  C3 0050'             jp      loop ;show changes if any
0136'  3A 0000#     show:   ld      A,(shwfls)      ;check the flag
0139'  A7                   and     A
013A'  C8                   ret     z
013B'  3E00                 ld      A,0
013D'  32 0000#             ld      (shwfls),A
0140'  CD 0482'             call    typeo
0143'  C9                   ret ;check for change in status
0144'  21 0001#     statck: ld      HL,statbf       ;current status table
0147'  11 C820              ld      DE,statbl       ;state table
014A'  0606                 ld      B,6
014C'  1A           ..slp:  ld      A,(DE)          ;port state table
014D'  BE                   cp      (HL)
014E'  2802                 jr      z,..sm          ;if same state, skip
0150'  77                   ld      (HL),A          ;save new state
0151'  C9                   ret
0152'  13           ..sm:   inc     DE
0153'  23                   inc     HL
0154'  10F6                 djnz    ..slp
0156'  11 CB00              ld      DE,snstbl       ;port sensor status
0159'  0606                 ld      B,6
015B'  1A           ..slp:  ld      A,(DE)
015C'  BE                   cp      (HL)
015D'  2802                 jr      z,..nc          ;if no change, skip
015F'  77                   ld      (HL),A
0160'  C9                   ret
0161'  13           ..nc:   inc     DE
0162'  23                   inc     HL
0163'  10F6                 djnz    ..slp
0165'  C9                   ret ;display the port status
0166'  21 C820      status: ld      HL,statbl       ;state table
0169'  11 0B0F              ld      DE,0B0Fh
016C'  0606                 ld      B,6
016E'  CD 0558'     ..slp:  call    curs
0171'  7E                   ld      A,(HL)          ;set the state
0172'  CD 0592'             call    hexo
0175'  23                   inc     HL
0176'  14                   inc     D
0177'  10F5                 djnz    ..slp
0179'  21 CB00              ld      HL,snstbl
017C'  11 0814              ld      DE,0814h
017F'  0E06                 ld      C,6
0181'  CD 0558'     ..plp:  call    curs
0184'  D5                   push    DE
0185'  5E                   ld      E,(HL)
0186'  0603                 ld      B,3
0188'  3E30         ..ilp:  ld      A,"0"
018A'  CB03                 rlc     E
018C'  3001                 jr      nc,..ni
018E'  3C                   inc     A
018F'  CD 0571'     ..ni:   call    conout
0192'  10F4                 djnz    ..ilp
0194'  3E20                 ld      A," "
0196'  CD 0571'             call    conout
0199'  0603                 ld      B,3
019B'  3E30         ..olp:  ld      A,"0"
019D'  CB03                 rlc     E
```

```
019F'  3001                jr      nc,..no
01A1'  3C                  inc     A
01A2'  CD 0571'    ..no:   call    conout
01A5'  10F4                djnz    ..olp
01A7'  D1                  pop     DE
01A8'  14                  inc     D
01A9'  2C                  inc     L
01AA'  0D                  dec     C
01AB'  20B4                jr      nz,..plp
01AD'  C3 0050'            jp      loop 01B0'  3A 006DH    dtmf:   ld      A,(dtmfon)    ;check for a new digit
01B3'  A7                  and     A
01B4'  C8                  ret     z
01B5'  3E00                ld      A,0
01B7'  32 006DH             ld     (dtmfon),A    ;reset the flag
01BA'  11 0F0F             ld      DE,0F0Fh
01BD'  21 0663'            ld      HL,spaces
01C0'  CD 054B'            call    phrs
01C3'  21 006EH            ld      HL,dtmfon + 1
01C6'  CD 054B'            call    phrs
01C9'  C9                  ret 01CA'  CD 05B7'    cnct:   call    setprt        ;set the first port
01CD'  DA 0050'            jp      c,loop
01D0'  4F                  ld      C,A
01D1'  F680                or      80h
01D3'  57                  ld      D,A
01D4'  3E20                ld      A,' '
01D6'  CD 0571'            call    conout
01D9'  CD 05B7'            call    setprt        ;set the second port
01DC'  DA 0050'            jp      c,loop
01DF'  47                  ld      B,A
01E0'  F680                or      80h
01E2'  5F                  ld      E,A
01E3'  3E01                ld      A,1
01E5'  CD 0000:05          call    state
01E8'  7A                  ld      A,D          ;exchange time slots
01E9'  53                  ld      D,E
01EA'  5F                  ld      E,A
01EB'  78                  ld      A,B          ;exchange ports
01EC'  41                  ld      B,C
01ED'  4F                  ld      C,A
01EE'  3E01                ld      A,1
01F0'  CD 0000:05          call    state
01F3'  C3 0050'            jp      loop 01F6'  CD 05B7'    dscnt:  call    setprt        ;set a port #
01F9'  DA 0050'            jp      c,loop
01FC'  4F                  ld      C,A           ;port #
01FD'  3E00                ld      A,0           ;disconnect stimuli
01FF'  CD 0000:05          call    state
0202'  C3 0050'            jp      loop 0205'  CD 05B7'    hold:   call    setprt        ;set a port #
0208'  DA 0050'            jp      c,loop
020B'  4F                  ld      C,A           ;port #
020C'  3E02                ld      A,2           ;hold stimuli
020E'  CD 0000:05          call    state
0211'  C3 0050'            jp      loop ;generate a flash hook
0214'  CD 05B7'    flash:  call    setprt        ;set a port #
0217'  DA 0050'            jp      c,loop
021A'  4F                  ld      C,A
021B'  3E20                ld      A,' '
021D'  CD 0571'            call    conout
0220'  CD 05C9'            call    getdis
0223'  CD 0571'            call    conout
0226'  CD 05E9'            call    hex
0229'  0600                ld      B,0
022B'  21 C710             ld      HL,flshtm
022E'  09                  add     HL,BC
022F'  77                  ld      (HL),A        ;set the timer
0230'  79                  ld      A,C
0231'  CD 0000:0C          call    flshit        ;open the seize relay
0234'  C3 0050'            jp      loop 0237'  CD 05B7'    knfrnc: call    setprt        ;set the first port
023A'  DA 0050'            jp      c,loop
023D'  4F                  ld      C,A
023E'  3E20                ld      A,' '
0240'  CD 0571'            call    conout
0243'  CD 05B7'            call    setprt        ;2nd port
0246'  DA 0050'            jp      c,loop
0249'  5F                  ld      E,A
024A'  3E20                ld      A,' '
024C'  CD 0571'            call    conout
024F'  CD 05B7'            call    setprt        ;3rd port
0252'  DA 0050'            jp      c,loop
0255'  57                  ld      D,A
0256'  D5                  push    DE
0257'  1EC7                ld      E,0C7h        ;1st recieve timeslot
```

```
0259'  79              ld      A,C             ;set up the first port
025A'  32 C70B         ld      (cnf1),A
025D'  F680            or      80h
025F'  57              ld      D,A             ;transmit timeslot
0260'  3E08            ld      A,8
0262'  CD 0000:05      call    state
0265'  C1              pop     BC
0266'  79              ld      A,C             ;set up the second port
0267'  32 C709         ld      (cnf2),A
026A'  F680            or      80h
026C'  57              ld      D,A             ;transmit timeslot
026D'  1C              inc     E               ;2nd receive timeslot
026E'  3E08            ld      A,8
0270'  CD 0000:05      call    state
0273'  48              ld      C,B             ;set up the third port
0274'  79              ld      A,C
0275'  32 C70A         ld      (cnf3),A
0278'  F680            or      80h
027A'  57              ld      D,A             ;transmit timeslot
027B'  1C              inc     E               ;3rd receive timeslot
027C'  3E08            ld      A,8
027E'  CD 0000:05      call    state
0281'  CD 0000:0A      call    confem          ;send conference message to the DSP
0284'  C3 0050'        jp      loop 0287'  CD 05B7'  listen: call  setprt          ;set a port #
028A'  DA 0050'        jp      c,loop
028D'  5F              ld      E,A
028E'  3E20            ld      A," "
0290'  CD 0571'        call    conout
0293'  CD 05A7'        call    setnum          ;set the time slot
0296'  DA 0050'        jp      c,loop
0299'  CD 05DA'        call    aschex          ;convert to hex
029C'  4B              ld      C,E             ;port #
029D'  5F              ld      E,A             ;time slot
029E'  3E06            ld      A,6             ;listen stimul.
02A0'  CD 0000:05      call    state
02A3'  C3 0050'        jp      loop 02A6'  CD 05B7'  xmit:   call  setprt          ;set a port #
02A9'  DA 0050'        jp      c,loop
02AC'  5F              ld      E,A
02AD'  3E20            ld      A," "
02AF'  CD 0571'        call    conout
02B2'  CD 05A7'        call    setnum          ;set the time slot
02B5'  DA 0050'        jp      c,loop
02B8'  CD 05DA'        call    aschex          ;convert to hex
02BB'  4B              ld      C,E             ;port #
02BC'  57              ld      D,A             ;save it
02BD'  3E04            ld      A,4             ;transmit stimuli
02BF'  CD 0000:05      call    state
02C2'  C3 0050'        jp      loop 02C5'  11 000D*  dspmss: ld    DE,dspbuf
02C8'  061E            ld      B,30
02CA'  CD 0583'        call    char
02CD'  FE31            cp      "1"             ;legal commands in range 1-9
02CF'  DA 0050'        jp      c,loop
02D2'  FE3A            cp      "9" + 1
02D4'  D2 0050'        jp      nc,loop
02D7'  CD 0571'        call    conout
02DA'  E60F            and     0Fh
02DC'  12              ld      (DE),A
02DD'  13              inc     DE
02DE'  CD 0314'  ..lp:   call  stdtmf          ;set the port and digit string
02E1'  FE1B            cp      esc
02E3'  CA 0050'        jp      z,loop
02E6'  FE0D            cp      0Dh             ;check for end of string
02E8'  2804            jr      z,..end
02EA'  12              ld      (DE),A
02EB'  13              inc     DE
02EC'  10F0            djnz    ..lp
02EE'  EB        ..end:  ex    DE,HL
02EF'  36FF            ld      (HL),0FFh       ;EOT character
02F1'  3A 000D*        ld      A,(dspbuf)
02F4'  FE04            cp      4               ;DTMF generator messages?
02F6'  2804            jr      z,..dial
02F8'  FE05            cp      5
02FA'  2005            jr      nz,..ndl
02FC'  364F      ..dial: ld    (HL),4Fh        ;if so, put in string terminator
02FE'  23              inc     HL
02FF'  36FF            ld      (HL),0FFh
0301'  21 000D*  ..ndl:  ld    HL,dspbuf
0304'  CD 035B'        call    dspout
0307'  21 006D*        ld      HL,dtmfmon      ;clear the DTMF monitor buffer
030A'  0610            ld      B,16
030C'  3600      ..clr:  ld    (HL),0
030E'  23              inc     HL
030F'  10FB            djnz    ..clr
0311'  C3 0050'        jp      loop 0314'  CD 0583'  stdtmf: call  char            ;get a character
0317'  21 0343'        ld      HL,tonval - 1
031A'  01 0017         ld      BC,23           ;# of legal characters
031D'  EDB9            cpdr
031F'  20F3            jr      nz,stdtmf
```

```
0321'   FE1B                    cp      esc
0323'   C8                      ret     z
0324'   CD 0571'                call    conout
0327'   21 0344'                ld      HL,tonval
032A'   09                      add     HL,BC
032B'   7E                      ld      A,(HL)          ;set the correct code
032C'   C9                      ret 032D'   30313233343536 tonchr:  .ascii  "0123456789ABCD##LUXPN"[cr][esc]

0344'   30313233343536 tonval:  .ascii  "0123456789:;<=>?@ABCN"[cr][esc]

035B'   7E              dspout: ld      A,(HL)
035C'   FEFF                    cp      0FFh
035E'   C8                      ret     z
035F'   DBEF            ..lp:   in      A,(dspst)       ;DSP status
0361'   CB77                    bit     6,A             ;check for full FIFO
0363'   28FA                    jr      z,..lp
0365'   7E                      ld      A,(HL)
0366'   D3EE                    out     (dspdat),A
0368'   23                      inc     HL
0369'   18F0                    jr      dspout 036B'   21 03B1'        sain:   ld      HL,sains
036E'   11 000D*                ld      DE,dspbuf
0371'   01 0005                 ld      BC,5
0374'   EDB0                    ldir
0376'   CD 05B7'                call    setprt          ;set a digit
0379'   DA 0050'                jp      c,loop
037C'   5F                      ld      E,A             ;the port #
037D'   3E20                    ld      A," "
037F'   CD 0571'                call    conout
0382'   CD 05A7'                call    setnum          ;set a 2 digit hex #
0385'   DA 0050'                jp      c,loop
0388'   CD 05DA'                call    aschex          ;convert to hex
038B'   32 000D*                ld      (dspbuf),A      ;save it as transmit sain
038E'   3E20                    ld      A," "
0390'   CD 0571'                call    conout
0393'   CD 05A7'                call    setnum          ;set receive sain
0396'   DA 0050'                jp      c,loop
0399'   CD 05DA'                call    aschex
039C'   32 000F*                ld      (dspbuf + 2),A  ;save it as transmit sain
039F'   7B                      ld      A,E
03A0'   21 000D*                ld      HL,dspbuf
03A3'   11 CBF0                 ld      DE,codecb
03A6'   01 0005                 ld      BC,5
03A9'   EDB0                    ldir
03AB'   CD 0000:09              call    midio           ;output to the CODEC
03AE'   C3 0050'                jp      loop 03B1'   BFAA            sains:  .byte   0BFh,0AAh       ;transmit sain
03B3'   BFA2                    .byte   0BFh,0A2h       ;receive sain
03B5'   FF                      .byte   0FFh 03B6'   21 040D'        balanc: ld      HL,baltbl       ;balance table
03B9'   11 000D*                ld      DE,dspbuf
03BC'   01 0007                 ld      BC,7
03BF'   EDB0                    ldir
03C1'   CD 05B7'                call    setprt          ;set a digit
03C4'   DA 0050'                jp      c,loop
03C7'   5F                      ld      E,A             ;the port #
03C8'   3E20                    ld      A," "
03CA'   CD 0571'                call    conout
03CD'   CD 05A7'                call    setnum          ;set a 2 digit hex #
03D0'   DA 0050'                jp      c,loop
03D3'   CD 05DA'                call    aschex          ;convert to hex
03D6'   32 000D*                ld      (dspbuf),A      ;resister 1 value
03D9'   3E20                    ld      A," "
03DB'   CD 0571'                call    conout
03DE'   CD 05A7'                call    setnum
03E1'   DA 0050'                jp      c,loop
03E4'   CD 05DA'                call    aschex
03E7'   32 000F*                ld      (dspbuf + 2),A  ;resister 2 value
03EA'   3E20                    ld      A," "
03EC'   CD 0571'                call    conout
03EF'   CD 05A7'                call    setnum
03F2'   DA 0050'                jp      c,loop
03F5'   CD 05DA'                call    aschex
03F8'   32 0011*                ld      (dspbuf + 4),A  ;resister 3 value
03FB'   7B                      ld      A,E
03FC'   21 000D*                ld      HL,dspbuf
03FF'   11 CBF0                 ld      DE,codecb
0402'   01 0007                 ld      BC,7
0405'   EDB0                    ldir
0407'   CD 0000:09              call    midio           ;output to the CODEC
040A'   C3 0050'                jp      loop 040D'   0032            baltbl: .byte   00,32h          ;resister 1
040F'   003A                    .byte   00,3Ah          ;resister 2
0411'   0042                    .byte   00,42h          ;resister 3
0413'   FF                      .byte   0FFh 0414'   CD 05B7'        type:   call    setprt          ;set a digit
0417'   DA 0050'                jp      c,loop
041A'   5F                      ld      E,A
041B'   CD 0583'                call    cnar            ;set a character
```

```
0412'  CD 0571'              call   conout
0421'  21 0530'              ld     HL,typlet + o
0424'  01 0007'              ld     BC,7
0427'  EDB9                  cpdr                    ;look for a match
0429'  C2 0030'              jp     nz,loop
042C'  21 C810               ld     HL,typtbl
042F'  1600                  ld     D,0
0431'  19                    add    HL,DE
0432'  71                    ld     (HL),C
0433'  7B                    ld     A,E
0434'  E607                  and    7
0436'  CD 0000:0B            call   hysain                ;set gain and hybrid values
0439'  21 C818               ld     HL,protbl
043C'  19                    add    HL,DE
043D'  3600                  ld     (HL),0
043F'  79                    ld     A,C                   ;check for DIP or E&M
0440'  FE05                  cp     5
0442'  2804                  jr     z,..em
0444'  FE03                  cp     3
0446'  2055                  jr     nz,..np               ;if not DIP or E&M, no protocol
0448'  3E20         ..em:    ld     A," "
044A'  CD 0571'              call   conout
044D'  CD 0583'              call   char                  ;get a character
0450'  CD 0571'              call   conout
0453'  FE49                  cp     "I"
0455'  280A                  jr     z,..im
0457'  FE57                  cp     "W"
0459'  2042                  jr     nz,..np               ;if not W, no wink
045B'  21 C818               ld     HL,protbl
045E'  19                    add    HL,DE
045F'  CBFE                  set    7,(HL)                ;set the wink bit
0461'  CD 0583'     ..im:    call   char                  ;get another character
0464'  CD 0571'              call   conout
0467'  FE50                  cp     "P"
0469'  280A                  jr     z,..pls
046B'  FE54                  cp     "T"
046D'  202E                  jr     nz,..np               ;if T, tone, else notone
046F'  21 C818               ld     HL,protbl
0472'  19                    add    HL,DE
0473'  CBF6                  set    6,(HL)                ;set the DTMF bit
0475'  CD 000C'     ..pls:   call   getdls
0478'  3823                  jr     c,..np
047A'  CD 0571'              call   conout
047D'  E60F                  and    0Fh
047F'  21 C818               ld     HL,protbl
0482'  19                    add    HL,DE
0483'  B6                    or     (HL)
0484'  77                    ld     (HL),A
0485'  A7                    and    A
0486'  2815                  jr     z,..np                ;if immediate, no dtmf, no protocol
0488'  7B                    ld     A,E                   ;port #
0489'  E607                  and    07h
048B'  43                    ld     B,E
048C'  04                    inc    B
048D'  3E80                  ld     A,80h
048F'  0F           ..dle:   rrca
0490'  10FD                  djnz   ..dle
0492'  21 C855               ld     HL,dmask
0495'  B6                    or     (HL)
0496'  77                    ld     (HL),A
0497'  CD 04B2'              call   typeo
049A'  C3 0030'              jp     loop
049D'  7B           ..np:    ld     A,E
049E'  E607                  and    07h                   ;port #
04A0'  43                    ld     B,E
04A1'  04                    inc    B
04A2'  3E7F                  ld     A,7Fh
04A4'  0F           ..ndle:  rrca
04A5'  10FD                  djnz   ..ndle
04A7'  21 C855               ld     HL,dmask
04AA'  A6                    and    (HL)
04AB'  77                    ld     (HL),A                ;clear Dmask bit
04AC'  CD 04B2'              call   typeo
04AF'  C3 0030'              jp     loop 04B2'  FD21 C810    typeo:   ld     IY,typtbl
04B6'  11 0807               ld     DE,0807h
04B9'  0606                  ld     B,6
04BB'  C5           ..le:    push   BC
04BC'  FD7E00                ld     A,(IY)
04BF'  CB27                  sla    A
04C1'  4F                    ld     C,A
04C2'  CB27                  sla    A
04C4'  81                    add    A,C
04C5'  21 0531'              ld     HL,typtbl
04C8'  4F                    ld     C,A
04C9'  0600                  ld     B,0
04CB'  09                    add    HL,BC
04CC'  CD 0548'              call   pprs
04CF'  C1                    pop    BC
04D0'  14                    inc    D
04D1'  FD23                  inc    IY
04D3'  10E6                  djnz   ..le
04D5'  FD21 C818             ld     IY,protbl
04D9'  11 081F               ld     DE,081Fh
```

```
04E9'   CD 0571'              call    conout
04EC'   CD 0571'              call    conout
04EF'   CD 0571'              call    conout
04F2'   2820                  jr      z,..nxt
04F4'   3E49         ..did:   ld      A,"I"
04F6'   FDCB007E              bit     7,(IY)
04FA'   2802                  jr      z,..i
04FC'   3E57                  ld      A,"H"
04FE'   CD 0571'     ..i:     call    conout
0501'   3E50                  ld      A,"P"
0503'   FDCB0076              bit     6,(IY)
0507'   2803                  jr      z,..P
0509'   3E54                  ld      A,"T"
050B'   CD 0571'     ..P:     call    conout
050E'   FD7E00                ld      A,(IY)
0511'   CD 0597'              call    hexo
0514'   14           ..nxt:   inc     D
0515'   FD23                  inc     IY
0517'   10C5                  djnz    ..plp
0519'   C9                    ret 051A'   4E4C4644474550  typlet: .ascii "NLFDGEP"
0521'   6E6F6E652000    typlbl: .asciz "none "
0527'   4C6F6F702000            .asciz "Loop "
052D'   4665656442000           .asciz "Feed "
0533'   444944202000            .asciz "DID  "
0539'   472E532E2000            .asciz "G.S. "
053F'   45264D202000            .asciz "E&M  "
0545'   50686F6E6500            .asciz "Phone"

0548'   CD 0558'      pnrs:   call    curs
054B'   7E            ..lp:   ld      A,(HL)             ;set the character
054C'   FE00                  cp      0                  ;if 0, end of phrase
054E'   C8                    ret     z
054F'   CD 0571'              call    conout             ;output character
0552'   23                    inc     HL
0553'   18F6                  jr      ..lp 0558'   F5            curs:   push    AF
0559'   3E1B                  ld      A,esc
055B'   CD 0571'              call    conout
055E'   3E59                  ld      A,crschr           ;= for Televideo, / for ADDS
0560'   CD 0571'              call    conout
0563'   7C                    ld      A,H
0564'   C620                  add     A,20h
0566'   CD 0571'              call    conout
0569'   7B                    ld      A,E
056A'   C620                  add     A,20h
056C'   CD 0571'              call    conout
056F'   F1                    pop     AF
0570'   C9                    ret 0571'   F5            conout: push    AF
0572'   ED3804        ..1:    in0     A,(STO)
0575'   E602                  and     2
0577'   2005                  jr      nz,..2
0579'   CD 0000:04            call    sched
057C'   18F4                  jr      ..1
057E'   F1            ..2:    pop     AF
057F'   ED3906                out0    (TDRO),A
0582'   C9                    ret 0583'   CD 0000:04    char:   call    sched
0586'   21 C000               ld      HL,consla          ;console input queue
0589'   CD 0000:06            call    pull32
058C'   38F5                  jr      c,char             ;if carry, no character
058E'   FE61                  cp      "a"
0590'   D8                    ret     c
0591'   FE7B                  cp      "z" + 1
0593'   D0                    ret     nc
0594'   E65F                  and     5Fh                ;make upper case
0596'   C9                    ret ;output a four bit value as a hex digit 0597'   F5            hexo:   push    AF
0598'   E60F                  and     0Fh
059A'   C630                  add     A,"0"
059C'   FE3A                  cp      "9" + 1
059E'   3B02                  jr      c,..9
05A0'   C607                  add     A,7
05A2'   CD 0571'      ..9:    call    conout
05A5'   F1                    pop     AF
05A6'   C9                    ret ;get a two digit Hex #, return it in BC 05A7'   CD 05C9'      setnum: call    setdig             ;get the 1st digit
05AA'   D8                    ret     c
05AB'   47                    ld      B,A
05AC'   CD 0571'              call    conout
05AF'   CD 05C9'              call    setdig             ;get the 2nd digit
05B2'   D8                    ret     c
05B3'   4F                    ld      C,A
05B4'   C3 0571'              jp      conout
```

```
                                            ;set a port number between 1 & 6
0587'   CD 05C9'        setprt: call    setdis          ;set a digit
058A'   D8                      ret     c
058B'   FE31                    cp      "1"
058D'   D8                      ret     c
058E'   FE37                    cp      "7"
0590'   3F                      ccf
05C1'   D8                      ret     c
05C2'   CD 0571'                call    conout
05C5'   3D                      dec     a
05C6'   E607                    and     7
05C8'   C9                      ret 05C9'   CD 0583'        setdis: call    char            ;set a character from the console
05CC'   FE30                    cp      "0"
05CE'   D8                      ret     c
05CF'   FE3A                    cp      "9" + 1
05D1'   3805                    jr      c,..ccf
05D3'   FE41                    cp      "A"
05D5'   D8                      ret     c
05D6'   FE47                    cp      "G"
05D8'   3F              ..ccf:  ccf
05D9'   C9                      ret 05DA'   78              aschex: ld      A,B
05DB'   CD 05E9'                call    hex
05DE'   07                      rlca
05DF'   07                      rlca
05E0'   07                      rlca
05E1'   07                      rlca
05E2'   47                      ld      B,A
05E3'   79                      ld      A,C
05E4'   CD 05E9'                call    hex
05E7'   B0                      or      B
05E8'   C9                      ret 05E9'   D630            hex:    sub     "0"
05EB'   FE0A                    cp      10
05ED'   D8                      ret     c
05EE'   D607                    sub     7
05F0'   C9                      ret 05F1'   5043204D697465  headns: .asciz  "PC Mite Monitor"
0601'   446F6E27742050  dpmss:  .asciz  "Don't Panic!"
060E'   7263762E206D73  msshd:  .ascii  "rcv. mss."
0617'   0D0A20786D742E          .asciz  [cr][lf]" xmt. mss."
0624'   456E7465722043  cmndhd: .asciz  "Enter Command: "
0634'   706F7274202074  porthd: .asciz  "port  type  state  status  protocol"
0656'   4454404620746F  dtmfhd: .asciz  "DTMF tones"
0663'   20202020202020  spaces: .asciz  "                                    "  ;36 spaces 0000*                           .loc    .data.
0000*                   shwfls: .blkb   1
0001*                   statbf: .blkb   12
000D*                   dspbuf: .blkb   32
002D*                   rcvbuf: .blkb   32
004D*                   xmtbuf: .blkb   32
006D*                   dtmfmn: .blkb   17
                                .end
                        .ident  suport
                        ..d     040792
                        .ver    1,3             ;fix deselect in MID10, flashnop;
                                                ;new gains & hybrids 3/30/92 (3/19)
                                                ;3/5/92 DSP firmware
                                                ;gain & hybrid settings
                        .ver    1,2             ;multiple cards
                        .ver    1,1             ;new DSP firmware .intern stmsg
                        .intern cnct,dscnt,hold,listen,xmit,conf
                        .intern scnct,slistn,dlistn,dxmit,dhold
                        .intern rinsit,unrins,sndit,rmvgnd
                        .intern rnstim,prttyp,midio,unconf
                        .intern gusain,flshit,sethk,clrhk .extern sxblk,push16,confem .insert pcmitmem.dfn
                        ;PC Mite Memory definition 4-07-92

C000                    consig  =       0C000h          ;console queue
C020                    rcvq    =       0C020h          ;receive message queue
C030                    xmtq    =       0C030h          ;xmit message queue
C100                    rcvbfs  =       0C100h          ;receive buffers
C200                    xmtbfs  =       0C200h          ;transmit buffers C700                    ttgen1  =       0C700h          ;DTMF generator 1 flag
C701                    ttgen2  =       0C701h          ;DTMF generator 2 flag
C702                    ttdet1  =       0C702h          ;DTMF detector 1 flag
C703                    ttdet2  =       0C703h          ;DTMF detector 2 flag
C704                    ttdet3  =       0C704h          ;DTMF detector 3 flag
```

```
C708        cnf1     =  0C708h       ;conference port 1
C709        cnf2     =  0C709h       ;conference port 2
C70A        cnf3     =  0C70Ah       ;conference port 3
C710        flshtm   =  0C710h       ;flash-hook generator timers
C720        ttdbf1   =  0C720h       ;DTMF detector buffer 1
C740        ttdbf2   =  0C740h       ;DTMF detector buffer 2
C760        ttdbf3   =  0C760h       ;DTMF detector buffer 3
C7C0        ttsbf1   =  0C7C0h       ;DTMF generator buffer 1
C7E0        ttsbf2   =  0C7E0h       ;DTMF generator buffer 2
C800        snstbl   =  0C800h       ;port status table
C808        beltmr   =  0C808h       ;phone bell timer
C810        typtbl   =  0C810h       ;port type table
C818        prottbl  =  0C818h       ;protocol table
C820        statbl   =  0C820h       ;state table
C828        onhkf    =  0C828h       ;on-hook flag
C829        isens0   =  0C829h       ;current sense table
C82A        isens1   =  0C82Ah       ;100 msec current table
C82B        isens2   =  0C82Bh       ;200 msec current table
C82C        ofhkf    =  0C82Ch       ;off-hook flag
C830        rins0    =  0C830h       ;rins0 sample
C831        rins1    =  0C831h       ;rins 100 msec sample
C832        rins2    =  0C832h       ;rins 200 msec sample
C833        rins1s   =  0C833h       ;rins 1 sec. sample
C834        rins2s   =  0C834h       ;rins 2 sec. sample
C835        rnsfls   =  0C835h       ;rins detect flag
C836        rnstmr   =  0C836h       ;rins clear timers
C840        srvfls   =  0C840h       ;ground removed flag
C841        snd0     =  0C841h       ;ground 0 msec.
C842        snd1     =  0C842h       ;ground 100 msec.
C843        snd2     =  0C843h       ;ground 200 msec.
C844        gasfls   =  0C844h       ;ground asserted flag
C848        rnst0    =  0C848h       ;ring trip 0 msec.
C849        rnst1    =  0C849h       ;ring trip 100 msec.
C84A        rnst2    =  0C84Ah       ;ring trip 200 msec
C84B        rnstf    =  0C84Bh       ;ring trip flag
C84C        rmask    =  0C84Ch       ;ring mask
C850        plsbf0   =  0C850h       ;DID pulse buffer 0 msec.
C851        plsbf1   =  0C851h       ;DID pulse buffer 10 msec.
C852        plsbf2   =  0C852h       ;DID pulse buffer 20 msec.
C853        plsfls   =  0C853h       ;pulse flag
C855        dmask    =  0C855h       ;DID mask
C858        plscnt   =  0C858h       ;DID pulse count
C860        didst    =  0C860h       ;DID state
C868        didtmr   =  0C868h       ;DID timers
C870        didnum   =  0C870h       ;DID number
C878        didcnt   =  0C878h       ;DID number counter
C880        didbfs   =  0C880h       ;DID number buffers
C8E0        flshbf   =  0C8E0h       ;flash-hook detection buffers
C8E6        flshfls  =  0C8E6h       ;flash-hook flag
C8E7        onhkf2   =  0C8E7h       ;on-hook flag for phones & E&M
C8E8        lnflag   =  0C8E8h       ;line flag
C8F0        codecb   =  0C8F0h       ;codec buffer FB00        xmtflg   =  0FB00h       ;transmit flag
FB01        rcvflg   =  0FB01h       ;receive flag
FB02        rcvbox   =  0FB02h       ;receive box
FB40        xmtbox   =  0FB40h       ;transmit mailbox
FB80        xstate   =  0FB80h       ;auxiliary state table
            .insert pcmiteio.dfn
            ;PC Mite I/O definitions 02-20-92

0000        CA0      =  0            ;serial channel 0 control registers
0002        CB0      =  2            ;serial channel 0 status register
0004        ST0      =  4
0006        TDR0     =  6            ;console transmit data
0008        RDR0     =  8            ;console receive data 0001        CA1      =  1            ;serial channel 1 control registers
0003        CB1      =  3
0005        ST1      =  5            ;status register
0007        TDR1     =  7            ;transmit data
0009        RDR1     =  9            ;receive data 000C        TMDR0    =  0Ch          ;timer register
000E        RLDR0L   =  0Eh          ;timer 0 load register
000F        RLDR0H   =  0Fh
0010        TCR      =  10h          ;timer control register 0032        DCNTL    =  32h          ;wait state control
0033        IL       =  33h          ;interupt vector
0034        ITC      =  34h          ;interupt control register
0036        RCR      =  36h          ;refresh register 00EE        dspdat   =  0EEh         ;DSP data port
00EF        dspst    =  0EFh         ;DSP status port (bits 4-7)
00EF        rotsw    =  0EFh         ;card select rotary switch (bits 0-3)

00F0        msmb     =  0F0h         ;microwire 2nd byte
00F1        mfmb     =  0F1h         ;microwire 1st byte
00FA        mcs      =  0FAh         ;chip select output register
00FB        mskp     =  0FBh         ;clock polarity control byte
00FC        mwm      =  0FCh         ;mode register
00FD        mskr     =  0FDh         ;clock rate register
00FE        mst      =  0FEh         ;status register
00FF        mpd      =  0FFh         ;pin definition register
```

```
                                ;generate a state message

0000'   F5              stmss:  push    AF              ;save the port #
0001'   DD21 0000       "       ld      IX,msgbuf       ;the message buffer
0005'   DD360053        "       ld      (IX),"S"
0009'   DD7101          "       ld      (IX + 1),C      ;new state
000C'   F630            "       or      "0"
000E'   DD7703          "       ld      (IX + 3),A
0011'   DBEF            "       in      A,(rotsw)       ;read in the rotary switch
0013'   E60F            "       and      0Fh
0015'   F630            "       or      "0"             ;card #
0017'   DD7702          "       ld      (IX + 2),A
001A'   DD360400        "       ld      (IX + 4),0
001E'   CD 0000 04      "       call    sxblk           ;get a message block
0021'   21 0000         "       ld      HL,msgbuf
0024'   01 0005         "       ld      BC,5
0027'   EDB0            "       ldir                    ;put message into the block
0029'   21 CB30         "       ld      HL,xmtq         ;transmit queue
002C'   CD 0000 05      "       call    push16          ;put block number onto the queue
002F'   F1              "       pop     AF
0030'   C9              "       ret ;set the off-hook flag 0031'   0600            sethk:  ld      B,0
0033'   4F              "       ld      C,A
0034'   21 CBEB         "       ld      HL,lnflgs
0037'   09              "       add     HL,BC
0038'   CBC6            "       set     0,(HL)          ;set the flag
003A'   C9              "       ret ;clear the off-hook flag 003B'   0600            clrhk:  ld      B,0
003D'   4F              "       ld      C,A
003E'   21 CBEB         "       ld      HL,lnflgs
0041'   09              "       add     HL,BC
0042'   CB86            "       res     0,(HL)          ;clear the flag
0044'   C9              "       ret ;connect a port 0045'   21 0066'        cnct:   ld      HL,cnctbl       ;connect parameter table
0048'   CD 01BC'        "       call    codbf
004B'   F5              "       push    AF
004C'   7A              cncts:  ld      A,D
004D'   32 CBF0         "       ld      (codecb),A      ;transmit timeslot
0050'   7B              "       ld      A,E
0051'   32 CBF2         "       ld      (codecb + 2),A  ;receive timeslot
0054'   F1              "       pop     AF
0055'   C3 01E7'        "       jp      midio           ;output values ;connect a ground start line 0058'   21 0066'        scnct:  ld      HL,cnctbl
005B'   CD 01BC'        "       call    codbf
005E'   F5              "       push    AF
005F'   3E14            "       ld      A,14h
0061'   32 CBF4         "       ld      (codecb + 4),A  ;ground assert relay
0064'   18E6            "       jr      cncts 0066'   80D2            cnctbl: .byte   80h,0D2h        ;set transmit timeslot
0068'   81CA            "       .byte   81h,0CAh        ;select receive timeslot
006A'   1B0A            "       .byte   1Bh,0Ah         ;interface latch, sieze, power up
006C'   FF              "       .byte   0FFh ;disconnect a port 006D'   21 0076'        dscnt:  ld      HL,dsctbl
0070'   CD 01BC'        "       call    codbf
0073'   C3 01E7'        "       jp      midio 0076'   00CA            dsctbl: .byte   00h,0CAh        ;disable transmit
0078'   00D2            "       .byte   00h,0D2h        ;disable receive
007A'   1C8A            "       .byte   1Ch,08Ah        ;interface latch, open relays, power down
007C'   FF              "       .byte   0FFh ;put a port on hold 007D'   21 0086'        hold:   ld      HL,hldtbl
0080'   CD 01BC'        "       call    codbf
0083'   C3 01E7'        "       jp      midio 0086'   00CA            hldtbl: .byte   00h,0CAh        ;disable Rx
0088'   00D2            "       .byte   00h,0D2h        ;disable Tx
008A'   18BA            "       .byte   18h,0BAh        ;close seize relay, power down
008C'   FF              "       .byte   0FFh ;put a port on hold, don't change seize relay 008D'   21 0096'        dhold:  ld      HL,dhldtb
0090'   CD 01BC'        "       call    codbf
0093'   C3 01E7'        "       jp      midio 0096'   00CA            dhldtb: .byte   00h,0CAh        ;disable Rx
```

```
 -0028'  00A2                        .byte   00h,0D2h
 -0029'  FF                          .byte   0FFh                ;disable Dx0

;set port to listen

-00BD'  21 00C1'        listen: ld      HL,listbl
 008E'   CD 01DC'                call    codbf
 00A1'   F5                      push    AF
                        listn:  ld      A,E
 00A3'   32 CBF2                 ld      (codecb + 2),A      ;recieve timeslot
 00A6'   F1                      pop     AF
 00A7'   C3 01E7'                jp      midio 00AA'   21 00C8'        dlistn: ld      HL,lstbl2
 00AD'   CD 01DC'                call    codbf                   ;don't change sieze relay
 00B0'   F5                      push    AF
 00B1'   18CF                    jr      listn 00B3'   21 00C1'        dlistn: ld      HL,listbl
 00B6'   CD 01DC'                call    codbf                   ;listen for ground start port to ring
 00B9'   F5                      push    AF
 00BA'   3E14                    ld      A,14h
 00BC'   32 CBF4                 ld      (codecb + 4),A      ;ground assert relay
 00BF'   18C1                    jr      listn 00C1'   00CA            listbl: .byte   00h,0CAh            ;disable Dx0
 00C3'   C4CA                    .byte   0C4h,0CAh           ;recieve timeslot
 00C5'   180A                    .byte   18h,0Ah             ;seize, power up
 00C7'   FF                      .byte   0FFh 00C8'   00CA            lstbl2: .byte   00h,0CAh            ;disable Dx0
 00CA'   C4CA                    .byte   0C4h,0CAh           ;recieve timeslot
 00CC'   FF                      .byte   0FFh ;set port to transmit 00CD'   21 00E8'        dxmit:  ld      HL,xmtbl2
 00D0'   1803                    jr      xmit2                   ;don't change sieze relay
 00D2'   21 00E1'        xmit:   ld      HL,xmitbl
 00D5'   CD 01DC'        xmit2:  call    codbf                   ;close seize relay
 00D8'   F5                      push    AF
 00D9'   7A                      ld      A,D
 00DA'   32 CBF2                 ld      (codecb + 2),A      ;transmit timeslot
 00DD'   F1                      pop     AF
 00DE'   C3 01E7'                jp      midio 00E1'   40D2            xmitbl: .byte   040h,0D2h           ;disable Dx1
 00E3'   BFD2                    .byte   0BFh,0D2h           ;transmit timeslot
 00E5'   180A                    .byte   18h,0Ah             ;seize, power up
 00E7'   FF                      .byte   0FFh 00E8'   40D2            xmtbl2: .byte   40h,0D2h            ;Disable Dx1
 00EA'   BFD2                    .byte   0BFh,0D2h           ;transmit timeslot
 00EC'   FF                      .byte   0FFh ;conference a port 00ED'   21 0100'        conf:   ld      HL,cnftbl
 00F0'   CD 01DC'                call    codbf
 00F3'   F5                      push    AF
 00F4'   7A                      ld      A,D
 00F5'   32 CBF0                 ld      (codecb),A          ;transmit timeslot
 00F8'   7B                      ld      A,E
 00F9'   32 CBF2                 ld      (codecb + 2),A      ;receive timeslot
 00FC'   F1                      pop     AF
 00FD'   C3 01E7'                jp      midio 0100'   80D2            cnftbl: .byte   80h,0D2h            ;set transmit timeslot
 0102'   C7CA                    .byte   0C7h,0CAh           ;select conference bridge rcv timeslot
 0104'   180A                    .byte   18h,0Ah             ;sieze, power up
 0106'   FF                      .byte   0FFh ;ring a phone 0107'   F5              ringit: push    AF
 0108'   47                      ld      B,A
 0109'   4F                      ld      C,A
 010A'   04                      inc     B                   ;port #
 010B'   3E80                    ld      A,80h
 010D'   07              ..lp:   rlca
 010E'   10FB                    djnz    ..lp
 0110'   21 C84C                 ld      HL,rmask
 0113'   B6                      or      (HL)
 0114'   77                      ld      (HL),A              ;set mask
 0115'   21 C808                 ld      HL,beltmr
 0118'   79                      ld      A,C
 0119'   85                      add     A,L
 011A'   6F                      ld      L,A
 011B'   3606                    ld      (HL),6              ;6 seconds
 011D'   F1                      pop     AF
 011E'   21 0127'                ld      HL,rnstbl
 0121'   CD 01DC'                call    codbf
 0124'   C3 01E7'                jp      midio
```

```
                            rngtbl: .byte    04h,0Ah         ;toggle ring bit
-0127'  040A                        .byte    1Ch,0Ah         ;toggle it back
 0129'  1C0A                        .byte    0FFh
 012B'  FF ;stop a phone from ringing unring: push    AF
 012C'  F5                          ld      B,A             ;port #
 012D'  47                          inc     B
 012E'  04                          ld      A,7Fh           ;mask
 012F'  3E7F                ..lp:   rlca
 0131'  07                          djnz    ..lp
 0132'  10FD                        ld      HL,rmask
 0134'  21 CB4C                     and     (HL)            ;clear ring mask
 0137'  A6                          ld      (HL),A
 0138'  77                          pop     AF
 0139'  F1                          ld      HL,unrnst
 013A'  21 0143'                    call    codbf
 013D'  CD 01DC'                    jp      midio
 0140'  C3 01E7' unrnst: .byte   0Ch,0Ah
 0143'  0C0A                        .byte   1Ch,0Ah
 0145'  1C0A                        .byte   0FFh
 0147'  FF ;assert ground on a ground start port sndit:  ld      HL,sndtbl
 0148'  21 015A'                    call    codbf
 014B'  CD 01DC'                    jp      midio
 014E'  C3 01E7'

;remove ground on a ground start port rmvsnd: ld      HL,rstbl
 0151'  21 015D'                    call    codbf
 0154'  CD 01DC'                    jp      midio
 0157'  C3 01E7'
                                                            ;assert ground, power up
                            sndtbl: .byte   1Ah,0Ah,0FFh    ;remove ground, power up
 015A'  1A0AFF              rstbl:  .byte   1Bh,0Ah,0FFh
 015D'  1B0AFF ;generate a flashhook fshit:  ld      HL,fshtbl
 0160'  21 0169'                    call    codbf
 0163'  CD 01DC'                    jp      midio
 0166'  C3 01E7'
                                                            ;open seize relay, power up
                            fshtbl: .byte   1Ch,0Ah,0FFh
 0169'  1C0AFF ;TX gain, RX gain, hybrid 1, hybrid 2, hybrid 3 hygain: push    DE
 016C'  D5                          push    BC
 016D'  C5                          push    AF
 016E'  F5                          ld      B,0             ;port type
 016F'  1600                        ld      E,C
 0171'  59                          push    DE
 0172'  D5                          ld      HL,portbl       ;port setup table
 0173'  21 01BE'                    ld      DE,codecb       ;default values
 0176'  11 CBF0                     ld      BC,11
 0179'  01 000B                     ldir
 017C'  EDB0                        pop     DE
 017E'  D1                          ld      HL,shtbl
 017F'  21 019B'                    add     HL,DE
 0182'  19                          sla     E
 0183'  CB23                        sla     E
 0185'  CB23                        add     HL,DE           ;point at values for port type
 0187'  19                          ld      DE,codecb
 0188'  11 CBF0                     ld      B,5
 018B'  0605                ..lp:   ld      A,(HL)          ;put values in output table
 018D'  7E                          ld      (DE),A
 018E'  12                          inc     DE
 018F'  13                          inc     HL
 0190'  23                          djnz    ..lp
 0191'  10F9                        pop     AF              ;output values
 0193'  F1                          call    midio
 0194'  CD 01E7'                    pop     BC
 0197'  C1                          pop     DE
 0198'  D1                          ret
 0199'  C9 shtbl:  .byte   0B4h,0F6h,0ECh,24h,0E5h    ;undefined port
 019B'  B4F6EC24E5                  .byte   0B4h,0FEh,0EC5h,20h,98h    ;door port
 01A0'  B4FEEC2098                  .byte   0B4h,0F5h,0EBh,23h,0E5h    ;battery feed port
 01A5'  B4F5EB23E5                  .byte   0B4h,0F5h,0EBh,23h,0E5h    ;DID port
 01AA'  B4F5EB23E5                  .byte   0B4h,0FEh,0EC5h,20h,98h    ;ground start port
 01AF'  B4FEEC2098                  .byte   0B3h,0F4h,0EBh,28h,20h     ;E&M port
 01B4'  B3F4EB2820                  .byte   0B4h,0FCh,0EEh,24h,98h     ;phone port
 01B9'  B4FCEE2498 portbl: .byte   0B4h,0AAh       ;transmit gain
 01BE'  B4AA                        .byte   0F6h,0A2h       ;receive gain
 01C0'  F6A2                        .byte   0ECh,32h        ;hybrid 1
 01C2'  EC32                        .byte   24h,5Ah         ;hybrid 2
 01C4'  245A                        .byte   0E5h,42h        ;hybrid 3
 01C6'  E542                        .byte   0FFh
 01C8'  FF
```

```
                        ;set the ring detect timer

01C9'   F5              rnstim: push    AF
01CA'   21 C838                 ld      HL,rnstmr
01CD'   85                      add     A,L
01CE'   6F                      ld      L,A
01CF'   3608                    ld      (HL),8          ;set the timer to 8 seconds
01D1'   F1                      pop     AF
01D2'   C9                      ret ;set the port type 01D3'   21 C810         prttyp: ld      HL,tyrtbl       ;port type table
01D6'   4F                      ld      C,A
01D7'   0600                    ld      B,0
01D9'   09                      add     HL,BC
01DA'   7E                      ld      A,(HL)          ;port type
01DB'   C9                      ret 01DC'   C5              codbf:  push    BC
01DD'   11 CBF0                 ld      DE,codecb
01E0'   01 0007                 ld      BC,7
01E3'   EDB0                    ldir
01E5'   D1                      pop     DE
01E6'   C9                      ret ;Setup CODEC in A using values in the codec buffer 01E7'   21 CBF0         mtdio:  ld      HL,codecb       ;Codec parameter buffer
01EA'   F3                      di                      ;disable interrupts
01EB'   03FA                    out     (mcs),A         ;select CODEC
01ED'   7E              ..lp:   ld      A,(HL)          ;check for the end of the table
01EE'   FEFF                    cp      0FFh
01F0'   280F                    jr      z,..dn          ;if FF, done
01F2'   0EF0                    ld      C,msmd
01F4'   EDA3                    outi                    ;output 2nd byte
01F6'   0EF1                    ld      C,mfmd
01F8'   EDA3                    outi                    ;output 1st byte
01FA'   DB5F            ..wt:   in      A,(wst)         ;wait until ready for more
01FC'   A7                      and     A
01FD'   28FB                    jr      z,..wt
01FF'   18EC                    jr      ..lp
0201'   3E0F            ..dn:   ld      A,0Fh           ;deselect the chip
0203'   D3FA                    out     (mcs),A
0205'   FB                      ei                      ;reenable interrupts
0206'   C9                      ret ;unconference a port 0207'   E5              unconf: push    HL
0208'   F5                      push    AF
0209'   21 C708                 ld      HL,cnfl         ;check the conference inputs for port
020C'   BE                      cp      (HL)
020D'   2808                    jr      z,..x
020F'   23                      inc     HL
0210'   BE                      cp      (HL)
0211'   2804                    jr      z,..x
0213'   23                      inc     HL
0214'   BE                      cp      (HL)
0215'   2005                    jr      nz,..d
0217'   36FF            ..x:    ld      (HL),0FFh       ;free up the conference input
0219'   CD 0000:06              call    confem          ;reset DSP timeslots
021C'   F1              ..d:    pop     AF
021D'   E1                      pop     HL
021E'   C9                      ret 0000*                           .loc    .data.

0000*                   msgbuf: .blkb   8

.end
                        .ident  state
                        .id     040792
                        .ver    1,3             ;listen stimuli changes
                                                ;flash-hook changes
                        ;ver    1,2             ;remove on-hook acknowledge
                        ;ver    1,1             ;new DSP code .intern state .extern cnct,dscnt,nold,dxmit,listen,conf
                        .extern scnct,slistn,dlistn,dxmit,dnold
                        .extern ringit,unrings,sndit,rcvend
                        .extern rnstim,stmss,prttyp,unconf
                        .extern clrttd,sethk,clrhk .insert pcmitmem.dfn
                        ;PC Mite Memory definition 4-07-92

C000                    consls  =       0C000h          ;console queue
C020                    rcvs    =       0C020h          ;receive message queue
C030                    xmts    =       0C030h          ;xmit message queue
C100                    rcvbfs  =       0C100h          ;receive buffers
C200                    xmtbfs  =       0C200h          ;transmit buffers
```

```
C700        ttsen1   =   0C700h      ;DTMF generator 1 flag
C701        ttsen2   =   0C701h      ;DTMF generator 2 flag
C702        ttdet1   =   0C702h      ;DTMF detector 1 flag
C703        ttdet2   =   0C703h      ;DTMF detector 2 flag
C704        ttdet3   =   0C704h      ;DTMF detector 3 flag
C708        cnf1     =   0C708h      ;conference port 1
C709        cnf2     =   0C709h      ;conference port 2
C70A        cnf3     =   0C70Ah      ;conference port 3
C710        flshtm   =   0C710h      ;flash-hook generator timers
C720        ttdbf1   =   0C720h      ;DTMF detector buffer 1
C740        ttdbf2   =   0C740h      ;DTMF detector buffer 2
C760        ttdbf3   =   0C760h      ;DTMF detector buffer 3
C7C0        ttsbf1   =   0C7C0h      ;DTMF generator buffer 1
C7E0        ttsbf2   =   0C7E0h      ;DTMF generator buffer 2
C800        snstbl   =   0C800h      ;port status table
C808        beltmr   =   0C808h      ;phone bell timer
C810        typtbl   =   0C810h      ;port type table
C818        protbl   =   0C818h      ;protocol table
C820        statbl   =   0C820h      ;state table
C828        onhkf    =   0C828h      ;on-hook flag
C829        isens0   =   0C829h      ;current isense table
C82A        isens1   =   0C82Ah      ;100 msec current table
C82B        isens2   =   0C82Bh      ;200 msec current table
C82C        ofhkf    =   0C82Ch      ;off-hook flag
C830        rins0    =   0C830h      ;rins0 sample
C831        rins1    =   0C831h      ;rins 100 msec sample
C832        rins2    =   0C832h      ;rins 200 msec sample
C833        rins1s   =   0C833h      ;rins 1 sec. sample
C834        rins2s   =   0C834h      ;rins 2 sec. sample
C835        rnsflg   =   0C835h      ;rins detect flag
C838        rnstmr   =   0C838h      ;rins clear timers
C840        srvflg   =   0C840h      ;sround removed flag
C841        snd0     =   0C841h      ;sround 0 msec.
C842        snd1     =   0C842h      ;sround 100 msec.
C843        snd2     =   0C843h      ;sround 200 msec.
C844        sasflg   =   0C844h      ;sround asserted flag
C848        rnst0    =   0C848h      ;rins trip 0 msec.
C849        rnst1    =   0C849h      ;rins trip 100 msec.
C84A        rnst2    =   0C84Ah      ;rins trip 200 msec.
C84B        rnstf    =   0C84Bh      ;rins trip flag
C84C        rmask    =   0C84Ch      ;rins mask
C850        plsbf0   =   0C850h      ;DID pulse buffer 0 msec.
C851        plsbf1   =   0C851h      ;DID pulse buffer 10 msec.
C852        plsbf2   =   0C852h      ;DID pulse buffer 20 msec.
C853        plsflg   =   0C853h      ;pulse flag
C855        dmask    =   0C855h      ;DID mask
C858        plscnt   =   0C858h      ;DID pulse count
C860        didst    =   0C860h      ;DID state
C868        didtmr   =   0C868h      ;DID timers
C870        didnum   =   0C870h      ;DID number
C878        didcnt   =   0C878h      ;DID number counter
C880        didbfs   =   0C880h      ;DID number buffers
C8E0        flshbf   =   0C8E0h      ;flash-hook detection buffers
C8E6        flshfg   =   0C8E6h      ;flash-hook flag
C8E7        onhkf2   =   0C8E7h      ;on-hook flag for phones & E&M
C8E8        lnflgs   =   0C8E8h      ;line flags
C8F0        codecb   =   0C8F0h      ;codec buffer F800        xmtflg   =   0F800h      ;transmit flag
F801        rcvflg   =   0F801h      ;receive flag
F802        rcvbox   =   0F802h      ;receive box
F840        xmtbox   =   0F840h      ;transmit mailbox
F880        xstate   =   0F880h      ;auxiliary state table ;states 0000        idlest   =   0
0001        cnctst   =   1
0002        holdst   =   2
0003        ringst   =   3
0004        xmitst   =   4
0005        belst    =   5
0006        lstnst   =   6
0007        ofhkst   =   7
0008        confst   =   8
0009        fhkist   =   9
000A        onhkwt   =   10      ;not implemented
000B        ofhknc   =   11      ;not implemented .remark "Stimuli disconnect      =   0
            connect         =   1
            hold            =   2
            rins detect     =   3
            xmit tone       =   4
            onhook          =   5
            listen tone     =   6
            ofhook          =   7
            conference      =   8
            rins clear      =   9
            sround detected =   10
            digits done     =   11"
```

```
.remark "State Messages idle      =    I
connect   =    C
hold      =    H
ring      =    R
xmit      =    X
listen    =    L          not-implemented
on-hook   =    N
off-hook  =    F"

0000'   DDE5                state:  push    IX
0002'   E5                          push    HL
0003'   D5                          push    DE
0004'   C5                          push    BC
0005'   ED53 0002*                  ld      (slotr),DE      ;save the time slots
0009'   ED43 0000*                  ld      (line),BC       ;save the line and argument
000D'   3E00                        ld      A,0
000F'   21 CB20                     ld      HL,statbl
0012'   09                          add     HL,BC           ;set the state of the line
0013'   4E                          ld      C,(HL)
0014'   CB21                        sla     C
0016'   CB21                        sla     C
0018'   81                          add     A,C             ;x 4
0019'   CB21                        sla     C
001B'   81                          add     A,C             ;x 8 for 12 total
001C'   4F                          ld      C,A
001D'   DD21 040C'                  ld      IX,sentr
0021'   DD09                        add     IX,BC
0023'   DD09                        add     IX,BC
0025'   DD6E00                      ld      L,(IX)
0028'   DD6601                      ld      H,(IX + 1)
002B'   7C                          ld      A,H
002C'   B5                          or      L
002D'   2801                        jr      z,estat
002F'   E9                          jp      (HL)

0030'   C1                  estat:  pop     BC
0031'   D1                          pop     DE
0032'   E1                          pop     HL
0033'   DDE1                        pop     IX
0035'   C9                          ret                     ;restore registers and return 0036'   5F                  cstat:  ld      E,A
0037'   1600                        ld      D,0
0039'   21 CB20                     ld      HL,statbl       ;change the state table
003C'   19                          add     HL,DE
003D'   71                          ld      (HL),C
003E'   21 F8B0                     ld      HL,xstate       ;change the auxillary state table
0041'   19                          add     HL,DE
0042'   71                          ld      (HL),C
0043'   C9                          ret ;connect in the idle state 0044'   3A 0000*            idle1:  ld      A,(line)
0047'   3E01                        ld      C,cnctst
0049'   CD 0036'                    call    cstat
004C'   0E43                        ld      C,"C"           ;connect state
004E'   CD 0000:14                  call    stmsg
0051'   ED5B 0002*                  ld      DE,(slotr)      ;set the time slots
0055'   CD 0000:15                  call    prttyp
0058'   FE04                        cp      4               ;ground start?
005A'   2807                        jr      z,..snd
005C'   79                          ld      A,C
005D'   CD 0000:04                  call    cnct            ;connect the ports
0060'   C3 0030'                    jp      estat
0063'   79                  ..snd:  ld      A,C
0064'   CD 0000:0A                  call    scnct
0067'   C3 0030'                    jp      estat ;hold in the idle state 006A'   3A 0000*            idle2:  ld      A,(line)
006D'   CD 0000:15                  call    prttyp          ;get the port type
0070'   FE04                        cp      4               ;ground start line
0072'   2815                        jr      z,..snd
0074'   FE06                        cp      6               ;phone
0076'   2818                        jr      z,..phn
0078'   79                          ld      A,C
0079'   0E02                        ld      C,holdst        ;hold state
007B'   CD 0036'                    call    cstat
007E'   0E48                        ld      C,"H"           ;hold state
0080'   CD 0000:14                  call    stmsg
0083'   CD 0000:06                  call    hold            ;put port on hold
0086'   C3 0030'                    jp      estat
0089'   79                  ..snd:  ld      A,C
008A'   0E02                        ld      C,holdst        ;change state to hold
008C'   CD 0036'                    call    cstat
008F'   CD 0000:11                  call    sndit           ;assert ground
0092'   C3 0030'                    jp      estat
```

```
 0095'  79           ..zbn:  ld    A,C
 0096'  0E05                 ld    C,bellst      ;bell state
 0098'  CD 0036'             call  cstat
 009B'  CD 0000:0F           call  rinsit        ;ring a phone
 009E'  C3 0030'             jp    estat ;ring detect in the idle state (also ground detect)

00A1'  3A 0000#     idle3:  ld    A,(line)
 00A4'  CD 0000:13           call  rnstim        ;set ring clear timer
 00A7'  0E03                 ld    C,rinsst      ;ringing state
 00A9'  CD 0036'             call  cstat         ;change the state
 00AC'  0E52                 ld    C,"R"         ;ring message
 00AE'  CD 0000:14           call  stmsg
 00B1'  C3 0030'             jp    estat ;transmit in the idle state 00B4'  3A 0000#     idle4:  ld    A,(line)
 00B7'  0E04                 ld    C,xmitst      ;transmit state
 00B9'  CD 0036'             call  cstat
 00BC'  0E58                 ld    C,"X"         ;transmitting state
 00BE'  CD 0000:14           call  stmsg
 00C1'  ED5B 0002*           ld    DE,(slotr)
 00C5'  CD 0000:08           call  listen
 00C8'  3A 0000#             ld    A,(line)
 00CB'  ED5B 0002*           ld    DE,(slotr)
 00CF'  CD 0000:07           call  xmit          ;set up transmit time slot
 00D2'  C3 0030'             jp    estat ;on-hook in idle state 00B5'  3A 0000#     idle5:  ld    A,(line)
 00B8'  CD 0000:19           call  clrhk         ;clear the off hook flag
 00BB'  C3 0030'             jp    estat ;listen in the idle state 00BE'  3A 0000#     idle6:  ld    A,(line)
 00E1'  CD 0000:15           call  prttyp        ;set the port type
 00E4'  FE04                 cp    4             ;ground start line?
 00E6'  2815                 jr    z,..snd
 00E8'  79                   ld    A,C
 00E9'  0E06                 ld    C,lstnst      ;listen state
 00EB'  CD 0036'             call  cstat
 00EE'  0E4C                 ld    C,"L"         ;listening state
 00F0'  CD 0000:14           call  stmsg
 00F3'  ED5B 0002*           ld    DE,(slotr)
 00F7'  CD 0000:08           call  listen        ;set up receive time slot
 00FA'  C3 0030'             jp    estat 00FD'  79           ..snd:  ld    A,C
 00FE'  0E06                 ld    C,lstnst      ;listen state
 0100'  CD 0036'             call  cstat
 0103'  ED5B 0002*           ld    DE,(slotr)
 0107'  CD 0000:0B           call  slistn        ;set up receive time slot and assert ground
 010A'  C3 0030'             jp    estat ;off-hook in the idle state 010D'  3A 0000#     idle7:  ld    A,(line)
 0110'  0E07                 ld    C,orhkst      ;off hook state
 0112'  CD 0036'             call  cstat
 0115'  CD 0000:18           call  sethk         ;set the off-hook flag
 0118'  0E46                 ld    C,"F"         ;off-hook
 011A'  CD 0000:14           call  stmsg         ;send state message
 011D'  C3 0030'             jp    estat ;conference from the idle state 0120'  3A 0000#     idle8:  ld    A,(line)
 0123'  0E08                 ld    C,confst
 0125'  CD 0036'             call  cstat         ;change state to conference
 0128'  ED5B 0002*           ld    DE,(slotr)
 012C'  CD 0000:09           call  conf          ;set up conference time slots
 012F'  C3 0030'             jp    estat ;disconnect in the connect state 0132'  3A 0000#     cnct0:  ld    A,(line)      ;port #
 0135'  CD 0000:15           call  prttyp        ;set the port type
 0138'  FE04                 cp    4
 013A'  DA 0151'             jp    c,..idl
 013D'  21 CB00              ld    HL,snstbl
 0140'  09                   add   HL,BC
 0141'  CB7E                 bit   7,(HL)        ;check for current sense
 0143'  200C                 jr    nz,..idl      ;if no current, make idle
 0145'  79                   ld    A,C
 0146'  0E09                 ld    C,fhkist      ;off hook idle state
 0148'  CD 0036'             call  cstat
 014B'  CD 0000:05           call  dscnt
 014E'  C3 0030'             jp    estat
 0151'  79           ..idl:  ld    A,C
 0152'  0E00                 ld    C,idlest      ;change state to idle
 0154'  CD 0036'             call  cstat
```

```
                                                    ld      C,"I"
 0157'   0E49                                       call    stmss        ;idle message
 0159'   CD 0000:14                                 call    dscnt
 015C'   CD 0000:05                                 jp      estat
 015F'   C3 0030'

;connect in the connect state

0162'   3A 0000*        cnct1:  ld      A,(line)
 0165'   0E01                    ld      C,cnctst     ;change state to connect
 0167'   CD 0036'                call    cstat
 016A'   0E43                    ld      C,"C"        ;connect message
 016C'   CD 0000:14              call    stmss
 016F'   E658 0000*              ld      0E,(slotr)   ;use slots
 0173'   CD 0000:04              call    cnct         ;connect the port
 0176'   C3 0030'                jp      estat ;hold in connect state 0179'   3A 0000*        cnct2:  ld      A,(line)
 017C'   0E02                    ld      C,holdst
 017E'   CD 0036'                call    cstat        ;hold state
 0181'   0E48                    ld      C,"H"        ;hold message
 0183'   CD 0000:14              call    stmss
 0186'   CD 0000:06              call    hold         ;put port on hold
 0189'   C3 0030'                jp      estat ;on-hook in connect state 018C'   3A 0000*        cnct5:  ld      A,(line)
 018F'   0E00                    ld      C,idlest     ;idle state
 0191'   CD 0036'                call    cstat
 0194'   CD 0000:19              call    clrhk        ;clear the off-hook flag
 0197'   0E49                    ld      C,"I"        ;idle message
 0199'   CD 0000:14              call    stmss
 019C'   CD 0000:05              call    dscnt        ;disconnect the port
 019F'   C3 0030'                jp      estat ;give a tone to a connected call 01A2'   3A 0000*        cnct6:  ld      A,(line)
 01A5'   CD 0000:06              call    hold
 01A8'   C3 02CA'                jp      list6

;offhook in connect state

01AB'   3A 0000*        cnct7:  ld      A,(line)
 01AE'   CD 0000:15              call    prttyp
 01B1'   FE05                    cp      5            ;check for E&M or phone
 01B3'   DA 0030'                jp      c,estat      ;if not either, ignore
 01B6'   21 C6EB                 ld      HL,infloss
 01B9'   09                      add     HL,BC
 01BA'   CB46                    bit     0,(HL)
 01BC'   C2 0030'                jp      nz,estat     ;test if already off-hook
 01BF'   79                      ld      A,C
 01C0'   CD 0000:18              call    sethk        ;set the off-hook flag
 01C3'   0E46                    ld      C,"F"
 01C5'   CD 0000:14              call    stmss
 01C8'   C3 0030'                jp      estat ;ground asserted in connect state 01CB'   3A 0000*        cnct10: ld      A,(line)
 01CE'   0E43                    ld      C,"C"
 01D0'   CD 0000:14              call    stmss        ;send a connect message
 01D3'   CD 0000:12              call    rmvsnd
 01D6'   C3 0030'                jp      estat ;disconnect in the hold state 01D9'   3A 0000*        hold0:  ld      A,(line)
 01DC'   CD 0000:15              call    prttyp
 01DF'   FE04                    cp      4            ;set the port type
 01E1'   3814                    jr      c,...idl
 01E3'   21 C80C                 ld      HL,snstbl    ;sensor table
 01E6'   09                      add     HL,BC
 01E7'   CB7E                    bit     7,(HL)
 01E9'   200C                    jr      nz,...idl
 01EB'   79                      ld      A,C
 01EC'   0E09                    ld      C,fhkist     ;off hook idle state
 01EE'   CD 0036'                call    cstat
 01F1'   CD 0000:05              call    dscnt
 01F4'   C3 0030'                jp      estat
 01F7'   79              ...idl: ld      A,C
 01F8'   0E00                    ld      C,idlest     ;change state to idle
 01FA'   CD 0036'                call    cstat
 01FD'   0E49                    ld      C,"I"        ;idle message
 01FF'   CD 0000:14              call    stmss
 0202'   CD 0000:05              call    dscnt
 0205'   C3 0030'                jp      estat ;on-hook in the hold state
```

```
0208'   3A 0000*      hold5:   ld     A,(line)
020B'   0E00                   ld     C,idlest          ;idle state
020D'   CD 0036'               call   cstat
0210'   CD 0000:19             call   clrhk             ;clear the off-hook flag
0213'   0E49                   ld     C,"I"             ;idle message
0215'   CD 0000:14             call   stmss
0218'   CD 0000:05             call   dscnt             ;disconnect the port
021B'   C3 0030'               jp     estat 021E'   3A 0000*      hold10:  ld     A,(line)
0221'   0E48                   ld     C,"H"
0223'   CD 0000:14             call   stmss             ;send the hold message
0226'   CD 0000:12             call   rmvsnd            ;remove the sround
0229'   C3 0030'               jp     estat ;ring detect in ringing state 022C'   3A 0000*      ring3:   ld     A,(line)
022F'   CD 0000:13             call   rnstim            ;reset ring clear timer
0232'   0E52                   ld     C,"R"             ;ring message
0234'   CD 0000:14             call   stmss
0237'   C3 0030'               jp     estat ;ring clear in ringing state 023A'   3A 0000*      ring9:   ld     A,(line)
023D'   0E00                   ld     C,idlest
023F'   CD 0036'               call   cstat             ;change state to idle
0242'   0E49                   ld     C,"I"             ;idle state
0244'   CD 0000:14             call   stmss
0247'   C3 0030'               jp     estat

;

024A'   3A 0000*      xmit0:   ld     A,(line)
024D'   CD 0000:17             call   clrttd            ;clear any touch tone detector
0250'   C3 0109'               jp     noid0

0253'   3A 0000*      xmit1:   ld     A,(line)
0256'   CD 0000:17             call   clrttd            ;clear any touch tone detector
0259'   C3 0162'               jp     cnct1

025C'   3A 0000*      xmit2:   ld     A,(line)
025F'   CD 0000:17             call   clrttd            ;clear any touch tone detector
0262'   C3 0179'               jp     cnct2

0265'   3A 0000*      xmit4:   ld     A,(line)
0268'   CD 0000:17             call   clrttd            ;clear any touch tone detector
026B'   C3 00B4'               jp     idle4

026E'   3A 0000*      xmit5:   ld     A,(line)
0271'   CD 0000:17             call   clrttd            ;clear any touch tone detector
0274'   C3 020B'               jp     hold5

0277'   3A 0000*      xmit6:   ld     A,(line)
027A'   ED5B 0002*             ld     DE,(slotr)
027E'   CD 0000:0C             call   dlistn            ;set the listen timeslot
0281'   C3 0030'               jp     estat 0284'   3A 0000*      xmit8:   ld     A,(line)
0287'   CD 0000:17             call   clrttd            ;clear any touch tone detector
028A'   C3 0120'               jp     idle8

028D'   3A 0000*      xmit11:  ld     A,(line)
0290'   CD 0000:17             call   clrttd            ;clear any touch tone detector
0293'   CD 0000:18             call   sethk             ;set off-hook flag
0296'   0E07                   ld     C,ofhkst          ;change state to off hook
0298'   CD 0036'               call   cstat
029B'   CD 0000:0E             call   dhold             ;don't change sieze relay
029E'   C3 0030'               jp     estat 02A1'   3A 0000*      bel10:   ld     A,(line)
02A4'   0E00                   ld     C,idlest          ;change state to idle
02A6'   CD 0036'               call   cstat
02A9'   0E49                   ld     C,"I"             ;idle message
02AB'   CD 0000:14             call   stmss
02AE'   CD 0000:10             call   unring            ;turn off ringing
02B1'   C3 0030'               jp     estat 02B4'   3A 0000*      bel17:   ld     A,(line)
02B7'   0E07                   ld     C,ofhkst          ;change state to off-hook waiting
02B9'   CD 0036'               call   cstat
02BC'   CD 0000:18             call   sethk
02BF'   0E46                   ld     C,"F"             ;off hook message
02C1'   CD 0000:14             call   stmss
02C4'   CD 0000:10             call   unring            ;turn off the ringing
02C7'   C3 0030'               jp     estat 02CA'   3A 0000*      listo:   ld     A,(line)
02CD'   0E06                   ld     C,lstnst
02CF'   CD 0036'               call   cstat             ;listen state
02D2'   0E4C                   ld     C,"L"
02D4'   CD 0000:14             call   stmss
02D7'   ED5B 0002*             ld     DE,(slotr)
02DB'   CD 0000:0C             call   dlistn            ;set up receive time slot, don't change seize
02DE'   C3 0030'               jp     estat
```

```
02E1'   3A 0000#    lst10:  ld      A,(line)
02E4'   0E4C                ld      C,"L"           ;listening message
02E6'   CD 0000:14          call    stmss
02E9'   CD 0000:12          call    rmvgnd          ;remove the ground
02EC'   C3 0030'            jp      estat ;digits done 02EF'   3A 0000#    lst11:  ld      A,(line)
02F2'   0E02                ld      C,holdst        ;change state to hold
02F4'   CD 0036'            call    estat
02F7'   0E45                ld      C,"E"           ;digit string complete message
02F9'   CD 0000:14          call    stmss
02FC'   CD 0000:06          call    hold            ;put port on hold
02FF'   C3 0030'            jp      estat ;receive digits in off hook state 0302'   3A 0000#    ofhk4:  ld      A,(line)
0305'   0E04                ld      C,xmitst        ;transmit state
0307'   CD 0036'            call    estat
030A'   CD 0000:15          call    prttyp
030D'   FE03                cp      3
030F'   2819                jr      z,..dem         ;is it DID
0311'   FE05                cp      5
0313'   2815                jr      z,..dem         ;or E&N
0315'   79                  ld      A,C
0316'   ED5B 0002#          ld      DE,(slotr)
031A'   CD 0000:08          call    listen
031D'   3A 0000#            ld      A,(line)
0320'   ED5B 0002#          ld      DE,(slotr)
0324'   CD 0000:07          call    xmit
0327'   C3 0030'            jp      estat
032A'   79          ..dem:  ld      A,C
032B'   ED5B 0002#          ld      DE,(slotr)
032F'   CD 0000:0C          call    dlistn
0332'   3A 0000#            ld      A,(line)
0335'   ED5B 0002#          ld      DE,(slotr)
0339'   CD 0000:0B          call    dxmit
033C'   C3 0030'            jp      estat 033F'   3A 0000#    ofhk5:  ld      A,(line)
0342'   0E00                ld      C,idlest        ;change state to idle
0344'   CD 0036'            call    estat
0347'   CD 0000:19          call    clrhk           ;clear the off-hook flag
034A'   0E49                ld      C,"I"           ;idle state
034C'   CD 0000:14          call    stmss
034F'   CD 0000:05          call    dscnt           ;open the relay if needed
0352'   C3 0030'            jp      estat 0355'   3A 0000#    ofhk6:  ld      A,(line)
0358'   0E06                ld      C,lstnst        ;listen state
035A'   CD 0036'            call    estat
035D'   0E4C                ld      C,"L"           ;listening message
035F'   CD 0000:14          call    stmss
0362'   ED5B 0002#          ld      DE,(slotr)      ;receive time slot
0366'   CD 0000:15          call    prttyp
0369'   FE03                cp      3
036B'   2808                jr      z,..dem         ;is it DID
036D'   FE05                cp      5
036F'   2807                jr      z,..dem         ;or E&N
0371'   79                  ld      A,C
0372'   CD 0000:0B          call    listen          ;close sieze relay if not DID or E&N
0375'   C3 0030'            jp      estat
0378'   79          ..dem:  ld      A,C
0379'   CD 0000:0C          call    dlistn          ;don't change seize relay
037C'   C3 0030'            jp      estat ;disconnect from a conference 037F'   3A 0000#    conf0:  ld      A,(line)
0382'   CD 0000:16          call    unconf          ;unconference the port
0385'   C3 0132'            jp      cnct0

;connect from a conference

0388'   3A 0000#    conf1:  ld      A,(line)
038B'   CD 0000:16          call    unconf          ;remove from the conference bridge
038E'   C3 0162'            jp      cnct1

;hold from conference

0391'   3A 0000#    conf2:  ld      A,(line)
0394'   CD 0000:16          call    unconf          ;remove from the conference bridge
0397'   C3 0179'            jp      cnct2
                    ;transmit from conference 039A'   3A 0000#    conf4:  ld      A,(line)
039D'   CD 0000:16          call    unconf          ;unconference the port
03A0'   CD 0000:06          call    hold            ;clear the time slots
03A3'   C3 0084'            jp      idle4

;on-hook in the conference state
```

```
-03A6'  3A 0000*        conf5:   ld      A,(line)
 03A9'  0E00                     ld      C,idlest        ;change state to idle
 03AB'  CD 0036'                 call    cstat
 03AE'  0E49                     ld      C,"I"           ;idle message
 03B0'  CD 0000:14               call    stmss
 03B3'  CD 0000:16               call    unconf          ;unconference the port
 03B6'  CD 0000:05               call    dscnt           ;disconnect it
 03B9'  C3 0030'                 jp      estat ;listen from the conference state 03BC'  3A 0000*        conf6:   ld      A,(line)
 03BF'  CD 0000:16               call    unconf          ;unconference the port
 03C2'  CD 0000:06               call    hold            ;clear the time slots
 03C5'  C3 02CA'                 jp      list6

;on-hook in off-hook idle state

03C8'  3A 0000*        ofhki5:  ld      A,(line)
 03CB'  0E00                     ld      C,idlest        ;change state to idle
 03CD'  CD 0036'                 call    cstat
 03D0'  CD 0000:19               call    clrhk           ;clear the off-hook flag
 03D3'  0E49                     ld      C,"I"           ;idle state
 03D5'  CD 0000:14               call    stmss
        ;                        call    dscnt           ;open the relay if needed
 03D8'  C3 0030'                 jp      estat ;acknowledge in the on-hook idle state 03DB'  3A 0000*        onhk0:   ld      A,(line)
 03DE'  0E00                     ld      C,idlest        ;change state to idle
 03E0'  CD 0036'                 call    cstat
 03E3'  0E49                     ld      C,"I"           ;idle message
 03E5'  CD 0000:14               call    stmss
 03E8'  C3 0030'                 jp      estat 03EB'  3A 0000*        onhk7:   ld      A,(line)
 03EE'  0E0B                     ld      C,ofhknc        ;change state to off-hook new call
 03F0'  CD 0036'                 call    cstat
 03F3'  C3 0030'                 jp      estat 03F6'  3A 0000*        ofnc0:   ld      A,(line)
 03F9'  0E49                     ld      C,"I"           ;send idle message
 03FB'  CD 0000:14               call    stmss
 03FE'  C3 010D'                 jp      idle7

0401'  3A 0000*        ofnc5:   ld      A,(line)
 0404'  0E0A                     ld      C,onhkwt        ;on-hook waiting acknowledge state
 0406'  CD 0036'                 call    cstat
 0409'  C3 0030'                 jp      estat ;idle state 040C'  0000  0044'     sentr:   .word   0,idle1,idle2,idle3,idle4,idle5
 0418'  00DE' 010D'              .word   idle6,idle7,idle8,0,idle3,0

;connect state

0424'  0132' 0162'              .word   cnct0,cnct1,cnct2,0,idle4,cnct5
 0430'  01A2' 01AB'              .word   cnct6,cnct7,idle8,0,cnct10,0

;hold

043C'  01D9' 0162'              .word   hold0,cnct1,cnct2,0,idle4,hold5
 0448'  02CA' 01AB'              .word   list6,cnct7,idle8,0,hold10,0

;rinsing

0454'  0000  0162'              .word   0,cnct1,cnct2,rins3,idle4,0
 0460'  01A2' 010D'              .word   cnct6,idle7,idle8,rins9,0,0

;transmitting

046C'  024A' 0253'              .word   xmit0,xmit1,xmit2,0,xmit4,xmit5
 0478'  0277' 0000               .word   xmit6,0,xmit8,0,0,xmit11

;bell state

0484'  02A1' 0000               .word   bell0,0,0,0,0,0
 0490'  0000  0284'              .word   0,bell2,0,0,0,0

;listening

049C'  01D9' 0162'              .word   hold0,cnct1,cnct2,0,idle4,hold5
 04A8'  02CA' 0000               .word   list6,0,idle8,0,list10,list11

;off-hook waiting

04B4'  0000  0162'              .word   0,cnct1,cnct2,0,ofhk4,ofhk5
 04C0'  0395' 0000               .word   ofhk6,0,idle8,0,0,0

;conferenced

04CC'  037F' 03BB'              .word   conf0,conf1,conf2,0,conf4,conf5
 04D8'  03BC' 01AB'              .word   conf6,cnct7,0,0,0,0
```

```
                                ;off hook idle state

04E4'   0000    0000            .word   0,0,0,0,0,ofhki5
04F0'   02CA'   0000            .word   list6,0,0,0,0,0

;on-hook waiting state

04FC'   03B8'   0000            .word   onhk0,0,0,0,0,0
0508'   0000    03EB'           .word   0,onhk7,0,0,0,0

;off-hook new call waiting acknowledgement

0514'   03F6'   0000            .word   ofnc0,0,0,0,0,ofnc5
0520'   0000    0000            .word   0,0,0,0,0,0

0000*                           .loc    .data.

0000*                   line:   .blkb   1
0001*                   ars:    .blkb   1
0002*                   sfotr:  .blkb   1
0003*                   stott:  .blkb   1

.end
                        .ident  commnt
                        .id     022092
                        .ver    1/0

.intern conrcv,rcmss

.extern push32,push16
                        .extern rolkmp

.insert pcmiteio.dfn
                        ;PC Mite I/O definitions 02-20-92

0000                    CA0     =       0               ;serial channel 0 control resisters
0002                    CB0     =       2
0004                    ST0     =       4               ;serial channel 0 status resister
0006                    TBR0    =       6               ;console transmit data
0008                    RDR0    =       8               ;console receive data 0001                    CA1     =       1               ;serial channel 1 control resisters
0003                    CB1     =       3
0005                    ST1     =       5               ;status resister
0007                    TDR1    =       7               ;transmit data
0009                    RDR1    =       9               ;receive data 000C                    TMDR0   =       0Ch             ;timer resister
000E                    RLDROL  =       0Eh             ;timer 0 load resisters
000F                    RLDROH  =       0Fh
0010                    TCR     =       10h             ;timer control resister 0032                    DCNTL   =       32h             ;wait state control
0033                    IL      =       33h             ;interrupt vector
0034                    ITC     =       34h             ;interrupt control resister
0036                    RCR     =       36h             ;refresh resister 00EE                    dspdat  =       0EEh            ;DSP data port
00EF                    dspst   =       0EFh            ;DSP status port (bits 4-7)
00EF                    rotsw   =       0EFh            ;card select rotary switch (bits 0-3)

00F0                    msmb    =       0F0h            ;microwire 2nd byte
00F1                    mfmb    =       0F1h            ;microwire 1st byte
00FA                    mcs     =       0FAh            ;chip select output resister
00FB                    mskp    =       0FBh            ;clock polarity control byte
00FC                    mwm     =       0FCh            ;mode resister
00FD                    mskr    =       0FDh            ;clock rate resister
00FE                    mst     =       0FEh            ;status resister
00FF                    mpd     =       0FFh            ;pin definition resister
                        .insert pcmitmem.dfn
                        ;PC Mite Memory definition 4-07-92

C000                    consfq  =       0C000h          ;console queue
C020                    rcvq    =       0C020h          ;receive message queue
C030                    xmtq    =       0C030h          ;xmit message queue
C100                    rcvbfs  =       0C100h          ;receive buffers
C200                    xmtbfs  =       0C200h          ;transmit buffers C700                    ttsen1  =       0C700h          ;DTMF generator 1 flag
C701                    ttsen2  =       0C701h          ;DTMF generator 2 flag
C702                    ttdet1  =       0C702h          ;DTMF detector 1 flag
C703                    ttdet2  =       0C703h          ;DTMF detector 2 flag
C704                    ttdet3  =       0C704h          ;DTMF detector 3 flag
C708                    cnf1    =       0C708h          ;conference port 1
C709                    cnf2    =       0C709h          ;conference port 2
C70A                    cnf3    =       0C70Ah          ;conference port 3
C710                    flshtm  =       0C710h          ;flash-hook generator timers
C720                    ttdbf1  =       0C720h          ;DTMF detector buffer 1
C740                    ttdbf2  =       0C740h          ;DTMF detector buffer 2
C760                    ttdbf3  =       0C760h          ;DTMF detector buffer 3
C7C0                    ttsbf1  =       0C7C0h          ;DTMF generator buffer 1
C7E0                    ttsbf2  =       0C7E0h          ;DTMF generator buffer 2
C800                    snstbl  =       0C800h          ;port status table
C808                    beltmr  =       0C808h          ;phone bell timer
C810                    tyrtbl  =       0C810h          ;port type table
```

```
    -C818              protbl    =    0C818h       ;protocol table
     C820              statbf    =    0C820h       ;state table
     C828              onhkf     =    0C828h       ;on-hook flag
     C829              isens0    =    0C829h       ;current isense table
     C82A              isens1    =    0C82Ah       ;100 msec current table
     C82B              isens2    =    0C82Bh       ;200 msec current table
     C82C              ofhkf     =    0C82Ch       ;off-hook flag
     C830              rins0     =    0C830h       ;rins0 sample
     C831              rins1     =    0C831h       ;ring 100 msec sample
     C832              rins2     =    0C832h       ;ring 200 msec sample
     C833              rins1s    =    0C833h       ;ring 1 sec. sample
     C834              rins2s    =    0C834h       ;ring 2 sec. sample
     C835              rnsflg    =    0C835h       ;ring detect flag
     C838              rnstmr    =    0C838h       ;ring clear timers
     C840              srvflg    =    0C840h       ;sround removed flag
     C841              snd0      =    0C841h       ;sround 0 msec.
     C842              snd1      =    0C842h       ;sround 10v msec.
     C843              snd2      =    0C843h       ;sround 200 msec.
     C844              sasflg    =    0C844h       ;sround asserted flag
     C848              rnst0     =    0C848h       ;ring trip 0 msec.
     C849              rnst1     =    0C849h       ;ring trip 100 msec.
     C84A              rnst2     =    0C84Ah       ;ring trip 200 msec.
     C84B              rnstf     =    0C84Bh       ;ring trip flag
     C84C              rmask     =    0C84Ch       ;ring mask
     C850              plsbf0    =    0C850h       ;DID pulse buffer 0 msec.
     C851              plsbf1    =    0C851h       ;DID pulse buffer 10 msec.
     C852              plsbf2    =    0C852h       ;DID pulse buffer 20 msec.
     C853              plsflg    =    0C853h       ;pulse flag
     C855              dmask     =    0C855h       ;DID mask
     C858              plscnt    =    0C858h       ;DID pulse count
     C860              didst     =    0C860h       ;DID state
     C868              didtmr    =    0C868h       ;DID timers
     C870              didnum    =    0C870h       ;DID number
     C878              didcnt    =    0C878h       ;DID number counter
     C880              didbfs    =    0C880h       ;DID number buffers
     C8E0              flsnbf    =    0C8E0h       ;flash-hook detection buffer
     C8E6              flshfs    =    0C8E6h       ;flash-hook flag
     C8E7              onhkf2    =    0C8E7h       ;on-hook flag for phones & E&M
     C8E8              lnflss    =    0C8E8h       ;line flass
     C8F0              codecp    =    0C8F0h       ;codec buffer F800              xmtflg    =    0F800h       ;transmit flag
     F801              rcvflg    =    0F801h       ;receive flag
     F802              rcvbox    =    0F802h       ;receive box
     F840              xmtbox    =    0F840h       ;transmit mailbox
     F880              xstate    =    0F880h       ;auxiliary state table 0003              quack     =    0003h ;receive message from the PC, takes 112 usec. to service interrupt 0000'    F3           pcmss:    di
 0001'    08                     ex     AF,AF'
 0002'    D9                     exx
 0003'    3A 0000:06             ld     A,(rblkmp)   ;receive block map
 0006'    0608                   ld     B,8
 0008'    07           ..fndb:   rlca
 0009'    D2 0011'               jp     nc,..fnd
 000C'    10FA                   djnz   ..fndb
 000E'    C3 003A'               jp     norm         ;if no free blocks, dump message
 0011'    58           ..fnd:    ld     E,B
 0012'    0F                     rrca
 0013'    F680                   or     80h
 0015'    07           ..fle:    rlca
 0016'    10FD                   djnz   ..fle
 0018'    32 0000:06             ld     (rblkmp),A   ;save the new map
 001B'    1D                     dec    E
 001C'    4B                     ld     C,E
 001D'    CB0B                   rrc    E
 001F'    CB0B                   rrc    E
 0021'    CB0B                   rrc    E
 0023'    16C1                   ld     D,rcvbfs/256 ;receive buffers
 0025'    21 F802                ld     HL,rcvbox    ;ec message buffer
 0028'    0620                   ld     B,32         ;max size
 002A'    7E           ..lp:     ld     A,(HL)       ;transfer a byte
 002B'    12                     ld     (DE),A
 002C'    A7                     and    A
 002D'    2804                   jr     z,..et       ;check for end of message
 002F'    1C                     inc    E
 0030'    2C                     inc    L
 0031'    10F7                   djnz   ..lp
 0033'    79           ..et:     ld     A,C
 0034'    21 C020                ld     HL,rcvq
 0037'    CD 0000:05             call   push16       ;receive message queue
 003A'    3E00         norm:     ld     A,0          ;push block # onto queue
 003C'    32 F801                ld     (rcvflg),A   ;clear the interupt
 003F'    D9                     exx
 0040'    08                     ex     AF,AF'
 0041'    FB                     ei
 0042'    ED4D                   reti ;console receive interupt 0044'    F3           conrcv:   di
 0045'    08                     ex     AF,AF'
```

```
 0046'   D9                        exx
 0047'   ED3804                    in0     A,(ST0)         ;check the status
 004A'   E670                      and     70h
 004C'   2015                      jr      nz,error        ;if error bits not 0, error
 004E'   ED3808                    in0     A,(RDR0)        ;get character
 0051'   E67F                      and     7Fh             ;eliminate parity
 0053'   FE03                      cp      03h             ;cntrl-C?
 0055'   CA 0003                   jp      z,quack
 0058'   21 C000                   ld      HL,consq        ;console input queue
 005B'   CD 0000:04                call    push32
 005E'   08                        ex      AF,AF'
 005F'   D9                        exx
 0060'   FB                        ei
 0061'   ED4D                      reti 0063'   3E74             error:   ld      A,74h
 0065'   ED3900                    out0    (CA0),A         ;clear the error bits
 0068'   ED3808                    in0     A,(RDR0)        ;eat the character
 006B'   08                        ex      AF,AF'
 006C'   D9                        exx
 006D'   FB                        ei
 006E'   ED4D                      reti .end
                          .ident   clock
                          .id      040792
                          .ver     1,3             ;flashhook generation & detection
                          ;ver     1,2             ;interrupt flag
                          ;ver     1,1             ;E&M off-hook fix .intern  clock
                          .extern  push16,pull16

.intern  ticks,scnt,tenths,iflag
                          .extern  xblkmp,xmtbuf .insert  pcmiteio.dfn
                          ;PC Mite I/O definitions 02-20-92

0000                     CA0      =       0               ;serial channel 0 control register
 0002                     CB0      =       2
 0004                     ST0      =       4               ;serial channel 0 status register
 0006                     TDR0     =       6               ;console transmit data
 0008                     RDR0     =       8               ;console receive data 0001                     CA1      =       1               ;serial channel 1 control registers
 0003                     CB1      =       3
 0005                     ST1      =       5               ;status register
 0007                     TDR1     =       7               ;transmit data
 0009                     RDR1     =       9               ;receive data 000C                     TMDR0    =       0Ch             ;timer register
 000E                     RLDR0L   =       0Eh             ;timer 0 load registers
 000F                     RLDR0H   =       0Fh
 0010                     TCR      =       10h             ;timer control register 0032                     DCNTL    =       32h             ;wait state control
 0033                     IL       =       33h             ;interrupt vector
 0034                     ITC      =       34h             ;interrupt control register
 0036                     RCR      =       36h             ;refresh register 00EE                     dspdat   =       0EEh            ;DSP data port
 00EF                     dspst    =       0EFh            ;DSP status port (bits 4-7)
 00EF                     rotsw    =       0EFh            ;card select rotary switch (bits 0-3)

00F0                     msmb     =       0F0h            ;microwire 2nd byte
 00F1                     mfmb     =       0F1h            ;microwire 1st byte
 00FA                     ucs      =       0FAh            ;chip select output register
 00FB                     mskp     =       0FBh            ;clock polarity control byte
 00FC                     mwm      =       0FCh            ;mode register
 00FD                     mskr     =       0FDh            ;clock rate register
 00FE                     mst      =       0FEh            ;status register
 00FF                     mpd      =       0FFh            ;pin definition register
                          .insert  pcmitmem.dfn
                          ;PC Mite Memory definition 4-07-92

C000                     consq    =       0C000h          ;console queue
 C020                     rcvq     =       0C020h          ;receive message queue
 C030                     xmtq     =       0C030h          ;xmit message queue
 C100                     rcvbfs   =       0C100h          ;receive buffers
 C200                     xmtbfs   =       0C200h          ;transmit buffers C700                     ttgen1   =       0C700h          ;DTMF generator 1 flag
 C701                     ttgen2   =       0C701h          ;DTMF generator 2 flag
 C702                     ttdet1   =       0C702h          ;DTMF detector 1 flag
 C703                     ttdet2   =       0C703h          ;DTMF detector 2 flag
 C704                     ttdet3   =       0C704h          ;DTMF detector 3 flag
 C708                     cnf1     =       0C708h          ;conference port 1
 C709                     cnf2     =       0C709h          ;conference port 2
 C70A                     cnf3     =       0C70Ah          ;conference port 3
 C710                     flshtm   =       0C710h          ;flash-hook generator timers
 C720                     ttdbf1   =       0C720h          ;DTMF detector buffer 1
 C740                     ttdbf2   =       0C740h          ;DTMF detector buffer 2
 C760                     ttdbf3   =       0C760h          ;DTMF detector buffer 3
```

```
C7C0            ttsbf1   =   0C7C0h      ;DTMF generator buffer 1
C7E0            ttsbf2   =   0C7E0h      ;DTMF generator buffer 2
C800            snstbl   =   0C800h      ;port status table
C808            beltmr   =   0C808h      ;phone bell timer
C810            tyrtbl   =   0C810h      ;port type table
C818            protbl   =   0C818h      ;protocol table
C820            statbl   =   0C820h      ;State table
C828            onhkf    =   0C828h      ;on-hook flag
C829            isens0   =   0C829h      ;current isense table
C82A            isens1   =   0C82Ah      ;100 msec current table
C82B            isens2   =   0C82Bh      ;200 msec current table
C82C            ofhkf    =   0C82Ch      ;off-hook flag
C830            rins0    =   0C830h      ;rins0 sample
C831            ring1    =   0C831h      ;ring 100 msec sample
C832            ring2    =   0C832h      ;ring 200 msec sample
C833            ring1s   =   0C833h      ;ring 1 sec. sample
C834            ring2s   =   0C834h      ;ring 2 sec. sample
C835            rnsflg   =   0C835h      ;ring detect flag
C838            rnstmr   =   0C838h      ;ring clear timers
C840            srvflg   =   0C840h      ;sround removed flag
C841            snd0     =   0C841h      ;sound 0 msec.
C842            snd1     =   0C842h      ;sound 100 msec.
C843            snd2     =   0C843h      ;sound 200 msec.
C844            sasflg   =   0C844h      ;sround asserted flag
C848            rnst0    =   0C848h      ;ring trip 0 msec.
C849            rnst1    =   0C849h      ;ring trip 100 msec.
C84A            rnst2    =   0C84Ah      ;ring trip 200 msec.
C84B            rnstf    =   0C84Bh      ;ring trip flag
C84C            rmask    =   0C84Ch      ;ring mask
C850            plsbf0   =   0C850h      ;BID pulse buffer 0 msec.
C851            plsbf1   =   0C851h      ;BID pulse buffer 10 msec.
C852            plsbf2   =   0C852h      ;BID pulse buffer 20 msec.
C853            plsflg   =   0C853h      ;pulse flag
C855            dmask    =   0C855h      ;BID mask
C856            plscnt   =   0C856h      ;BID pulse count
C860            didst    =   0C860h      ;BID state
C868            didtmr   =   0C868h      ;BID timers
C870            didnum   =   0C870h      ;BID number
C878            didcnt   =   0C878h      ;BID number counter
C880            didbfs   =   0C880h      ;BID number buffers
C8E0            flshbf   =   0C8E0h      ;flash-hook detection buffers
C8E6            flshfg   =   0C8E6h      ;flash-hook flag
C8E7            onhkr2   =   0C8E7h      ;on-hook flag
C8E8            lnflg    =   0C8E8h      ;line flag
C8F0            codecb   =   0C8F0h      ;codec buffer F800            xmtflg   =   0FB00h      ;transmit flag
F801            rcvflg   =   0FB01h      ;receive flag
F802            rcvbox   =   0FB02h      ;receive box
F840            xmtbox   =   0FB40h      ;transmit mailbox
F880            xstate   =   0FB80h      ;auxiliary state table 0000'  F3                  clock:  di
0001'  08                          ex      AF,AF'      ;exchange registers
0002'  D9                          exx
0003'  DD E5                       push    IX
0005'  ED 5810                     in      A,(TCR)     ;read timer control register to reset interrupt
0008'  ED 5800                     in      A,(TMDRL0)  ;read timer also ;check for outgoing messages 000B'  3A F800                     ld      A,(xmtflg)
000E'  A7                          and     A
000F'  2030                        jr      nz,time     ;if flag set, skip
0011'  21 L030                     ld      HL,xmts
0014'  CD 0000:05                  call    pullq
0017'  DA 0042'                    jp      c,time      ;if queue empty, skip
001A'  47                          ld      B,A         ;save block #
001B'  3A 0038h                    ld      A,(lflag)
001E'  A7                          and     A
001F'  2822                        jr      z,..fre     ;if flag is 0, kill message
0021'  78                          ld      A,B         ;restore block #
0022'  6F                          ld      L,A
0023'  CB0B                        rrc     L
0025'  CB0B                        rrc     L
0027'  CB0B                        rrc     L
0029'  26C2                        ld      H,xmtbfs/256    ;point at transmit buffer
002B'  E5                          push    HL
002C'  11 F840                     ld      DE,xmtbox
002F'  01 0020                     ld      BC,32
0032'  EDB0                        ldir
0034'  E1                          pop     HL
0035'  11 0000:07                  ld      DE,xmtbuf   ;monitor buffer
0038'  01 0020                     ld      BC,32
003B'  EDB0                        ldir
003D'  47                          ld      B,A
003E'  3E01                        ld      A,1
0040'  32 F800                     ld      (xmtflg),A  ;set the transmit flag
0043'  04              ..fre:      inc     B
0044'  3E7F                        ld      A,7Fh
0046'  07              ..lp:       rlca
0047'  10FD                        djnz    ..lp
0049'  21 0000:06                  ld      HL,xblkmp   ;block map
004C'  A6                          and     (HL)
004D'  77                          ld      (HL),A      ;free the block
```

;take care of clocks and timed functions

```
004E'   ED4B 0001*      time:   ld      BC,(ticks)      ;counter
0052'   0D                      dec     C
0053'   ED43 0001*              ld      (ticks),BC
0057'   2012                    jr      nz,..nsec       ;a second yet?
0059'   04                      inc     B               ;bump the seconds counter
005A'   0E64                    ld      C,100           ;reset interupt down counter
005C'   ED43 0001*              ld      (ticks),BC 0060'   ED4B CB33               ld      BC,(rins1s)     ;update the rins second tables
0064'   41                      ld      B,C
0065'   0E00                    ld      C,0
0067'   ED43 CB33               ld      (rins1s),BC 006B'   21 CB00         ..nsec: ld      HL,snstbl       ;sensor table
006E'   0606                    ld      B,6             ;# of ports
0070'   0E00                    ld      C,0
0072'   79              ..lp:   ld      A,C
0073'   D3FA                    out     (mcs),A         ;port #
0075'   3E00                    ld      A,0
0077'   D3F0                    out     (msmb),A
0079'   3E0F                    ld      A,0Fh           ;read latch register
007B'   D3F1                    out     (mfmb),A
007D'   DBFE            ..wip:  in      A,(mst)
007F'   A7                      and     A
0080'   28FB                    jr      z,..wip
0082'   DBF0                    in      A,(msmb)        ;data
0084'   77                      ld      (HL),A
0085'   23                      inc     HL
0086'   0C                      inc     C
0087'   10E9                    djnz    ..lp
0089'   3E0F                    ld      A,0Fh
008B'   D3FA                    out     (mcs),A 008D'   21 0000*                ld      HL,tenths       ;tenths of second counter
0090'   35                      dec     (HL)
0091'   C2 00FA'                jp      nz,rins
0094'   360A                    ld      (HL),10         ;reset the counter
0096'   21 C710                 ld      HL,flshtm       ;flashhook timer table
0099'   11 C800                 ld      DE,snstbl
009C'   0606                    ld      B,6             ;# of ports
009E'   0E00                    ld      C,0             ;port #
00A0'   7E              ..flp:  ld      A,(HL)          ;timer active?
00A1'   A7                      and     A
00A2'   CA 00BC'                jp      z,..nxt         ;if not, skip
00A5'   EB                      ex      DE,HL
00A6'   CBBE                    res     7,(HL)          ;fake current sensor during flashhook
00A8'   EB                      ex      DE,HL
00A9'   35                      dec     (HL)            ;decrement it
00AA'   C2 00BC'                jp      nz,..nxt
00AD'   79                      ld      A,C
00AE'   D3FA                    out     (mcs),A         ;CODEC select
00B0'   3E18                    ld      A,18h           ;close the seize relay
00B2'   D3F0                    out     (msmb),A
00B4'   3E0A                    ld      A,0Ah
00B6'   D3F1                    out     (mfmb),A        ;powered up
00B8'   3E0F                    ld      A,0Fh
00BA'   ED79                    out     (C),A
00BC'   0C              ..nxt:  inc     C
00BD'   1C                      inc     E
00BE'   2C                      inc     L
00BF'   10DF                    djnz    ..flp
```

;read in the current sensor and check for hook status

```
00C1'   ED4B C829       isense: ld      BC,(isens0)     ;update the tables
00C5'   ED43 C82A               ld      (isens1),BC
00C9'   0E00                    ld      C,0
00CB'   21 C805                 ld      HL,snstbl+5     ;sensor table
00CE'   0606                    ld      B,6
00D0'   7E              ..lp:   ld      A,(HL)          ;get the sensor value
00D1'   07                      rlca                    ;shift out the current sensor
00D2'   CB11                    rl      C               ;shift it in to byte
00D4'   2D                      dec     L
00D5'   10F9                    djnz    ..lp
00D7'   79                      ld      A,C
00D8'   21 CB4C                 ld      HL,rmask
00DB'   B6                      or      (HL)            ;mask it if rinsing phone
00DC'   32 CB29                 ld      (isens0),A
```

;check for off hooks

```
00DF'   21 CB29                 ld      HL,isens0
00E2'   7E                      ld      A,(HL)          ;i0
00E3'   2C                      inc     L
00E4'   B6                      or      (HL)            ;/(i0 + i1) = /i0 * /i1
00E5'   EEFF                    xor     0FFh
00E7'   2C                      inc     L
00E8'   A6                      and     (HL)            ;/i0 * /i1 * i2
00E9'   2C                      inc     L
00EA'   B6                      or      (HL)            ;or into flags
00EB'   77                      ld      (HL),A          ;save updated flags
```

;check for on hooks

```
00EC'  2B                       dec    HL              ;sens2
00ED'  7E                       ld     A,(HL)          ;/2
00EE'  EEFF                     xor    0FFh            ;/2
00F0'  2D                       dec    L
00F1'  A6                       and    (HL)            ;/1 * /2
00F2'  2D                       dec    L
00F3'  A6                       and    (HL)            ;/0 * /1 * /2
00F4'  2D                       dec    L
00F5'  B6                       or     (HL)            ;or into onhook flag
00F6'  77                       ld     (HL),A          ;save updated flag
00F7'  C3 01F9'                 jp     did
00FA'  7E       rins:           ld     A,(HL)
00FB'  3D                       dec    A
00FC'  C2 013D'                 jp     nz,ground       ;check ground starts ;check for rings every 100 msec.

00FF'  ED4B CB30                ld     BC,(rins0)      ;update table by 1 sample time
0103'  ED43 CB31                ld     (rins1),BC
0107'  21 CB05                  ld     HL,snstbl + 5   ;sensor table
010A'  3E00                     ld     A,0
010C'  0606                     ld     B,6             ;# of sensors
010E'  CB27     ..rip:          sla    A               ;rotate bits to right place
0110'  CB76                     bit    6,(HL)
0112'  C2 0117'                 jp     nz,..nr         ;no rinsins
0115'  CBC7                     set    0,A
0117'  2D       ..nr:           dec    L
0118'  10F4                     djnz   ..rip
011A'  21 CB40                  ld     HL,rmask        ;mask rins detect if rinsins phone
011D'  AE                       xor    (HL)
011E'  AE                       xor    (HL)
011F'  32 CB30                  ld     (rins0),A 0122'  21 CB30                  ld     HL,rins0        ;current rins sensor
0125'  7E                       ld     A,(HL)          ;rins0
0126'  2C                       inc    L
0127'  A6                       and    (HL)            ;rins0 * rins1
0128'  2C                       inc    L
0129'  A6                       and    (HL)            ;rins0 * rins1 * rins2
012A'  4F                       ld     C,A
012B'  2C                       inc    L
012C'  7E                       ld     A,(HL)          ;rins 1 second ago
012D'  2C                       inc    L               ;rins1s
012E'  B6                       or     (HL)            ;rins1s + ring2s
012F'  EEFF                     xor    0FFh            ;/(rins1s + rins2s)=/rins1s * /rins2s
0131'  A1                       and    C               ;rins0*rins1*rins2*/rins1s*/rins2s
0132'  2C                       inc    L               ;rins flag
0133'  B6                       or     (HL)            ;or into ring flag
0134'  77                       ld     (HL),A
0135'  2D                       dec    L
0136'  2D                       dec    L
0137'  79                       ld     A,C             ;or rinsins into 1 second base
0138'  B6                       or     (HL)
0139'  77                       ld     (HL),A
013A'  C3 01F9'                 jp     did
013D'  3D       ground: dec     A
013E'  C2 0179'                 jp     nz,rnstrp
0141'  ED4B CB41                ld     BC,(snd0)       ;update the tables
0145'  ED43 CB42                ld     (snd1),BC
0149'  0E00                     ld     C,0
014B'  21 CB05                  ld     HL,snstbl + 5   ;sensor table
014E'  0606                     ld     B,6
0150'  CB21     slp:            sla    C               ;rotate the ground sensor values
0152'  CB6E                     bit    5,(HL)          ;get the sensor value
0154'  CA 0159'                 jp     z,..ns
0157'  CBC1                     set    0,C
0159'  2D       ..ns:           dec    L
015A'  10F4                     djnz   slp
015C'  79                       ld     A,C
015D'  32 CB41                  ld     (snd0),A ;check for ground assertion 0160'  21 CB41                  ld     HL,snd0
0163'  7E                       ld     A,(HL)          ;s0
0164'  2C                       inc    L
0165'  B6                       or     (HL)            ;s0 + s1
0166'  EEFF                     xor    0FFh            ;/(s0 + s1) = /s0 * /s1
0168'  2C                       inc    L
0169'  A6                       and    (HL)            ;/s0 * /s1 * s2
016A'  2C                       inc    L
016B'  B6                       or     (HL)            ;or into flag
016C'  77                       ld     (HL),A          ;save updated flag ;check for ground removal 016D'  2B                       dec    HL              ;snd2
016E'  7E                       ld     A,(HL)          ;s2
016F'  EEFF                     xor    0FFh            ;/s2
0171'  2D                       dec    L
0172'  A6                       and    (HL)            ;s1 * /s2
0173'  2D                       dec    L
0174'  A6                       and    (HL)            ;s0 * s1 * /s2
0175'  2D                       dec    L
0176'  B6                       or     (HL)            ;or into ground removed flag
0177'  77                       ld     (HL),A          ;save updated flag
0178'  C3 01F9'                 jp     did
```

```
 0178'  3D            rnstrp: dec    A
 017C'  C2 0183'              jp     nz,flash
 017F'  ED4B C848             ld     BC,(rnst0)
 0183'  ED43 C849             ld     (rnst1),BC
 0187'  0E00                  ld     C,0
 0189'  21 C805               ld     HL,snstbl + 5    ;sensor table
 018C'  0606                  ld     B,6
 018E'  CB21          rtlp:   sla    C                ;rotate the ring sensor values
 0190'  CB76                  bit    6,(HL)           ;set the sensor value
 0192'  CA 0197'              jp     z,..nr
 0195'  CBC1                  set    0,C
 0197'  2D            ..nr:   dec    L
 0198'  10F4                  djnz   rtlp
 019A'  3A C84C               ld     A,(rmask)        ;only look at ports tart and r...r.s
 019D'  A1                    and    C
 019E'  32 C84B               ld     (rnst0),A 01A1'  21 C848               ld     HL,rnst0
 01A4'  7E                    ld     A,(HL)           ;rnst0
 01A5'  2C                    inc    L
 01A6'  A6                    and    (HL)             ;rnst0 * rnst1
 01A7'  2C                    inc    L
 01A8'  4F                    ld     C,A
 01A9'  7E                    ld     A,(HL)           ;rnst2
 01AA'  EEFF                  xor    0FFh             ;/rnst2
 01AC'  A1                    and    C                ;rnst0 * rnst1 * /rnst2
 01AD'  2C                    inc    L
 01AE'  B6                    or     (HL)
 01AF'  77                    ld     (HL),A           ;update the flag
 01B0'  C3 01F9'              jp     did 01B3'  3D            flash:  dec    A
 01B4'  C2 01F9'              jp     nz,did
 01B7'  21 0004#              ld     HL,flsnx
 01BA'  7E                    ld     A,(HL)
 01BB'  EE01                  xor    1
 01BD'  77                    ld     (HL),A
 01BE'  C2 01D2'              jp     nz,..flsd        ;detect flashhooks
 01C1'  3A C829               ld     A,(sens0)        ;current current sensors
 01C4'  21 C8E0               ld     HL,flshbf        ;flash hook detection buffers
 01C7'  0606                  ld     B,6
 01C9'  1F            ..lp:   rra
 01CA'  CB16                  rl     (HL)
 01CC'  2C                    inc    L
 01CD'  10FA                  djnz   ..lp
 01CF'  C3 01F9'              jp     did 01D2'  11 0000       ..flsd: ld     DE,0
 01D5'  21 C8E0               ld     HL,flshbf        ;flashhook buffers
 01D8'  0606                  ld     B,6              ;# of ports
 01DA'  7E            ..fdlp: ld     A,(HL)
 01DB'  FE7F                  cp     7Fh
 01DD'  C2 01E2'              jp     nz,..nd
 01E0'  CBF2                  set    6,D              ;set onhook bit
 01E2'  E6BF          ..nd:   and    0BFh             ;mask for don't care bits
 01E4'  FE9E                  cp     9Eh              ;check for a flash
 01E6'  C2 01EB'              jp     nz,..nf
 01E9'  CBF3                  set    6,E
 01EB'  CB3B          ..nf:   srl    E                ;rotate
 01ED'  CB3A                  srl    D
 01EF'  2C                    inc    L                ;next buffer
 01F0'  10F8                  djnz   ..fdlp
 01F2'  7E                    ld     A,(HL)
 01F3'  83                    or     E
 01F4'  77                    ld     (HL),A           ;or in flash flags
 01F5'  2C                    inc    L
 01F6'  7E                    ld     A,(HL)
 01F7'  82                    or     D
 01F8'  77                    ld     (HL),A           ;or in onhook flags
 01F9'  ED4B C850     did:    ld     BC,(plsbf0)      ;update pulse samples
 01FD'  ED43 C851             ld     (plsbf1),BC
 0201'  0E00                  ld     C,0
 0203'  21 C805               ld     HL,snstbl + 5
 0206'  0606                  ld     B,6
 0208'  7E            ..lp:   ld     A,(HL)           ;sensor values
 0209'  07                    rlca                    ;rotate out current sensor
 020A'  CB11                  rl     C                ;rotate into pulse buffer
 020C'  2D                    dec    L
 020D'  10F9                  djnz   ..lp
 020F'  3A C855               ld     A,(dmask)        ;only look at DCD ports
 0212'  A1                    and    C
 0213'  32 C850               ld     (plsbf0),A ;detect pulses 0216'  21 C851               ld     HL,plsbf1
 0219'  B6                    or     (HL)             ;pls0 + pls1
 021A'  EEFF                  xor    0FFh             ;/(pls0 + pls1) = /pls0 * /pls1
 021C'  2C                    inc    L
 021D'  A6                    and    (HL)             ;/pls0 * /pls1 * pls1
 021E'  2C                    inc    L ;process pulses 021F'  4F                    ld     C,A              ;pulses
 0220'  0606                  ld     B,6              ;# of ports
```

```
0222'  3E1E                  ld     A,30             ;pulse timer
0224'  21 CB59               ld     HL,plscnt        ;pulse count buffer
0227'  11 CB60               ld     DE,didst         ;DID state table
022A'  DD21 CB68             ld     IX,didtmr        ;DID timer
022E'  CB19        ..pip:    rr     C
0230'  C2 0277'              jp     nz,..np
0233'  CBB5                  res    6,E              ;port state
0235'  1A                    ld     A,(DC)           ;state
0236'  CBF5                  set    6,E
0238'  FE0A                  cp     10
023A'  2804                  jr     z,..wak
023C'  A7                    and    A                ;is the port idle?
023D'  C2 0277'              jp     nz,..np
0240'  1A          ..wak:    ld     A,(DE)           ;DID state
0241'  FE02                  cp     2                ;pulsing state?
0243'  282D                  jr     z,..pls
0245'  FE01                  cp     1
0247'  281F                  jr     z,..pels
0249'  FE00                  cp     0                ;idle?
024B'  2022                  jr     nz,..nd
024D'  3C                    inc    A
024E'  12                    ld     (DE),A           ;set to guard time interval
024F'  3E6D                  ld     A,109            ;guard time immediate start
0251'  CBB5                  res    6,L              ;protocol
0253'  CB7E                  bit    7,(HL)           ;immediate start?
0255'  2802                  jr     z,..im
0257'  3E8B                  ld     A,139            ;guard time wink start
0259'  CBF5        ..im:     set    6,L              ;pulse count
025B'  DD7700                ld     (IX),A           ;set guard timer
025E'  3600                  ld     (HL),0           ;set pulse count to 0
0260'  CBED                  set    5,L              ;digit counter
0263'  3600                  ld     (HL),0           ;reset to 0
0265'  CBAD                  res    5,L              ;pulse counter
0267'  180F                  jr     ..np
0269'  DD7E00      ..pels:   ld     A,(IX)           ;set timer value
026C'  FE65                  cp     101
026E'  3008                  jr     nc,..np
0270'  3E02        ..nd:     ld     A,2
0272'  12                    ld     (DE),A           ;set state to pulsing
0273'  34          ..pls:    inc    (HL)             ;bump the pulse counter
0274'  DD36001E              ld     (IX),30'         ;reset the pulse timer
0278'  DD23        ..np:     inc    IX
027A'  2C                    inc    L
027B'  1C                    inc    E
027C'  10B1                  djnz   ..pip 027E'  21 CB6B               ld     HL,didtmr
0281'  11 CB60               ld     DE,didst
0284'  0606                  ld     B,6
0286'  1A          ..tip:    ld     A,(DE)
0287'  FE01                  cp     1
0289'  282E                  jr     z,..st           ;guard time interval
028B'  7E                    ld     A,(HL)           ;see if value in counter
028C'  A7                    and    A
028D'  CA 02A8'              jp     z,..nt           ;if not, skip
0290'  35                    dec    (HL)
0291'  C2 02A8'              jp     nz,..nt
0294'  1A                    ld     A,(DE)           ;state
0295'  FE03                  cp     3
0297'  281A                  jr     z,..ito          ;interdigit timeout
0299'  7D                    ld     A,L
029A'  D610                  sub    10h
029C'  6F                    ld     L,A
029D'  4E                    ld     C,(HL)           ;get the number
029E'  3600                  ld     (HL),0           ;clear pulse counter
02A0'  C61B                  add    A,1Bh
02A2'  6F                    ld     L,A
02A3'  71                    ld     (HL),C           ;put in number buffer
02A4'  D608                  sub    8
02A6'  6F                    ld     L,A
02A7'  36FF                  ld     (HL),255         ;interdigit timeout
02A9'  3E03                  ld     A,3
02AB'  12                    ld     (DE),A           ;set to interdigit timeout
02AC'  2C          ..nt:     inc    L
02AD'  1C                    inc    E
02AE'  10D6                  djnz   ..tip
02B0'  C3 0309'              jp     bue
02B3'  3E00        ..ito:    ld     A,0
02B5'  12                    ld     (DE),A
02B6'  C3 02AB'              jp     ..nt 02B9'  35          ..st:     dec    (HL)             ;decrement the timer
02BA'  2848                  jr     z,..to
02BC'  7E                    ld     A,(HL)
02BD'  FE81                  cp     129              ;start of wink
02BF'  2823                  jr     z,..wnk
02C1'  FE69                  cp     109
02C3'  2821                  jr     z,..ewnk
02C5'  C3 02AB'              jp     ..nt
02C8'  3E06        ..wnk:    ld     A,6
02CA'  D7                    sub    A
02CB'  D3FA                  out    (mcs),A          ;select port
02CD'  3E1B                  ld     A,1Bh            ;reverse battery
02CF'  D3F0                  out    (msmb),A
```

```
02D0'  3E8A            ld     A,8Ah
02D2'  D3F1            out    (mfmb),A
02D4'  DBFC   ..wk1:   in     A,(mst)
02D6'  A7              and    A
02D7'  28FB            jr     z,...wk1
02D9'  3E0F            ld     A,0Fh
02DB'  D3FA            out    (mcs),A          ;deselect port
02DD'  3E01            ld     A,1
02DF'  32 C866         ld     (0C866h),A
02E2'  C3 02A8'        jp     ..nt
02E5'  3E96   ..ewk2:  ld     A,6
02E7'  90              sub    B
02E8'  D3FA            out    (mcs),A
02EA'  3E10            ld     A,10h
02EC'  D3F0            out    (msmb),A         ;increment battery
02EE'  3E8A            ld     A,8Ah
02F0'  D3F1            out    (mfmb),A
02F2'  DBFC   ..ewk1:  in     A,(mst)
02F4'  A7              and    A
02F5'  28FB            jr     z,...ewk1
02F7'  3E0F            ld     A,0Fh
02F9'  D3FA            out    (mcs),A          ;deselect port
02FB'  3E02            ld     A,2
02FD'  32 C867         ld     (0C867h),A
0300'  C3 02A8'        jp     ..nt 0303'  3E0            ..to:  ld     A,0
0305'  12              ld     (HL),A           ;set back to idle state
0306'  C3 02A8'        jp     ..nt 0309'  DDE1   bye:     pop    IX               ;restore registers
030B'  08              ex     AF,AF'
030C'  D9              exx
030D'  FB              ei
030E'  ED4D            reti
                       .loc   .data.
                                                ;tenth of a second timer
0000#  tenths: .blkb   1                        ;downcounter
0000#  ticks:  .blkb   1                        ;seconds
0001#  scnt:   .blkb   1                        ;interrupt flag
0002#  iflag:  .blkb   1                        ;flash task alternation
0003#  fishx:  .blkb   1
0004#          .end
                       .ident  queues
                       .id     071985
                       .ver    2,0

.intern pushes
                       .intern pulles
                       .intern push32
                       .intern pull32
                       .intern push16
                       .intern pull16

;push onto 254 byte queue, enter HL point at queue, character in A
       ;return with carry if full, destroys contents of L 0000'  37     pushes:  scf                      ;set the carry flag
0001'  F5              push   AF                ;save the value to push
0002'  7E              ld     A,(HL)            ;head of queue
0003'  23              inc    HL                ;tail of queue
0004'  3C              inc    A                 ;point at next byte in queue
0005'  C2 000A'        jp     nz,..1            ;check if end of queue buffer
0008'  3E02            ld     A,2               ;if end, point at beginning
000A'  BE     ..1:     cp     (HL)              ;compare new head to tail
000B'  CA 0016'        jp     z,full            ;if the same, queue is full
000E'  2B              dec    HL                ;point at head again
000F'  77              ld     (HL),A            ;save the new head
0010'  85              add    A,L               ;point at head byte
0011'  6F              ld     L,A
0012'  F1              pop    AF                ;restore value
0013'  77              ld     (HL),A            ;put data onto queue
0014'  3F              ccf                      ;clear the carry flag
0015'  C9              ret 0016'  F1     full:    pop    AF                ;restore value
0017'  C9              ret ;pull from 254 byte queue, HL = start of queue area, return with data in A
       ;if empty return with carry set 0018'  7E     pulles:  ld     A,(HL)            ;head
0019'  23              inc    HL                ;point at tail
001A'  BE              cp     (HL)              ;compare head and tail
001B'  CA 002C'        jp     z,empty           ;if head = tail, queue empty
001E'  7E              ld     A,(HL)            ;tail address
001F'  3C              inc    A                 ;point at tail byte
0020'  C2 0025'        jp     nz,..1            ;check for end of queue
0023'  3E02            ld     A,2               ;start of queue
0025'  77     ..1:     ld     (HL),A            ;save new tail
0026'  2D              dec    L
0027'  85              add    A,L               ;add tail to start of queue
```

```
0028'   6F              ld      L,A                     ;point at tail byte
0029'   7E              ld      A,(HL)                  ;get data from queue
002A'   A7              and     A                       ;clear carry flag
002B'   C9              ret 002C'   37      empty:  scf                             ;set carry flag if empty
002D'   C9              ret ;push onto 30 byte queue, enter HL point at queue, character in A
002E'   37      push32: scf                             ;set the carry flag
002F'   F5              push    AF                      ;save the value to push
0030'   7E              ld      A,(HL)                  ;head of queue
0031'   23              inc     HL                      ;tail of queue
0032'   3C              inc     A                       ;point at next byte in queue
0033'   FE20            cp      32                      ;check if end of queue
0035'   C2 003A'        jp      nz,..1
0038'   3E02            ld      A,2                     ;if end, point at beginning
003A'   BE      ..1:    cp      (HL)                    ;compare new head to tail
003B'   CA 0016'        jp      z,full                  ;if the same, queue is full
003E'   2B              dec     HL                      ;point at head again
003F'   77              ld      (HL),A                  ;save the new head
0040'   85              add     A,L
0041'   6F              ld      L,A                     ;point at head byte
0042'   F1              pop     AF                      ;restore value
0043'   77              ld      (HL),A                  ;put data onto queue
0044'   3F              ccf                             ;clear the carry flag
0045'   C9              ret ;pull from 30 byte queue, HL = start of queue area, return with data in A
;if empty return with carry set
0046'   7E      pull32: ld      A,(HL)                  ;head
0047'   23              inc     HL                      ;point at tail
0048'   BE              cp      (HL)                    ;compare head and tail
0049'   CA 002C'        jp      z,empty                 ;if head = tail, queue empty
004C'   7E              ld      A,(HL)                  ;tail address
004D'   3C              inc     A                       ;point at tail byte
004E'   FE20            cp      32                      ;check for end of queue
0050'   C2 0055'        jp      nz,..1
0053'   3E02            ld      A,2                     ;start of queue
0055'   77      ..1:    ld      (HL),A                  ;save new tail
0056'   2B              dec     L
0057'   85              add     A,L                     ;add tail to start of queue
0058'   6F              ld      L,A                     ;point at tail byte
0059'   7E              ld      A,(HL)                  ;get data from queue
005A'   A7              and     A                       ;clear carry flag
005B'   C9              ret ;pull from 14 byte queue, HL points at queue, A is value to push
;returns with carry if full, value in A
005C'   37      push16: scf                             ;set the carry flag
005D'   F5              push    AF                      ;save value to push
005E'   7E              ld      A,(HL)                  ;head of queue
005F'   23              inc     HL                      ;tail of queue
0060'   3C              inc     A                       ;point at next byte in queue
0061'   FE10            cp      16                      ;end of queue?
0063'   C2 0068'        jp      nz,..1
0066'   3E02            ld      A,2                     ;wrap around to beginning if end
0068'   BE      ..1:    cp      (HL)                    ;compare head to tail
0069'   CA 0016'        jp      z,full                  ;if the same, queue is full
006C'   2B              dec     HL
006D'   77              ld      (HL),A                  ;save the new head
006E'   85              add     A,L
006F'   6F              ld      L,A                     ;point at the head address
0070'   F1              pop     AF
0071'   77              ld      (HL),A
0072'   3F              ccf                             ;clear the carry flag
0073'   C9              ret ;pull from 14 byte queue, HL = address of queue, return with data in A
;if empty, return with carry set
0074'   7E      pull16: ld      A,(HL)                  ;head of queue
0075'   23              inc     HL                      ;tail of queue
0076'   BE              cp      (HL)                    ;compare head and tail
0077'   CA 002C'        jp      z,empty                 ;if head = tail, queue empty
007A'   7E              ld      A,(HL)                  ;tail address
007B'   3C              inc     A                       ;point at tail byte
007C'   FE10            cp      16                      ;check for end of queue
007E'   C2 0083'        jp      nz,..1
0081'   3E02            ld      A,2                     ;wrap around if at end
0083'   77      ..1:    ld      (HL),A                  ;save the new tail address
0084'   2D              dec     L
0085'   85              add     A,L                     ;point at tail address
0086'   6F              ld      L,A
0087'   7E              ld      A,(HL)                  ;get data from queue
0088'   B7              or      A                       ;clear the carry flag
0089'   C9              ret .end
```

```
            .ident  init
            .id     033092
            .ver    1,2     ;change gain & hybrid (3/19 values)
                            ;don't initialize 1st byte of shared ram
                            ;change gain
            ;ver    1,1     ;new DSP software ;RAM version .intern sched,start .extern clock
            .extern conrcv,pcmss
            .extern st,mon,monitr,msserc,dsperc,did
            .extern ticks,tenths 0000        rstrt   =       0000h
0003        quack   =       0003h 0018        esc     =       18h 0D000       ram     =       0D000h          ;start of scratch RAM
0DC00       rrtp    =       0DC00h
0DC02       rrt     =       0DC02h
0DC7E       pstack  =       0DC7Eh
0005        taskno  =       5
0040        stksiz  =       64

.insert pcmiteio.dfn
            ;PC Mite I/O definitions 02-20-92

0000        CA0     =       0               ;serial channel 0 control registers
0002        CB0     =       2
0004        ST0     =       4               ;serial channel 0 status register
0006        TDR0    =       6               ;console transmit data
0008        RDR0    =       8               ;console receive data 0001        CA1     =       1               ;serial channel 1 control registers
0003        CB1     =       3
0005        ST1     =       5               ;status register
0007        TDR1    =       7               ;transmit data
0009        RDR1    =       9               ;receive data 000C        TMDRL0  =       0Ch             ;timer register
000E        RLDRUL  =       0Eh             ;timer 0 load registers
000F        RLDROH  =       0Fh
0010        TCR     =       10h             ;timer control register 0032        DCNTL   =       32h             ;wait state control
0033        IL      =       33h             ;interrupt vector
0034        ITC     =       34h             ;interrupt control register 0036        RCR     =       36h             ;refresh register 00EE        dspdat  =       0EEh            ;DSP data port
00EF        dspst   =       0EFh            ;DSP status port (bits 4-7)
00EF        rotsw   =       0EFh            ;card select rotary switch (bits 0-3)

00F0        msmb    =       0F0h            ;microwire 2nd byte
00F1        mfmb    =       0F1h            ;microwire 1st byte
00FA        acs     =       0FAh            ;chip select output register
00FB        mskp    =       0FBh            ;clock polarity control byte
00FC        mwm     =       0FCh            ;mode register
00FD        mskr    =       0FDh            ;clock rate register
00FE        mst     =       0FEh            ;status register
00FF        mpd     =       0FFh            ;pin definition register .insert pcmitmem.dfn
            ;PC Mite Memory definition 4-07-92

C000        consiq  =       0C000h          ;console queue
C020        rcvq    =       0C020h          ;receive message queue
C030        xmtq    =       0C030h          ;xmit message queue
C100        rcvbfs  =       0C100h          ;receive buffers
C200        xmtbfs  =       0C200h          ;transmit buffers C700        ttsen1  =       0C700h          ;DTMF generator 1 flag
C701        ttsen2  =       0C701h          ;DTMF generator 2 flag
C702        ttdet1  =       0C702h          ;DTMF detector 1 flag
C703        ttdet2  =       0C703h          ;DTMF detector 2 flag
C704        ttdet3  =       0C704h          ;DTMF detector 3 flag
C708        cnf1    =       0C708h          ;conference port 1
C709        cnf2    =       0C709h          ;conference port 2
C70A        cnf3    =       0C70Ah          ;conference port 3
C710        flshtm  =       0C710h          ;flash-hook generator timers
C720        ttdbf1  =       0C720h          ;DTMF detector buffer 1
C740        ttdbf2  =       0C740h          ;DTMF detector buffer 2
C760        ttdbf3  =       0C760h          ;DTMF detector buffer 3
C7C0        ttsbf1  =       0C7C0h          ;DTMF generator buffer 1
C7E0        ttsbf2  =       0C7E0h          ;DTMF generator buffer 2
C800        snstbl  =       0C800h          ;port status table
C808        beltmr  =       0C808h          ;phone bell timer
C810        typtbl  =       0C810h          ;port type table
C818        prothl  =       0C818h          ;protocol table
C820        statbl  =       0C820h          ;state table
C828        onhkf   =       0C828h          ;on-hook flag
```

```
C829           isens0  =   0C829h         ;current isense table
C82A           isens1  =   0C82Ah         ;100 msec current table
C82B           isens2  =   0C82Bh         ;200 msec current table
C82C           ofhkf   =   0C82Ch         ;off-hook flag
C830           rins0   =   0C830h         ;rins0 sample
C831           rins1   =   0C831h         ;rins 100 msec sample
C832           rins2   =   0C832h         ;rins 200 msec sample
C833           rins1s  =   0C833h         ;rins 1 sec. sample
C834           rins2s  =   0C834h         ;rins 2 sec. sample
C835           rnsflg  =   0C835h         ;rins detect flag
C838           rnstmr  =   0C838h         ;rins clear timers
C840           srvflg  =   0C840h         ;ground removed flag
C841           snd0    =   0C841h         ;ground 0 msec.
C842           snd1    =   0C842h         ;ground 100 msec.
C843           snd2    =   0C843h         ;ground 200 msec.
C844           gasflg  =   0C844h         ;ground asserted flag
C848           rnst0   =   0C848h         ;rins trip 0 msec.
C849           rnst1   =   0C849h         ;rins trip 100 msec.
C84A           rnst2   =   0C84Ah         ;rins trip 200 msec
C84B           rnstf   =   0C84Bh         ;rins trip flag
C84C           rmask   =   0C84Ch         ;ring mask
C850           plsbf0  =   0C850h         ;DID pulse buffer 0 msec.
C851           plsbf1  =   0C851h         ;DID pulse buffer 10 msec.
C852           plsbf2  =   0C852h         ;DID pulse buffer 20 msec.
C853           plsflg  =   0C853h         ;pulse flag
C855           dmask   =   0C855h         ;DID mask
C858           plscnt  =   0C858h         ;DID pulse count
C860           didst   =   0C860h         ;DID state
C868           didtmr  =   0C868h         ;DID timers
C870           didnum  =   0C870h         ;DID number
C878           didcnt  =   0C878h         ;DID number counter
C880           didbfs  =   0C880h         ;DID number buffers
C8E0           flshbf  =   0C8E0h         ;flash-hook detection buffers
C8E6           flshfg  =   0C8E6h         ;flash-hook flag
C8E7           onhkf2  =   0C8E7h         ;on-hook flag for phones & E&M
C8E8           lnflss  =   0C8E8h         ;line flags
C8F0           ccoecb  =   0C8F0h         ;codec buffer F800           xmtflg  =   0F800h         ;transmit flag
F801           rcvflg  =   0F801h         ;receive flag
F802           rcvbox  =   0F802h         ;receive box
F840           xmtbox  =   0F840h         ;transmit mailbox
F880           xstate  =   0F880h         ;auxiliary state table 0000'                  .loc   .prog.

0000'  F3      start:  di                 ;disable interrupts
0001'  3E00            ld     A,0
0003'  ED3936          out0   (RCR),A     ;disable dma refresh
0006'  31 DC7E         ld     SP,pstack   ;set stack pointer
0009'  3E3F            ld     A,3Fh
000B'  ED47            ld     I,A         ;set interrupt vector
000D'  ED5E            im     2           ;set interrupt mode ;initialize RAM and tables 000F'  21 C000         ld     HL,0C000h   ;set RAM to 0
0012'  11 C001         ld     DE,0C001h
0015'  01 37FF         ld     BC,37FFh
0018'  3600            ld     (HL),0
001A'  ED80            ldir
001C'  21 F801         ld     HL,rcvflg   ;initialize shared RAM except 1st byte
001F'  11 F802         ld     DE,rcvbox
0022'  01 07FE         ld     BC,07FEh
0025'  3600            ld     (HL),0
0027'  ED80            ldir ;initialize interrupt vector 0029'  3EE0            ld     A,0E0h      ;interrupt vector base 0E0h
002B'  ED3933          out0   (IL),A
002E'  3E02            ld     A,2         ;disable external interrupts except INT0
0030'  ED3934          out0   (ITC),A ;initialize the console and communications ports 0033'  3E74            ld     A,74h       ;8 data bits, no parity, CTS = 1
0035'  ED3900          out0   (CA0),A
0038'  ED3901          out0   (CA1),A
003B'  3E02            ld     A,2         ;9600 baud
003D'  ED3902          out0   (CB0),A
0040'  ED3903          out0   (CB1),A
0043'  3E00            ld     A,0         ;no interrupt on channel 1 DCD = 0
0045'  ED3905          out0   (ST1),A
0048'  3E08            ld     A,8         ;rcv. interrupt, CTS disabled
004A'  ED3904          out0   (ST0),A     ;console port ;initialize timer 0

004D'  3E09    ..tim:  ld     A,00h       ;set counter to 3072 for 100 us interrupt
004F'  ED390E          out0   (RLDR0L),A
0052'  3E0C            ld     A,0Ch
0054'  ED390F          out0   (RLDR0H),A
0057'  3E11            ld     A,11h       ;enable timer 0, interrupt
0059'  ED3910          out0   (TCR),A
```

```
                        ;set the clock counter
005C'   01 0064         ..toc:  ld      BC,0064h
005F'   ED43 0000:0C            ld      (ticks),BC
0063'   3E0A                    ld      A,10
0065'   32 0000:0b              ld      (tenths),A ;initialize the microwire interface and DSP 0068'   3E01                    ld      A,1             ;DSP restart command
006A'   D3EE                    out     (dspdst),A
006C'   DBEF                    in      A,(dspst)
006E'   E610                    and     10h
0070'   3E02                    ld      A,2             ;if slave
0072'   2802                    jr      z,..dout
0074'   3E03                    ld      A,3             ;if master
0076'   D3EE            ..dout: out     (dspdst),A
0078'   DDE3                    ex      (SP),IX         ;delay
007A'   DDE3                    ex      (SP),IX
007C'   DBEF            ..dw:   in      A,(dspst)       ;wait for DSP
007E'   E680                    and     80h
0080'   28FA                    jr      z,..dw
0082'   DBEE                    in      A,(dspdst)      ;read the DSP
0084'   3EF0                    ld      A,0F0h          ;set MII direction, bits 1-2 output
0086'   D3FF                    out     (med),A
0088'   3E0F                    ld      A,0Fh           ;deselect all chips
008A'   D3FA                    out     (mcs),A
008C'   3EFF                    ld      A,0FFh
008E'   D3FB                    out     (mskp),A        ;set clock polarity to rising edge
0090'   D3FC                    out     (mwm),A         ;select 16 bit mode all ports
0092'   3E00                    ld      A,0
0094'   D3FD                    out     (mskr),A        ;disable interrupts, master, divide for 1 clock ;initialize the ports 0096'   0606                    ld      B,6             ;# of ports
0098'   1E00                    ld      E,0             ;port #
009A'   21 00DD'        portlp: ld      HL,portbl       ;port value table
009D'   CD 00C8'                call    outprt          ;output the values
00A0'   1C                      inc     E
00A1'   10F7                    djnz    portlp ;initialize the queue pointers 00A3'   01 0202                 ld      BC,0202h
00A6'   ED43 C000               ld      (consla),BC     ;console queue
00AA'   ED43 C020               ld      (rcvq),BC       ;receive message queue
00AE'   ED43 C030               ld      (xmtq),BC       ;transmit message queue
00B2'   01 FFFF                 ld      BC,0FFFFh
00B5'   ED43 C700               ld      (txgen1),BC     ;DTMF generator class
00B9'   ED43 C702               ld      (txdst1),BC     ;DTMF detector class
00BD'   ED43 C708               ld      (cnf1),BC       ;conference class
00C1'   ED43 C709               ld      (cnf2),BC
00C5'   C3 00F4'                jp      psched          ;set up user stacks 00C8'   7B              outprt: ld      A,E
00C9'   D3FA                    out     (mcs),A         ;chip select
00CB'   7E              ..lp:   ld      A,(HL)          ;check for the end of the table
00CC'   FEFF                    cp      0FFh
00CE'   C8                      ret     z
00CF'   0EF0                    ld      C,msmb          ;2nd byte
00D1'   EDA3                    outi
00D3'   0C                      inc     C               ;1st byte
00D4'   EDA3                    outi
00D6'   DBFE            ..wlp:  in      A,(mst)         ;wait till accepted
00D8'   A7                      and     A
00D9'   28FB                    jr      z,..wlp
00DB'   18EE                    jr      ..lp 00DD'   8182            portbl: .byte   81h,82h         ;control register=power down, 2.048 MHz
00DF'   40B2                    .byte   40h,0B2h        ;Dx1 disabled
00E1'   40CA                    .byte   40h,0CAh        ;Dr1 disabled
00E3'   B4AA                    .byte   0B4h,0AAh       ;transmit gain
00E5'   F5A2                    .byte   0F5h,0A2h       ;receive gain
00E7'   EC32                    .byte   0ECh,032h       ;1st hybrid value
00E9'   243A                    .byte   024h,03Ah       ;2nd hybrid value
00EB'   E542                    .byte   0E5h,042h       ;3rd hybrid value
00ED'   0C8A                    .byte   0Ch,8Ah         ;latch data
00EF'   1C93                    .byte   1Ch,93h         ;latch direction
00F1'   1C8A                    .byte   1Ch,8Ah         ;latch data, turn off ring
00F3'   FF                      .byte   0FFh 3FE0                            .loc    3FE0h ;real time clock vectors 3FE0    0000:06         clkvec: .word   pcmsg
3FE2    0003                    .word   quack
3FE4    0000:04                 .word   clock
3FE6    0003                    .word   quack 3FEE                            .loc    3FEEh
```

```
3FEE   0000:05       convec: .word   convcv
3FF0   0003                  .word   quack
3FF2   0003                  .word   quack
3FF4   0003                  .word   quack
3FF6   0000                  .word   0
3FF8   0000                  .word   0
3FFA   0000                  .word   0
3FFC   0000                  .word   0

00F4'                        .loc    .prog.
                     ;sched places tasks on the round robin table and points to their stack 00F4'  21 0135'      psched: ld      HL,tasks        ;list of tasks
00F7'  0605                  ld      B,taskno
00F9'  DD21 DC7E             ld      IX,pstack       ;top of stack area for 1st task
00FD'  11 0040               ld      DE,stksiz       ;stack size
0100'  7E            stklp:  ld      A,(HL)          ;1st task return address
0101'  DD7700                ld      (IX),A
0104'  23                    inc     HL
0105'  7E                    ld      A,(HL)          ;high order address
0106'  DD7701                ld      (IX + 1),A
0109'  23                    inc     HL
010A'  DD19                  add     IX,DE           ;point at next task stack
010C'  10F2                  djnz    stklp 010E'  0605                  ld      B,taskno        ;round robin table
0110'  DD21 DC02             ld      IX,rrt
0114'  21 DC72               ld      HL,pstack - 12  ;set stack pointer at low address & registers
0117'  11 0040               ld      DE,stksiz
011A'  DD360001      rrtlp:  ld      (IX),1          ;set status to ready
011E'  DD7501                ld      (IX + 1),L      ;stack pointer address
0121'  DD7402                ld      (IX + 2),H
0124'  19                    add     HL,DE
0125'  DD23                  inc     IX
0127'  DD23                  inc     IX
0129'  DD23                  inc     IX              ;next RRT entry
012B'  10EB                  djnz    rrtlp           ;loop for all tasks
012D'  DD3600FF              ld      (IX),0FFh       ;end of stack flag
0131'  FB                    ei                      ;enable the interrupts
0132'  C3 016E'              jp      wrap ;list of tasks
0135'  0000:08       tasks:  .word   monitr          ;monitor task
0137'  0000:07               .word   stimul          ;stimuli processing task
0139'  0000:09               .word   msgprc          ;mailbox message processor
013B'  0000:0B               .word   did             ;DID processor
013D'  0000:0A               .word   dsPPrc          ;DSP handler .remark "
                     The last 14 bytes of the stack for each task will include the IY register
                     the IX register
                     the HL register
                     the DE register
                     the BC register
                     the AF register
                     the return address The round robin table contains a three byte entry for each task.
                     The first byte contains the status (0=NOT READY, 1=READY), the
                     next two bytes contain the stack pointer for the task.

013F'  F5            sched:  push    AF              ;save AF on task's stack
0140'  3E01                  ld      A,1             ;task status READY, task will run next time
0142'  C5            pushes: push    BC              ;save all registers on task's stack
0143'  D5                    push    DE
0144'  E5                    push    HL
0145'  DDE5                  push    IX
0147'  FDE5                  push    IY
0149'  21 0000               ld      HL,0            ;put the task stack pointer in de
014C'  39                    add     HL,SP
014D'  DD2A DC00             ld      IX,(rrtp)       ;round robin table pointer
0151'  11 0003               ld      DE,3            ;round robin table entry size
0154'  DD7700                ld      (IX),A          ;save task status
0157'  DD7501                ld      (IX + 1),L      ;save stackpointer address
015A'  DD7402                ld      (IX + 2),H
015D'  DD19          next:   add     IX,DE           ;point at next task in RRT
015F'  DD22 DC00     updat:  ld      (rrtp),IX       ;update RRT pointer
0163'  DD7E00                ld      A,(IX)          ;set status byte
0166'  B7                    or      A
0167'  CA 015D'              jp      z,next          ;if 0, task not ready to run
016A'  3C                    inc     A               ;check for FF, end of table
016B'  C2 0174'              jp      nz,gotask       ;if ready to run, do it 016E'  DD21 DC02     wrap:   ld      IX,rrt          ;if at end of table, try task at start of table
0172'  18EB                  jr      updat           ;wrap-around ;load registers for next task
0174'  DD6E01        gotask: ld      L,(IX + 1)      ;stack pointer for new task
0177'  DD6602                ld      H,(IX + 2)
```

```
017A'  F9              ld      SP,HL
017B'  FDE1            pop     IY              ;restore registers for new task
017D'  DDE1            pop     IX
017F'  E1              pop     HL
0180'  D1              pop     DE
0181'  C1              pop     BC 0182'  F1              pop     AF              ;all registers restored
0183'  C9              ret                     ;return to task 0184'  F5      dsched: push    AF              ;save flags on the task's stack
0185'  3E00            ld      A,0             ;set task's status to NOT READY
0187'  C3 0142'        jp      pushes 0000'                  .end    start
```

Segments and Symbols:

.ABS. :   Address = 0000, Size = FFFF

.FREE.    017C

.INIT :   Address = 0000, Size = 018A

START   0000    SCHED   213F

QUEUES:   Address = 218A, Size = 008A

PUSHPG  218A    PULLPG  21A2    PUSH32  21B8    PULL32  21D7
  PUSH16  21E6    PULL16  21FE

CLOCK :   Address = 2214, Size = 0310

CLOCK   2214

PRTINT:   Address = 2524, Size = 0070

PCMSG   2524    CONRCV  2568

STATE :   Address = 2594, Size = 052C

STATE   2594

SUPORT:   Address = 2AC0, Size = 021F

STMSG   2AC0    SETHK   2AF1    CLRHK   2AF8    CNCT    2B05
  DCNCT   2B19    VSCNT   2B2D    HOLD    2B3D    DHOLD   2B49
  LISTEN  2B58    DLISTN  2B6A    GLISTN  2B73    DXMIT   2B8D
  XMIT    2B93    CONF    2BAD    RINGIT  2BC7    UNRING  2BEC
  GNDIT   2C08    RMVGND  2C11    FLSHIT  2C26    HYGAIN  2C2C
  RNGTIM  2C89    PRTTYP  2C93    MIDIO   2CA7    UNCONF  2CC7

MONITO:   Address = 2CDF, Size = 068B

MONITR  2CDF    PHRS    322A    CONBIT  3250    ASCHEX  3259

MSGPRC:   Address = 3367, Size = 0527

MSGPRC  3367    GXBLK   3B5F

STIMUL:   Address = 388E, Size = 0226

STIMUL  388E

DID   :   Address = 3AB4, Size = 00A3

DID     3AB4

DSPPRC:   Address = 3B57, Size = 0253

DSPPRC  3B57    CLRTTD  3D2B    CONFEM  3D64    DSPSND  3D92

/CLOCK :  Address = D800, Size = 0005

TENTHS  D800    TICKS   D801    SCNT    D802    IFLAG   D803

/STATE :  Address = D805, Size = 0004

/SUPORT:  Address = D809, Size = 0008

/MONITO:  Address = D811, Size = 007E

SHWFLG  D811    RCVBUF  D83E    XMTBUF  D85E    OTNFHN  D87E

/MSGPRC:  Address = D88F, Size = 0032

XBLKMP  D88F    XBLKMP  D890

/STIMUL:  Address = D8C1, Size = 0005

/DSPPRC:  Address = D8C6, Size = 0012

DSPFLG  D8C6

Modules:

| Name | ID# | Version | Revision | Source File |
|---|---|---|---|---|
| INIT | 033092 | 1 | 2 | PCSTART .ZSM |
| QUEUES | 071983 | 2 | 0 | QUEUES .ZSM |
| CLOCK | 040792 | 1 | 3 | CLOCK .ZSM |
| COMMNT | 033092 | 1 | 0 | COMMNT .ZSM |
| STATE | 040792 | 1 | 3 | STATE .ZSM |
| SUPORT | 040792 | 1 | 3 | SUPPORT .ZSM |
| MONITO | 040692 | 1 | 3 | MONITOR .ZSM |
| MSGPRC | 041392 | 1 | 5 | MESSAGE .ZSM |
| STIMUL | 041792 | 1 | 3 | STIMULI .ZSM |
| DID | 041792 | 1 | 5 | DID .ZSM |
| DSPPRC | 040792 | 1 | 4 | DSP .ZSM |

```
{-
    Call Progress and DTMF Signal Generator

Revision History:

03/20/92:   Changed transmit output so i4 points to txbuf at start and
                i2 points to txbuf+12 at start.
                Added initialization for i2 and i4 in tx interrupt.
                Added initialization for i6 in rx interrupt.
                These are to prevent possibility of permanent loss of
                synchronization between SPORT and interrupt routines.

04/14/92:   Changed "si=dm(i0,m0)" to "si=dm(i0,m3)" and removed
                modify instruction in X_shift2 loops.
                Scaled down output of single frequency tones.
                Corrected a pointer in conference setup routine.

ADSP-2101

Outputs call progress tones and DTMF on PCM highway.

Timeslot 0:  DTMF port 0
    Timeslot 1:  DTMF port 1
    Timeslot 2:  dialtone
    Timeslot 3:  reorder
    Timeslot 4:  busy
    Timeslot 5:  ringback
    Timeslot 6:  1004 Hz Digital milliWatt
    Timeslot 7:  Conference output 1
    Timeslot 8:  Conference output 2
    Timeslot 9:  Conference output 3
    Timeslot 10: Conference output 4
    Timeslot 11: Conference output 5
    Timeslot 12: Conference output 6

Reserved registers:  i2 = pointer to transmit buffer in interrupt
                         i3 = circular buffer for dtmf generators
                         i4 = circular buffer for serial transmitter
                         i6 = circular buffer for serial receiver
-}

.module/boot=0/abs=0    CLOCKS;
.port FIFO;

.const  baddigitcode    = h#FFFF;   { output code for non-digit }
.const  pass_posttests  = 0;
.const  fail_minsig     = 1;
.const  fail_relpeak    = 2;
.const  fail_twist      = 3;
.const  fail_2ndharm    = 4;
.const  fail_energy     = 5;
.const  countval        = 120;
.const  channels        = 3;            { number of DTMF detector }
.const  Qbufsize        = channels * 32;    { total size of Q1Q2 buffers }
.const  magsize         = channels * 8;     { total size of magsqr buffers }

.const  min_tone_level    = h#0040; { min "tone-present" magsqr level }
.const  max_notone_level  = h#0CCD; { .100 max "tone-not-present" level }
.const  max_2ndharm_level = h#2000; { .25 2nd harm must be lt this level }
.const  max_2ndharm_sum   = h#1000; { .125 sum of 2nd harms must be lt this }
```

```
.const   maxfortwist          = h#287A;  { -5 dB row/col must be gt this value }
.const   maxrevtwist          = h#0F00;  { -9.31 dB col/row  must be gt this value }
.const   rowratio             = h#1000;  { .125 row energy gt this * total energy }
.const   colratio             = h#0800;  { .0625 col energy gt this * total energy }
.const   sumratio             = h#6333;  { .7750 row + col gt this * total energy }
.const   confratio            = h#7333;  { .9 approximately -1 dB }

{ *** housekeeping variables *** }
{ these are 16.0 fixed point integers }
.var    countdtmf;                       { counts samples for DTMF detector  }

{ the next variables are 1.15 fixed point fractions }
.var/circ
        A_Q1Q2_buff[32],                 { Goertzel feedback loop storage elements }
        B_Q1Q2_buff[32],
        C_Q1Q2_buff[32];

.var    A_magsqr[8],                     { 1.15 magsqr Goertzel result values }
        B_magsqr[8],
        C_magsqr[8];

{ *** individual channel variables *** }
.var    A_NRG_hi;
.var    A_NRG_lo;                        { energy buffer }
.var    A_shift;                         { shift value for incoming data }
.var    A_shiftflag;                     { flag to indicate time to shift }
.var    A_maxrowval;                     { 1.15 magsqr value of max row fundamental }
.var    A_maxcolval;                     { 1.15 magsqr value of max col fundamental }
.var    A_whichrow;          { 0,1,2,3,4 means: invalid, row1, row2, row3, row4 }
.var    A_whichcol;          { 0,1,2,3,4 means: invalid, col1, col2, col3, col4 }
.var    A_rowharm;                       { 1.15 magsqr value of row second harmonic }
.var    A_colharm;                       { 1.15 magsqr value of col second harmonic }
.var    A_digit_history[2];              { remember last 2 digits (non-digits) }
.var    A_digit_flag;                    { flag set when digit received }
.var    A_failurecode;                   { see .const definitions above }

.var    B_NRG_hi;
.var    B_NRG_lo;                        { energy buffer }
.var    B_shift;                         { shift value for incoming data }
.var    B_shiftflag;                     { flag to indicate time to shift }
.var    B_maxrowval;                     { 1.15 magsqr value of max row fundamental }
.var    B_maxcolval;                     { 1.15 magsqr value of max col fundamental }
.var    B_whichrow;          { 0,1,2,3,4 means: invalid, row1, row2, row3, row4 }
.var    B_whichcol;          { 0,1,2,3,4 means: invalid, col1, col2, col3, col4 }
.var    B_rowharm;                       { 1.15 magsqr value of row second harmonic }
.var    B_colharm;                       { 1.15 magsqr value of col second harmonic }
.var    B_digit_history[2];              { remember last 2 digits (non-digits) }
.var    B_digit_flag;                    { flag set when digit received }
.var    B_failurecode;                   { see .const definitions above }

.var    C_NRG_hi;
.var    C_NRG_lo;                        { energy buffer }
.var    C_shift;                         { shift value for incoming data }
.var    C_shiftflag;                     { flag to indicate time to shift }
.var    C_maxrowval;                     { 1.15 magsqr value of max row fundamental }
.var    C_maxcolval;                     { 1.15 magsqr value of max col fundamental }
.var    C_whichrow;          { 0,1,2,3,4 means: invalid, row1, row2, row3, row4 }
.var    C_whichcol;          { 0,1,2,3,4 means: invalid, col1, col2, col3, col4 }
.var    C_rowharm;                       { 1.15 magsqr value of row second harmonic }
.var    C_colharm;                       { 1.15 magsqr value of col second harmonic }
.var    C_digit_history[2];              { remember last 2 digits (non-digits) }
.var    C_digit_flag;                    { flag set when digit received }
.var    C_failurecode;                   { see .const definitions above }

.var    doneflag,                        { flag to indicate done collecting samples }
        shifter;                         { temp flag indicates data needs shifting }

.var/pm/ram/circ
        coefs[16];                       { 2.14 Goertzel coefs: 2*cos(2*PI*fi/fs) }

{ *** variable initializations   exact frequencies *** }
.init   coefs[00]:  h#6D4C00, h#694C00, h#646500, h#5E9B00;
.init   coefs[04]:  h#4A8100, h#3FC500, h#331D00, h#246300;
.init   coefs[08]:  h#3AA600, h#2D3F00, h#1D7D00, h#0BD800;
.init   coefs[12]:  h#D6BB00, h#BF8900, h#A8D200, h#94B000;

.var/pm digitlist[16];                   { ASCII values of digits to output}
```

```
.init    digitlist[0]:    h#003100, h#003200, h#003300, h#003A00;
.init    digitlist[4]:    h#003400, h#003500, h#003600, h#003B00;
.init    digitlist[8]:    h#003700, h#003800, h#003900, h#003C00;
.init    digitlist[12]:   h#003E00, h#003000, h#003F00, h#003D00;

{ dynamic scratchpad variables }
.const   lpausechar    = h#0013;    { Offset of long pause }
.const   spausechar    = h#0012;    { Offset of short pause }
.const   pause_dura    = 10 - 1;    { long pause is 10 DTMF tones }
.const   clear_length  = 51;        { will clear the following variables }
.var     CPsum[5],                  { phase accumulators for call progress tones }
         CPsin[5],                  { output values after calculating sine }
         rrdr_on,                   { counter for reorder on time }
         rrdr_off,                  { counter for reorder off time }
         bsy_on,                    { counter for busy on time }
         bsy_off,                   { counter for busy off time }
         ring_on,                   { counter for ringback on time }
         ring_off,                  { counter for ringback off time }
         toneflg0,                  { dial flag for DTMF port 0 }
         toneflg1,                  { dial flag for DTMF port 1 }
         freq0[2],                  { frequency buffer for DTMF port 0 }
         freq1[2],                  { frequency buffer for DTMF port 1 }
         phase0[2],                 { phase accumulators for DTMF port 0 }
         phase1[2],                 { phase accumulators for DTMF port 1 }
         tonepnt0,                  { pointers to next byte in tone buffer }
         tonepnt1,
         tmp_i1,                    { temporary storage for i1 }
         tmp_i3,                    { temporary storage for i3 }
         tmp2_i3,                   { additional temp storage for i3 }
         tmp_i5,                    { temporary storage for i5 }
         tmp2_i5,                   { additional temp storage for i5 }
         pausing0,                  { flag to indicate long pause in process }
         pausing1,
         confbuf[6],                { buffer for conference summation }
         rxintpnt[9],               { pointer to receive data }
         running;                   { flag to indicate that SPORTs are running }

.var     tonecnt0,                  { counters for dtmf tones }
         tonecnt1,
         tone_dura,                 { tone duration in 125 uS increments }
         rxintbuf[9];               { buffer for receive interrupt data }

.const           BUF_LENGTH = 34;           { size of DTMF buffer }
.var             tonebuf0[BUF_LENGTH],      { dtmf output buffer 0 }
                 tonebuf1[BUF_LENGTH];      { dtmf output buffer 1 }
.var/circ        rxbuf[31];                 { receive buffer }
.var/circ        txbuf[13];                 { transmit buffer }
                                            { WARNING!!! If length of txbuf is
                                              changed, pointer initialization for
                                              i2 MUST also be changed!!! }
```

```
{---------------------------------------------------------------------
   Values are stored in the dial list as follows:
                                                        (E=*, F=#)
   DTMF digits   ==> h#000y,  where y=0,1,2,3,4,5,6,7,8,9,A,B,C,D,E,F
   Other digits  ==> h#0010 = 697 Hz tone.
                     h#0011 = 904 Hz tone.
                     h#0012 = 1 digit pause
                     h#0013 = 10 digit pause
   End of string ==> h#001F
---------------------------------------------------------------------}
```

```
{---------------------------------------------------------------------

The following are the advance values for all frequencies used to generate
   call progress and signalling tones (including ring, busy, reorder, dialtone
   DTMF, MF, and digital mW at 1004 Hz). The advance is
   65536 * (desired frequency)/(sampling frequency) or 8.192*(desired freq.)
   Since we use integers, the fractional portion has been rounded.
   Finally, since all are in PM the 8 LSBs are not loaded on a MOVE operation.

The maximum amplitude from a "standard" CODEC is defined as 3.17 dBm
   (Nat'l Semi 1990 Telecom Databook - AN-614, p. 4-53). The sine routine
   gives a 16 bit value. Multiplying this number by a 1.16 number will give
   a scaled 16 bit output. Since the u-Law conversion uses 14 bits, the
``` actual scaling value will be shifted right two bits to perform a divide by 4. This scaling is included in the scaling constants.

Two sine waves at equal amplitude and different frequencies give a sum that is 3 dB higher than either one separately. RS-464 lists the required amplitudes for DTMF and call progress signals. These have been used to calculate the scaling factor. The scale factor is:

SF = (.6 * 10^(A/10))^(1/2) / 1.1158 where A is the desired power expressed in dBm.
1.1158 is the RMS voltage corresponding to 3.17 dBm.

The following table gives all scaling factors:

| Tone | Combined Level | Each Level | Scale (Decimal) | Scale/4 (Hex) | |
|---|---|---|---|---|---|
| DTMF | 0.00 dBm | - 3.00 dBm | 0.4909 | 0FB5 | (exactly 1/2 power) |
| Dialtone | -13.75 dBm | -16.75 dBm | 0.1009 | 033B | |
| Reorder | -21.00 dBm | -24.00 dBm | 0.0438 | 0167 | |
| Busy | -21.00 dBm | -24.00 dBm | 0.0438 | 0167 | |
| Ringback | -13.00 dBm | -16.00 dBm | 0.1100 | 0385 | |
| Digital mW | 0.00 dBm | 0.00 dBm | 0.6942 | 1637 | |

The following is simply a reference guide

```
Row 0:          h#164E;          697 (2B9) Hz * 8.192
Row 1:          h#18A4;          770 (302) Hz * 8.192
Row 2:          h#1B44;          852 (354) Hz * 8.192
Row 3:          h#1E1D;          941 (3AD) Hz * 8.192
Col 0:          h#26B0;         1209 (4B9) Hz * 8.192
Col 1:          h#2AC1;         1336 (538) Hz * 8.192
Col 2:          h#2F44;         1477 (5C5) Hz * 8.192
Col 3:          h#3442;         1633 (661) Hz * 8.192
                h#0B33;          350 (15E) Hz * 8.192
                h#0E14;          440 (1B8) Hz * 8.192
                h#0F5C;          480 (1E0) Hz * 8.192
                h#13D7;          620 (26C) Hz * 8.192
                h#1666;          700 (2BC) Hz * 8.192
                h#1CCD;          900 (384) Hz * 8.192
                h#2333;         1100 (44C) Hz * 8.192
                h#299A;         1300 (514) Hz * 8.192
                h#3000;         1500 (5DC) Hz * 8.192
                h#3666;         1700 (6A4) Hz * 8.192
                h#2021;         1004 (3EC) Hz * 8.192
```

```
{ NOTE *** put all fixed DM inits into PM and copy over into DM !! *** NOTE }
.const  SLAVE_RSP  = h#0001;   { Response to SLAVE command }
.const  MSTR_RSP   = h#0002;   { Response to MASTER command }
.const  DIAL0_RSP  = h#0003;   { Port 0 Dial Complete }
.const  DIAL1_RSP  = h#0004;   { Port 1 Dial Complete }
.const  DETECT0    = h#0005;   { DTMF Detector 0 has valid digit }
.const  DETECT1    = h#0006;   { DTMF Detector 1 has valid digit }
.const  DETECT2    = h#0007;   { DTMF Detector 2 has valid digit }
.const  DTMFscale  = h#0FB5;   { scale factor for DTMF tones }
.const  DIALscale  = h#033B;   { scale factor for dialtone }
.const  BUSYscale  = h#0167;   { scale factor for busy and reorder tones }
.const  RINGscale  = h#0385;   { scale factor for ringback tones }
.const  DMWscale   = h#1637;   { scale factor for digital mW }

.const  MAX_CMD    = h#000C;   { greatest command is 0Ch in this version }
.var/pm PM_subs[MAX_CMD+1],    { commands from 64180 }
        PM_rrdr_dura[2],       { reorder duration in 125 uS increments }
        PM_bsy_dura[2],        { busy duration in 125 uS increments }
        PM_ring_dura[2],       { ringback duration in 125 uS increments }
        PM_CPTone[5],          { call progress tone frequencies }
        PM_digits[40];         { frequencies for DTMF dialing }

.init   PM_subs[0]:    ^dummy,    ^breset,    ^slaveset,  ^mstrset;
.init   PM_subs[4]:    ^dial0,    ^dial1,     ^detect0,   ^detect1;
.init   PM_subs[8]:    ^detect2,  ^confrnc1,  ^confrnc2,  ^deltadur;
.init   PM_subs[12]:   ^download;
```

```
.init   PM_rrdr_dura[0]:    h#07D000, h#07D000; { 250 milliseconds }
.init   PM_bsy_dura[0]:     h#0FA000, h#0FA000; { 500 milliseconds }
.init   PM_ring_dura[0]:    h#3E8000, h#7D0000; { 2 seconds, 4 seconds }
.init   PM_CPTone[0]:       h#0B3300, h#0E1400, h#0F5C00, h#13D700, h#202100;

.init   PM_digits[00]:  h#1E1D00,h#2AC100, h#164E00,h#26B000;
.init   PM_digits[04]:  h#164E00,h#2AC100, h#164E00,h#2F4400;
.init   PM_digits[08]:  h#18A400,h#26B000, h#18A400,h#2AC100;
.init   PM_digits[12]:  h#18A400,h#2F4400, h#1B4400,h#26B000;
.init   PM_digits[16]:  h#1B4400,h#2AC100, h#1B4400,h#2F4400;
.init   PM_digits[20]:  h#164E00,h#344200, h#18A400,h#344200;
.init   PM_digits[24]:  h#1B4400,h#344200, h#1E1D00,h#344200;
.init   PM_digits[28]:  h#1E1D00,h#26B000, h#1E1D00,h#2F4400;
.init   PM_digits[32]:  h#164E00,h#000000, h#1E1D00,h#000000; { 697 Hz, 941 Hz }
.init   PM_digits[36]:  h#000000,h#000000, h#000000,h#000000; { silence }

{------------------------------------------------------------------

All of the following are MF tones. These are not currently implemented
    but may be added if and when it is necessary.

.init   PM_digits[32]:  h#299A00,h#300000, h#166600,h#1CCD00;
.init   PM_digits[36]:  h#166600,h#233300, h#1CCD00,h#233300;
.init   PM_digits[40]:  h#166600,h#299A00, h#1CCD00,h#299A00;
.init   PM_digits[44]:  h#233300,h#299A00, h#166600,h#300000;
.init   PM_digits[48]:  h#1CCD00,h#300000, h#233300,h#300000;
.init   PM_digits[52]:  h#233300,h#366600, h#166600,h#366600;
.init   PM_digits[56]:  h#1CCD00,h#366600, h#299A00,h#366600;
.init   PM_digits[60]:  h#300000,h#366600, h#366600,h#366600;

------------------------------------------------------------------}

{------------------------------------------------------------------ pick out the largest row and col magsqr, remember which ones, how big

INPUT:  pointer to top of channel's magsqr buffer
    OUTPUT: index of detected row and col tones
        value of detected row and col tones

------------------------------------------------------------------}

.macro  maxrowcol( %0, %1, %2, %3, %4, %5 );
        { ^magsqr, maxrowval, whichrow, maxcolval, whichcol,
          failurecode }
.local  findmaxrow;
.local  findmaxcol;
.local  failsiglevel;
.local  done;

i3 = %0;
        ax1 = 0;                    { set up variables in case nothing found }
        ay1 = 0;                    { set up variables in case nothing found }
        ay0 = 0;                    { initialize BIGGEST-VALUE-SO-FAR to zero }
        cntr = 4;
        do findmaxrow until ce;
            ax0 = dm(i3,m0);        { read CURRENT-MNSQR-VALUE }
            ar = ax0 - ay0;         { compare to BIGGEST-VALUE-SO-FAR }
            if le jump findmaxrow;
            ax1 = 5;
            ay0 = ax0;              { if CURRENT is bigger, remember value }
            ay1 = cntr;             { if CURRENT is bigger, remember index }
            dm(%1) = ay0;           { remember the largest magsqr value }
findmaxrow: nop;
        ar = ax1 - ay1;
        dm(%2) = ar;                { remember index of the biggest row (1,2,3,4) }
        ax0 = min_tone_level;
        ar = ay0-ax0;
        if lt jump failsiglevel;
        ax1 = 0;
        ay1 = 0;
        ay0 = 0;
        cntr = 4;
        do findmaxcol until ce;
            ax0 = dm(i3,m0);
            ar = ax0 - ay0;
            if le jump findmaxcol;
            ax1 = 5;
            ay0 = ax0;
```

```
                ay1 = cntr;
                dm(%3) = ay0;
findmaxcol: nop;
                ar = ax1 - ay1;
                dm(%4) = ar;
                ax0 = min_tone_level;
                ar = ay0 - ax0;
                if ge jump done;

failsiglevel:
                ay0 = fail_minsig;
                dm(%5) = ay0;
done:       nop;

.endmacro;
```

{-
    verifies that only one valid row tone and only one col tone is present

INPUT: pointer to top of channel's magsqr buffer
    index of detected row and col tones
    OUTPUT: failurecode set if test fails
-}

```
.macro   no_other_peaks( %0, %1, %2, %3 );
         { magsqr, maxrowval, maxcolval, failurecode }

.local   looper;
.local   looper1;
.local   failrelpeak;
.local   done;

my0 = max_notone_level;         { scale factor }
            sr1 = dm(%1);                    { maxrowval }
            mr = sr1 * my0 (SS);             { multiply }
            af = pass 0;
            i3 = %0;
            cntr = 4;
            do looper until ce;
                ay0 = dm(i3,m0);
                ar = mr1 - ay0;              { difference }
looper:     if lt af = af + 1;
            sr1 = dm(%2);
            mr = sr1 * my0 (SS);
            cntr = 4;
            do looper1 until ce;
                ay0 = dm(i3,m0);
                ar = mr1 - ay0;              { difference }
looper1:    if lt af = af + 1;
            ax1 = 2;                         { check if only 2 tones are over their }
            ar = ax1 - af;                   { max notone level thresholds }
            if eq jump done;
failrelpeak:
            ay0 = fail_relpeak;
            dm(%3) = ay0;                    { set failurecode }
done:       nop;
.endmacro;
```

{-
    checks difference between row tone level and col tone level (twist)

INPUT: index of detected row and col tones
        value of detected row and col tones
    OUTPUT: forward twist flag or reverse twist flag set appropriately
        twist amount as a ratio ( row/col [fwd] or col/row [rev] )
        failurecode set if test fails
-}

```
.macro   twisttests( %0, %1, %2 );
         { maxrowval, maxcolval, failurecode }
.local   standard;
.local   reverse;
.local   failtwist;
.local   done;
```

```
              ax0 = dm(%0);
              ay0 = dm(%1);
              ar = ax0 - ay0;
              if gt jump reverse;
standard:
              mx0 = dm(%1);
              my0 = maxfortwist;
              mr = mx0 * my0 (ss);             { mr = maxcolval*maxfortwist }
              ay0 = dm(%0);                    { maxrowval }
              ar = mr1 - ay0;                  { maxcol*maxfortwist-maxrowval }
              if gt jump failtwist;
              jump done;
reverse:
              mx0 = dm(%0);
              my0 = maxrevtwist;
              mr = mx0 * my0 (ss);             { mr = maxrowval*maxrevtwist }
              ay0 = dm(%1);                    { maxcolval }
              ar = mr1 - ay0;                  { maxrowval*maxrevtwist-maxcolval }
              if le jump done;

failtwist:
              ay0 = fail_twist;
              dm(%2) = ay0;
done:    nop;
.endmacro;

{-------------------------------------------------------------------------
|
|    checks for excessive energy in second harmonics of detected tones
|
|    INPUT:   pointer to top of channel's Goertzel feedback buffer
|         index of detected row and col tones
|         pointers to variables which hold channel's 2nd harmonic levels
|    OUTPUT: value of channel's row and col 2nd harmonic levels
|         failurecode set if test fails
|
-------------------------------------------------------------------------}

.macro    check2ndharm( %0, %1, %2, %3, %4, %5, %6, %7, %8, %9);
          { ^Q1Q2_buff, whichrow, ^rowharm, rowharm,
            whichcol, ^colharm, colharm, failurecode,
            maxrowval, maxcolval }

.local    fail2ndharm;
.local    done;

ay0 = %0;
              mr0 = dm(%1);
              sr = ashift mr0 by 1 (hi);       { range: 1,2,3,4 ==> 2,4,6,8 }
              ay1 = 14;
              ar = sr1 + ay1;
              ar = ar + ay0;
              i0 = ar;                         { i0 points to ^Q1Q2_buff+16+2*(whichrow-1) }
              ay0 = ^coefs;
              af = mr0 + ay0;
              ax0 = 7;
              ar = ax0 + af;
              i7 = ar;                         { i7 points to ^coefs+8+whichrow-1 }
              i3 = %2;                         { i3 points to ^rowharm }
              call magsqr;
              my0 = max_2ndharm_level;
              sr1 = dm(%8);
              mr = sr1 * my0 (SS);             { max 2ndharmonic level }
              ay0 = dm(%3);                    { rowharm }
              ar = ay0 - mr1;                  { get difference }
              if gt jump fail2ndharm;

ay0 = %0;
              mr0 = dm(%4);
              sr = ashift mr0 by 1 (hi);       { range: 1,2,3,4 ==> 2,4,6,8 }
              ay1 = 22;
              ar = sr1 + ay1;
              ar = ar + ay0;
              i0 = ar;                         { i0 points to ^Q1Q2_buff+16+8+2*(whichcol-1) }
              ay0 = ^coefs;
              af = mr0 + ay0;
              ax0 = 11;
              ar = ax0 + af;
              i7 = ar;                         { i7 points to ^coefs+8+4+whichcol-1 }
```

```
        i3 = %5;                        { i3 points to ^colharm }
        call magsqr;
        my0 = max_2ndharm_level;
        sr1 = dm(%9);
        mr = sr1 * my0 (SS);            { max 2ndharmonic level }
        ay0 = dm(%6);                   { colharm }
        ar = ay0 - mr1;                 { get difference }
        if gt jump fail2ndharm;
        ax0 = dm(%8);                   { maxrowval }
        ay0 = dm(%9);                   { maxcolval }
        ar = ax0 + ay0;
        my0 = max_2ndharm_sum;
        mr = ar * my0 (SS);
            ax0 = dm(%3);
            ay0 = dm(%6);               { get magsqr of harmonics }
            af = ax0 + ay0;
            ar = mr1 - af;              { take difference }
            if gt jump done;            { ok, bail out }
fail2ndharm:
        ay0 = fail_2ndharm;
        dm(%7) = ay0;
done:   nop;
.endmacro;
```

{------------------------------------------------------------------ checks ratio of maxrow and maxcol values to total energy.

INPUT:  pointer to top of channel's magsqr buffer
            maxcolval and maxrowval
    OUTPUT: failurecode set if test fails

------------------------------------------------------------------}

```
.macro  checkenergy( %0, %1, %2, %3);
            { NRG_hi, maxrowval, maxcolval, failurecode }
.local  failenergy;
.local  done;

mx0 = dm(%0);                   { get energy }
        my0 = countval;                 { get # of samples }
        mr  = mx0 * my0 (SS);           { multiply }
        se  = exp mr1 (hi);             { normalize value so best precision }
        sr  = norm mr1 (hi);
        sr  = sr or norm mr0 (lo);      { scaled 16 bit value is in sr1 }
        mx0 = sr1;                      { save temporarily }
        ar  = -14;                      { includes X4 because of MAC shifting}
        ay0 = se;
        ar  = ar - ay0;                 { convert shift value }
        se  = ar;
        my0 = rowratio;                 { get ratio for row value }
        mr  = mx0 * my0 (SS);           { multiply by energy }
        ar  = dm(%1);                   { get row value }
        sr  = ashift ar (hi);           { scale and save in sr1 }
        ay0 = sr1;
        ar  = mr1 - ay0;                { compare scaled value with ratio }
        if gt jump failenergy;          { if ratio > row, fail } my0 = colratio;
        mr  = mx0 * my0 (SS);           { multiply energy by ratio }
        ar  = dm(%2);                   { get column value }
        sr  = ashift ar (hi);           { scale }
        af  = sr1 + ay0;                { calculate sum for later }
        ay0 = sr1;
        ar  = mr1 - ay0;                { compare scaled with ratio }
        if gt jump failenergy;

my0 = sumratio;                 { get ratio of row+col }
        mr  = mx0 * my0 (SS);           { multiply energy by ratio }
        af  = mr1 - af;                 { compare }
        if le jump done;

failenergy:
        ay0 = fail_energy;
        dm(%3) = ay0;
done:   nop;
.endmacro;
```

```
{--------------------------------------------------------------------
    the hexadecimal value to output for a given DTMF digit is generated
    and output if necessary, digit_history updated, failurecode cleared INPUT:   index of detected row and col tones
         failurecode
    OUTPUT:  digit_history list updated with latest hex output code
         hex output code written to output port if the current code is
             the same as the previous code, but different from the
             one before that
         failurecode cleared for next DTMF decode operation
--------------------------------------------------------------------}

.macro  outputcode( %0, %1, %2, %3, %4, %5);
        { whichrow, whichcol, digit_history, failurecode,
          digit_flag, detector }
.local  checkfailures;
.local  digitdetected;
.local  nodigit;
.local  readlist;
.local  quiet;
.local  pushlist;

checkfailures:
        ay0 = dm(%3);
        ar = pass ay0;
        if ne jump nodigit;
digitdetected:
        ay0 = dm(%1);
        ar = ay0 - 1;
        sr1 = ar;
        ay0 = dm(%0);
        ar = ay0 - 1;
        sr = sr or lshift ar by 2 (hi);
        jump readlist;
nodigit:
        sr1 = baddigitcode;
readlist:
        ay0 = dm(%2);
        ay1 = dm(%2 + 1);
        ar = sr1 - ay0;                 { is it same as last digit? }
        if ne jump pushlist;            { no, don't process any more }
        ay1 = dm(%4);                   { digit flag }
        ar = pass sr1;
        if lt jump quiet;               { if not a digit, do quiet stuff }
        ar = pass ay1;                  { see if during digit }
        if ne jump pushlist;            { yes, don't process }
        ar = -1;                        { set flag }
        dm(%4) = ar;
        ar = %5;                        { output command for detected digit }
        dm(FIFO) = ar;
        ay1 = ^digitlist;
        ar = sr1+ay1;
        i5 = ar;
        ar = pm(i5,m4);
        dm(FIFO) = ar;
        jump pushlist;                  { sent tone, now finish up }
quiet:  ar = pass ay1;                  { see if doing digit }
        if eq jump pushlist;            { no, don't do anything }
        ar = 0;
        dm(%4) = ar;                    { clear flag }
pushlist:
        dm(%2+1) = ay0;                 { move previous byte }
        dm(%2) = sr1;                   { move current byte }
        ay0 = pass_posttests;
        dm(%3) = ay0;
        dm(%0) = ay0;
        dm(%1) = ay0;
.endmacro;

{--------------------------------------------------------------------

INTERRUPT VECTOR TABLE
--------------------------------------------------------------------}

RESTART:    call DM_inits;      { copy DM .inits from bootable PM space }
            call CntlReg_inits; { set up SPORTS, TIMER, etc }
            call recycle;       { set up dtmf detection parameters }
```

```
                    jump wait_cmd;         { and start code }
IRQ2:               rti; rti; rti; rti;
S0_TX:              call eight_khz;        { SPORT0 Transmit interrupt }
                    dis sec_reg;
                    rti;
                    rti;
S0_RX:              call rx_int;           { SPORT0 Receive interrupt }
                    call restore;
                    rti;
                    rti;
S1_TX_IRQ1:  rti; rti; rti; rti;  { SPORT1 TRANSMIT INT }
S1_RX_IRQ0:  rti; rti; rti; rti;  { SPORT1 RECEIVE INT }
TIMER_DONE:  rti; rti; rti; rti;  { TIMER INTERRUPT }
```

{---------------------------------------------------------------
    WAIT_CMD:

Calls idle routine.  When FLAG_IN goes valid, idle routine returns.  The
    command will then be processed.
----------------------------------------------------------------}

```
wait_cmd:   call idling;
            ay0 = MAX_CMD;             { see if command }
            af  = ay0 - ar;
            if lt jump wait_cmd;       { no, ignore command }
            ay0 = ^PM_subs;            { address }
            ar  = ar + ay0;            { add to get offset }
            i5  = ar;                  { move into index register }
            si  = pm(i5,m7);           { get data into si }
            i5  = si;                  { and put into index register }
            call (i5);                 { call routine }
            jump wait_cmd;             { go back for more }
```

{---------------------------------------------------------------
    DO_CMD:

This routine runs when a command has been received during another command.
    It is basically the same as the normal command processor, except it does
    a jump instead of a call.  Thus, we can get back to the normal command
    processor when this is done.
----------------------------------------------------------------}

```
do_cmd:     ay0 = ^PM_subs;            { address }
            ar  = ar + ay0;            { add to get offset }
            i5  = ar;                  { move into index register }
            si  = pm(i5,m7);           { get data into si }
            i5  = si;                  { and put into index register }
            jump (i5);                 { call routine }
```

{---------------------------------------------------------------
    INTERRUPT SERVICE ROUTINES
----------------------------------------------------------------}

{---------------------------------------------------------------
    RX_INT:

Processes the receive interrupt.

----------------------------------------------------------------}

```
rx_int:     i6 = ^rxbuf;                      { reset buffer pointer just in case }
            ena sec_reg;
            dm(tmp_i1) = i1;
            dm(tmp_i3) = i3;
            i1  = ^rxintbuf;
            i3  = dm(rxintpnt);
            ax0 = dm(i3,m3);
            dm(i1,m0) = ax0;
            i3  = dm(rxintpnt+1);
            ax0 = dm(i3,m3);
            dm(i1,m0) = ax0;
```

```
            i3  = dm(rxintpnt+2);
            ax0 = dm(i3,m3);
            dm(i1,m0) = ax0;
            i3  = dm(rxintpnt+3);
            ax0 = dm(i3,m3);
            dm(i1,m0) = ax0;
            i3  = dm(rxintpnt+4);
            ax0 = dm(i3,m3);
            dm(i1,m0) = ax0;
            i3  = dm(rxintpnt+5);
            ax0 = dm(i3,m3);
            dm(i1,m0) = ax0;
            i3  = dm(rxintpnt+6);
            ax0 = dm(i3,m3);
            dm(i1,m0) = ax0;
            i3  = dm(rxintpnt+7);
            ax0 = dm(i3,m3);
            dm(i1,m0) = ax0;
            i3  = dm(rxintpnt+8);
            ax0 = dm(i3,m3);
            dm(i1,m0) = ax0;
            my0 = confratio;              { conference 1 start }
            i3  = ^rxintbuf+3;
            i1  = ^confbuf;
            ax0 = dm(i3,m0);
            ay0 = dm(i3,m0);
            ax1 = dm(i3,m0);
            ay1 = ax1;
            ar  = ay0 - ax1;
            mr  = ar * my0 (SS);
            dm(i1,m0) = mr1;
            ar  = ay1 - ax0;
            mr  = ar * my0 (SS);
            dm(i1,m0) = mr1;
            ar  = ax0 - ay0;
            mr  = ar * my0 (SS);
            dm(i1,m0) = mr1;              { conference 1 end }
            ax0 = dm(i3,m0);              { conference 2 start }
            ay0 = dm(i3,m0);
            ax1 = dm(i3,m0);
            ay1 = ax1;
            ar  = ay0 - ax1;
            mr  = ar * my0 (SS);
            dm(i1,m0) = mr1;
            ar  = ay1 - ax0;
            mr  = ar * my0 (SS);
            dm(i1,m0) = mr1;
            ar  = ax0 - ay0;
            mr  = ar * my0 (SS);
            dm(i1,m0) = mr1;              { conference 2 end } ax0 = dm(doneflag);
            ar  = pass ax0;
            if ne rts;

A_shift0:                                 { shifts detector A data, if needed }
            ax0 = dm(A_shiftflag);
            ar  = pass ax0;
            if ne jump A_shift1;
            modify (i0,m2);
            modify (i0,m2);               { point to B_Q1Q2_buff }
            jump B_shift0;

A_shift1:
            cntr = 32;
            do A_shift2 until ce;
                si = dm(i0,m3);
                sr = ashift si by -1 (hi);
A_shift2:   dm(i0,m0) = sr1;
            mr1 = dm(A_NRG_hi);           { need to shift energy }
            mr0 = dm(A_NRG_lo);           { by 2 since it is squared }
            sr = ashift mr1 by -2 (hi);
            sr = sr or lshift mr0 by -2 (lo);
            dm(A_NRG_hi) = sr1;
            dm(A_NRG_lo) = sr0;
            ar = 1;
            ay0 = dm(A_shift);
            ar = ay0 - ar;
            dm(A_shift) = ar;
```

```
            ar = 0;
            dm(A_shiftflag) = ar;

B_shift0:                                       { shifts detector B data }
            ax0 = dm(B_shiftflag);
            ar = pass ax0;
            if ne jump B_shift1;
            modify (i0,m2);
            modify (i0,m2);                     { point to C_Q1Q2_buff }
            jump C_shift0;

B_shift1:
            cntr = 32;
            do B_shift2 until ce;
                si = dm(i0,m3);
                sr = ashift si by -1 (hi);
B_shift2:   dm(i0,m0) = sr1;
            mr1 = dm(B_NRG_hi);                 { need to shift energy }
            mr0 = dm(B_NRG_lo);                 { by 2 since it is squared }
            sr = ashift mr1 by -2 (hi);
            sr = sr or lshift mr0 by -2 (lo);
            dm(B_NRG_hi) = sr1;
            dm(B_NRG_lo) = sr0;
            ar = 1;
            ay0 = dm(B_shift);
            ar = ay0 - ar;
            dm(B_shift) = ar;
            ar = 0;
            dm(B_shiftflag) = ar;

C_shift0:                                       { shifts detector C data }
            ax0 = dm(C_shiftflag);
            ar = pass ax0;
            if ne jump C_shift1;
            modify (i0,m2);
            modify (i0,m2);                     { point to A_Q1Q2_buff }
            jump decdtmf;

C_shift1:
            cntr = 32;
            do C_shift2 until ce;
                si = dm(i0,m3);
                sr = ashift si by -1 (hi);
C_shift2:   dm(i0,m0) = sr1;
            mr1 = dm(C_NRG_hi);                 { need to shift energy }
            mr0 = dm(C_NRG_lo);                 { by 2 since it is squared }
            sr = ashift mr1 by -2 (hi);
            sr = sr or lshift mr0 by -2 (lo);
            dm(C_NRG_hi) = sr1;
            dm(C_NRG_lo) = sr0;
            ar = 1;
            ay0 = dm(C_shift);
            ar = ay0 - ar;
            dm(C_shift) = ar;
            ar = 0;
            dm(C_shiftflag) = ar;

decdtmf:
            ay0 = dm(countdtmf);
            ar = ay0 - 1;
            dm(countdtmf) = ar;
            if lt jump last;

indtmf: si = dm(rxintbuf);                      { get sample for channel  AY1=1.15 }
            se = dm(A_shift);                   { get shift value }
            sr = ashift si (LO);
            ay1 = sr0;
            call magdtmf;
            ar = dm(shifter);
            dm(A_shiftflag) = ar;
            mr1 = dm(A_NRG_hi);
            mr0 = dm(A_NRG_lo);
            mx0 = ay1;
            my0 = ay1;
            mr = mr + mx0 * my0 (SS);           { square input and add to energy }
            dm(A_NRG_hi) = mr1;                 { and save }
            dm(A_NRG_lo) = mr0;
            ar = 0xc000;                        { see if too big }
```

```
                af = abs mr1;
                ar = ar and af;
                if eq jump indtmfB;              { no }
                dm(A_shiftflag) = ar;            { yes, set flag } indtmfB:
                si = dm(rxintbuf+1);             { get sample for channel  AY1=1.15 }
                se = dm(B_shift);                { get shift value }
                sr = ashift si (LO);
                ay1 = sr0;
                call magdtmf;
                ar = dm(shifter);
                dm(B_shiftflag) = ar;
                mr1 = dm(B_NRG_hi);
                mr0 = dm(B_NRG_lo);
                mx0 = ay1;
                my0 = ay1;
                mr = mr + mx0 * my0 (SS);        { square input and add to energy }
                dm(B_NRG_hi) = mr1;              { and save }
                dm(B_NRG_lo) = mr0;
                ar = 0xC000;                     { see if too big }
                af = abs mr1;
                ar = ar and af;
                if eq jump indtmfC;              { no }
                dm(B_shiftflag) = ar;            { yes, set flag } indtmfC:
                si = dm(rxintbuf+2);             { get sample for channel  AY1=1.15 }
                se = dm(C_shift);                { get shift value }
                sr = ashift si (LO);
                ay1 = sr0;
                call magdtmf;
                ar = dm(shifter);
                dm(C_shiftflag) = ar;
                mr1 = dm(C_NRG_hi);
                mr0 = dm(C_NRG_lo);
                mx0 = ay1;
                my0 = ay1;
                mr = mr + mx0 * my0 (SS);        { square input and add to energy }
                dm(C_NRG_hi) = mr1;              { and save }
                dm(C_NRG_lo) = mr0;
                ar = 0xC000;                     { see if too big }
                af = abs mr1;
                ar = ar and af;
                if eq rts;                       { no }
                dm(C_shiftflag) = ar;            { yes, set flag } rts;

last:   i3 = ^A_magsqr;
                cntr = channels;
                do chanlast until ce;
                    cntr = 8;
                    do freqlast until ce;
                        call magsqr;
        freqlast:       nop;
                    modify(i0,m2);               { skip 2nd harmonic Q1Q2s }
        chanlast:   modify(i7,m5);               { skip 2nd harmonic COEFs }
                ax0 = 1;
                dm(doneflag) = ax0;
                rts;
```

{----------------------------------------------------

EIGHT_KHZ:

Processes the transmit interrupt.

----------------------------------------------------}

```
        eight_khz:  i2 = ^txbuf+12;              { initialize pointers, just in case }
                    i4 = ^txbuf;                 { i2 is offset by -1 because of SPORT }
                                                 { double buffering. }
                    dm(tmp_i3) = i3;
                    dm(tmp_i5) = i5;
                    ena sec_reg;                 { bank in secondary registers }
```

```
              ay0 = dm(tonecnt0);     { see if outputting tone 0 }
              ar  = pass ay0;
              if ne jump sendtone0;   { yes, jump to output routine }
              ay0 = dm(tonecnt1);     { see if outputting tone 1 }
              dm(i2,m0) = ar, ar = pass ay0;  { output silence }
              if ne jump sendtone1;   { yes, jump to output routine }
              dm(i2,m0) = ar;         { no, output silence sample }
                                      { note that have both outputting silence }
                                      { for one frame between tones }
              ay0 = dm(tone_dura);    { get tone duration }
              dm(tonecnt0) = ay0;     { save in counters }
              dm(tonecnt1) = ay0;
              ax0 = dm(toneflg0);
              ar  = pass ax0;
              if le jump chktone1;    { see if dialing }
              ax0 = 0;                { no, check next generator }
              dm(phase0) = ax0;
              dm(phase0 + 1) = ax0;
              i3  = dm(tonepnt0);     { get next byte out of buffer }
              ax0 = dm(i3,m0);
              ay0 = lpausechar;
              ar  = ax0 - ay0;
              if ne jump notpause0;   { not pausing, skip next stuff }
              ay0 = dm(pausing0);     { get pause counter }
              ar  = ay0 - 1;          { decrement }
              if ge jump pause0;
              ar  = pause_dura;       { if it was 0, starting pause, load dura }
pause0:       dm(pausing0) = ar;      { save new value }
              if eq jump notpause0;
              i3  = dm(tonepnt0);     { if not 0, don't bump pointer }
notpause0:    dm(tonepnt0) = i3;      { save pointer to next value }
              ay0 = 0x001f;           { see if dial done }
              ar  = ax0 - ay0;
              if ne jump newtone0;    { not done, get new tone }
              ax0 = ^tonebuf0;        { get pointer to beginning of buffer }
              dm(tonepnt0) = ax0;     { and save }
              ax0 = 0;
              dm(freq0) = ax0;
              dm(freq0 + 1) = ax0;
              ax0 = -1;
              dm(toneflg0) = ax0;     { set flag so know that dialing is done }
              jump chktone1;          { see if there's a tone for channel 1 } newtone0:     ay0 = 0x003f;           { limit range }
              ar  = ax0 and ay0;      { ar has pointer to tone }
              sr  = lshift ar by 1 (hi);  { shift since buffer entries two wide }
              ay0 = ^PM_digits;       { point to digit buffer }
              ar  = sr1 + ay0;        { plus calculated offset }
              i5  = ar;
              ax0 = pm(i5,m4);        { get first frequency }
              dm(freq0) = ax0;
              ax0 = pm(i5,m4);        { get second frequency }
              dm(freq0 + 1) = ax0;

chktone1:     ax0 = dm(toneflg1);     { see if dialing }
              ar  = pass ax0;
              if le jump CP_outputs;  { no, go to call progress code }
              ax0 = 0;                { clear phase buffer }
              dm(phase1) = ax0;
              dm(phase1 + 1) = ax0;
              i3  = dm(tonepnt1);     { get next byte out of buffer }
              ax0 = dm(i3,m0);
              ay0 = lpausechar;
              ar  = ax0 - ay0;
              if ne jump notpause1;   { not pausing, skip next stuff }
              ay0 = dm(pausing1);     { get pause counter }
              ar  = ay0 - 1;          { decrement }
              if ge jump pause1;
              ar  = pause_dura;       { if it was 0, starting pause, load dura }
pause1:       dm(pausing1) = ar;      { save new value }
              if eq jump notpause1;
              i3  = dm(tonepnt1);     { if not 0, don't bump pointer }
notpause1:    dm(tonepnt1) = i3;      { save pointer to next value }
              ay0 = 0x001f;           { see if dial done }
              ar  = ax0 - ay0;
              if ne jump newtone1;    { not done, get new tone }
              ax0 = ^tonebuf1;        { get pointer to beginning of buffer }
              dm(tonepnt1) = ax0;     { and save }
              ax0 = 0;                { clear frequencies }
```

```
                    dm(freq1)     = ax0;
                    dm(freq1 + 1) = ax0;
                    ax0 = -1;
                    dm(toneflg1) = ax0;       { set flag so know that dialing is done }
                    jump CP_outputs;          { go to call progress code } newtone1:           ay0 = 0x003f;             { limit range }
                    ar  = ax0 and ay0;        { ar has pointer to tone }
                    sr  = lshift ar by 1 (hi); { shift since buffer entries two wide }
                    ay0 = ^PM_digits;         { point to digit buffer }
                    ar  = sr1 + ay0;          { plus calculated offset }
                    i5  = ar;
                    ax0 = pm(i5,m4);          { get first frequency }
                    dm(freq1) = ax0;
                    ax0 = pm(i5,m4);          { get second frequency }
                    dm(freq1 + 1) = ax0;
                    jump CP_outputs;          { output call progress tones } sendtone0:          ar  = ay0 - 1;            { update counter }
                    dm(tonecnt0) = ar;
                    ay0 = dm(phase0);         { get phase }
                    ax0 = dm(freq0);          { get frequency }
                    ar  = ax0 + ay0;          { add 'em up }
                    dm(phase0) = ar;
                    ax0 = ar;                 { get ready to calculate sine }
                    call boot_sin;            { and go do it }
                    my0 = DTMFscale;          { Scale output. Gives appropriate RMS }
                    mr  = ar * my0 (ss);      { output for DTMF }
                    ay1 = mr1;                { save in ay1 for now } ay0 = dm(phase0 + 1);     { get next phase }
                    ax0 = dm(freq0 + 1);      { get next frequency }
                    ar  = pass ax0;           { see if 0 }
                    if ne jump sndtone0;      { no, don't scale }
                    sr= ashift mr1 by -2 (HI); { yes, scale down output }
                    ay1 = sr1;                { and save in ay1 }
sndtone0:           ar  = ax0 + ay0;          { add 'em up }
                    dm(phase0 + 1) = ar;      { save new phase }
                    ax0 = ar;                 { get ready to calculate sine }
                    call boot_sin;            { and do it }
                    my0 = DTMFscale;          { Scale output. Gives appropriate RMS }
                    mr  = ar * my0 (ss);      { output for DTMF }
                    ar  = mr1 + ay1;          { add two tones }
                    dm(i2,m0) = ar;           { send to transmit buffer }
                    ar  = 0;                  { send silence to other channel }
                    dm(i2,m0) = ar;
                    jump CP_outputs;          { and go to call progress } sendtone1:          ar  = ay0 - 1;            { update counter }
                    dm(tonecnt1) = ar;
                    ay0 = dm(phase1);         { get phase }
                    ax0 = dm(freq1);          { get frequency }
                    ar  = ax0 + ay0;          { add 'em up }
                    dm(phase1) = ar;          { save new phase }
                    ax0 = ar;                 { get ready to calculate sine }
                    call boot_sin;            { and go do it }
                    my0 = DTMFscale;          { Scale output. Gives appropriate RMS }
                    mr  = ar * my0 (ss);      { output for DTMF }
                    ay1 = mr1;                { save in ay1 for now } ay0 = dm(phase1 + 1);     { get next phase }
                    ax0 = dm(freq1 + 1);      { get next frequency }
                    ar = pass ax0;            { see if 0 }
                    if ne jump sndtone1;      { no, don't scale }
                    sr = ashift mr1 by -2 (HI); { yes, scale down output }
                    ay1 = sr1;                { and save in ay1 }
sndtone1:           ar  = ax0 + ay0;          { add 'em up }
                    dm(phase1 + 1) = ar;      { save new phase }
                    ax0 = ar;                 { get ready to calculate sine }
                    call boot_sin;            { and do it }
                    my0 = DTMFscale;          { Scale output. Gives appropriate RMS }
                    mr  = ar * my0 (ss);      { output for DTMF }
                    ar  = mr1 + ay1;          { add two tones }
                    dm(i2,m0) = ar;           { send to transmit buffer }
```

```
CP_outputs:  i3   = ^CPsin;              { i3 has value of calculated sine }
             i1   = ^CPsum;              { i1 has phase accumulators }
             i5   = ^PM_CPTone;          { i5 is for tone frequencies }
             cntr = 5;                   { calculate five sines }
             do CP_Loop until ce;
                 ax0 = dm(i1,m3),ay0 = pm(i5,m4);
                                         { get old phase but don't inc. pointer }
                                         { get frequency and update pointer }
                 ar  = ax0 + ay0;        { add them }
                 dm(i1,m0) = ar;         { save new value and update pointer }
                 ax0 = ar;               { put new value in ax0 for sine routine }
                 dm(tmp2_i5) = i5;
                 call boot_sin;          { calculate sine }
                 i5 = dm(tmp2_i5);
CP_Loop:         dm(i3,m0) = ar;         { and save new value }
             i3   = ^CPsin;              { point to sine value table }
             ar   = dm(i3,m0);           { get 350 Hz value }
             my0  = DIALscale;           { Scale output. Gives appropriate RMS }
             mr   = ar * my0 (ss);       { output for DIALTONE }
             ay1  = mr1;                 { save momentarily }
             ar   = dm(i3,m0);           { get 440 Hz value }
             my0  = DIALscale;           { Scale output. Gives appropriate RMS }
             mr   = ar * my0 (ss);       { output for DIALTONE }
             ar   = mr1 + ay1;           { and add }
             dm(i2,m0) = ar;             { output to transmit buffer }
             ar   = dm(i3,m0);           { get 480 Hz value }
             my0  = BUSYscale;           { Scale output. Gives appropriate RMS }
             mr   = ar * my0 (ss);       { output for BUSY }
             ay1  = mr1;                 { save momentarily }
             ar   = dm(i3,m0);           { get 620 Hz value }
             my0  = BUSYscale;           { Scale output. Gives appropriate RMS }
             mr   = ar * my0 (ss);       { output for BUSY }
             ar   = mr1 + ay1;           { add }
             ax0  = ar;                  { and pass this value to subroutine }
             i3   = ^rrdr_on;            { reorder on time for sub }
             i1   = ^rrdr_off;           { reorder off time for sub }
             i5   = ^PM_rrdr_dura;       { constants are in i5 }
             call togsound;              { call subroutine }
             i3   = ^bsy_on;             { busy on time for sub }
             i1   = ^bsy_off;            { busy off time for sub }
             i5   = ^PM_bsy_dura;        { constants are in i5 }
             call togsound;              { call subroutine }
             i3   = ^CPsin + 1;          { point to 440 Hz }
             ar   = dm(i3,m0);           { get 440 Hz value }
             my0  = RINGscale;           { Scale output. Gives appropriate RMS }
             mr   = ar * my0 (ss);       { output for RINGBACK }
             ay1  = mr1;                 { save momentarily }
             ar   = dm(i3,m0);           { get 480 Hz value }
             my0  = RINGscale;           { Scale output. Gives appropriate RMS }
             mr   = ar * my0 (ss);       { output for RINGBACK }
             ar   = mr1 + ay1;           { add }
             ax0  = ar;                  { pass to subroutine }
             i3   = ^ring_on;
             i1   = ^ring_off;
             i5   = ^PM_ring_dura;
             call togsound;
             i3   = ^CPsin + 4;          { point to 1004 Hz }
             ar   = dm(i3,m0);           { get value }
             my0  = DMWscale;            { Scale output. Gives appropriate RMS }
             mr   = ar * my0 (ss);       { output for Digital milliwatt }
             dm(i2,m0) = mr1;            { output 1004 Hz sample value } i3   = ^confbuf;
             cntr = 6;
             do confloop until ce;
                 ay0 = dm(i3,m0);
confloop:        dm(i2,m0) = ay0;        { output conference data } i5   = dm(tmp_i5);
             i3   = dm(tmp_i3);
             rts;
```

```
┌─────────────────────────────────────────────────────────────────────────┐
│                                                                         │
│      SUBROUTINES                                                        │
│                                                                         │
└─────────────────────────────────────────────────────────────────────────┘
```

```
DM_inits:   i2 = ^txbuf;      { i2 is used to point to transmit buffer }
```

```
                i4 = ^txbuf;        { i4 is used for autobuffering transmit }
                i6 = ^rxbuf;

l0 = Qbufsize;
                l1 =  0;
                l2 = %txbuf;        { in interrupt routine }
                l3 =  0;
                l4 = %txbuf;
                l5 =  0;
                l6 = %rxbuf - 1;    { counter is one less because of dummy location}
                l7 = l6;

m0 =  1;
                m1 = -1;
                m2 = 16;
                m3 =  0;
                m4 =  1;
                m5 =  8;
                m6 =  0;
                m7 =  0;

i3 = ^CPsum;
                cntr = clear_length;
                do boot_clear until ce;
boot_clear:         dm(i3,m0) = 0;
                i3 = ^txbuf;
                cntr = %txbuf;
                do boot_clr1 until ce;
boot_clr1:          dm(i3,m0) = 0;
                cntr = 6;
                i3 = ^confbuf;
                do boot_conf until ce;
boot_conf:          dm(i3,m0) = 0;
                i3 = ^rrdr_on;                  { initialize tone counters }
                i5 = ^PM_rrdr_dura;
                cntr = 6;
                do boot_cntr until ce;
                    ax0 = pm(i5,m4);
boot_cntr:          dm(i3,m0) = ax0;
                i3 = ^rxintpnt;
                ax0 = ^rxbuf + 30;
                cntr = %rxintbuf;
                do boot_pntr until ce;
boot_pntr:          dm(i3,m0) = ax0;

ax0 = 0x0320;                   { store 100 ms in dtmf duration.}
                dm(tonecnt0) = ax0;
                dm(tonecnt1) = ax0;
                dm(tone_dura) = ax0;

ax0 = ^tonebuf0;
                dm(tonepnt0) = ax0;
                ax0 = ^tonebuf1;
                dm(tonepnt1) = ax0;

ax0 = baddigitcode;
                dm(A_digit_history) = ax0;
                dm(A_digit_history+1) = ax0;
                dm(B_digit_history) = ax0;
                dm(B_digit_history+1) = ax0;
                dm(C_digit_history) = ax0;
                dm(C_digit_history+1) = ax0;

ax0 = 0;
                dm(rxbuf+30) = ax0;
                dm(A_digit_flag) = ax0;
                dm(B_digit_flag) = ax0;
                dm(C_digit_flag) = ax0;

rts;

{------------------------------------------------------------------------

TOGSOUND:

registers altered:   ay0, ar, i2, i5 input registers:     ax0 = value to output to serial port.
```

```
                    i3 = on duration down counter.
                    i1 = off duration down counter.
                    i2 = TX buffer.
                    i5 = duration constants in PM.
```

```
togsound:   ay0 = dm(i3,m3);        { i3 points to sound on time }
            ar  = pass ay0;
            if eq jump quiet;       { signal? or silence? now }
            ar  = ay0 - 1;
            dm(i3,m3) = ar;         { decr. sig duration counter }
            dm(i2,m0) = ax0;        { output sample to transmit buffer }
            rts;

quiet:      ar  = 0;
            ay0 = dm(i1,m3);        { get signal off time }
            dm(i2,m0) = ar, ar = pass ay0;
            if eq jump noisy;
            ar  = ay0 - 1;
            dm(i1,m3) = ar;         { decr. silence duration counter }
            rts;

noisy:      ay0=pm(i5,m4);          { i5 has pointer to current on duration }
            dm(i3,m3) = ay0;        { store at on time }
            ay0=pm(i5,m4);          { pointer to off duration }
            dm(i1,m3) = ay0;        { store at off time }
            rts;
```

```
   64180 Command Subroutines.

The following subroutines process commands from the 64180.
```

```
   DUMMY

This is intended as a place holder, but also gets called if for any
   reason a command of "0" is received.
```

```
dummy:   rts;
```

```
   BRESET:

This command does a warm boot by clearing the interrupt mask register
   and setting the boot force bit.  No RTS is needed.
```

```
breset:    imask = 0;
           ax0 = h#0218;            { force boot, 3 wait states }
           dm(h#3fff) = ax0;
```

```
   SLAVESET:

This command enables the serial port, but does no other initialization.
   It sends the correct response to the 64180, and sets the running flag,
   but otherwise has no purpose.  Note that the serial ports cannot be
   changed after the initial startup -- hence the running flag.
```

```
slaveset:  ax0 = dm(running);       { see if already running }
           af  = pass ax0;
           if ne jump slavedn;      { yes, echo and return }
           i3  = h#3FFF;            { point to system control register }
           dm(i3,m0) = h#1018;      { enable SPORT0 }
           icntl = b#00111;         { set edge sensitive interrupts }
           imask = b#011000;        { set interrupt enable flags }
           ax0 = -1;                { set running flag }
           dm(running) = ax0;
```

```
slavedn:    ar = SLAVE_RSP;            { send response to 64180 }
            dm(FIFO) = ar;
            rts;
```

{------------------------------------------------------------------

MSTRSET:

Sets up serial ports for internal clock generation.
    Only executes once on startup.  Since initialization routine sets
    SPORT for external clock, this routine only changes those registers
    necessary to generate the clock.  After the clock is set up
    (or not, as the case may be), the SPORT is enabled, interrupts are
    enabled, and the running flag is set.  Finally, the appropriate
    response is sent to the 64180 so that it can continue execution.

------------------------------------------------------------------}

```
mstrset:    ax0 = dm(running);          { see if already running }
            af  = pass ax0;
            if ne jump mstrdn;          { yes, echo and return }
            i3  = h#3FF4;               { point to SPORT1 registers }
            dm(i3,m0) = 255;            { RFSDIV=255 for 8kHz interrupt rate }
            dm(i3,m0) = 2;              { SCLKDIV=2 makes 2.048 MHz SCLK }
            dm(i3,m0) = h#C7A7;         { multichannel enabled, internal
                                          SCLK, multichnl frame dly=1,
                                          MCL=32, int RFS, invert TFS, normal
                                          RFS, u-Law, 8-Bit PCM }
            i3  = h#3FFF;               { point to system control register }
            dm(i3,m0) = h#1018;         { enable SPORT0 }
            icntl = b#00111;            { set edge sensitive interrupts }
            imask = b#011000;           { set interrupt enable flags }
            ax0 = -1;                   { set running flag }
            dm(running) = ax0;

mstrdn:     ar  = MSTR_RSP;             { send response to 64180 }
            dm(FIFO) = ar;
            rts;
```

{------------------------------------------------------------------

DIAL0:    Sends a string of DTMF digits to port 0.

Copies a string of DTMF digits from FIFO, converts to appropriate format,
    and starts dialer.  If a command is received, it bails out and executes
    the command.  The code checks the input for correct values and skips over
    bad inputs.  If the buffer overflows, it simply sets the pointer to the
    beginning and keeps going.  If it overflowed on the dial complete message,
    the routine will still work correctly.  Also, the buffer allows 32 DTMF
    digits, plus a pause at the beginning and an end of string character
    at the end.

------------------------------------------------------------------}

```
dial0:      i3  = ^tonebuf0;            { store pause in first byte }
            ax1 = spausechar;
            dm(i3,m0) = ax1;
dial0wait:  call wait_prm;
            if ne jump dial0bail;       { command received, bail out }
            ay1 = h#0030;               { subtract offset from parameter }
            ar  = ar - ay1;
            if lt jump dial0wait;       { if less than 0, bad number, so skip }
            ay1 = h#0013;               { see if too big }
            af  = ar - ay1;
            if le jump dial0stor;       { no, put in buffer }
            ay1 = h#001F;               { see if done }
            af  = ar - ay1;
            if ne jump dial0wait;       { not done, bad byte, ignore and get }
                                        { next byte }
dial0stor:  dm(i3,m0) = ar;             { store in buffer }
            ax1 = ^tonebuf0;            { check for buffer overflow }
            ay1 = BUF_LENGTH;
            af  = ax1 + ay1;
            ax1 = i3;
            af  = af - ax1;             { dm(tonepnt0);}
            if gt jump dial0done;       { no overflow, keep going }
            i3  = ^tonebuf0;
dial0done:  ay1 = h#001F;               { see if done }
            ar  = ar - ay1;
            if ne jump dial0wait;       { not done, get more }
            ax1 = 1;                    { start dialing }
```

```
              dm(toneflg0) = ax1;
              rts;

dial0bail:    ax1 = DIAL0_RSP;           { send dial done, so 64180 doesn't wait}
              dm(FIFO) = ax1;
              jump do_cmd;               { and that should do it. }
```

```
{------------------------------------------------------------------

DIAL1:   Sends a string of DTMF digits to port 1.

Copies a string of DTMF digits from FIFO, converts to appropriate format,
   and starts dialer.  If a command is received, it bails out and executes
   the command.  The code checks the input for correct values and skips over
   bad inputs.  If the buffer overflows, it simply sets the pointer to the
   beginning and keeps going.  If it overflowed on the dial complete message,
   the routine will still work correctly.  Also, the buffer allows 32 DTMF
   digits, plus a pause at the beginning and end of string at the end.

------------------------------------------------------------------}
```

```
dial1:        i3  = ^tonebuf1;           { store pause in first byte }
              ax1 = spausechar;
              dm(i3,m0) = ax1;
dial1wait:    call wait_prm;
              if ne jump dial1bail;      { command received, bail out }
              ay1 = h#0030;              { subtract offset from parameter }
              ar  = ar - ay1;
              if lt jump dial1wait;      { if less than 0, bad number, so skip }
              ay1 = h#0013;              { see if too big }
              af  = ar - ay1;
              if le jump dial1stor;      { no, put in buffer }
              ay1 = h#001F;              { see if done }
              af  = ar - ay1;
              if ne jump dial1wait;      { not done, bad byte, ignore and get }
                                         { next byte }
dial1stor:    dm(i3,m0) = ar;            { store in buffer }
              ax1 = ^tonebuf1;           { check for buffer overflow }
              ay1 = BUF_LENGTH;
              af  = ax1 + ay1;
              ax1 = i3;                  { dm(tonepnt1);}
              af  = af - ax1;
              if gt jump dial1done;      { no overflow, keep going }
              i3  = ^tonebuf1;
dial1done:    ay1 = h#001F;              { see if done }
              ar  = ar - ay1;
              if ne jump dial1wait;      { not done, get more }
              ax1 = 1;                   { start dialing }
              dm(toneflg1) = ax1;
              rts;

dial1bail:    ax1 = DIAL1_RSP;           { send dial done, so 64180 doesn't wait}
              dm(FIFO) = ax1;
              jump do_cmd;               { and that should do it. }
```

```
{------------------------------------------------------------------

DELTADUR:   Changes duration of dial string.

Will wait for a duration (in ms) from 64180.  Stores the value for
   dialing routines.  If a command is received, it bails out and executes
   the command.

------------------------------------------------------------------}
```

```
deltadur:     call wait_prm;
              if ne jump do_cmd;         { command received, bail out }
              si  = ar;
              sr  = ashift si by 3 (hi); { time ms x 8 = no. of 8 kHz samples }
              ay0 = sr1;
              ar  = ay0-1;               { count N-1 to 0, not N to 1 }
              dm(tone_dura) = ar;        { init signal timer (counts samples) }
              rts;
```

```
{------------------------------------------------------------------}
|                                                                  |
|   DETECT0:                                                       |
|                                                                  |
|   Waits for a single parameter from 64180. Converts it into appropriate
|   form and sets pointer for interrupt routine.                   |
|                                                                  |
{------------------------------------------------------------------} detect0:    call wait_prm;
            if ne jump do_cmd;      { command received, bail out }
            ay0 = h#0030;           { subtract 30 to get correct value }
            ar  = ar - ay0;
            if lt rts;              { bad value, ignore }
            ay0 = h#001E;           { see if too large }
            af  = ar - ay0;
            if gt ar = pass ay0;    { if too big, make 1Eh }
            ay0 = ^rxbuf;           { get address of buffer }
            ar  = ar + ay0;         { add offset to base address }
            dm(rxintpnt) = ar;      { and store pointer }
            rts;

{------------------------------------------------------------------}
|                                                                  |
|   DETECT1:                                                       |
|                                                                  |
|   Waits for a single parameter from 64180. Converts it into appropriate
|   form and sets pointer for interrupt routine.                   |
|                                                                  |
{------------------------------------------------------------------} detect1:    call wait_prm;
            if ne jump do_cmd;      { command received, bail out }
            ay0 = h#0030;           { subtract 30 to get correct value }
            ar  = ar - ay0;
            if lt rts;              { bad value, ignore }
            ay0 = h#001E;           { see if too large }
            af  = ar - ay0;
            if gt ar = pass ay0;    { if too big, make 1Eh }
            ay0 = ^rxbuf;           { get address of buffer }
            ar  = ar + ay0;         { add offset to base address }
            dm(rxintpnt+1) = ar;
            rts;

{------------------------------------------------------------------}
|                                                                  |
|   DETECT2:                                                       |
|                                                                  |
|   Waits for a single parameter from 64180. Converts it into appropriate
|   form and sets pointer for interrupt routine.                   |
|                                                                  |
{------------------------------------------------------------------} detect2:    call wait_prm;
            if ne jump do_cmd;      { command received, bail out }
            ay0 = h#0030;           { subtract 30 to get correct value }
            ar  = ar - ay0;
            if lt rts;              { bad value, ignore }
            ay0 = h#001E;           { see if too large }
            af  = ar - ay0;
            if gt ar = pass ay0;    { if too big, make 1Eh }
            ay0 = ^rxbuf;           { get address of buffer }
            ar  = ar + ay0;         { add offset to base address }
            dm(rxintpnt+2) = ar;
            rts;

{------------------------------------------------------------------}
|                                                                  |
|   CONFRNC1:                                                      |
|                                                                  |
|   Waits for three parameters from 64180. Converts them into appropriate
|   form and sets pointers for interrupt routine.                  |
|                                                                  |
{------------------------------------------------------------------} confrnc1:   i3 = ^rxintpnt + 3;     { point to first byte in buffer }
            cntr = 3;               { do 3 times }
            do conf_loop until ce;
                call wait_prm;      { get parameter }
                if ne jump conf_bail;   { if command, bail out }
                ay0 = h#0030;       { subtract 30 to get correct value }
                ar  = ar - ay0;
```

```
                    if ge jump conf1;
                    ar   = h#001E;              { bad value, adjust to valid }
    conf1:          ay0  = h#001E;              { see if too large }
                    af   = ar - ay0;
                    if le jump conf2;
                    ar   = h#001E;              { too big, adjust to valid }
    conf2:          ay0  = ^rxbuf;              { get address of buffer }
                    ar   = ar + ay0;            { add offset to base address }
    conf_loop:      dm(i3,m0) = ar;             { and store pointer }
                    rts;

conf_bail:  pop pc;                         { clear stacks }
                pop loop;
                pop cntr;
                ax1 = ar;
                ax0 = h#001E;                   { dummy pointers }
                ay0 = ^rxbuf;
                ar  = ax0 + ay0;
                i3  = ^rxintpnt + 3;            { point to pointer }
                dm(i3,m0) = ar;                 { store dummy values }
                dm(i3,m0) = ar;
                dm(i3,m0) = ar;
                ar  = ax1;
                jump do_cmd;                    { and execute command }
```

{------------------------------------------------------------

CONFRNC2:

Waits for three parameters from 64180. Converts them into appropriate
   form and sets pointers for interrupt routine.

------------------------------------------------------------}

```
    confrnc2:   i3 = ^rxintpnt + 6;             { point to first byte in buffer }
                cntr = 3;                       { do 3 times }
                do conf_loop1 until ce;
                    call wait_prm;              { get parameter }
                    if ne jump conf_bail1;      { if command, bail out }
                    ay0 = h#0030;
                    ar  = ar - ay0;             { subtract 30 to get correct value }
                    if ge jump conf11;
                    ar  = h#001E;               { bad value, adjust to valid }
    conf11:         ay0 = h#001E;               { see if too large }
                    af  = ar - ay0;
                    if le jump conf21;
                    ar  = h#001E;               { too big, adjust to valid }
    conf21:         ay0 = ^rxbuf;               { get address of buffer }
                    ar  = ar + ay0;             { add offset to base address }
    conf_loop1:     dm(i3,m0) = ar;             { and store pointer }
                    rts;

conf_bail1: pop pc;                         { clear stacks }
                pop loop;
                pop cntr;
                ax1 = ar;
                ax0 = h#001E;                   { dummy pointers }
                ay0 = ^rxbuf;
                ar  = ax0 + ay0;
                i3  = ^rxintpnt + 6;            { point to pointer }
                dm(i3,m0) = ar;                 { store dummy values }
                dm(i3,m0) = ar;
                dm(i3,m0) = ar;
                ar  = ax1;
                jump do_cmd;                    { and execute command } download:   rts;
```

{------------------------------------------------------------

WAIT_PRM:

Calls the idle routine. When FLAG_IN goes valid, the idle routine will
   return. This routine will then process the paramter.

------------------------------------------------------------}

```
    wait_prm:   call idling;
                ay0 = MAX_CMD+1;
                af  = ar - ay0;
```

```
                if lt jump waitdn;
                af  = pass 0;
waitdn:         rts;
```

```
IDLING:

Executes normal idle behavior (check for end of dial, etc.)  When
FLAG_IN goes valid, will return to calling routine with data in AR.
```

```
idling:     ax1 = dm(toneflg0);
            ar  = pass ax1;
            if ge jump idle1;
            ax1 = DIAL0_RSP;
            dm(FIFO) = ax1;
            ax1 = 0;
            dm(toneflg0) = ax1;
idle1:      ax1 = dm(toneflg1);
            ar  = pass ax1;
            if ge jump idle2;
            ax1 = DIAL1_RSP;
            dm(FIFO) = ax1;
            ax1 = 0;
            dm(toneflg1) = ax1;

idle2:  ax0 = dm(doneflag);
        ar = pass ax0;
        if eq jump idle3;

dm(tmp2_i3) = i3;           { save since used in command routines } maxrowcol( ^A_magsqr, A_maxrowval, A_whichrow,
                   A_maxcolval, A_whichcol, A_failurecode );
        no_other_peaks( ^A_magsqr, A_maxrowval, A_maxcolval, A_failurecode );
        twisttests( A_maxrowval, A_maxcolval, A_failurecode );
        check2ndharm( ^A_Q1Q2_buff, A_whichrow, ^A_rowharm, A_rowharm,
                      A_whichcol, ^A_colharm, A_colharm, A_failurecode,
                      A_maxrowval, A_maxcolval );
        checkenergy( A_NRG_hi, A_maxrowval, A_maxcolval, A_failurecode );
        outputcode( A_whichrow, A_whichcol, A_digit_history, A_failurecode,
                    A_digit_flag, DETECT0 );

maxrowcol( ^B_magsqr, B_maxrowval, B_whichrow,
                   B_maxcolval, B_whichcol, B_failurecode );
        no_other_peaks( ^B_magsqr, B_maxrowval, B_maxcolval, B_failurecode );
        twisttests( B_maxrowval, B_maxcolval, B_failurecode );
        check2ndharm( ^B_Q1Q2_buff, B_whichrow, ^B_rowharm, B_rowharm,
                      B_whichcol, ^B_colharm, B_colharm, B_failurecode,
                      B_maxrowval, B_maxcolval );
        checkenergy( B_NRG_hi, B_maxrowval, B_maxcolval, B_failurecode );
        outputcode( B_whichrow, B_whichcol, B_digit_history, B_failurecode,
                    B_digit_flag, DETECT1 );

maxrowcol( ^C_magsqr, C_maxrowval, C_whichrow,
                   C_maxcolval, C_whichcol, C_failurecode );
        no_other_peaks( ^C_magsqr, C_maxrowval, C_maxcolval, C_failurecode );
        twisttests( C_maxrowval, C_maxcolval, C_failurecode );
        check2ndharm( ^C_Q1Q2_buff, C_whichrow, ^C_rowharm, C_rowharm,
                      C_whichcol, ^C_colharm, C_colharm, C_failurecode,
                      C_maxrowval, C_maxcolval );
        checkenergy( C_NRG_hi, C_maxrowval, C_maxcolval, C_failurecode );
        outputcode( C_whichrow, C_whichcol, C_digit_history, C_failurecode,
                    C_digit_flag, DETECT2 );

call recycle;

i3 = dm(tmp2_i3);

idle3:      if not flag_in jump idling;
            ax0 = dm(FIFO);             { get data }
            ay0 = h#00ff;               { clear upper byte }
            ar  = ax0 and ay0;
            rts;
```

```
{─────────────────────────────────────────────────────────────────────
    BOOT_SIN:

Included in DTMF source code July 3, 1990 B.W.
        Sine Approximation              Y = boot_sin(x)
        Calling Parameters
                AX0 = x in scaled 1.15 format
                M7 = 1
                L7 = 0
        Return Values           MR1 = y in 1.15 format
        Altered Registers       AY0,AF,AR,MY1,MX1,MF,MR,SR,I3
        Computation Time        27 cycles
─────────────────────────────────────────────────────────────────────}

.ENTRY  boot_sin;

.VAR/PM sin_coeff[5];
.INIT   sin_coeff: H#324000, H#005300, H#AACC00, H#08B700, H#1CCE00;

boot_sin:
        i5 = ^sin_coeff;                        { Pointer to coeff. buffer}
        ay0 = h#4000;
        ar = ax0, af  = ax0 and ay0;            { Check 2nd or 4th quad.}
        if ne ar = -ax0;                        { If yes, negate input}
        ay0 = h#7FFF;
        ar  = ar and ay0;                       { Remove sign bit}
        my1 = ar;
        mf  = ar  * my1 (rnd), mx1 = pm(i5,m4); { mf = x2 } mr  = mx1 * my1 (ss),  mx1 = pm(i5,m4); { mr = c1x}
        cntr = 3;
        do approx until ce;
            mr  = mr + mx1 * mf (ss);
approx:     mf  = ar * mf (rnd), mx1 = pm(i5,m4);
        mr  = mr + mx1 * mf (ss);
        sr  = ashift mr1 by 3 (hi);
        sr  = sr or lshift mr0 by 3 (lo);       { Convert to 1.15 format}
        ar  = pass sr1;
        if lt ar = pass ay0;                    { Saturate if needed}
        af  = pass AX0;
        if lt ar = -ar;                         { Negate output if needed}
        rts;

{─────────────────────────────────────────────────────────────────────

Every Time Setup Routine resets pointers to top of buffers, resets counter values,
    clears Goertzel feedback buffers to zero, etc

─────────────────────────────────────────────────────────────────────} recycle:
        i0 = ^A_Q1Q2_buff;
        cntr = Qbufsize;               { number of locations to clear }
        do zloop until ce;
zloop:    dm(i0,m0) = 0;

ax0 = 0;
        dm(A_NRG_hi) = ax0;
        dm(A_NRG_lo) = ax0;
        dm(A_shift) = ax0;
        dm(A_shiftflag) = ax0;

dm(B_NRG_hi) = ax0;
        dm(B_NRG_lo) = ax0;
        dm(B_shift) = ax0;
        dm(B_shiftflag) = ax0;

dm(C_NRG_hi) = ax0;
        dm(C_NRG_lo) = ax0;
        dm(C_shift) = ax0;
        dm(C_shiftflag) = ax0;

i7 = ^coefs;
```

```
        ax0 = countval;
        dm(countdtmf) = ax0;

ax0 = 0;                  { change to 0 to start interrupt }
        dm(doneflag) = ax0;

rts;
```

{─────────────────────────────────────────────
|
|   magdtmf:
|
|   Calculates Goertzel feedback values for each pass.
|
─────────────────────────────────────────────}

```
magdtmf:
        ar = 0;
        dm(shifter) = ar;              { clear shift flag }
        cntr = 16;                     { 8 fundamentals, 8 2nd_harmonics per chan }
        do freqdtmf until ce;
            mx0 = dm(i0,m0), my0 = pm(i7,m4);
                                       { get Q1 and COEF  Q1=1.15, COEF=2.14 }
            mr = mx0 * my0 (rnd), ay0 = dm(i0,m1);
                                       { mult, get Q2    MR=2.30,   Q2=1.15 }
            sr = ashift mr1 by 1 (hi); { change 2.30 to 1.15 }
            ar = sr1 - ay0;            { Q1*COEF - Q2           AR=1.15 }
            ar = ar + ay1;             { Q1*COEF - Q2 + input   AR=1.15 }
            dm(i0,m0) = ar;            { result = new Q1 }
            ay0 = 0xC000;
            ar = abs ar;               { see if too big }
            ar = ar and ay0;
            if eq jump freqdtmf;       { no }
            dm(shifter) = ar;          { yes, set flag }
freqdtmf:   dm(i0,m0) = mx0;           { old Q1 = new Q2 }
        rts;
```

{─────────────────────────────────────────────
|
|   Calculate Magnitude Square
|
|   calculates magnitude-squared (magsqr) from Goertzel feedback results
|
─────────────────────────────────────────────}

```
magsqr: mx0 = dm(i0,m0);               { get two copies of Q1     1.15 }
        my0 = mx0;
        mx1 = dm(i0,m0);               { get two copies of Q2     1.15 }
        my1 = mx1;
        ar = pm(i7,m4);                { get COEF                 2.14 }
        mr = 0;
        mf = mx0*my1(rnd);             {  Q1*Q2                   1.15 }
        mr = mr-ar*mf(rnd);            { -Q1*Q2*COEF              2.14 }
        sr = ashift mr1 by 1 (hi);     { 2.14 -> 1.15 format conv. 1.15 }
        mr = 0;
        mr1 = sr1;
        mr = mr+mx0*my0(ss);           { Q1*Q1 + -Q1*Q2*COEF      1.15 }
        mr = mr+mx1*my1(rnd);          { Q1*Q1 + Q2*Q2 + -Q1*Q2*COEF  1.15 }
        dm(i3,m0) = mr1;               { store in magsqr buffer   1.15 }
        rts;
```

{─────────────────────────────────────────────
|
|   Restore stuff from interrupt routine.
|
─────────────────────────────────────────────}

```
restore:
        i3 = dm(tmp_i3);
        i1 = dm(tmp_i1);
        dis sec_reg;
        rts;
```
|   CNTLREG_INITS:
|
|   Set Up SPORTS and TIMER on PC-MITE board after RESET
|   (used for ADSP-2101 EZ-LAB demonstrations)
|
|   Analog Devices, Inc.
|   DSP Division
|   P.O.Box 9106
|   Norwood, MA 02062
|
|   31-Jan-1990, revised 3-Apr-1990

```
Christoph Cavigioli (DSP Applications)
Included in DTMF source code July 3, 1990 B.W.

Usage:            call CntlReg_inits;
Input:            none
Output:           DM(0x3fef) - DM(0x3fff) initialized
Altered Registers: I0,L0
Benchmark:        21 cycles
```

```
CntlReg_inits:
        i3    = h#3FEF;              { point to DM-mapped control registers }

{————————————————S E R I A L      P O R T   #1   S T U F F————————————————}
{ h#3FEF } dm(i3,m0) = h#0000;       { autobuffering disabled }
{ h#3FF0 } dm(i3,m0) = h#0000;       { RFSDIV not used }
{ h#3FF1 } dm(i3,m0) = h#0000;       { SCLKDIV not used }
{ h#3FF2 } dm(i3,m0) = h#0000;       { control reg functions disabled }

{————————————————S E R I A L      P O R T   #2   S T U F F————————————————}
{ h#3FF3 } dm(i3,m0) = h#0863;       { tx & rx autobuffering enabled }
{ h#3FF4 } dm(i3,m0) = 0;            { RFSDIV=255 for 8 kHz interrupt rate }
{ h#3FF5 } dm(i3,m0) = 0;            { SCLKDIV=2 makes 2.048 MHz SCLK
                                       with 12.288 MHz xtal on EZ-LAB }
{ h#3FF6 } dm(i3,m0) = h#86A7;       { multichannel enabled,
                                       externally generated SCLK,
                                       multichannel frame delay = 1,
                                       MCL = 32, no int RFS,
                                       invert TFS, normal RFS,
                                       interpret ser data as u_law, 8-bit PCM }
{ h#3FF7 } dm(i3,m0) = h#1FFF;       { multichannel tx word enables #15 - #00 }
{ h#3FF8 } dm(i3,m0) = h#0000;       { multichannel tx word enables #31 - #16 }
{ h#3FF9 } dm(i3,m0) = h#FFFF;       { multichannel rx word enables #15 - #00 }
{ h#3FFA } dm(i3,m0) = h#3FFF;       { multichannel rx word enables #31 - #16 }

{————————————————T I M E R     S T U F F————————————————}
{ h#3FFB } dm(i3,m0) = h#0000;       { TSCALE }
{ h#3FFC } dm(i3,m0) = h#0000;       { TCOUNT }
{ h#3FFD } dm(i3,m0) = h#0000;       { TPERIOD }

{————————————————S Y S T E M    A N D    M E M O R Y    S T U F F————————————————}
{ h#3FFE } dm(i3,m0) = h#1249;       { DMWAIT = 1, all segments }
{ h#3FFF } dm(i3,m0) = h#0018;       { SPORT0 disabled,
                                       SPORT1 disabled,
                                       SPORT1 config. as FI,FO,IRQ0,IRQ1,SCLK,
                                       BOOT_PAGE=0, BMWAIT=3, PMWAIT=0 }
        rts;
.endmod;
```

We claim:

1. A digital switching system comprising:

a digital switching matrix having an input bus and an output bus with information on the input bus being selectively connectable to information on the output bus in response to control signals applied to switches of the switching matrix;

a plurality of information systems with each information system having an information bus for transmitting and receiving information using a protocol which is different from a protocol used by the information bus of each of the other information systems with the information buses of the information systems being electrically connected to the input and the output buses of the matrix to permit information transmitted on a conductor of any of the information buses to be received by another conductor of any of the information buses through the input bus, the switching matrix and the output bus;

a host processor, coupled to each of the plurality of the information systems, for controlling the information systems with commands causing at least one of the information systems to transmit and at least one of the information systems to receive information using the information bus of the transmitting and the information bus of the receiving information systems, the switching matrix and the input and output buses; and 2. A digital switching system in accordance with claim 1, wherein:

a control processor, responsive to commands from the host processor, for generating the control signals controlling switching of the switches of the digital switching matrix.

information transmitted and received on the information buses is encoded in a pulse code modulation format to provide a plurality of channels of information with each channel being time division multiplexed.

3. A digital switching system in accordance with claim 2, wherein:

the channels of information contain audio voice information.

4. A digital switching system in accordance with claim 2, further comprising:

control circuitry, responsive to the control processor, for providing a master clock signal to the information systems which controls a rate of information transmission and reception on the buses by the information systems.

5. A digital switching system in accordance with claim 4, wherein:

the commands control the generation of the master clock signal with the host processor commanding the information systems to control the transmission and reception of information on the information buses under the control of the master clock signal.

6. A digital switching system in accordance with claim 5, wherein:
the master clock signal is synchronized with a signal provided on one of the information buses of the information systems.

7. A digital switching system in accordance with claim 4, wherein:
the control circuitry also provides synchronization signals to the information systems which synchronize frames of information transmitted and received on the buses by the information systems.

8. A digital switching system in accordance with claim 7, wherein:
the commands control the generation of the synchronization signals with the host processor commanding the information systems to synchronize the transmission and reception of frames on the information buses under the control of the synchronization signals.

9. A digital switching system in accordance with claim 1, wherein:
at least one of the information systems is connected to a public switched telephone network and the network provides a timing reference to the switching system used to generate a master clock signal by control circuitry to control a rate of information transmission and reception on the buses by the information systems.

10. A digital switching system in accordance with claim 1, wherein:
the host processor transmits commands to a plurality of the information systems and to the control processor to cause information to be transmitted from the bus of one of the information systems through the digital switching matrix for receipt by the bus of another one of the information systems.

11. A digital switching system in accordance with claim 10, further comprising:
control circuitry, responsive to the control processor, for providing a master clock signal to the information systems which controls a rate of information transmission and reception on the buses by the information systems.

12. A digital switching system in accordance with claim 11, wherein:
the commands control the generation of the master clock signal with the host processor commanding the information systems to control the transmission and reception of information on the information buses under the control of the master clock signal.

13. A digital switching system in accordance with claim 12, wherein:
the master clock signal is synchronized with a signal provided on one of the information buses of the information systems.

14. A digital switching system in accordance with claim 11, wherein:
the control circuitry also provides synchronization signals to the information systems which synchronize frames of information transmitted and received on the buses by the information systems.

15. A digital switching system in accordance with claim 14, wherein:
the commands control the generation of the synchronization signals with the host processor commanding the information systems to synchronize the transmission and reception of frames on the information buses under the control of the synchronization signals.

16. A digital switching system in accordance with claim 1, wherein:
the host processor transmits commands to one of the information systems and to the control processor to cause information to be transmitted and received by the bus of the information system receiving the commands through the switching matrix.

17. A digital switching system in accordance with claim 16, further comprising:
control circuitry, responsive to the control processor, for providing a master clock signal to the information systems which controls a rate of information transmission and reception on the buses by the information systems.

18. A digital switching system in accordance with claim 17, wherein:
the commands control the generation of the master clock signal with the host processor commanding the information systems to control the transmission and reception of information on the information buses under the control of the master clock signal.

19. A digital switching system in accordance with claim 18, wherein:
the master clock signal is synchronized with a signal provided on one of the information buses of the information systems.

20. A digital switching system in accordance with claim 17, wherein:
the control circuitry also provides synchronization signals to the information systems which synchronize frames of information transmitted and received on the buses by the information systems.

21. A digital switching system in accordance with claim 20, wherein:
the commands control the generation of the synchronization signals with the host processor commanding the information systems to synchronize the transmission and reception of frames on the information buses under the control of the synchronization signals.

22. A digital switching system in accordance with claim 1, wherein:
the host processor transmits commands to at least one of the information systems and to the control processor to cause a plurality of channels of information to be transmitted from the bus of at least one of the information systems through the switching matrix to the bus of at least another one of the information systems.

23. A digital switching system in accordance with claim 22, wherein:
the host processor transmits commands to a plurality of the information systems and to the control processor to cause the plurality of channels of information to be transmitted from the bus of at least one of the information systems through the switching matrix to the bus of at least another one of the information systems.

24. A digital switching system in accordance with claim 23, further comprising:
control circuitry, responsive to the control processor, for providing a master clock signal to the information systems which controls a rate of information transmission and reception on the buses by the information systems.

25. A digital switching system in accordance with claim 24, wherein:
the commands control the generation of the master clock signal with the host processor commanding the information systems to control the transmission and reception of information on the information buses under the control of the master clock signal.

26. A digital switching system in accordance with claim 25, wherein:
the master clock signal is synchronized with a signal provided on one of the information buses of the information systems.

27. A digital switching system in accordance with claim 35, wherein:
the control circuitry also provides synchronization signals to the information systems which synchronize frames of information transmitted and received on the buses by the information systems.

28. A digital switching system in accordance with claim 27, wherein:
the commands control the generation of the synchronization signals with the host processor commanding the information systems to synchronize the transmission and reception of frames on the information buses under the control of the synchronization signals.

29. A digital switching system in accordance with claim 22, further comprising:
control circuitry, responsive to the control processor, for providing a master clock signal to the information systems which controls a rate of information transmission and reception on the buses by the information systems.

30. A digital switching system in accordance with claim 29, wherein:
the commands control the generation of the master clock signal with the host processor commanding the information systems to control the transmission and reception of information on the information buses under the control of the master clock signal.

31. A digital switching system in accordance with claim 30, wherein:
the master clock signal is synchronized with a signal provided on one of the information buses of the information systems.

32. A digital switching system in accordance with claim 29, wherein:
the control circuitry also provides synchronization signals to the information systems which synchronize frames of information transmitted and received on the buses by the information systems.

33. A digital switching system in accordance with claim 32, wherein:
the commands control the generation of the synchronization signals with the host processor commanding the information systems to synchronize the transmission and reception of frames on the information buses under the control of the synchronization signals.

34. A digital switching system in accordance with claim 1, wherein:
the host processor transmits commands to the plurality of information systems and to the control processor to cause full duplex communications between buses of at least two of the information systems through the switching matrix.

35. A digital switching system in accordance with claim 34, further comprising:
control circuitry, responsive to the control processor, for providing a master clock signal to the information systems which controls a rate of information transmission and reception on the buses by the information systems.

36. A digital switching system in accordance with claim 35, wherein:
the commands control the generation of the master clock signal with the host processor commanding the information systems to control the transmission and reception of information on the information buses under the control of the master clock signal.

37. A digital switching system in accordance with claim 36, wherein:
the master clock signal is synchronized with a signal provided on one of the information buses of the information systems.

38. A digital switching system in accordance with claim 35, wherein:
the control circuitry also provides synchronization signals to the information systems which synchronize frames of information transmitted and received on the buses by the information systems.

39. A digital switching system in accordance with claim 38, wherein:
the commands control the generation of the synchronization signals with the host processor commanding the information systems to synchronize the transmission and reception of frames on the information buses under the control of the synchronization signals.

40. A digital switching system in accordance with claim 1, further comprising:
control circuitry, responsive to the control processor, for providing a master clock signal to the information systems which controls a rate of information transmission and reception on the buses by the information systems.

41. A digital switching system in accordance with claim 40, wherein:
the commands control the generation of the master clock signal with the host processor commanding the information systems to control the transmission and reception of information on the information buses under the control of the master clock signal.

42. A digital switching system in accordance with claim 41, wherein:
the master clock signal is synchronized another with another signal provided on one of the information buses of the information systems.

43. A digital switching system in accordance with claim 40, wherein:
the control circuitry also provides synchronization signals to the information systems which synchronize frames of information transmitted and received on the buses by the information systems.

44. A digital switching system in accordance with claim 43, wherein:
the commands control the generation of the synchronization signals with the host processor commanding the information systems to synchronize the transmission and reception of frames on the information buses under the control of the synchronization signals.

45. A system comprising:
a plurality of information systems with each information system having an information bus for transmitting and receiving information using a protocol which is different from a protocol used by the information bus of each of the other information systems with conductors of the information buses of the information systems being electrically connected to permit information transmitted on a conductor of any of the information buses to be received by another conductor of any of the information buses;

a host processor, coupled to each of the plurality of the information systems, for controlling the information systems with commands causing at least one of the information systems to transmit and at least one of the information systems to receive information using the information bus of the transmitting and the information bus of the receiving information systems;

a control processor, responsive to commands from the host processor, for generating the control signals; and control circuitry, responsive to the control processor, for providing a master clock signal to the information systems which controls a rate of information transmission and reception on the buses by the information systems.

46. A system in accordance with claim 45, wherein: the commands control the generation of the master clock signal with the host processor commanding the information systems to control the transmission and reception of information on the information buses under the control of the master clock signal.

47. A system in accordance with claim 46, wherein: the master clock signal is synchronized with a signal provided on one of the information buses of the information systems.

48. A system in accordance with claim 45, wherein: the control circuitry also provides synchronization signals to the information systems which synchronize frames of information transmitted and received on the buses by the information systems.

49. A system in accordance with claim 48, wherein: the commands control the generation of the synchronization signals with the host processor commanding the information systems to synchronize the transmission and reception of frames on the information buses under the control of the synchronization signals.

50. A system in accordance with claim 45, wherein: information transmitted and received on the information buses is encoded in a pulse code modulation format to provide a plurality of channels of information with each channel being time division multiplexed.

51. A system in accordance with claim 50, wherein: the channels of information contain audio voice information.

52. A system in accordance with claim 45, wherein: at least one of the information systems is connected to a public switched telephone network and the network provides a timing reference to the system used to generate the master clock signal.

* * * * *